US011996005B2

(12) United States Patent
Californiaa

(10) Patent No.: US 11,996,005 B2
(45) Date of Patent: May 28, 2024

(54) METHOD OF INTERACTIVE READING FOR USERS OF SELF-SCROLLING BRAILLE

(71) Applicant: Eurica Californiaa, Laie, HI (US)

(72) Inventor: Eurica Californiaa, Laie, HI (US)

( * ) Notice: Subject to any disclaimer, the term of this patent is extended or adjusted under 35 U.S.C. 154(b) by 45 days.

(21) Appl. No.: 17/467,255

(22) Filed: Sep. 5, 2021

(65) Prior Publication Data
US 2021/0398452 A1 Dec. 23, 2021

Related U.S. Application Data

(62) Division of application No. 15/791,330, filed on Oct. 23, 2017, now Pat. No. 11,145,223.

(60) Provisional application No. 62/411,623, filed on Oct. 23, 2016.

(51) Int. Cl.
G09B 21/04 (2006.01)
G09B 21/00 (2006.01)

(52) U.S. Cl.
CPC ......... G09B 21/004 (2013.01); G09B 21/007 (2013.01); G09B 21/04 (2013.01)

(58) Field of Classification Search
CPC ..... G09B 21/04; G09B 21/007; G09B 21/004
USPC ........................................................ 434/114
See application file for complete search history.

(56) References Cited

U.S. PATENT DOCUMENTS

| | | |
|---|---|---|
| 1,487,115 A | 3/1924 | McQuarrie |
| 2,062,468 A | 12/1936 | Matz |
| 2,802,918 A | 8/1957 | Boyle |
| 3,229,387 A | 1/1966 | Linvill |
| 4,569,575 A | 2/1986 | Le Pesant et al. |
| 5,993,089 A | 11/1999 | Burrell, IV |
| 6,159,013 A * | 12/2000 | Parienti ..................... A61F 9/08 434/114 |
| 6,369,954 B1 | 4/2002 | Berge et al. |
| 6,776,619 B1 | 8/2004 | Roberts et al. |
| 6,819,228 B2 | 11/2004 | Gipson et al. |
| 6,911,132 B2 | 6/2005 | Pamula et al. |

(Continued)

FOREIGN PATENT DOCUMENTS

DE 102004046526 B4 7/2007

OTHER PUBLICATIONS

Ray et al., "PandaBraille: A refreshable electro-tactile braille display with no moving parts (VIT University)," Participant, Tech for Cognitive & Sensory Impairments, Rehabilitation Engineering and Assistive Technology Society of North America (RESNA) Conference 2013, http://aac-rerc.psu.edu/wordpressmu/RESNA-SDC/2013/06/19/pandabraille-a-refreshable-electro-tactile-braille-display-with-no-moving-parts-vit-university/ (accessed Oct. 15, 2017).

(Continued)

Primary Examiner — Kesha Frisby
(74) Attorney, Agent, or Firm — Boies Schiller Flexner LLP

(57) ABSTRACT

Electronically displayed Braille dots are laterally propagated against a stationary finger resting on a stationary base for reading Braille. The lateral propagation takes the form of a transverse wave of pins which are raised and lowered in sequence. The reading can be synchronized with other processes or events under computer controls. A method of interactive reading is provided whereby the reading of Braille from the display is computer-synchronized with other events and processes to help users learn Braille, to monitor physiological responses to reading, and to enhance a user's reading experience.

29 Claims, 78 Drawing Sheets

(56) References Cited

U.S. PATENT DOCUMENTS

| | | | |
|---|---|---|---|
| 7,126,903 | B2 | 10/2006 | Feenstra et al. |
| 7,352,356 | B2 | 4/2008 | Roberts et al. |
| 8,292,798 | B2 | 10/2012 | Californiaa |
| 8,360,778 | B2 | 1/2013 | Murphy et al. |
| 8,633,907 | B2 | 1/2014 | Mahalingam |
| 8,932,061 | B2 | 1/2015 | Abernethy, Jr. et al. |
| 9,024,874 | B2 | 5/2015 | Stetten et al. |
| 9,171,483 | B2 | 10/2015 | Cho |
| 9,600,072 | B2 | 3/2017 | Naidu et al. |
| 9,715,280 | B2 | 7/2017 | Ullrich et al. |
| 9,916,008 | B2 | 3/2018 | Bostick et al. |
| 9,984,589 | B2 | 5/2018 | Jain et al. |
| 10,573,199 | B2 | 2/2020 | Abebe et al. |
| 11,145,223 | B2 | 10/2021 | Californiaa |
| 2018/0342176 | A1 | 11/2018 | Californiaa |
| 2020/0193870 | A1 | 6/2020 | Californiaa |

OTHER PUBLICATIONS

Hayward et al., "Tactile display device using distributed lateral skin stretch," Proceedings of the Haptic Interfaces for Virtual Environment and Teleoperator Systems Symposium, ASME International Mechanical Engineering Congress & Exposition 2000, Orlando, FL, pp. 1309-1314.

Ross et al., "A new dynamic tactile display for reconfigurable braille: implementation and tests," Frontiers in Neuroengineering, vol. 7, Art. 6, Apr. 2014, pp. 1-6.

Bar-Cohen, "Electroactive polymers for refreshable Braille displays," SPIE Newsroom, Sep. 11, 2009, doi: http://doi.org/10.1117/2.1200909.1738.

"Active Braille" Brand Braille Display, User Manual (Version 4.5, Sep. 2018), Help Tech GmbH, Horb, Germany.

ATC-LogAnalyzer, HelpTech, https://www.helptech.eu/atc-loganalyzer (accessed Oct. 5, 2022).

Roberts et al., "49.2: Rotating wheel Braille display for continuous refreshable Braille," The Society for Information Display Symposium Digest of Technical Papers, vol. 31, No. 1, May 2000, pp. 1130-1133.

National Library Service for the Blind and Physically Handicapped, "Braille Books and Pamphlets," Specification #800, Library of Congress (Washington, DC), Feb. 2008.

Temiz et al., "Lab-on-a-chip devices: How to close and plug the lab?" Microelectronic Engineering, vol. 132, 2015, pp. 156-175.

Leester-Schädel et al., "Fabrication of microfluidic devices," In: A. Dietzel (ed.), Microsystems for pharmatechnology: Manipulation of fluids, particles, droplets, and cells, Cham (Switzerland): Springer, 2016, pp. 23-57.

Chatterjee et al., "Droplet-based microfluidics with nonaqueous solvents and solutions," Lab on a Chip, vol. 6, No. 2, 2006, pp. 199-206.

Jeong et al., "Enhancement of response speed of viscous fluids using overdrive voltage," Sensors and Actuators B: Chemical, vol. 209, 2015, pp. 56-60.

Jeong et al., "Optimum thickness of hydrophobic layer for operating voltage reduction in EWOD systems," Sensors and Actuators A, vol. 215, 2014, pp. 8-16.

Pellat, "Mesure de la force agissant sur les diélectriques liquides non électrisés placés dans un champ életrique (Measurement of the force acting on non-electrified dielectric liquids placed in an electric field)," Comptes Rendus de Académie des Sciences (Proceedings of the Academy of Sciences), Paris, vol. 123, Jul.-Dec. 1896, pp. 691-694.

Maryott et al., "Table of dielectric constants of pure liquids," National Bureau of Standards Circular 514, Washington, DC, 1951.

Gu et al., "Computerized microfluidic cell culture using elastomeric channels and Braille displays," Proceedings of the National Academy of Sciences USA, vol. 101, No. 45, 2004, pp. 15861-15866.

Hulme et al., "Incorporation of prefabricated screw, pneumatic, and solenoid valves into microfluidic devices," Lab on a Chip, vol. 9, No. 1, 2009, pp. 79-86.

Au et al., "Microvalves and micropumps for BioMEMS," Micromachines, vol. 2, No. 2, 2011, pp. 179-220.

Bar-Cohen, "Electroactive polymers for refreshable Braille displays," SPIE Newsroom, 2009, http://dx.doi.org/10.1117/2.1200909.1738.

Chakraborti et al., "A compact dielectric elastomer tubular actuator for refreshable Braille displays," Sensors and Actuators A, vol. 179, 2012, pp. 151-157.

Spigna et al., "The integration of novel EAP-based Braille cells for use in a refreshable tactile display," SPIE Proceedings, vol. 7642, Electroactive Polymer Actuators and Devices (EAPAD) 2010, 76420A.

Wu, "A reconfigurable tactile display based on polymer MEMS technology," Georgia Institute of Technology, Thesis, 2008, http://hdl.handle.net/1853/22623.

Arora, "Development of dielectric elastomer based prototype fiber actuators," North Carolina State University, Thesis, 2005, http://www.lib.ncsu.edu/resolver/1840.16/1413.

Mazzoldi et al., "Electroactive polymer actuators," In: H. Janocha (ed.), Adaptronics and smart structures: basics, materials, design, and applications, 2nd ed., New York: Springer, 2007, pp. 204-224.

Mani, "Surface characterization of polyvinylidene fluoride (PVDF) in its application as an actuator," Texas A&M University, Thesis, 2007, http://hdl.handle.net/1969.1/ETD-TAMU-1349.

Rosset et al., "Flexible and stretchable electrodes for dielectric elastomer actuators," Applied Physics A, vol. 110, No. 2, 2013, pp. 281-307.

Akbay, "Performance of compliant electrodes in electro active polymer (EAP) actuators," North Carolina State University, Thesis, 2004, http://www.lib.ncsu.edu/resolver/1840.16/1877.

Khodaparast et al., "Electrode structures in high strain actuator technology," Journal of Optoelectronics and Advanced Materials, vol. 9, No. 11, 2007, pp. 3585-3591.

Dargaville et al., "Characterization, performance and optimization of PVDF as a piezoelectric film for advanced space mirror concepts," Sandia National Laboratories, Sandia Report No. SAND2005-6846, U.S. Department of Commerce, Springfield, VA: National Technical Information Service, 2005.

Tiwari et al., "Optimizing the design of polymer based unimorph actuator using COMSOL Multiphysics," Proceedings of the 2012 COMSOL Conference in Bangladore, 2012, https://www.comsol.com/offers/conference2012papers/papers/file/id/13954/file/15821_tiwari_paper.pdf.

Kim, "Low power energy harvesting with piezoelectric generators," University of Pittsburgh, Thesis, 2002, http://d-scholarship.pitt.edu/id/eprint/10228.

Mo et al., "Finite element analysis of unimorph rectangular piezoelectric diaphragm actuators with experimental verification," Smart Materials and Structures, vol. 21, No. 8, 2012, 085025.

Shilkrot et al., "FingerReader: A wearable device to explore printed text on the go," Proceedings of the Association for Computing Machinery 33rd Annual Conference on Human Factors in Computing Systems, ACM CHI 2015, Extended Abstracts, pp. 2363-2372.

Saadeh, "A refreshable and portable e-Braille system for the blind and visually impaired," University of North Las Vegas, Dissertation, Paper No. 1619, 2012, http://digitalscholarship.unlv.edu/thesesdissertations/1619/.

Kaczmarek et al., "Pattern identification as a function of stimulation current on a fingertip-scanned electrotactile display," Institute of Electronics and Electrical Engineers Transactions on Neural Systems and Rehabilitation Engineering, vol. 11, No. 3, 2003, pp. 265-275.

\* cited by examiner

BRAILLE LETTER "t"

Raised dot = filled circle
Unraised dot = empty circle

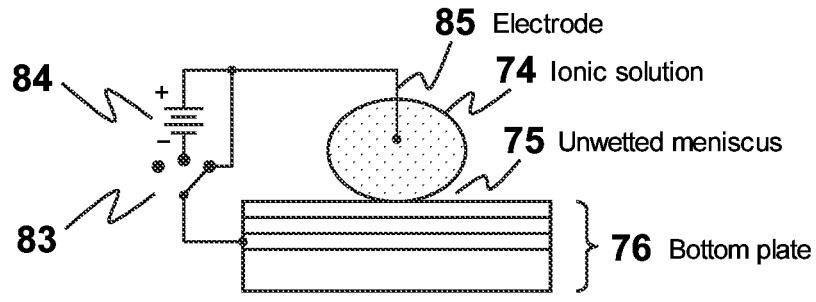
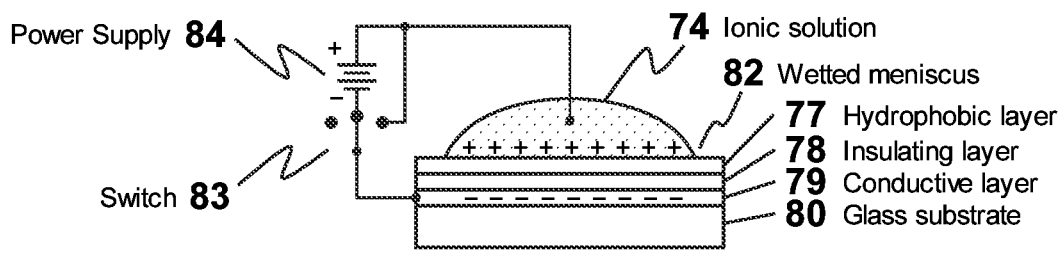
FIG. 15A
(Prior Art)
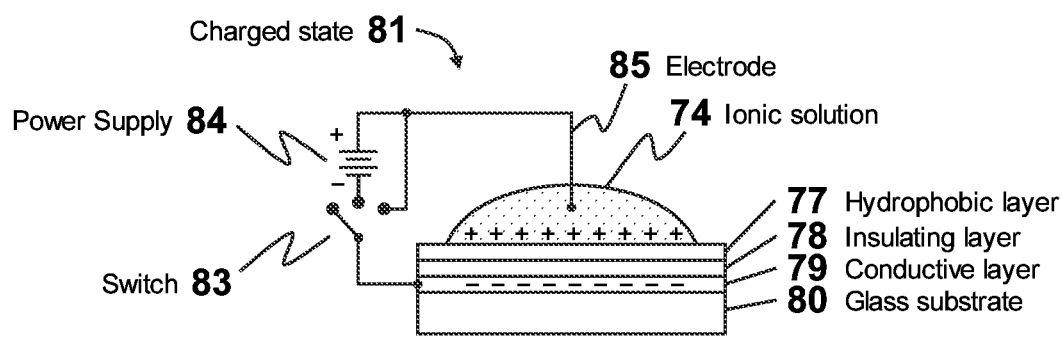
FIG. 15B
(Prior Art)

MSB 76543210 LSB

10010110

01101100 int ASCII2NEMETH[256] = {0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 106, 4, 46, 202, 138, 234, 32, 230, 110, 130, 42, 2, 34, 10, 40, 38, 64, 96, 68, 70, 66, 100, 102, 98, 36, 134, 6, 194, 238, 44, 142, 8, 0, 0, 0, 0, 0, 217, 0, 0, 0, 0, 0, 0, 0, 0, 0, 249, 0, 0, 0, 0, 0, 0, 95, 0, 0, 0, 74, 198, 206, 12, 14, 0, 128, 192, 136, 140, 132, 200, 204, 196, 72, 76, 160, 224, 168, 172, 164, 232, 236, 228, 104, 108, 162, 226, 78, 170, 174, 166, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0};

©2017 Eurica Califorrniaa int NEMETH2ASCII[256] = {0, 0, 44, 0, 34, 0, 59, 0, 64, 0, 46, 0, 94, 0, 95, 0, 0, 0, 0, 0, 0, 0, 0, 0, 0, 0, 0, 0, 0, 0, 0, 0, 39, 0, 45, 0, 57, 0, 48, 0, 47, 0, 43, 0, 62, 0, 35, 0, 0, 0, 0, 0, 0, 0, 0, 0, 0, 0, 0, 0, 0, 0, 0, 0, 49, 0, 53, 0, 51, 0, 52, 0, 105, 0, 91, 0, 106, 0, 119, 0, 0, 0, 0, 0, 0, 0, 0, 0, 0, 0, 0, 0, 0, 0, 50, 0, 56, 0, 54, 0, 55, 0, 115, 0, 33, 0, 116, 0, 41, 0, 0, 0, 0, 0, 0, 0, 0, 0, 0, 0, 0, 0, 0, 0, 97, 0, 42, 0, 101, 0, 58, 0, 99, 0, 37, 0, 100, 0, 63, 0, 0, 0, 0, 0, 0, 0, 0, 0, 0, 0, 0, 0, 0, 0, 107, 0, 117, 0, 111, 0, 122, 0, 109, 0, 120, 0, 110, 0, 121, 0, 0, 0, 0, 0, 0, 0, 0, 0, 0, 0, 0, 0, 0, 0, 98, 0, 60, 0, 104, 0, 92, 0, 102, 0, 36, 0, 103, 0, 93, 0, 0, 0, 0, 0, 0, 0, 0, 0, 0, 0, 0, 0, 0, 0, 108, 0, 118, 0, 114, 0, 40, 0, 112, 0, 38, 0, 113, 0, 61, 0, 0, 0, 0, 0, 0, 0, 0, 0, 0, 0, 0, 0, 0, 0, 0};

©2017 Eurica Califorrniaa

FIG. 65 int UTF2TNES[256] = {0, 128, 64, 192, 32, 160, 96, 224, 8, 136, 72, 200, 40, 168, 104, 232, 4, 132, 68, 196, 36, 164, 100, 228, 12, 140, 76, 204, 44, 172, 108, 236, 2, 130, 66, 194, 34, 162, 98, 226, 10, 138, 74, 202, 42, 170, 106, 234, 6, 134, 70, 198, 38, 166, 102, 230, 14, 142, 78, 206, 46, 174, 110, 238, 16, 144, 80, 208, 48, 176, 112, 240, 24, 152, 88, 216, 56, 184, 120, 248, 20, 148, 84, 212, 52, 180, 116, 244, 28, 156, 92, 220, 60, 188, 124, 252, 18, 146, 82, 210, 50, 178, 114, 242, 26, 154, 90, 218, 58, 186, 122, 250, 22, 150, 86, 214, 54, 182, 118, 246, 30, 158, 94, 222, 62, 190, 126, 254, 1, 129, 65, 193, 33, 161, 97, 225, 9, 137, 73, 201, 41, 169, 105, 233, 5, 133, 69, 197, 37, 165, 101, 229, 13, 141, 77, 205, 45, 173, 109, 237, 3, 131, 67, 195, 35, 163, 99, 227, 11, 139, 75, 203, 43, 171, 107, 235, 7, 135, 71, 199, 39, 167, 103, 231, 15, 143, 79, 207, 47, 175, 111, 239, 17, 145, 81, 209, 49, 177, 113, 241, 25, 153, 89, 217, 57, 185, 121, 249, 21, 149, 85, 213, 53, 181, 117, 245, 29, 157, 93, 221, 61, 189, 125, 253, 19, 147, 83, 211, 51, 179, 115, 243, 27, 155, 91, 219, 59, 187, 123, 251, 23, 151, 87, 215, 55, 183, 119, 247, 31, 159, 95, 223, 63, 191, 127, 255};

©2017 Eurica Califorrniaa

FIG. 66

```
int TNES2UTF[256] = {0x2800, 0x2880, 0x2820, 0x28A0, 0x2810, 0x2890,
0x2830, 0x28B0, 0x2808, 0x2888, 0x2828, 0x28A8, 0x2818, 0x2898, 0x2838,
0x28B8, 0x2840, 0x28C0, 0x2860, 0x28E0, 0x2850, 0x28D0, 0x2870, 0x28F0,
0x2848, 0x28C8, 0x2868, 0x28E8, 0x2858, 0x28D8, 0x2878, 0x28F8, 0x2804,
0x2884, 0x2824, 0x28A4, 0x2814, 0x2894, 0x2834, 0x28B4, 0x280C, 0x288C,
0x282C, 0x28AC, 0x281C, 0x289C, 0x283C, 0x28BC, 0x2844, 0x28C4,
0x2864, 0x28E4, 0x2854, 0x28D4, 0x2874, 0x28F4, 0x284C, 0x28CC,
0x286C, 0x28EC, 0x285C, 0x28DC, 0x287C, 0x28FC, 0x2802, 0x2882,
0x2822, 0x28A2, 0x2812, 0x2892, 0x2832, 0x28B2, 0x280A, 0x288A, 0x282A,
0x28AA, 0x281A, 0x289A, 0x283A, 0x28BA, 0x2842, 0x28C2, 0x2862,
0x28E2, 0x2852, 0x28D2, 0x2872, 0x28F2, 0x284A, 0x28CA, 0x286A,
0x28EA, 0x285A, 0x28DA, 0x287A, 0x28FA, 0x2806, 0x2886, 0x2826,
0x28A6, 0x2816, 0x2896, 0x2836, 0x28B6, 0x280E, 0x288E, 0x282E, 0x28AE,
0x281E, 0x289E, 0x283E, 0x28BE, 0x2846, 0x28C6, 0x2866, 0x28E6, 0x2856,
0x28D6, 0x2876, 0x28F6, 0x284E, 0x28CE, 0x286E, 0x28EE, 0x285E,
0x28DE, 0x287E, 0x28FE, 0x2801, 0x2881, 0x2821, 0x28A1, 0x2811, 0x2891,
0x2831, 0x28B1, 0x2809, 0x2889, 0x2829, 0x28A9, 0x2819, 0x2899, 0x2839,
0x28B9, 0x2841, 0x28C1, 0x2861, 0x28E1, 0x2851, 0x28D1, 0x2871, 0x28F1,
0x2849, 0x28C9, 0x2869, 0x28E9, 0x2859, 0x28D9, 0x2879, 0x28F9, 0x2805,
0x2885, 0x2825, 0x28A5, 0x2815, 0x2895, 0x2835, 0x28B5, 0x280D, 0x288D,
0x282D, 0x28AD, 0x281D, 0x289D, 0x283D, 0x28BD, 0x2845, 0x28C5,
0x2865, 0x28E5, 0x2855, 0x28D5, 0x2875, 0x28F5, 0x284D, 0x28CD,
0x286D, 0x28ED, 0x285D, 0x28DD, 0x287D, 0x28FD, 0x2803, 0x2883,
0x2823, 0x28A3, 0x2813, 0x2893, 0x2833, 0x28B3, 0x280B, 0x288B, 0x282B,
0x28AB, 0x281B, 0x289B, 0x283B, 0x28BB, 0x2843, 0x28C3, 0x2863,
0x28E3, 0x2853, 0x28D3, 0x2873, 0x28F3, 0x284B, 0x28CB, 0x286B,
0x28EB, 0x285B, 0x28DB, 0x287B, 0x28FB, 0x2807, 0x2887, 0x2827,
0x28A7, 0x2817, 0x2897, 0x2837, 0x28B7, 0x280F, 0x288F, 0x282F, 0x28AF,
0x281F, 0x289F, 0x283F, 0x28BF, 0x2847, 0x28C7, 0x2867, 0x28E7, 0x2857,
0x28D7, 0x2877, 0x28F7, 0x284F, 0x28CF, 0x286F, 0x28EF, 0x285F,
0x28DF, 0x287F, 0x28FF};
```

©2017 Eurica Califorrniaa

FIG. 67 byte TNES2UTFDEC[256] = {0, 128, 32, 160, 16, 144, 48, 176, 8, 136, 40, 168, 24, 152, 56, 184, 64, 192, 96, 224, 80, 208, 112, 240, 72, 200, 104, 232, 88, 216, 120, 248, 4, 132, 36, 164, 20, 148, 52, 180, 12, 140, 44, 172, 28, 156, 60, 188, 68, 196, 100, 228, 84, 212, 116, 244, 76, 204, 108, 236, 92, 220, 124, 252, 2, 130, 34, 162, 18, 146, 50, 178, 10, 138, 42, 170, 26, 154, 58, 186, 66, 194, 98, 226, 82, 210, 114, 242, 74, 202, 106, 234, 90, 218, 122, 250, 6, 134, 38, 166, 22, 150, 54, 182, 14, 142, 46, 174, 30, 158, 62, 190, 70, 198, 102, 230, 86, 214, 118, 246, 78, 206, 110, 238, 94, 222, 126, 254, 1, 129, 33, 161, 17, 145, 49, 177, 9, 137, 41, 169, 25, 153, 57, 185, 65, 193, 97, 225, 81, 209, 113, 241, 73, 201, 105, 233, 89, 217, 121, 249, 5, 133, 37, 165, 21, 149, 53, 181, 13, 141, 45, 173, 29, 157, 61, 189, 69, 197, 101, 229, 85, 213, 117, 245, 77, 205, 109, 237, 93, 221, 125, 253, 3, 131, 35, 163, 19, 147, 51, 179, 11, 139, 43, 171, 27, 155, 59, 187, 67, 195, 99, 227, 83, 211, 115, 243, 75, 203, 107, 235, 91, 219, 123, 251, 7, 135, 39, 167, 23, 151, 55, 183, 15, 143, 47, 175, 31, 159, 63, 191, 71, 199, 103, 231, 87, 215, 119, 247, 79, 207, 111, 239, 95, 223, 127, 255};

©2017 Eurica Califorrniaa

FIG. 68

```
001 // Arduino Version 1.6.13 www.arduino.cc
002 // EXEMPLARY PROGRAM FOR DISPLAYING ASCII TEXT IN NEMETH
BRAILLE ON INVENTIVE BRAILLE DISPLAYS
003 byte _data = 12; // Data signal sent to shift registers
004 byte _enable = 11; // Enable signal sent to shift registers
005 byte _latch = 10; // Latch signal sent to shift registers
006 byte _shift = 9;  // Shift signal sent to shift registers
007 byte _clear = 8; // Clear signal sent to shift registers
008 int NumRows = 4; // Number of rows in display
009 int NumCols = 13; // Number of columns in display
010 int BotRowsUnused = 0; // Number of rows unused or absent
at bottom of display (set equal to 1 for 2-by-3 6-bit Braille)
011 int WindowRight = 0; // Right hand window (number of unused
pins, viz. half-pins, on right of display)
012 int WindowLeft = 0; // Left hand window (number of unused
pins on left of display)
013 int TimeInterval = 100; // Time in milliseconds between
successive pin events (shorter interval means faster scrolling
rate of Braille dots)
014 byte MyDisplay[52]; // Virtual shift register; assumes
underlying hardware accomodates 52 pins (four rows of 13)
015 // ASCII2NEMETH[256] is a TNES-based array for accessing
the Nemeth Braille Code with a corresponding ASCII character
```

Continued

FIG. 69
(Lines 1-15)

```
016 byte ASCII2NEMETH[256] = {0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0,
0, 106, 4, 46, 202, 138, 234, 32, 230, 110, 130, 42, 2, 34, 10,
40, 38, 64, 96, 68, 70, 66, 100, 102, 98, 36, 134, 6, 194, 238,
44, 142, 8, 0, 0, 0, 0, 0, 217, 0, 0, 0, 0, 0, 0, 0, 0, 0, 249,
0, 0, 0, 0, 0, 0, 95, 0, 0, 0, 74, 198, 206, 12, 14, 0, 128,
192, 136, 140, 132, 200, 204, 196, 72, 76, 160, 224, 168, 172,
164, 232, 236, 228, 104, 108, 162, 226, 78, 170, 174, 166, 0,
0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0, 0, 0, 0, 0, 0,
0, 0, 0, 0, 0, 0};
017 int ColWidth[4] = {2, 2, 2, 6}; // Column width in pins
(half-pins) of four column types: {Left Column Dots, Interdot
Spaces, Right Column Dots, Trailing Spaces}
018 byte DOTstate[4][4] = {0}; // DOTstate[row][column type] =
state of dots (raised or lowered) by row and column type
019
020 void setup()
021 {
022 pinMode(_data, OUTPUT);
023 pinMode(_enable, OUTPUT);
024 pinMode(_latch, OUTPUT);
025 pinMode(_shift, OUTPUT);
026 pinMode(_clear, OUTPUT);
027 digitalWrite(_enable, 0);
028 digitalWrite(_clear, 1);
029 }
030
031 void loop()
032 {
033 digitalWrite(_data, 0);
034 for (int x = 0; x < 52; x++)   // Clear Braille display
```

Continued

FIG. 69
(Lines 16-34)

```
035  {
036  digitalWrite(_shift, 0);
037  digitalWrite(_shift, 1);
038  }
039  digitalWrite(_latch, 0);
040  digitalWrite(_latch, 1);
041  for (int x = 0; x < 52; x++)  //Clear virtual shift register
042  {
043  MyDisplay[x] = 0;
044  }
045  const String MyText = ",four score and seven years ago today..."; // Exemplary text to be displayed
046  unsigned long lenMyText = MyText.length(); // Character length of text
047  byte targetChar; // Instant character being displayed
048  for (unsigned long charPos = 0; charPos < lenMyText; charPos++) // For length of text
049  {
050  targetChar = MyText[charPos]; // Get instant character from string
051  for (byte bitPos = 0; bitPos < NumRows; bitPos++)  // Get dot states for character from TNES array
052  {
053  DOTstate[bitPos][0] = bitRead(ASCII2NEMETH[targetChar], bitPos + 4);
054  DOTstate[bitPos][2] = bitRead(ASCII2NEMETH[targetChar], bitPos);
055  }
056  for (byte dsplCol = 0; dsplCol < 4; dsplCol++) // For each of four column types
057  {
058  byte w = 0;
059  int k = 0;
```

(Lines 35-59)

```
060 if ((charPos == lenMyText - 1) && dsplCol == 3 && 
(ColWidth[3] < NumCols - 1))  // If displaying trailing spaces on 
last character
061    { k = NumCols - 1 - ColWidth[3]; }  // Then add additional 
spaces as needed to flush display
062 while (w < ColWidth[dsplCol] + k) // Repeat for number of 
pins assigned to a given column type
063    {
064 for (int y = BotRowsUnused; y < NumRows; y++)   // For each 
row in Braille display
065      {
066 for (int z = NumCols - 1 - WindowLeft; z > 0 + WindowRight; 
z--) // Shift contents of virtual shift register
067        {
068 MyDisplay[NumCols * y + z] = MyDisplay[NumCols * y + z - 1];
069        }
070      }
071 for (int i = BotRowsUnused; i < NumRows; i++) // Add dots 
states to virtual shift register
072      {
073 MyDisplay[NumCols * i + WindowRight] = DOTstate[i][dsplCol];
074      }
075 for (int i = 0; i < 52; i++)   // Display contents of virtual 
shift register on Braille Display
076      {
077 digitalWrite(_data, MyDisplay[i]);
078 digitalWrite(_shift, 0);
079 digitalWrite(_shift, 1);
080      }
081 digitalWrite(_latch, 0);
082 digitalWrite(_latch, 1);
083 delay(TimeInterval);   // Time between changes to display
084 w++;
085    }
086  }
087 }
088 }  // Copyright (c) 2017 Eurica Califorrniaa
```

FIG. 69

(Lines 60-88)

"n"　　　"ñ"

"n"　　　"ñ"

"n"

"ñ"

"a"

"@"

"c"

"c"

METHOD OF INTERACTIVE READING FOR USERS OF SELF-SCROLLING BRAILLE

CROSS-REFERENCE TO RELATED APPLICATIONS

This is a divisional application of application Ser. No. 15/791,330, filed Oct. 23, 2017, which is incorporated herein in its entirety by way of reference. This application claims the benefit of U.S. provisional application No. 62/411,623, filed on Oct. 23, 2016, which is incorporated herein in its entirety by way of reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention relates to a tactile display for displaying members of a character set electronically in a format for use by blind, deafblind, dyslexic, illiterate, and other persons with disabilities, including a Braille format.

2. Prior Art

Braille is a system of tactile characters for writing and reading in the form of raised dots presented on a surface which serves as a substrate to support the dots.

Referring to FIGS. 1A and 1B, a traditional Braille character takes the form of a binary code combination of six raised/unraised dots arranged in a two-by-three matrix called a Braille cell 900. The raised dots may be fixed or refreshable.

Fixed dots are typically embossed on a sheet of paper or plastic. Refreshable dots are typically raised and lowered by electronically controlled actuators.

Prior art actuators for refreshable Braille include solenoids, piezoelectric reeds, and fluid pressure sources (hydraulic or pneumatic) controlled by microvalves, whereby each solenoid, piezoelectric reed, or microvalve controls a single pin, corresponding to a single dot.

To read Braille, the dots are sensed by a finger, typically using a relative motion between the finger and the dots. The relative motion may be called swiping, scrolling, or scanning.

In a first example, Braille is read by scrolling a moving finger over fixed dots presented on a stationary substrate. This is how Braille has traditionally been read.

In a second example, Braille is read by scrolling a moving finger over refreshable dots presented on a stationary substrate.

In a third example, Braille is read by scrolling a moving substrate bearing fixed dots past a stationary finger. For example, the substrate moves from reel to reel like an embossed ticker tape and the finger rests on the tape over a support between the reels.

In a fourth example, Braille is read by scrolling a moving substrate bearing refreshable dots past a stationary finger. For example, the substrate is a wheel that slowly rotates with a finger resting on top of it. See U.S. Pat. No. 6,776,619 (Roberts et al.) for a refreshable Braille reader, incorporated herein in its entirety by way of reference. See also Roberts et al., "49.2: Rotating Wheel Braille Display for Continuous Refreshable Braille," The Society for Information Display Symposium Digest of Technical Papers, Vol. 31, No. 1, May 2000, pp. 1130-1133, incorporated herein in its entirety by way of reference.

In the first and second examples, there is a moving finger and a stationary substrate.

In the third and fourth examples, there is a stationary finger and a moving substrate.

Roberts et al. describe two approaches toward achieving a sought-after fifth example, in which a means is sought for reading Braille using a stationary finger resting on a stationary substrate (ibid., p. 1131, col. 1):

"Since the primary cost factor of existing Braille displays is the large number of actuators, it was decided to address the cost issue by finding a way to greatly reduce the number of actuators needed, without the inconvenience of a short-line display. There have been attempts in the past to do this by creating a single-cell display, with the idea that the user would hold a finger over the single cell, and the dots would move up and down to produce a succession of characters, which the user would perceive and mentally reconstruct into text. Such devices have not been commercially successful, for two main reasons. First, the human sense of touch is most sensitive to the sensations produced by lateral motion (scanning) of the object being touched, thus the users could not readily feel the up-and-down motion of the dots in a single-cell display, without moving the reading finger side to side, which is tiring if it must be performed once per character. Second, Braille users mentally construct a geometric model of the layout of the Braille characters, and having all the characters apparently in the same place interferes with this mental process, much in the same way that sighted users have difficulty reading as text a succession of letters that appear in the same place on a visual display."

"Another method that has been tested is to build a fingertip-sized array of pins with extremely close spacing (a millimeter or less, which is several times the density of Braille dots) and to control the up and down motion of this array of pins so that it creates the impression of a textured surface moving laterally under the finger tip. (This can be pictured as one of the 'bed of nails' or 'Pin Art' toys with hundreds of movable pins, with a hand laid against the pins on one side of the toy, receiving the tactile impression of an object that is moved across the other ends of the pins on the other side of the toy.) The virtual textured surface thus generated can contain the impression of moving Braille dots. Experiments with this design have been fairly successful, but unfortunately the need to concentrate the action of a large number of actuators (for example, a 1 cm by 1 cm display with 1 mm pin spacing would require 100 actuators) has thus far prevented the development of a commercial product."

3. Necessity of the Invention

What is needed is a method and apparatus for a tactile display whereby Braille is read by means of electronically refreshable dots presented to a stationary finger resting on a stationary substrate.

What is needed is a means of actuation for the refreshable dots having close spacing.

What is needed is a self-scrolling Braille.

BRIEF SUMMARY OF THE INVENTION

The invention satisfies the above-stated needs.

It is an object of the invention to provide a self-scrolling Braille.

In a preferred embodiment, the invention satisfies this object by method of actuating a series of pins in succession along respective tracks disposed in a stationary substrate, wherein the actuated pins provide a transverse wave of raised dots traveling in a Braille configuration, and which transverse wave enables the user to read Braille by simulating a lateral motion of the raised dots against a stationary portion of the user's body resting on the substrate, for example, a finger.

In one embodiment, called constant contact mode, the pins are in contact with the user in both the raised and unraised states.

In another embodiment, called tapping mode, the pins are not in contact with the user in the unraised state, but when actuated are allowed to accelerate freely within a void region until they tap against the user to signify the raised state.

Advantageously, the tapping mode requires less force from actuators raising and lowering the pins than the constant contact mode to provide a palpable sensation from the pins.

The prior art relies on an array of microvalves to control a fluid pressure source to actuate Braille dots. See U.S. Pat. No. 7,352,356 (Roberts et al.) for a refreshable scanning tactile graphic display for localized sensory stimulation, incorporated herein in its entirety by way of reference; and, U.S. Pat. No. 9,715,280 (Ullrich et al.) for a tactile touch panel actuator mechanism, incorporated herein in its entirety by way of reference.

It is further an object of the present invention to omit the use of microvalves in a hydraulic control of refreshable Braille dots.

In one embodiment, the invention satisfies this object by employing electrowetting forces to urge a hydraulic fluid to actuate Braille dots It is further an object of the present invention to provide an interactive method of reading.

In one embodiment, the invention satisfies this object by temporally pairing a self-scrolling Braille display with another process or event, whereby the other process or event is performed or recorded in computer-controlled synchronization with a presenting of dots, words, or characters on the self-scrolling Braille display. Exemplary uses of the method include helping users to learn Braille, monitoring physiological responses to reading, and enhancing a user's reading experience.

It is further an object of the present invention to provide a Braille computer tablet to improve the accessibility of children to Braille.

In one embodiment, the invention satisfies this object in the form of a computer tablet having a display including at least one self-scrolling Braille display.

These and other objects and advantages of the invention are disclosed in the detailed description to follow.

BRIEF DESCRIPTION OF THE SEVERAL VIEWS OF THE DRAWING

FIGS. 15A and 15B are side cross-sectional views of a prior art electrowetting arrangement.

FIG. 61 is a top orthogonal view of a 1-by-8 Braille cell having dot position assigned according to an inventive system.

FIG. 62 is a top orthogonal view of a 1-by-6 Braille cell having dot position assigned according to an inventive system.

FIG. 63 is a top orthogonal view of a 1-by-4 Braille cell having dot position assigned according to an inventive system.

FIGS. 64, 65, 66, 67, and 68 are software code views of five different arrays for use in programs for controlling the inventive displays.

FIG. 69 is a software code view of a program for controlling the inventive Braille displays.

DETAILED DESCRIPTION OF THE INVENTION

The invention satisfies the above-stated needs.

Described are an inventive self-scrolling Braille, an inventive means of actuation for refreshable Braille, and additional inventive teachings.

1. Self-Scrolling Braille

In view of the prior art, it will be appreciated that there remains a long felt need for a refreshable Braille display comprising a fingertip-sized array of pins having close spacing to create a sensation of Braille dots moving laterally under the finger.

It is an object of the invention to provide a self-scrolling Braille comprising a tactile display whereby Braille is read by means of refreshable dots presented to a stationary finger resting on a stationary substrate.

A principle of the invention is similar to "the wave" phenomenon at a football stadium: As individual spectators stand up and down in succession, they create the appearance of a traveling wave which moves around the stadium.

Figure 2A:
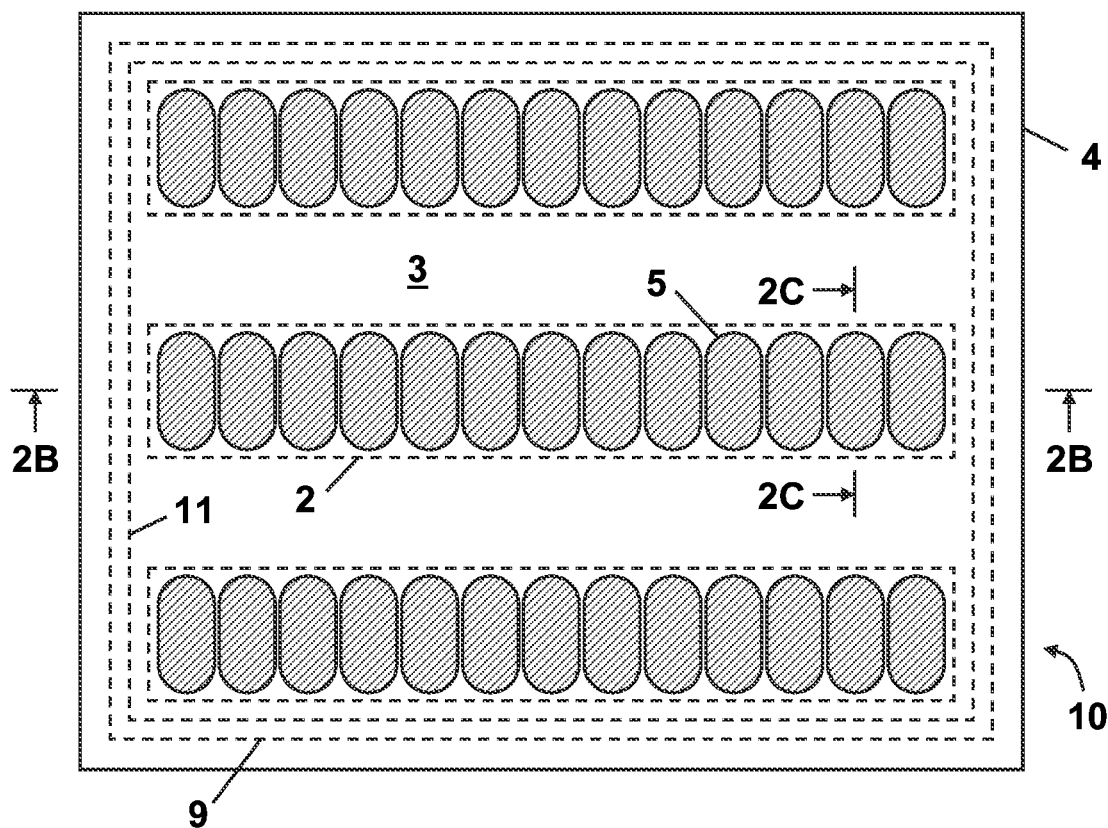
FIGS. 2A, 2B, and 2C are respective top orthogonal, side cross-sectional, and partial side cross-sectional views of an inventive self-scrolling Braille display.
Figure 2B:
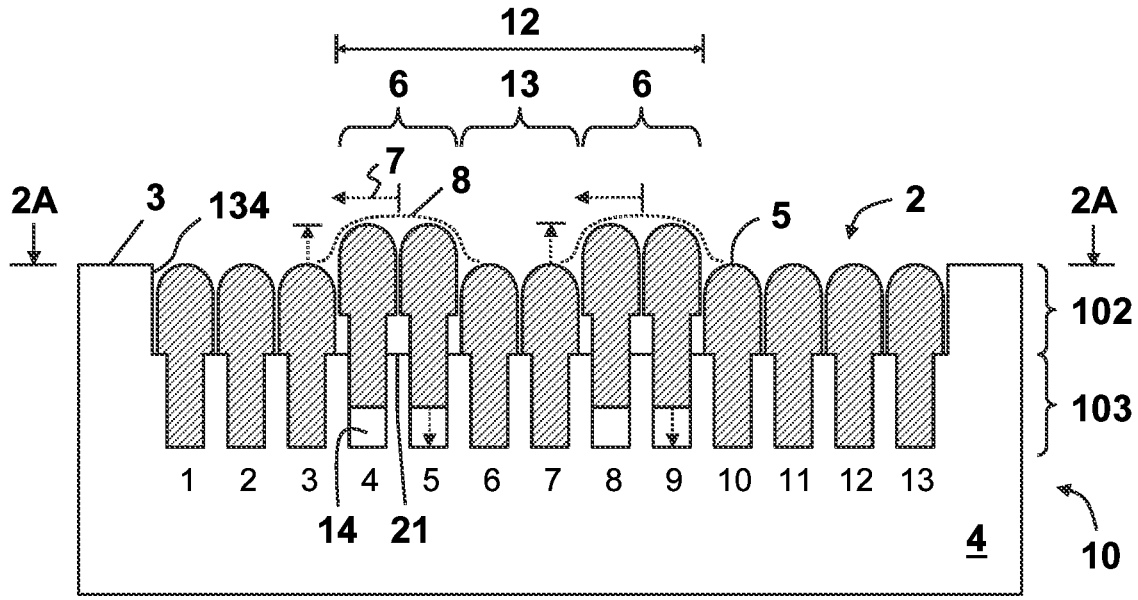

Referring to FIGS. 2A and 2B, a preferred embodiment of self-scrolling Braille according to the invention comprises: three parallel tracks 2 disposed on a surface 3 of a substrate 4, each track 2 being formed by a series of half-pins 5 disposed within the substrate 4, wherein each half-pin 5 is raised or lowered flush with respect to the surface 3 of the substrate 4 by means of an actuator under microprocessor controls, wherein two adjacent half-pins 5 are raised to write a single Braille dot 6, wherein the two half-pins 5 forming the dot 6 are lowered flush to erase the dot 6, wherein successive half-pins 5 are raised and lowered sequentially to laterally propagate 7 the dot 6 as a transverse wave 8 that scrolls past a stationary finger resting on the stationary substrate 4 over the tracks 2, and wherein the microprocessor patterns the dots 6 to display a Braille character which is sized and configured to a Braille cell.

The invention is called "self-scrolling" Braille because the Braille dots of the preferred embodiment scroll themselves past a stationary finger resting on a stationary substrate without the finger or substrate having to move.

To revisit the stadium analogy, referring to FIGS. 2A and 2B, the self-scrolling effect of the preferred embodiment is created by causing the half-pins 5 forming the dots 6 to stand up and down in succession to produce the transverse wave 8 which scrolls (propagates) down the length of each of the three tracks 2 which are likened to seating rows in a stadium.

The half-pins 5 are so named because two adjacent half-pins are required to form a single Braille dot or full-pin. In FIG. 2B, the half-pins 5 are numbered 1 to 13. Referring to FIG. 2B, to propagate the dot 6 formed by the half-pins 5 numbered 8 and 9, the half-pin 5 numbered 7 rises and the half-pin 5 numbered 9 falls, while the half-pin 5 numbered 8 stays raised.

Advantageously, the half-pin concept of the present invention ensures that at least a portion of every raised dot 6 remains at a fully raised height while it is being propagated, so there is less wobble and more consistency in the feeling of the dot 6 as it moves laterally under the finger. In contrast, when whole pins are used to produce a transverse wave instead of half-pins, there will be a moment when neither the pin being lowered nor the pin being raised is at the fully raised height, which creates a feeling of wobble and inconsistency in the feeling of the dot.

In general, a surface region of the inventive tactile displays where a Braille cell is presented to the finger in the manner of self-scrolling Braille is called a Braille "hotspot" according to the invention. Referring to FIG. 2A, a hotspot 9 according to the preferred embodiment is presented by that region of the self-scrolling Braille surface 3 which lies over the tracks 2.

Referring to FIG. 2A, a tactile display for self-scrolling Braille 10 (viz. self-scrolling Braille display 10) according to the preferred embodiment of the invention has at least one hotspot 9 on its surface 3. Such a display adapted to being worn on the finger is more specifically called a self-scrolling Braille "finger reader" according to the invention. Self-scrolling Braille displays 10 can be practiced as desktop devices, handheld displays, or as worn devices such as finger readers.

Advantageously, a self-scrolling Braille device according to the invention, such as a finger reader, may optionally scroll text in Braille in sync with another process under microprocessor controls. For example, to teach Braille literacy by pairing sounds with corresponding symbols, a text file may be synced with an audio file so the user can hear spoken words or characters as they are presented to the finger in Braille. Such synchronization is made possible according to the invention because, advantageously, the microprocessor always knows what is being read at a given moment, since it knows exactly what is being presented to the finger at that moment.

Advantageously, a self-scrolling Braille device according to the invention may optionally include a touch-sensitive user interface according to the art, whereby a microprocessor is responsive to user-generated finger gestures. For example, when the user places a finger over a hotspot, the microprocessor may begin scrolling text in Braille.

Referring to FIG. 2A, an exemplary hotspot 9 according to the preferred embodiment comprises 39 half-pins 5 disposed in three parallel tracks 2 containing 13 half-pins 5 each, wherein the parallel tracks 2 are spaced apart 0.114 inches (2.90 millimeters) on center and the half-pins 5 are spaced apart 0.0285 inches (0.724 millimeters) on center. Accordingly, the length of the tracks 2 in this example is 0.371 inches (9.41 millimeters) and the three tracks 2 have a combined column height of 0.285 inches (7.24 millimeters). An active portion 11 of the hotspot 9 is presented by a surface region covered by the tracks 2, which in this example is 0.371 inches by 0.285 inches (9.41 millimeters by 7.24 millimeters). To read Braille, the finger is placed over the active portion 11 of the hotspot 9.

Referring to FIG. 2B, Braille cells according to the preferred embodiment are configured to a cell width 12 having a width of six half-pins 5, consisting of two half-pins 5 in the low state (unraised) forming a interdot spacing 13 which is bounded by two half-pins 5 on both sides for forming Braille dots 6. According to the preferred embodiment, seven half-pins 5 are kept in the low state between successive Braille cells. The right-angle distance between adjacent Braille dots in the same cell is thus 0.114 inches on center (2.90 millimeters) and the distance between corresponding dots in adjacent Braille cells is thus 0.257 inches on center (6.52 millimeters). In the high state (raised), the Braille dots rise 0.019 inches (0.483 millimeters) above the surface of the substrate and have a base diameter of 0.057 inches (1.448 millimeters).

Advantageously, the exemplary hotspot 9 of the preferred embodiment is thus sized and configured to standard or near-standard Braille characters. See National Library Service for the Blind and Physically Handicapped, "Braille Books and Pamphlets," Specification #800, Library of Congress (Washington, DC), February 2008, incorporated herein in its entirety by way of reference.

Though not shown in the drawing of FIG. 2A, the exemplary hotspot 9 of the preferred embodiment may optionally be covered with a flexible or elastomeric film bonded to the surface 3 of the substrate 4 to promote a smoother feel of the Braille dots 6 and to keep the tracks 2 clean and waterproof.

Advantageously, the exemplary hotspot 9 of the preferred embodiment is sized to fit underneath the digital pulp (viz. finger pad) of an index finger used for reading Braille.

Figure 2C:
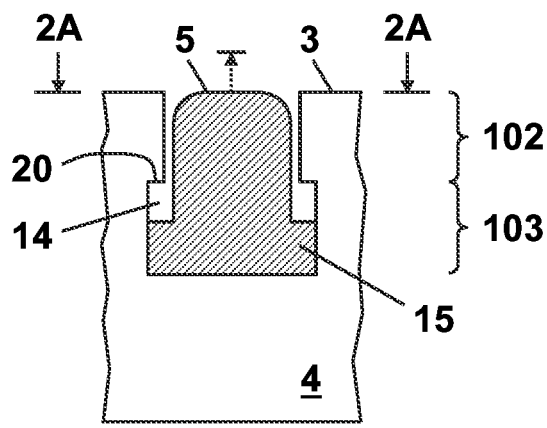

Referring to FIG. 2C, an exemplary half-pin 5 according to the preferred embodiment is raised and lowered hydraulically within a piston chamber 14 disposed in the substrate 4.

Figure 3:
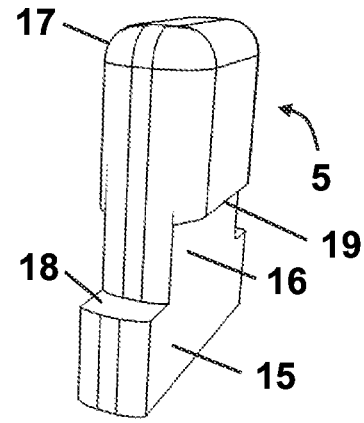
FIG. 3 is a side perspective view of an inventive half-pin.

Referring to FIG. 3, the exemplary half-pin 5 comprises a piston 15, a connecting shaft 16, a rounded head 17, an upstroke ledge 18, and a downstroke ledge 19. The half-pin 5 can be made from such exemplary materials as plastic or other polymeric materials, poly(dimethylsiloxane) (PDMS) or other silicone, ceramic, hard rubber, glass, and metal. The half-pin 5 can be coated in whole or in part with a thin film for such exemplary purposes as reducing friction, promoting a piston seal, repelling water, and so forth. An exemplary thin film material for reducing friction, promoting a piston seal, and repelling water is provided by a fluoropolymer, for example, Teflon® (The Chemours Company, Wilmington, DE) or Cytop® (Asahi Glass Company, Ltd., Tokyo, Japan).

Referring to FIG. 2C in view of FIG. 3, the substrate 4 is disposed with an upstroke retainer 20 to limit an upstroke of the half-pin 5 to a preset rising distance in contact with the upstroke ledge 18. The rising distance of the half-pin 5 is the height the half-pin 5 rises above the surface 3 of the substrate 4 in the high state (raised).

Referring to FIG. 2B in view of FIG. 3, the substrate 4 is disposed with a downstroke retainer 21 to limit a downstroke of the half-pin 5 to a preset lowering distance in contact with the downstroke ledge 19. The lowering distance is the depth the half-pin 5 is lowered to in the substrate 4 to be flush with the surface 3 in the low state (unraised).

Figure 1A:
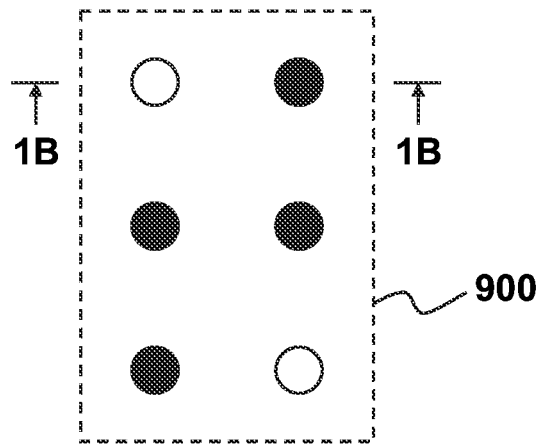
FIGS. 1A and 1B are respective top orthogonal and side cross-sectional views of a Braille cell displaying the letter "t" in Braille.
Figure 1B:

Referring to FIG. 1, the standard Braille cell 900 has three rows and two columns. The rows are referred to as top, middle, and bottom. The top and bottom rows may also be referred to as distal and proximal, respectively. The columns are referred to as left and right.

Referring to FIG. 2A, points of reference with respect to the hotspot 9 are superior (looking at the substrate 4 from the top), inferior (looking at the substrate 4 from the bottom), distal (the side the top track 2 is on), proximal (the side the bottom track 2 is on), left, and right. Distal and proximal take their reference from the finger. In general, the orientation of a hotspot can be reversed by rotating it 180 degrees and signaling the microprocessor to scroll text the other way around. Exemplary means of signaling the microprocessor include user input for manual signaling and an accelerometer for automated signaling.

Figure 4:
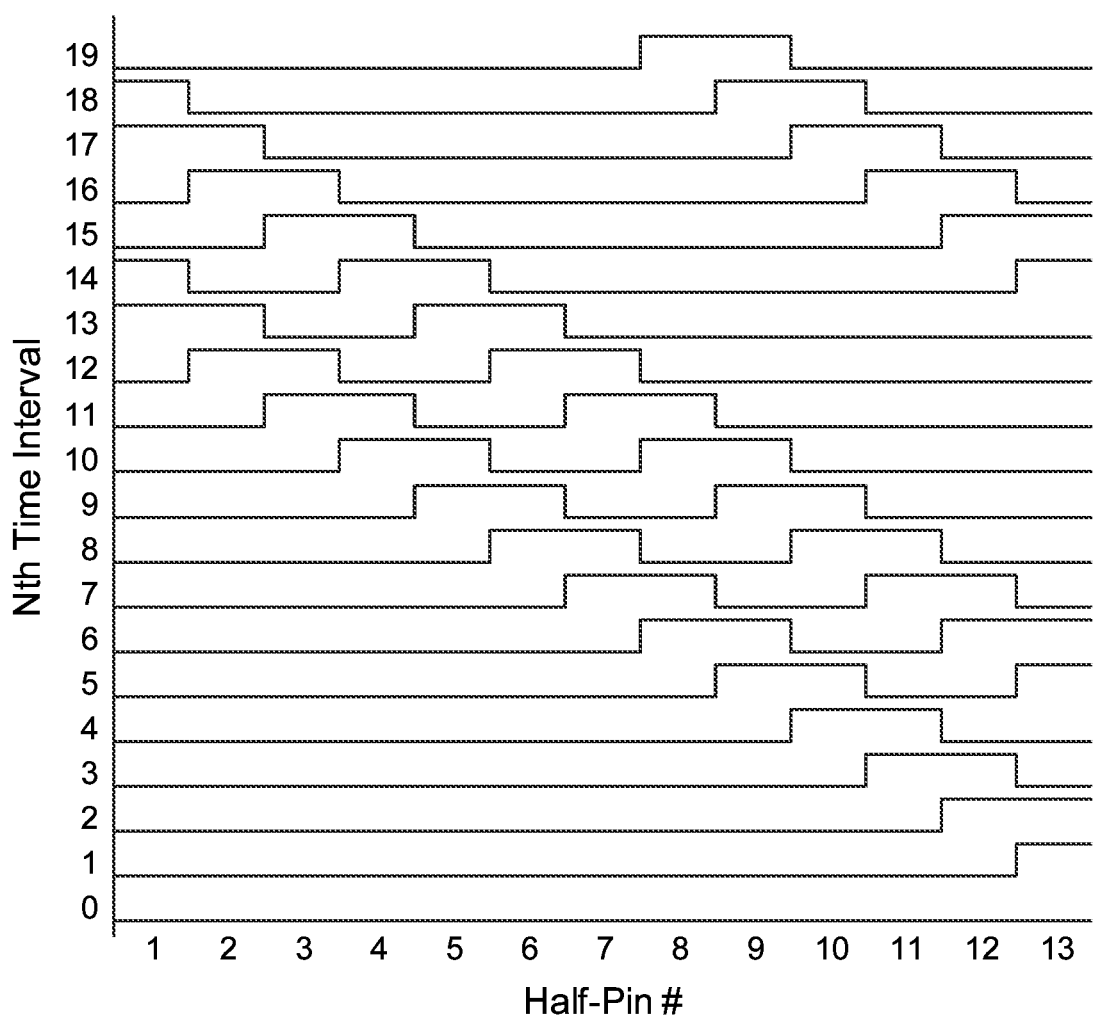
FIG. 4 is an inventive timing diagram for propagating a middle row of half-pins to form the character sequence "t-s" in Braille on the inventive display.

FIG. 4 is a timing diagram for propagating the middle row of half-pins 5 when forming the character sequence "t-s" in Braille. The high state (logic value one) represents a raised half-pin 5 and the low state (logic value zero) represents an unraised half-pin 5. The $10^{th}$ time interval shown in FIG. 4 corresponds to the logic states of the half-pins 5 shown in FIG. 2B, which are numbered 1 to 13. The rate at which half-pin states are propagated is controlled by the microprocessor by setting the duration of the time interval according to user preferences.

Figure 5A:
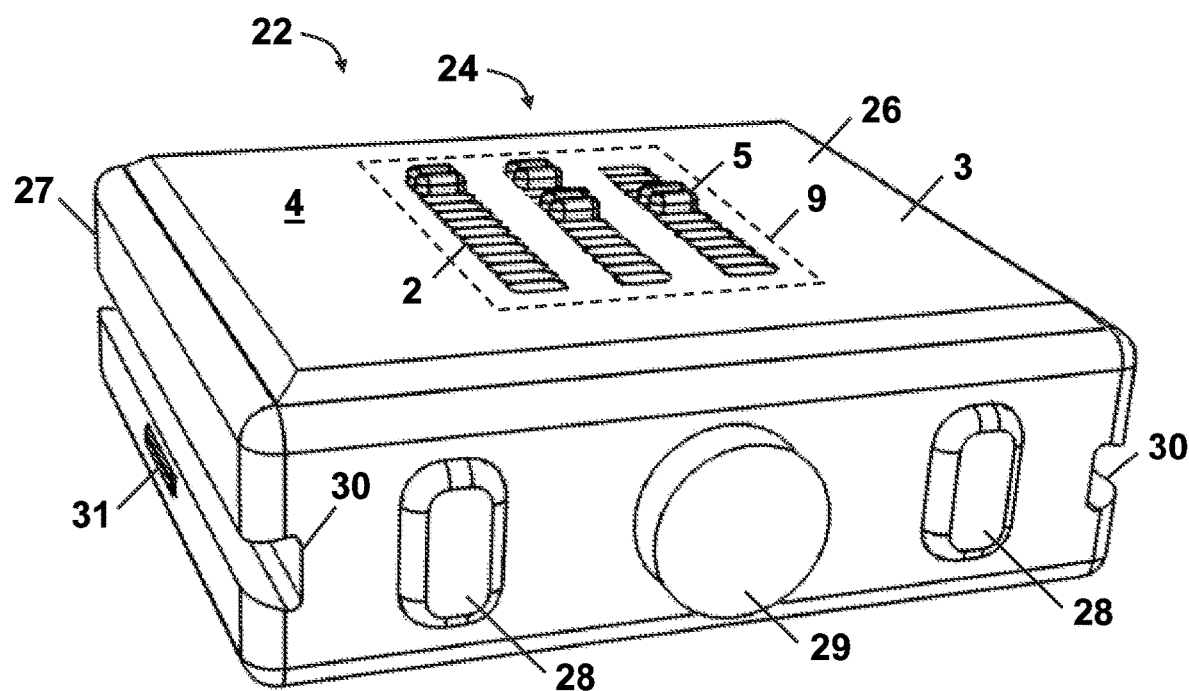
FIGS. 5A and 5B are respective top and bottom perspective views of an inventive finger reader base assembly.
Figure 5B:
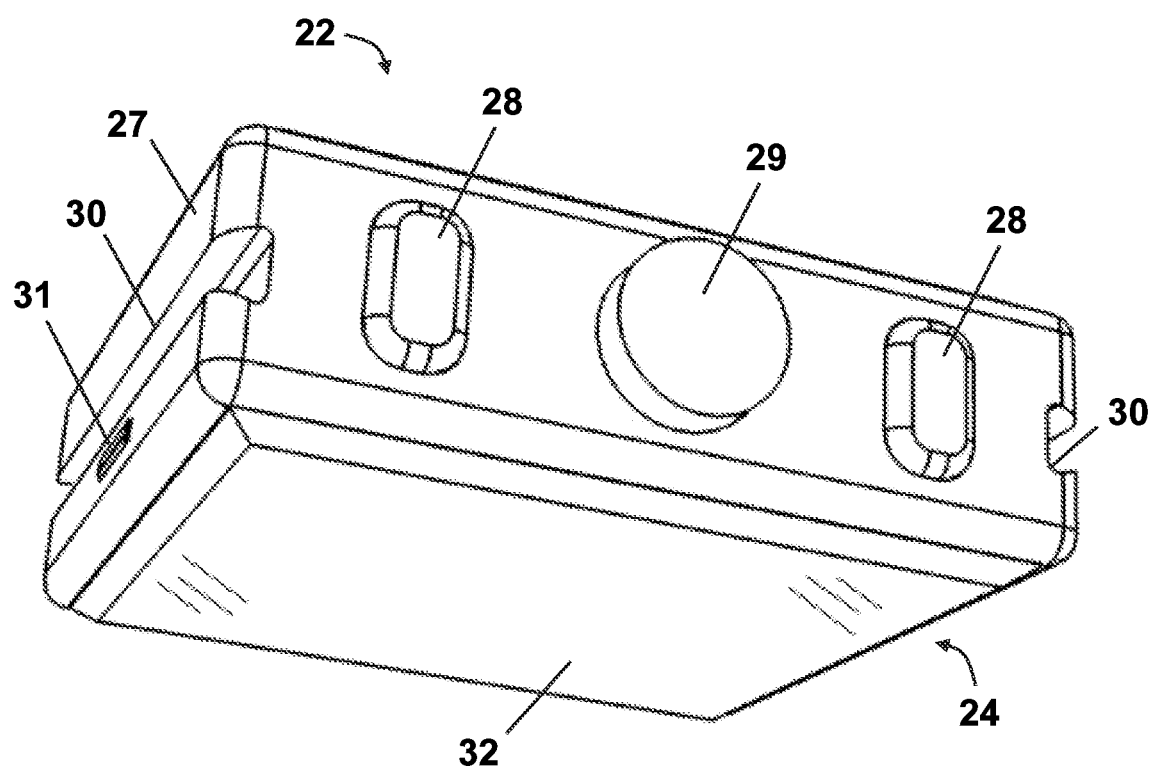
Figure 6A:
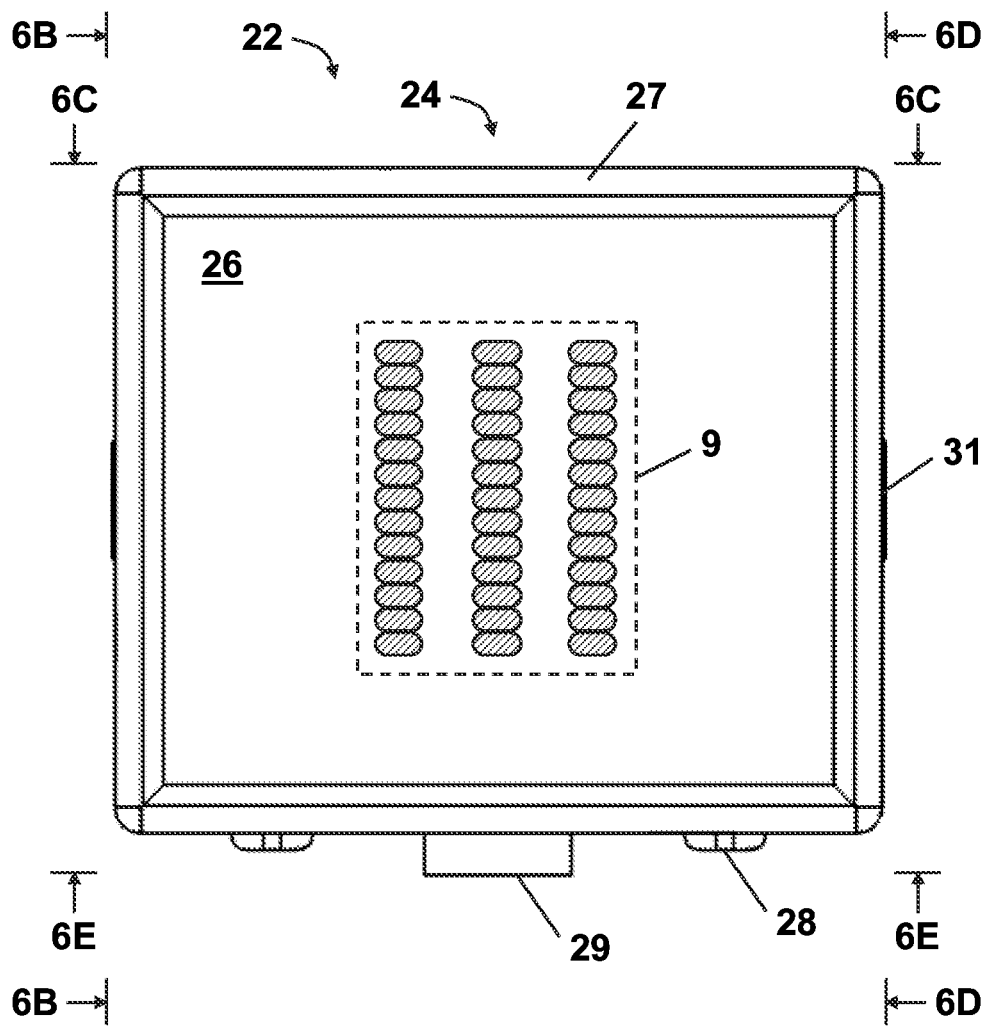
FIGS. 6A (top), 6B (proximal side), 6C (left side), 6D (distal side), 6E (right side), and 6F (bottom) are respective orthogonal views of the inventive base assembly (side views designated with respect to left-finger usage).
Figure 6B:
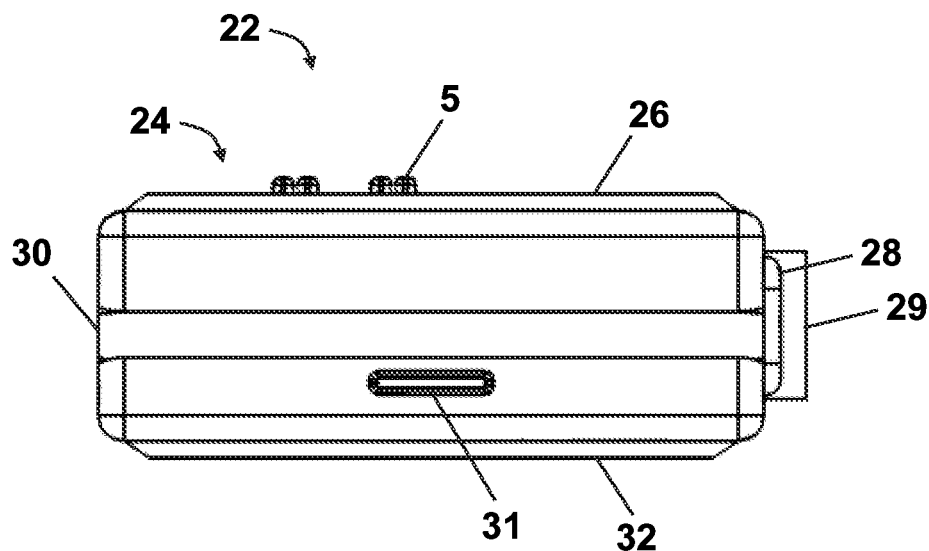
Figure 6C:
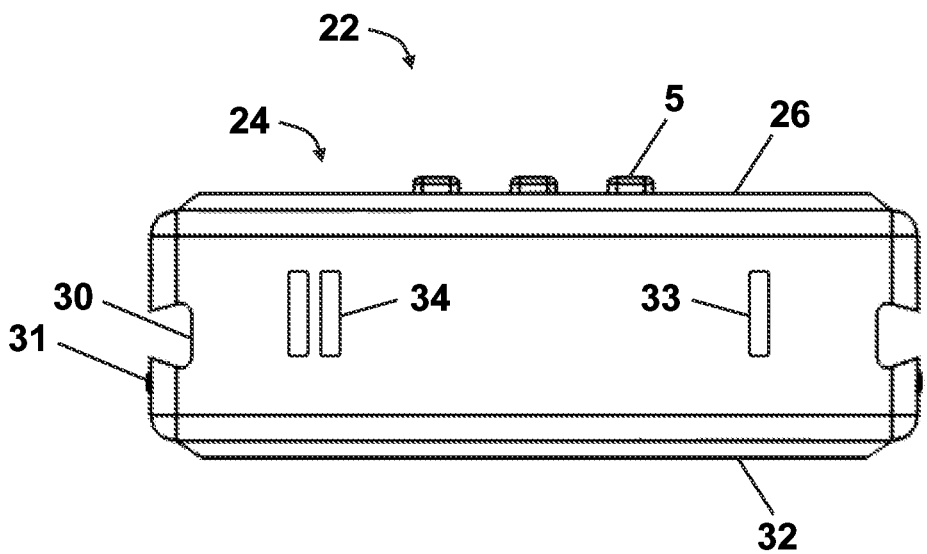
Figure 6D:
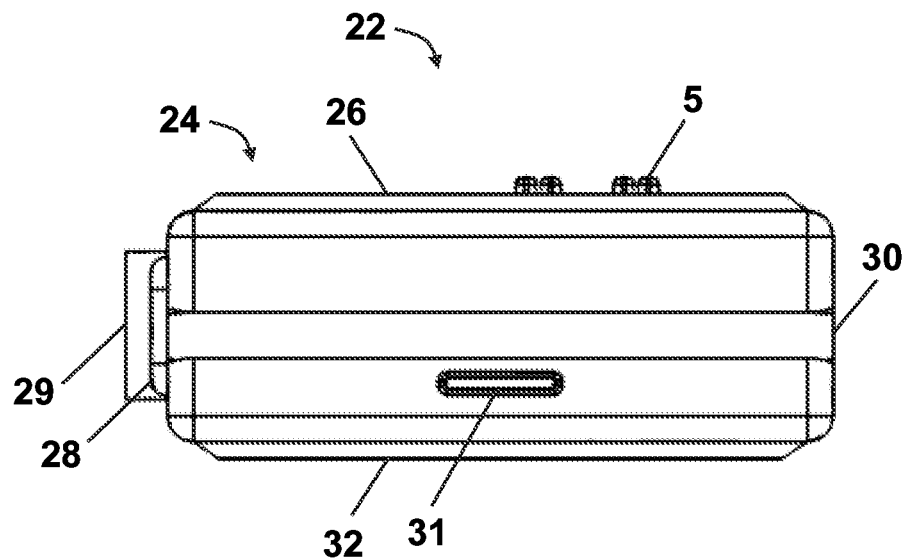
Figure 6E:
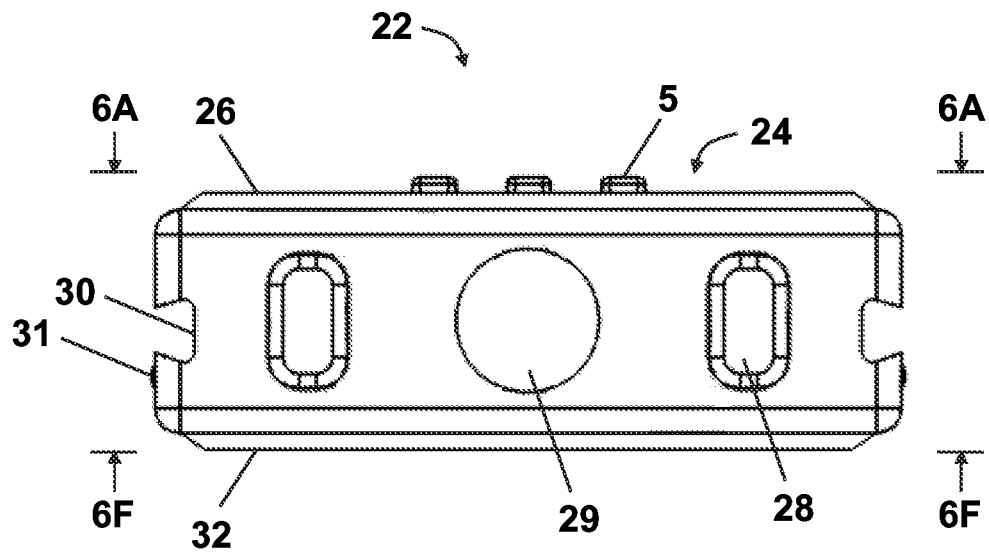
Figure 6F:
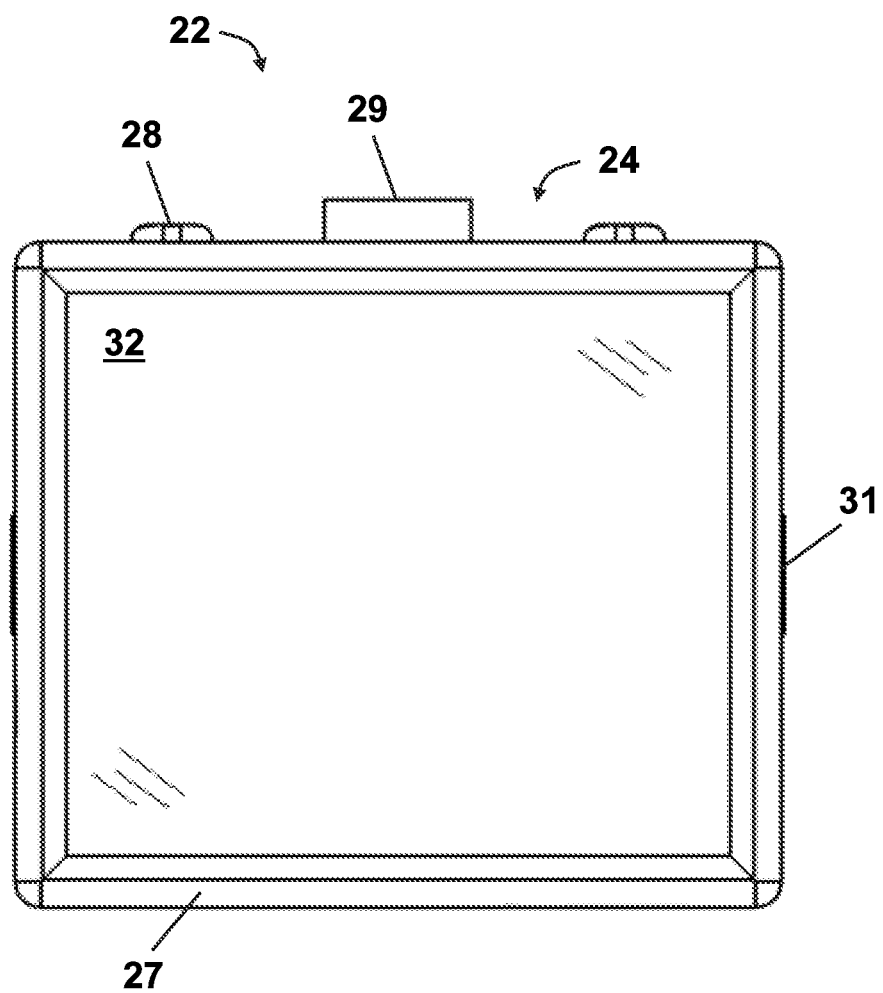
Figure 7:
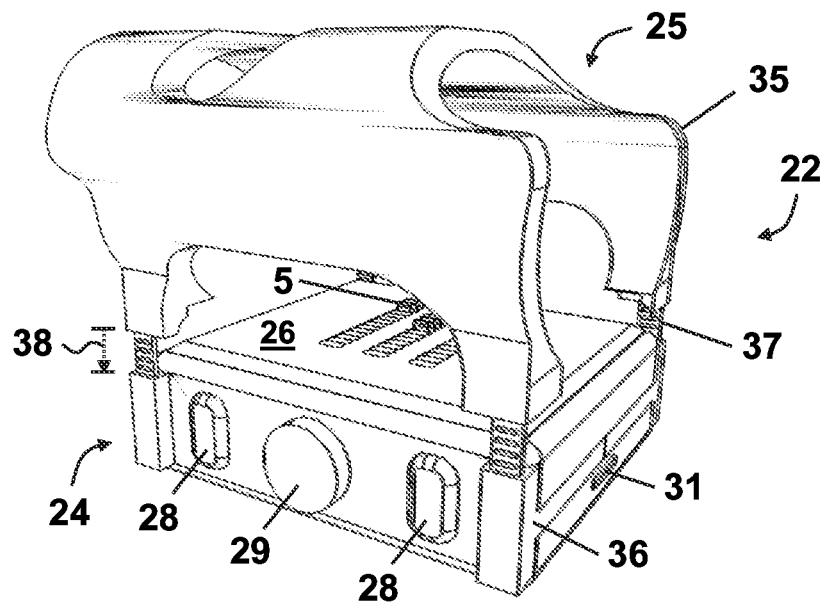
FIG. 7 is a side perspective view of an inventive self-scrolling Braille finger reader.
Figure 8:
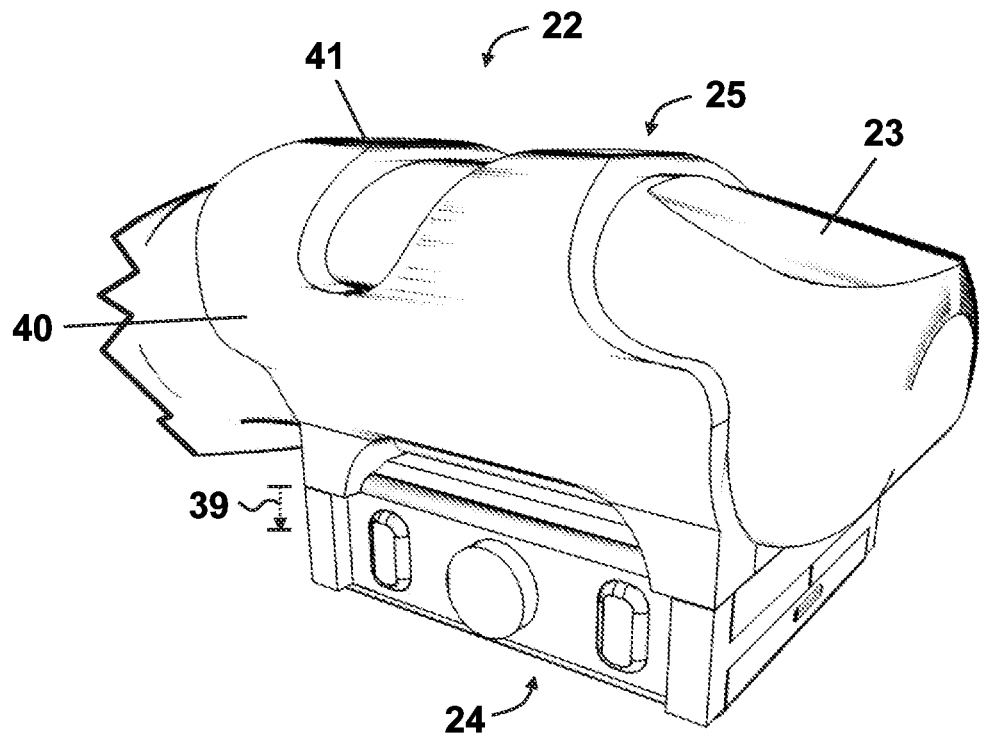
FIG. 8 is a side perspective view of the inventive finger reader being worn on the left index finger.

FIGS. 5A, 5B, 6A, 6B, 6C, 6D, 6E, 6F, 7, 8, 9, and 10 show an exemplary self-scrolling Braille finger reader 22 according to the invention. FIG. 8 shows the finger reader 22 being worn on a left index finger 23. FIGS. 5A, 5B, 6A, 6B, 6C, 6D, 6E, and 6F show only a finger reader base assembly 24, which is the part the finger reader 22 that the finger 23 rests on to read Braille. FIGS. 7 and 8 show the entire finger reader 22, which includes the base assembly 24 and an exemplary finger coupling 25. The finger coupling 25 attaches to the base assembly 24 so that the finger reader 22 can be worn on the finger 23.

Referring to FIG. 5A, the base assembly 24 comprises a self-scrolling Braille display panel 26 having one hotspot 9 on the surface 3 of its superior side, a device border 27, proximally and distally disposed input buttons 28, a rotary input 29 which can also be pushed as a button to provide input, and proximally and distally disposed slots 30 to receive the finger coupling 25, including release buttons 31 to release the finger coupling. Referring to FIG. 5B, the base assembly 24 further comprises an opposing touchscreen or touchpad 32 on its inferior side. Referring to FIG. 6C, the base assembly 24 further comprises a microphone 33 and an audio speaker 34.

FIGS. 6A and 6F show respective superior side and inferior side orthogonal views of the base assembly 24 shown in FIGS. 5A and 5B. FIGS. 6B, 6C, 6D, and 6E show orthogonal views of the sides of the base assembly 24 shown in FIGS. 5A and 5B.

FIGS. 7 and 8 show the exemplary finger reader 22, comprising the base assembly 24 shown in FIGS. 5A and 5B and the exemplary finger coupling 25. Referring to FIGS. 7 and 8 in view of FIGS. 5A and 5B, the finger coupling 25 comprises a finger coupling body 35 adapted to receiving the finger 23 therethrough, four finger coupling posts 36 which are connected to the base assembly 24 at each of its four corners via the proximally and distally disposed slots 30 for receiving the finger coupling 25, and four finger coupling risers 37 which slidably connect the finger coupling body 35 with each of the four finger coupling posts 36. FIG. 7 shows the finger coupling risers 37 in an extended state to make room under the finger coupling body 35 to receive the finger 23.

Referring to FIGS. 7 and 8, after the finger 23 has been inserted into the finger coupling body 35, the finger coupling body 35 and the base assembly 24 are pressed together to distend 38 the finger coupling risers 37 so that the finger 23 rests against the surface of the display panel 26 to read the Braille dots presented thereon by the half-pins 5; to remove the finger reader 22 from the finger 23, the user pulls on the base assembly 24 to extend 39 the finger coupling risers 37 so the finger 23 can be withdrawn from the finger coupling body 35.

Referring to FIG. 8, to help retain the finger reader 22 on the finger 23, at least a portion 40 of the exemplary finger coupling body 35 makes contact with a region of the finger 23 which is proximal to the distal interphalangeal joint. Though not shown in FIG. 7, bridge areas 41 of the finger coupling body 35 may be adapted to making a lateral adjustment of an opening presented by the finger coupling body 35 to obtain a more custom fit when closed around the finger 23. An inner wall of the finger coupling 25 may be provided with cushions for comfortable support of the finger 23. The surface of the display panel 26 may be provided with side cushions to help center the finger 23 thereon. The finger coupling body 35 may be disposed with perforations so the skin of the finger 23 can breathe and perspire therethrough.

In general, a base assembly for a self-scrolling Braille device according to the invention may be provided with various means of attachment to the body as a worn device, for example, adjustable or elastic bands, hook and loop fasteners, for example, Velcro® (Velcro Companies, Manchester, NH), athletic tape, gloves, finger gloves, thimbles, finger couplings, and so forth. When necessary to admit contact with a touchpad or touchscreen associated with the base assembly, an opening may be provided in a glove or other means of attachment. The means of attachment may be permanently or removably joined to the base assembly. Exemplary means of joining include slots, posts, holes, rings, hooks, adhesive, and so forth. When reading with a toe, a shoe may be provided with a sole configured for receiving the base assembly such that the toe rests on the base assembly.

Advantageously, the exemplary base assembly 24 shown in FIGS. 5A and 5B is bilaterally symmetric so that it can be rotated 180 degrees for left- or right-handed operation. For example, though left-handed operation is shown in FIGS. 7 and 8, then simply by reversing the finger reader coupling 25 by way of rotating it 180 degrees with respect to the finger coupling posts 36, the finger reader 22 can be worn on a finger of the right hand instead of on the left.

Advantageously, the inventive device enables the wearer to read even while walking, working, or in other positions where paper reading would be ergonomically difficult, such as when lying flat in bed or on a beach towel.

Advantageously, because the inventive device can be worn by the user, the user can read even while being driven down a bumpy road without having to put up with the text jiggling around in front of the eyes as occurs with sighted reading.

Advantageously, because sight is not required to read from the inventive device, the user can read even in the dark.

Advantageously, the inventive device can be adapted to waterproof or water resistant embodiments, so that the reader can read while bathing or in an aquatic environment.

Figure 9:
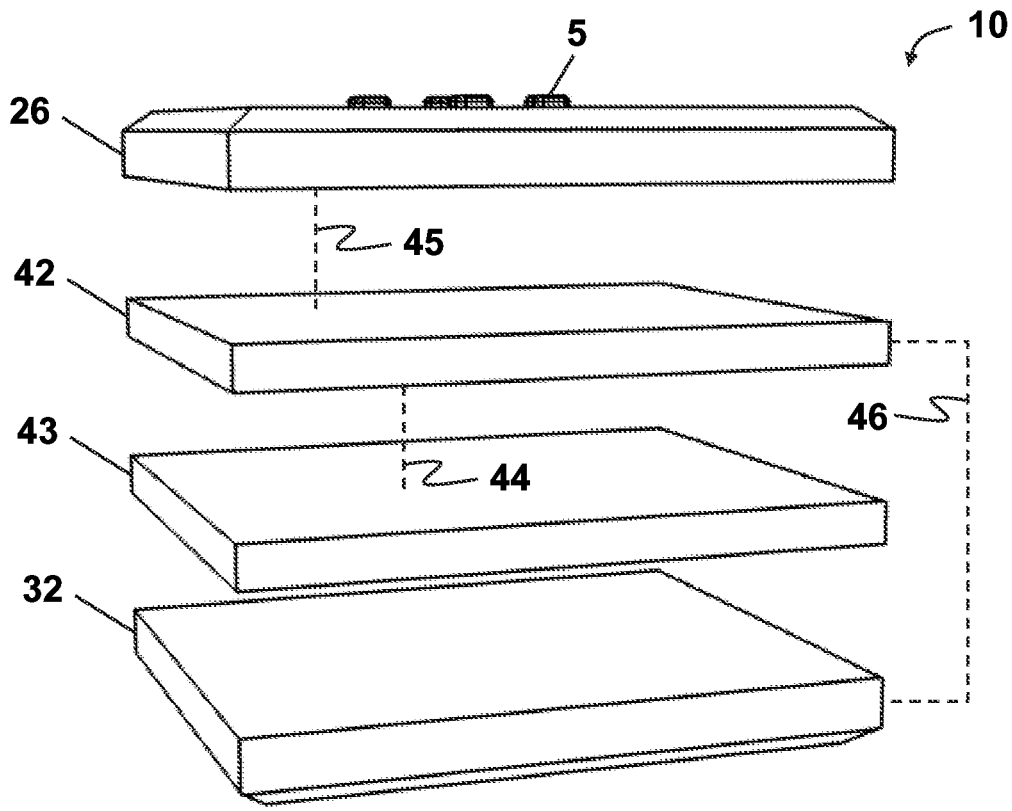
FIGS. 9 and 10 are side perspective exploded views of selected electronics components forming the inventive Braille display.

FIG. 9 shows a simplified exploded view of the four main electronic components making up the base assembly 24 shown in FIGS. 5A and 5B, which are the display panel 26, an electronics assembly 42, a battery assembly 43, and the touchpad or touchscreen 32. Referring to FIG. 9 in view of FIGS. 5A and 5B, electrical interconnects 44, 45, 46 route power and data between the battery assembly 43 and the electronics assembly 42, between the electronics assembly 42 and the display panel 26, and between the electronics assembly 42 and the touchpad or touchscreen 32, respectively. Though electrical power is shown being routed from the battery assembly 43 to the electrical assembly 42, which in turn routes power to the display panel 26 and the touchpad or touchscreen 32, in general the battery assembly 43 may also make direct electrical communication with such components.

The electronics assembly 42 contains the microprocessor, computer memory, and other electronic components necessary to operate the finger reader 22. The battery assembly 43 contains a rechargeable battery and an inductive coupling for wireless charging via an external charging station, along with electronics to monitor and regulate power supply.

The electronics assembly 42 is configured for operating an alphanumeric Braille display in the form of the self-scrolling Braille display panel 26, for responding to touch-sensitive feedback from the touchpad or touchscreen 32, for using electrical power from the battery assembly 43, and for communicating wirelessly. It is well known in the art to provide means of an electronic assembly configured for operating an alphanumeric display, for responding to touch-sensitive feedback from a touchpad or touchscreen, for using electrical power from a battery assembly, and for communicating wirelessly. It is also well known in the art to provide means of a rechargeable battery including an inductive coupling for wireless charging via an external charging station. It is also well known in the art to provide a touchpad or touchscreen to enable touch-sensitive feedback including with the use of one or more finger gestures.

For example, it is well known in the art that a smartwatch, for example, an AppleWatch® (Apple Inc., Cupertino, CA), can connect wirelessly with a smartphone, for example, an iPhone® (Apple Inc., Cupertino, CA), and contains an electronics assembly, a battery assembly, and a touchscreen as its main electronic components.

Referring to FIG. 9, since a patent need not teach, and preferably omits, what is well known in the art, details of the electronics assembly 42, the battery assembly 43, and the touchpad or touchscreen 32 of the inventive device are omitted from this disclosure. Instead, referring to FIG. 9 in view of FIGS. 5A and 5B, of the four main electronic components of the inventive finger reader 22, this disclosure focuses on teaching one skilled in the art how to make and use the inventive self-scrolling display panel 26, as will be appreciated from the next subsection of this disclosure.

Figure 10:
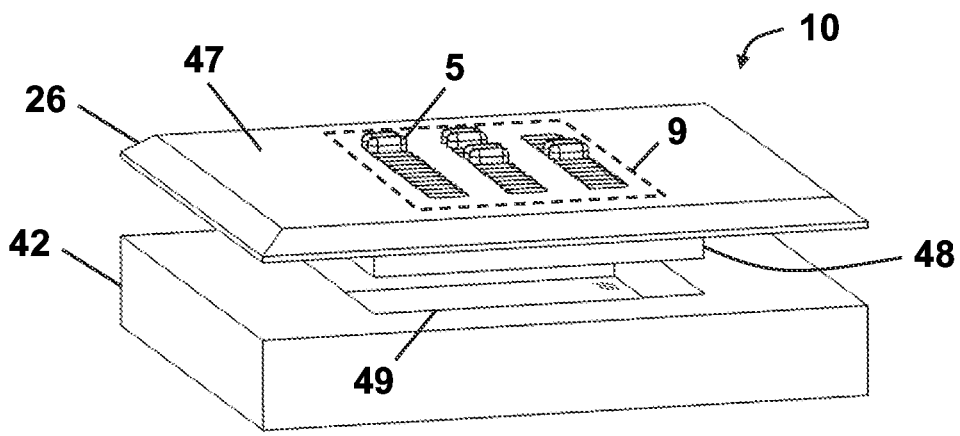

FIG. 10 shows a simplified exploded view of a modification of the display panel 26 and electronics assembly 42 shown in FIG. 9. Referring to FIG. 10 in view of FIGS. 5A and B, a panel surface 47 of the display panel 26 may in general extend beyond the hotspot 9. However, depending on how the display panel 26 is made, the panel surface 47 may also extend beyond an underlying actuator housing 48 which contains the actuators needed to actuate the half-pins 5. In such a case, then to save more space for the electronics of the electronics assembly 42, the actuator housing 48 can be adapted to electrical communication with the electronics assembly 42 such that it inserts into an electrical socket 49 disposed in the electronics assembly 42, as shown.

Referring to FIGS. 9 and 10, in general at least the display panel 26 and the electronics assembly 42 are needed to comprise the various embodiments of the self-scrolling Braille display 10 according to the invention, along with an electrical power supply to power the self-scrolling Braille display 10. As an alternative to what is shown in FIGS. 9 and 10, the electronics assembly 42 may be disposed within the display panel 26 in whole or in part, rather than being separate from it.

Figure 11A:
FIGS. 11A, 11B, 11C, and 11D are plan views of prior art finger gestures.
Figure 11B:
Figure 11C:
Figure 11D:
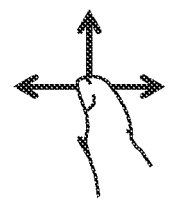

FIGS. 11A, 11B, 11C, and 11D show a variety of prior art finger gestures that can be used to provide user input via a touchpad or touchscreen. In the case of the finger reader 22 shown in FIGS. 5B and 8, the finger used for gesturing on the touchpad or touchscreen 32 will typically be the thumb which opposes the index finger 23 of the same hand; alternatively, it may be a finger of the opposing hand. Referring to FIG. 11A in view of FIG. 5B, the user can swipe the thumb up, down, left, or right over the touchpad or touchscreen 32. Referring to FIG. 11B in view of FIG. 5B, the user can tap the thumb on the touchpad or touchscreen 32. Referring to FIG. 11C in view of FIG. 5B, the touchpad or touchscreen 32 can be configured for a pressure-sensitive response, for example, by means of force touch technology, whereby the user can firmly press the thumb on the touchpad or touchscreen 32 to indicate a level of force. Referring to FIG. 11D in view of FIG. 5B, the user can drag the thumb over the touchpad or touchscreen 32.

Figure 12A:
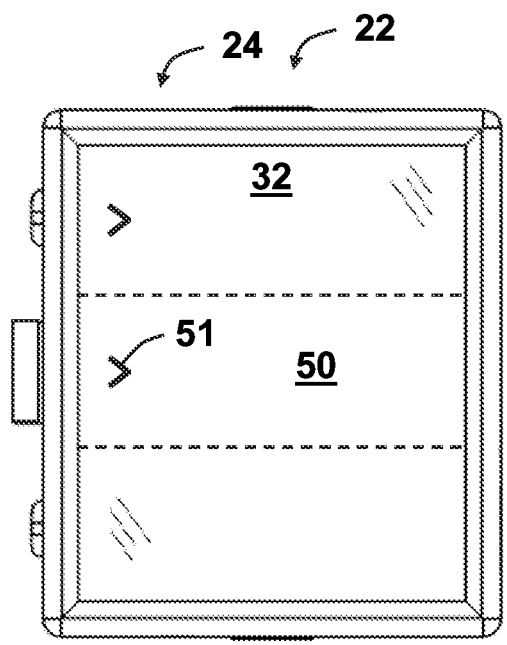
FIGS. 12A and 12B are top orthogonal views of partitioning schemes for a touchpad or touchscreen associated with the inventive base assembly.
Figure 12B:
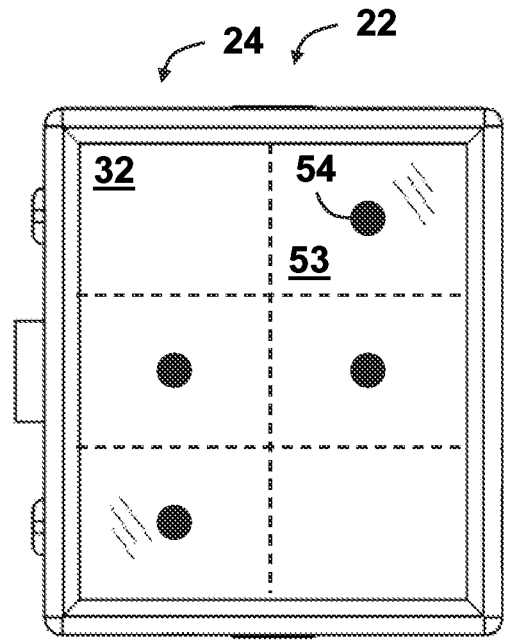

In general, the touchpad or touchscreen 32 may be partitioned into predefined areas by means of software so that finger gestures can be distinguished based on the area they are applied to. For example, FIGS. 12A and 12B show two different partitioning schemes. Referring to FIG. 12A in view of FIGS. 5B and 8, the touchpad or touchscreen 32 can be partitioned into three rows 50. For example, in a preselected mode of operation, the user can swipe left 51 on the middle row 50 to skip forward in the text by a preset increment, or swipe left 51 on the top row 50 to scroll the text faster. Referring to FIG. 12B in view of FIGS. 5B and 8, the touchpad or touchscreen 32 can be partitioned into the cells 53 of a two-by-three matrix. For example, in a preselected mode of operation, the user can tap 54 on selected cells 53 to type out Braille dots.

The finger reader 22 may be practiced by connecting via Bluetooth or other wireless protocol to an auxiliary device and accessing any finger reader compatible software applications, apps, or websites. For example, the auxiliary device can be a smartphone, smartwatch, tablet, laptop, or desktop computer. Modes of finger reader operation can be selected, for example, by using finger gestures, input keys or buttons, rotary inputs, voice commands, or via the auxiliary device.

Advantageously, using various thumb gestures, for example, by tapping or swiping the thumb against the touchpad or touchscreen, the user can control the finger reader 22 to perform such functions as: start/stop scrolling text; scroll text faster/slower; skip forward/backward in the text; skip between lines/chapters of text; access/navigate/select from a menu, a file manager, or a table of contents; write on the touchpad or touchscreen with the thumb or other finger; download text or text messages from a remote server or a wireless provider; send instructions or text messages via a remote server or a wireless provider; and so forth.

Advantageously, the finger reader 22 shown in FIG. 8 leaves the tip of the finger 23 bare so the finger tip can be used for typing on another device while wearing the finger reader.

Advantageously, the user can read text or text messages with the finger reader 22 while at the same time typing on another device which is wirelessly connected to the finger reader 22. This is of special advantage to blind persons to enable them to check for mistakes while typing.

Figure 13:
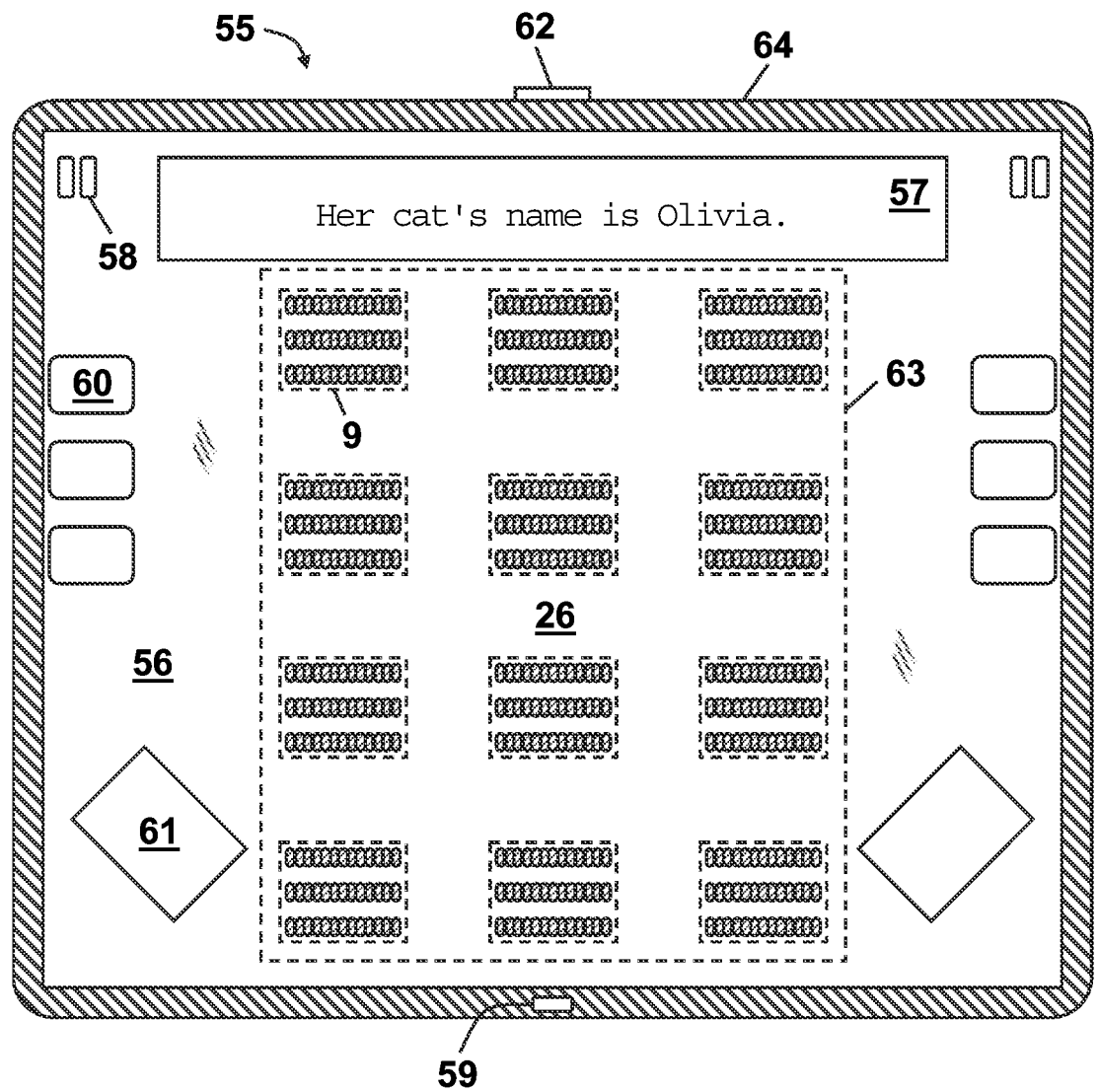
FIG. 13 is a top orthogonal view of an inventive children's Braille tablet.

FIG. 13 shows a top orthogonal view of a children's Braille tablet 55 according the invention. Referring to FIG. 13, the tablet 55 has a device surface 56 disposed with a three-by-four matrix having 12 self-scrolling Braille hotspots 9, a plain text alphanumeric display or other visual display 57, left and right audio speakers 58, a microphone 59, left- and right-side columns of three input buttons 60 each, left and right touchpads 61, and a power on/off switch 62. In addition to the touchpads 61, preferably a matrix region 63 of the device surface 56 which is covered by the three-by-four matrix of hotpots 9 is also touch-sensitive to allow the user to perform finger gestures thereon.

The tablet 55 is provided with an electronics assembly and battery assembly that are housed internally within a tablet body 64. The tablet may also be provided with a memory device reader, a USB port, an audio or headset connector, or a power cord. The electronics assembly may be configured for standalone operation or for wireless or wired operation in tandem with an auxiliary device. For example, the auxiliary device can be a smartphone, smartwatch, laptop, desktop computer, or another tablet. Modes of tablet operation can be selected, for example, by using the input buttons 60, by making finger gestures on the touchpads 61 or on the matrix region 63, by using the microphone to input voice commands, or via the auxiliary device. The tablet 55 can also be provided with other means of input, such as a rotary input.

For right-handed operation, the child will use the index finger of the right hand to read from the hotspots 9 while the index finger of the left hand is used to make finger gestures on the left touchpad 61, and vice versa for left-handed operation.

Various learning games can be played using the inventive tablet 55. For example, in a game of association, the child hears the sound "moo" from the speakers. Each of the hotspots 9 repetitively scrolls the name of a different animal: c-a-t, d-o-g, and so forth. The child then tries different hotspots 9 to find the one with the word cow, which corresponds to the "moo" sound. Upon finding the hotspot 9 with the word cow, the child taps the touchpad 61 and the tablet 55 makes a sound to signal a correct answer. To give another example, in a game of matching, the child can drag-and-drop words from one hotspot 9 to another so that different rows or columns of hotspots 9 contain words of the same kind, for example, animals, plants, and so forth.

Advantageously, for the benefit of parent-teacher supervision, the tablet 55 is provided with the visual display 57 to provide indicia of what the child is reading, doing, or needs to do.

Advantageously, after selecting a title from a library of reading materials contained by the tablet, or after downloading a selected title online or from another device, the child can then use a selected hotspot 9 to read the text in Braille.

Advantageously, the tablet 55 may also be configured to operate as a cell phone, using the 12 hotspots 9 as cell phone keys, including for text messaging.

Figure 14:
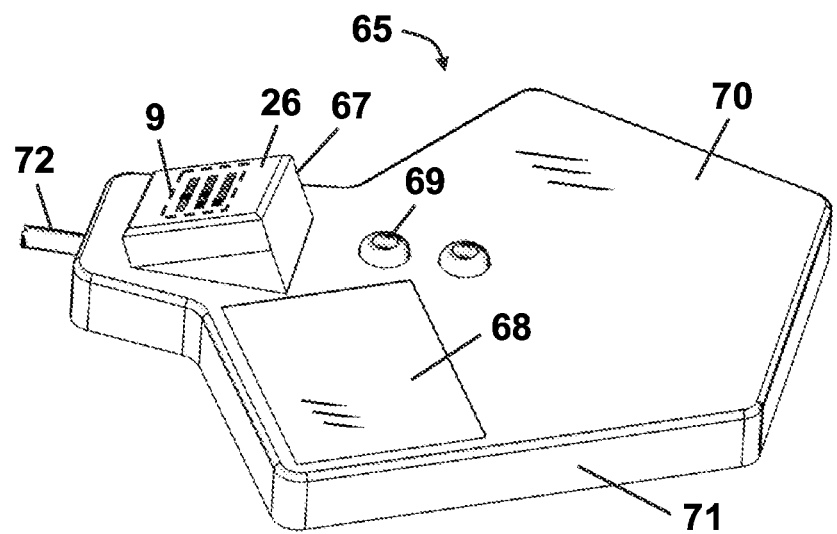
FIG. 14 is a side perspective orthogonal view of an inventive Braille desktop display.

FIG. 14 shows an embodiment of a Braille desktop display 65 according to the invention. The particular embodiment shown is configured for right-handed usage. Though the desktop display 65 can be carried like a laptop or mobile device, it is designed to be operated while resting on top of a desk or table. Referring to FIG. 14 in view of FIG. 2A, the desktop display 65 has one hotspot 9 disposed on its display panel 26, which is ergonomically elevated and angled on a pedestal 67 as shown so that the digital pulp of the right index finger can rest on it comfortably, and also has a touchpad 68 for use by the right thumb, two input buttons 69, and a device surface 70.

In use, the right hand rests on the device surface 70 with the digital pulp of the extended index finger resting on the hotspot 9, the thumb resting on the touchpad 68, and with the remaining three fingers curled in flat against the palm of the hand so that they rest on the device surface 70. The two buttons 69 are accessed by the thumb underneath the extended index finger.

To give a non-limiting example of device usage, while reading text from the hotspot 9 with the index finger, the user can swipe left with the thumb on the touchpad 68 to skip forward in the text.

To give another non-limiting example of device usage, the thumb can press one of the two buttons 69 to call up the first member of a list, for example, a user-defined list of folders. To point to the next member of the list, the user swipes the thumb on the touchpad 68. The hotspot 9 repetitively scrolls the name of the member of the list being pointed to. To select a folder, the user taps the thumb on the touchpad 68.

Referring to FIG. 14, the desktop display 65 is provided with an electronics assembly and a battery or power assembly that are housed internally within a desktop display body 71. Though shown with a cable 72 for wired connection to an auxiliary device or external power supply, the electronics assembly may also be configured for standalone operation or for wireless operation in tandem with an auxiliary device. For example, the auxiliary device can be a smartphone, smartwatch, laptop, desktop computer, or another desktop display. The desktop display 65 may be practiced as a standalone device or by connecting it via a wired or wireless protocol to one of the auxiliary devices and accessing any desktop display compatible software applications, apps, or websites. The desktop display 65 may also be provided with a memory device reader, a USB port, an audio or headset connector, a speaker, a microphone, or a power cord.

Modes of desktop display operation can be selected, for example, by using the input buttons 69, by making finger gestures on the touchpad 68, by using the microphone to input voice commands, or via the auxiliary device. The desktop display 65 can also be provided with other means of input, such as a rotary input.

Advantageously, the desktop display 65 can be used at public libraries to provide access to books in Braille, including books downloaded from via the Internet, without having to fill up the library shelves with huge amounts of paper as is required for embossed books in Braille.

In the past, Braille has been very difficult to learn because a teacher was needed to spend time confirming the identity of each character and word being scrolled by the student's finger.

Advantageously, recalling that characters and words being presented to the finger by way of the inventive self-scrolling Braille can be synchronized with an audio file, students can learn independently on their own, preferably with the aid of a phonics program, simply by listening to the audio as the corresponding characters and words are presented in Braille. After a time, the miracle of reading will take over, whereby the person focuses on the content of what is being read rather than on the process of reading.

Advantageously, the invention will be of aid not only to blind persons, but also to sighted illiterate persons, for after learning Braille, the self-scrolling Braille device used for reading Braille can be synchronized with a visual display of the corresponding plain characters and words using a computer, which are highlighted on the visual display in sync with the Braille text, so that eventually the sighted reader can transition to reading plain text.

Advantageously, the invention will also be of aid to dyslexic persons, given that self-scrolling Braille enables a single character at a time to be presented for reading by a single finger in a serial fashion to reduce the reversal of words and characters.

Traditional problems in reading Braille generally include errors in sensing raised versus unraised dots and errors in spatially identifying their organization in the Braille cell. For example, finger misalignment may occur, such that with the finger placed, for example, too low over the Braille cell, the second row of the cell may be mistaken for the first row, in which case the lower margin of the cell may be mistaken for a third row having unraised dots. A major cause of such problems is that the finger does not maintain a precise, constant alignment with respect to the Braille cell, in which case the Braille dots float around on the surface of the finger, making them more difficult to identify and comprehend. To avoid finger misalignment when scrolling the finger over lines of Braille, concentration and precise finger movements are required, but this detracts from the ability to concentrate on the text being read.

Advantageously, self-scrolling Braille devices according to the invention enable the reader to effortlessly maintain a precise, constant alignment of the finger over the Braille cell. This will help to reduce errors in sensing dots and in spatially identifying their organization in the Braille cell. It will also help to improve tactile sensitivity by localizing the regions of the finger where the dots are sensed. It will also help to improve concentration on the text itself by eliminating the need to concentrate on the repetitive, tedious process of manual scrolling and alignment. It will also help advanced Braille readers to interpret non-standard cells, for example, a 2-by-4 dot cell matrix, a 1-by-5 dot cell matrix, or a 1-by-6 dot cell matrix.

The invention is not limited to standard Braille encoding and may be practiced with other coding strategies according to the art. For example, although three tracks 2 are shown in FIG. 2A, to accommodate different coding strategies the preferred embodiment can be adapted to other numbers of tracks 2. For example, coding strategies employing a 2-by-4 dot cell matrix can be adapted to four tracks 2.

Other specifications of the preferred embodiment can also be modified. For example, the length or width of the tracks 2, the size or number of half-pins 5 per track 2, or the spacing between adjacent Braille dots or Braille cells may be increased or decreased. For example, the length of the tracks 2, including the number of half-pins 5 per track 2, may be sized to the width of a child's finger or sized to accommodate a plurality of fingers. To give another example, the dimensions of the preferred embodiment can be increased to provide larger Braille dots with greater spacing to make the dots easier to sense on a less sensitive region of the body, for example, the underside of the wrist in an embodiment worn as a bracelet or watch.

In general, self-scrolling Braille displays according to the invention can be affixed or mounted as labels, directories, kiosks, web portals, information portals, and so forth, for example, on a kiosk for directory assistance, on walls to identify rooms in a building, on a device or package for product identification, and so forth. When the display is activated, for example, by user touch, the display scrolls text representing the related information, for example, the room numbers of persons listed in a building directory.

Advantageously, the invention enables a great quantity of alphanumeric information to be stored and displayed for the benefit of Braille readers in a relatively small space.

Advantageously, the invention makes Braille more accessible to persons with disabilities.

2. Means of Actuation for Refreshable Braille

In view of the prior art, it will be appreciated that there remains a long felt need for an improved means of actuation to enable a refreshable Braille display having a close spacing of pins to produce a closely spaced train of refreshable Braille dots.

It is an object of the invention to provide the inventive self-scrolling Braille including a means of actuation for the refreshable dots having close spacing.

A principle of the invention is based on the art of electrowetting, including the related art of digital microfluidics.

My teaching in U.S. Pat. No. 8,292,798 (California) for an incubator for babies before implantation, which deals extensively with digital microfluidics, is incorporated herein in its entirety by way of reference.

FIGS. 15A and 15B provide an example from the prior art of what in this disclosure is called the charged electrowetting of an electrically conductive ionic solution. See U.S. Pat. No. 8,292,798, col. 60, line 56 ff., for comparison with the uncharged (viz. dielectric) electrowetting of an electrically conductive ionic solution.

Referring to FIG. 15A, in an uncharged state 73, an electrically conductive liquid droplet 74 containing an ionic solution has an unwetted meniscus 75 as it rests on a bottom plate 76 which is covered on top with a hydrophobic film layer 77 followed by an electrically insulating film layer 78 which in turn covers an electrically conductive layer 79 disposed on a planar substrate layer which in this example is a glass substrate 80. In the charged state 81, electrowetting forces cause the droplet 74 to form a wetted meniscus 82 when a switch 83 makes contact with an electrical power supply 84 to create a voltage difference between the conductive layer 79 and an electrode 85 in contact with the droplet 74. To return to the uncharged state 73, the switch 83 is turned to short the electrode 85 and conductive layer 79 together to the same voltage potential, in which case the droplet 74 discharges its stored electrical charge and returns to its unwetted state as shown by its unwetted meniscus 75.

In the case of charged electrowetting, the principle of energy storage is based on the electrolytic capacitor. It is called "charged" electrowetting because the droplet 74 has a net electrical charge in the charged state 81. In this example, the charge is positive. But the polarity of the power supply 84 can be reversed with the same electrowetting effect, except that the charge of the droplet 74 will be negative.

Referring to FIG. 15B in view of FIG. 15A, as with the maintenance of charge after charging an electrolytic capacitor, even with the power supply 84 disconnected the charged state 81 will be maintained, and the droplet 74 will maintain the wetted meniscus 82. The droplet 74 will return to the uncharged state 73 after the switch 83 is turned to discharge the electrical energy which is stored in the form of opposite charges by electrolytic capacitance.

For charged electrowetting, U.S. Pat. No. 8,292,798 teaches the more powerful arrangement placing control electrodes on all or both sides of a droplet, as opposed to on one side of the droplet only. A common electrode charges the droplet relative to the control electrodes. It also teaches an annular configuration. See U.S. Pat. No. 8,292,798, col. 61, line 53 ff.

As to the means of actuation for refreshable Braille, the present invention prefers to employ charged electrowetting, in the more powerful arrangement of placing control electrodes on all sides of the droplet in an annular configuration, with a coaxially disposed common electrode. The common electrode is preferably coated with a hydrophobic film which is not electrically insulating. As an alternative to the annular configuration, a parallel plate configuration is also taught.

Figure 16:
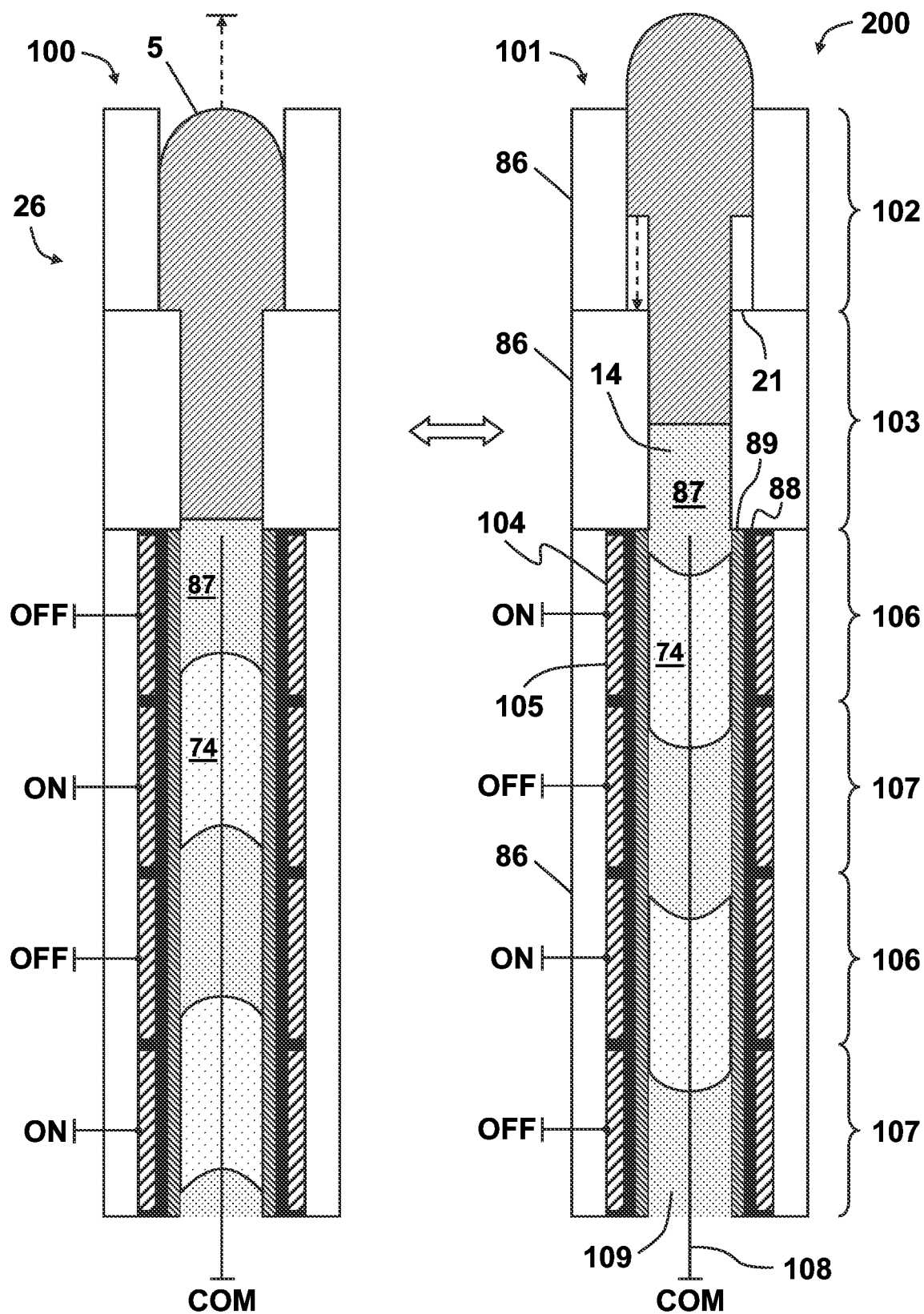
FIG. 16 is a side cross-sectional view of an inventive means of actuation for refreshable Braille.

FIG. 16 shows an exemplary means of actuation 200 for refreshable Braille according to the preferred embodiment. To simplify the drawing of FIG. 16, the means of actuation 200 is shown for a single half-pin 5. According to the means of actuation 200, the half-pin 5 is actuated between unraised 100 and raised 101 states.

Referring to FIG. 16 in view of FIGS. 9 and 10, in practice the means of actuation 200 for the half-pins 5 is incorporated within the display panel 26. According to the preferred embodiment, the display panel 26 including the means of actuation 200 is made using layer-based microfabrication techniques.

Advantageously, layer-based microfabrication techniques traditionally offer cost savings over other miniaturization techniques and are well suited to mass production.

Referring to FIG. 16, a plurality of planar substrate layers house the half-pin 5 and their means of actuation 200. As shown in FIG. 16, an exemplary material for the substrate layers is glass 86.

In general, materials for substrate layers, techniques for forming or patterning structures and features on or within substrate layers, and techniques for bonding substrate layers together are well known in the arts of microfabrication and microfluidics. See Temiz et al., "Lab-on-a-chip devices: How to close and plug the lab?" Microelectronic Engineering, Vol. 132, 2015, pp. 156-175, incorporated herein in its entirety by way of reference. See also Leester-Schädel et al., "Fabrication of microfluidic devices," in: A. Dietzel (ed.), Microsystems for pharmatechnology: Manipulation of fluids, particles, droplets, and cells, Cham (Switzerland): Springer, 2016, pp. 23-57, incorporated herein in its entirety by way of reference.

Exemplary materials for the substrate layers include glass, borosilicate glass, glass-ceramics, poly(dimethylsiloxane) (PDMS) or other silicone, plastic or other polymeric material, cyclic olefin copolymer (COC), cyclic olefin polymer (COP), poly(carbonate) (PC), poly(methyl methacrylate) (PMMA), polyimide (PI), polyethylene terephthalate (PET), polystyrene (PS), poly (ether-ether-ketone) (PEEK), acrylonitrile butadiene styrene (ABS), polyamide (PA), poly (ethylene) (PE), poly(tetrafluoroethylene) (PTFE), epoxy, SU-8 photoresist, synthetic sapphire, synthetic diamond, ceramic, alumina, silicon nitride, silicon carbide, cubic zirconia, silicon, germanium, and stainless steel or other metal.

Exemplary techniques for forming or patterning voids, channels, vias (viz. holes), slots, film layers, and other structures or features on or within the substrate layers include any combination of micromachining, laser micromachining, photolithography, wet or dry chemical etching, micro milling, micro drilling, micro cutting, micro scribing, micro patterning, micro grinding, soft lithography, hot embossing, microforming, casting, molding, injection molding, inkjet printing, 3D-printing, microelectrical discharge machining, thin-film growth or deposition, and so forth according to the arts of microfabrication and microfluidics.

Exemplary techniques for bonding the substrate layers together include direct bonding and indirect bonding, for example, adhesive bonding. Exemplary adhesives include UV curable epoxy adhesives, for example, Norland Optical Adhesive 61 (NOA 61) (Norland Products, Inc., Cranbury, NJ) or SU-8 photoresist; and, silicone adhesives, for example, RTV 108 or RTV 118 (Momentive Performance Materials, Inc., Waterford, NY) or SYLGARD® 184 (Dow Corning Corporation, Midland, MI).

Referring to FIG. 16 in view of FIGS. 2B, 2C, and 3, a retainment layer 102 keeps the half-pins 5 from falling out of a piston chamber layer 103 underneath it. The piston chamber 14 for the half-pin 5 is disposed within the piston chamber layer 103.

Advantageously, the piston chamber 14 is entirely contained by the piston chamber layer 103, which provides smooth walls for smooth operation of the piston 15 and the connecting shaft 16, as opposed to rough operation caused by walls having irregularities where two layers meet.

Referring to FIG. 16, a series of electronically selectable control electrodes 104 is disposed beneath the piston chamber layer 103 to actuate droplets 74 of an electrically conductive ionic solution in hydraulic communication with the piston chamber 14. Counting from the topmost control electrode 105 of the control electrodes 104, odd numbered control electrodes (called upstroke electrodes 106) provide the half-pin 5 with upstroke actuation (to raise the half-pin 5) and even numbered control electrodes (called downstroke electrodes 107) provide the half-pin 5 with downstroke actuation (to lower the half-pin 5). In other words, the control electrodes 104 for upstroke and downstroke actuation alternate in series.

With the upstroke electrodes 106 turned ON and the downstroke electrodes 107 turned OFF, the half-pin 5 is actuated to its raised state 101. With the downstroke electrodes 107 turned ON and the upstroke electrodes 106 turned OFF, the half-pin 5 is actuated to its unraised state 100. A common electrode 108 to carry a common voltage (COM) relative to the ON state of the control electrodes 104 is disposed within a droplet channel 109 housing the droplets 74.

Referring to FIG. 16 in view of FIGS. 9 and 10, the selection (viz. addressing) and turning on and off of the control electrodes 104 to raise and lower the half-pin 5 is controlled by the electronics assembly 42.

Referring to FIG. 16, at least the topmost control electrode 105 is needed to raise the half-pin 5. If only the topmost control electrode 105 is provided, then an alternate means of lowering the half-pin 5 must be provided, for example, an elastic member attached between the substrate 4 and the half-pin 5 to retract the half-pin 5 to the unraised state 100 once the upstroke electrode 106 is turned off. But to raise and lower the half-pin 5 using only the control electrodes 104, at least one upstroke electrode 106 and at least one downstroke electrode 107 must be provided. In the example of FIG. 16, two pairs of upstroke and downstroke electrodes 106, 107 are provided and each pair actuates its own droplet 74. Though two pairs are shown in FIG. 16, in practice one or more pairs of control electrodes 104 may be provided, with each pair actuating its own droplet 74.

Advantageously, having multiple pairs of upstroke and downstroke electrodes 106, 107, with each pair having its own droplet 74, produces a greater hydraulic force on the half-pin 5 than a single pair acting alone.

Advantageously, for a given hydraulic leverage ratio between the droplet channel 109 and the piston chamber 14, a greater hydraulic pressure will obtained by increasing the number of droplets 74 being actuated in series.

Referring to FIG. 16 in view of FIGS. 2B, 2C, and 3, though two pairs of upstroke and downstroke electrodes 106, 107 are shown in FIG. 16, in practice a predetermined number of pairs is provided to produce enough hydraulic force to cause the upstroke ledge 18 of the half-pin 5 to rest firmly against the upstroke retainer 20 in the raised state 101 and to cause the downstroke ledge 19 of the half-pin 5 to rest firmly against the downstroke retainer 21 in the unraised state 100. In the raised state 101, the predetermined number of upstroke electrodes 106 acting on their respective droplets 74 is such that it provides sufficient force between the upstroke ledge 18 and the upstroke retainer 20 so that the half-pin 5 will remain in the raised state 101 even against substantial pressure from the user's finger pressing down upon it.

Advantageously, because electrowetting forces maintain a given state of actuation based on the principle of electrolytic capacitance even when power is turned off, then in contrast to the prior art there is no need to provide a locking and unlocking mechanism to keep the half-pins 5 in the raised state for a period of time, including against finger pressure.

Even when the predetermined number of pairs of upstroke and downstroke electrodes 106, 107 provides sufficient force to actuate the half-pins 5, additional pairs may be added to provide the same or greater force at a lower voltage.

Referring to FIG. 16 in view of FIGS. 2C and 3, the piston 15 and successive droplets 74 are bounded by a liquid filler medium 87 which is electrically non-conducting and immiscible with the droplets 74. Exemplary filler media 87 include silicone oil, mineral oil, and fluorinated oil. An exemplary fluorinated oil is a fluorocarbon-based liquid which is electrically non-conducting and immiscible with water, for example, Fluorinert® (3M Company, Maplewood, MN).

Referring to FIG. 16, in operation, respective droplets 74 reciprocate in an up-and-down piston-like fashion within respective regions of the droplet channel 109 in going between the raised and unraised states 101, 100 of the half-pins 5, and which regions are bounded by respective pairs of upstroke and downstroke electrodes 106, 107, with one droplet 74 per pair.

In keeping with the principles of electrowetting an ionic solution, the control electrodes 104 are covered first with an electrically insulating film layer 88 and then with a hydrophobic film layer 89 so that the droplets 74 are in contact with the hydrophobic layer 89 and are electrically insulated from the control electrodes 104. Though separate layers are shown in the drawing, alternatively a single film layer material may be employed which is both electrically insulating and hydrophobic.

Exemplary materials for the insulating layer 88 (viz. dielectric layer) include Parylene, Parylene C, and other poly(para-xylylene) polymers, silicon dioxide ($SiO_2$), silicon nitride ($Si_xN_y$), and poly(ethylene).

An exemplary material for the hydrophobic layer 89 is a fluoropolymer, for example, Teflon AF1600 ® (The Chemours Company, Wilmington, DE) or Cytop®. According to the art, the hydrophobic layer 89 may also be a superhydrophobic layer.

The control electrodes 104 are formed of an electrically conductive material. Exemplary materials for the control electrodes 104 include copper, gold, platinum, palladium, silver, titanium, chromium, aluminum, nickel, indium tin oxide, tin, zinc, conductive polymers, and conductive semiconductors.

The common electrode 108 is formed of an electrically conductive material. Exemplary materials for the common electrode 108 include platinum wire and stainless steel wire. The common electrode 108 is preferable coated with a hydrophobic film layer which is not electrically insulating. An exemplary material for the hydrophobic film which is not electrically insulating is a fluoropolymer, for example, Teflon AF1600 ® and Cytop®. According to the art, the hydrophobic film may also be a superhydrophobic film.

An exemplary liquid material for the electrically conductive liquid droplets 74 is an ionic solution. An exemplary ionic solution is an aqueous 0.1 M sodium chloride (NaCl) solution. Another exemplary ionic solution is phosphate-buffered saline. Ionic solutions forming the droplets 74 may also be mixed with non-conducting liquids such as glycerol and ethanol. These examples of droplet materials are not limiting for, according to the art, electrowetting can be performed on a wide variety of ionic solutions, as well as on variety of droplet materials other than ionic solutions. See Chatterjee et al., "Droplet-based microfluidics with nonaqueous solvents and solutions," Lab on a Chip, Vol. 6, No. 2, 2006, pp. 199-206, incorporated herein in its entirety by way of reference.

Referring to FIG. 16, to actuate the droplets 74, a predetermined voltage potential is applied between selected control electrodes 104 and the common electrode 108. The upstroke electrodes 106 are selected for upstroke actuation and the downstroke electrodes 107 are selected for downstroke actuation. A direct current (DC) or alternating current (AC) voltage potential may be applied. An exemplary AC voltage takes the form of a square wave having a predetermined frequency and waveform. Droplet actuation rates may be enhanced using an overdrive voltage as disclosed by Jeong et al. See Jeong et al., "Enhancement of response speed of viscous fluids using overdrive voltage," Sensors and Actuators B: Chemical, Vol. 209, 2015, pp. 56-60, incorporated herein in its entirety by way of reference. By overdrive potential is meant a higher voltage which is stepped down to a lower target voltage after a brief, initial period of time.

Referring to FIG. 16 in view of FIGS. 9 and 10, according to the preferred embodiment the mechanisms shown in FIG. 16 to actuate the half-pin 5 are contained by the display panel 26 and electrical power for the voltage potential to actuate the droplets 74 is supplied by the battery assembly 43 via the electrical assembly 42 under microprocessor controls. Electrical power may also be provided, for example, via a USB port or transformer.

Figure 17A:
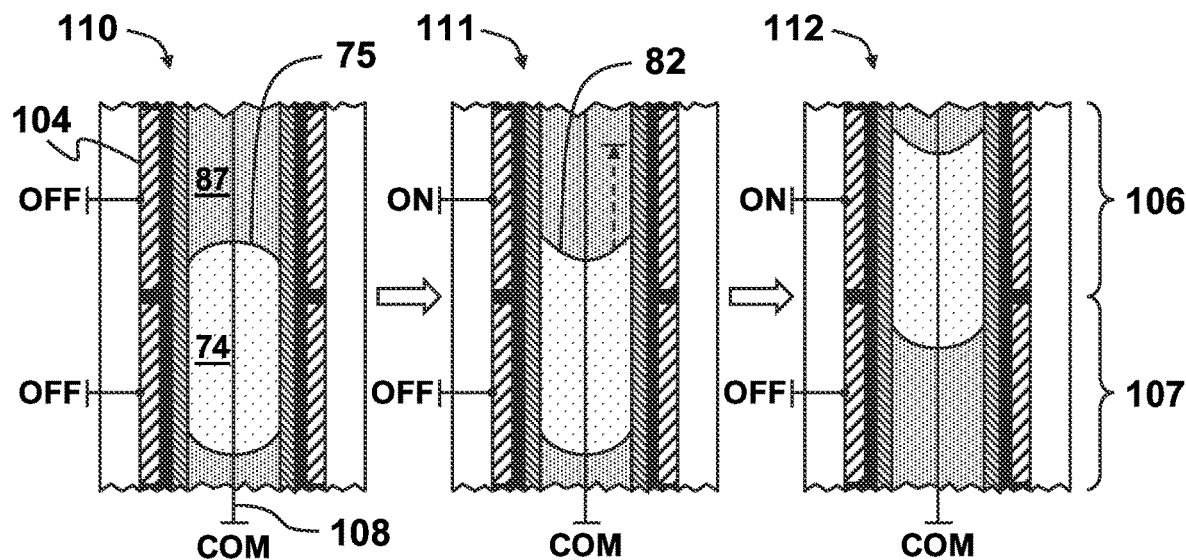
FIGS. 17A and 17B are partial side cross-sectional views of the inventive means of actuation being operated in respective upstroke and downstroke modes.
Figure 17B:
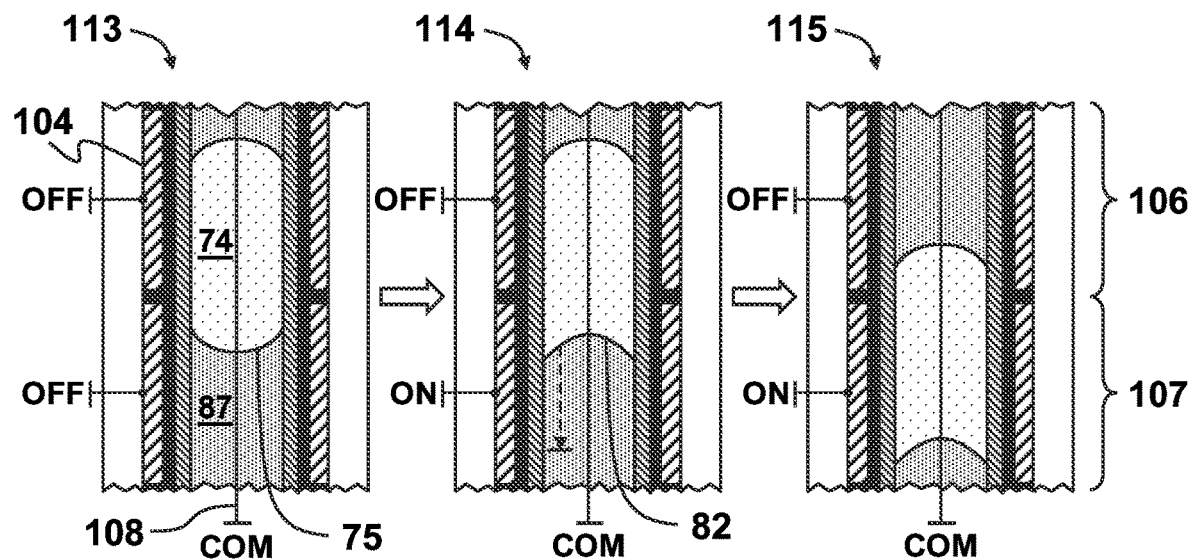

In view of FIG. 16, FIG. 17A shows a pair of upstroke and downstroke electrodes 106, 107 in an upstroke mode of actuation (to raise the half-pin 5 to the raised state 101) and FIG. 17B shows the same pair in a downstroke mode of actuation (to lower the half-pin 5 to the unraised state 100).

Referring to FIG. 17A in view of FIGS. 2C, 3, and 16, a series of three states is shown: 1) an uncharged low position 110, 2) an upstroke mode 111, and 3) a charged high position 112. In the uncharged low position 110, all control electrodes 104 are OFF and the droplet 74 is at rest having an unwetted meniscus 75 on both its upper and lower sides; the droplet 74 does not exert any upward or downward pressure in this state; and, the associated half-pin 5 is in the unraised state 100. In the upstroke mode 111, the upstroke electrodes 106 are ON and the downstroke electrodes 107 are OFF and the droplet 74 rises having a wetted meniscus 82 on its upper side in contrast to an unwetted meniscus 75 on its lower side. Upon reaching the charged high position 112 the droplet 74 can go no further upward because the half-pin 5 has reached the raised state 101 and contact between the upstroke retainer 20 and the upstroke ledge 18 prevents further upward movement; nonetheless, the droplet 74 continues to exert upward pressure because the upstroke electrodes 106 are ON and the downstroke electrodes 107 are OFF.

Referring to FIG. 17B in view of FIGS. 2C, 3, and 16, a series of three states is shown: an uncharged high position 113, 2) a downstroke mode 114, and 3) a charged low position 115. In the uncharged high position 113, all control electrodes 104 are OFF and the droplet 74 is at rest having an unwetted meniscus 75 on both its upper and lower sides; the droplet 74 does not exert any upward or downward pressure in this state; and, the associated half-pin 5 is in the raised state 101. In the downstroke mode 114, the downstroke electrodes 107 are ON and the upstroke electrodes 106 are OFF and the droplet 74 lowers having a wetted meniscus 82 on its lower side in contrast to an unwetted meniscus 75 on its upper side. Upon reaching the charged low position 115 the droplet 74 can go no further downward because the half-pin 5 has reached the unraised state 100 and contact between the downstroke retainer 21 and downstroke ledge 19 prevents further downward movement; nonetheless, the droplet 74 continues to exert downward pressure because the downstroke electrodes 107 are ON and the upstroke electrodes 106 are OFF.

Referring to FIGS. 17A and 17B, in general either the upstroke electrodes 106 or downstroke electrodes 107 will be turned ON, and the opposing member of the pair will be OFF. The case of both the upstroke and downstroke electrodes 106, 107 being ON at the same time does not occur within the scope of proper operation as it may cause such undesirable results as droplet splitting. Though shown for illustration purposes in FIGS. 17A and 17B, the uncharged state of all control electrodes being OFF will seldom occur. Instead, as shown in FIG. 18 in view of FIGS. 17A and 17B, movement of the droplet 74 will cycle between the charged low and high positions 115, 112 via the upstroke and downstroke modes 111, 114.

Figure 18:
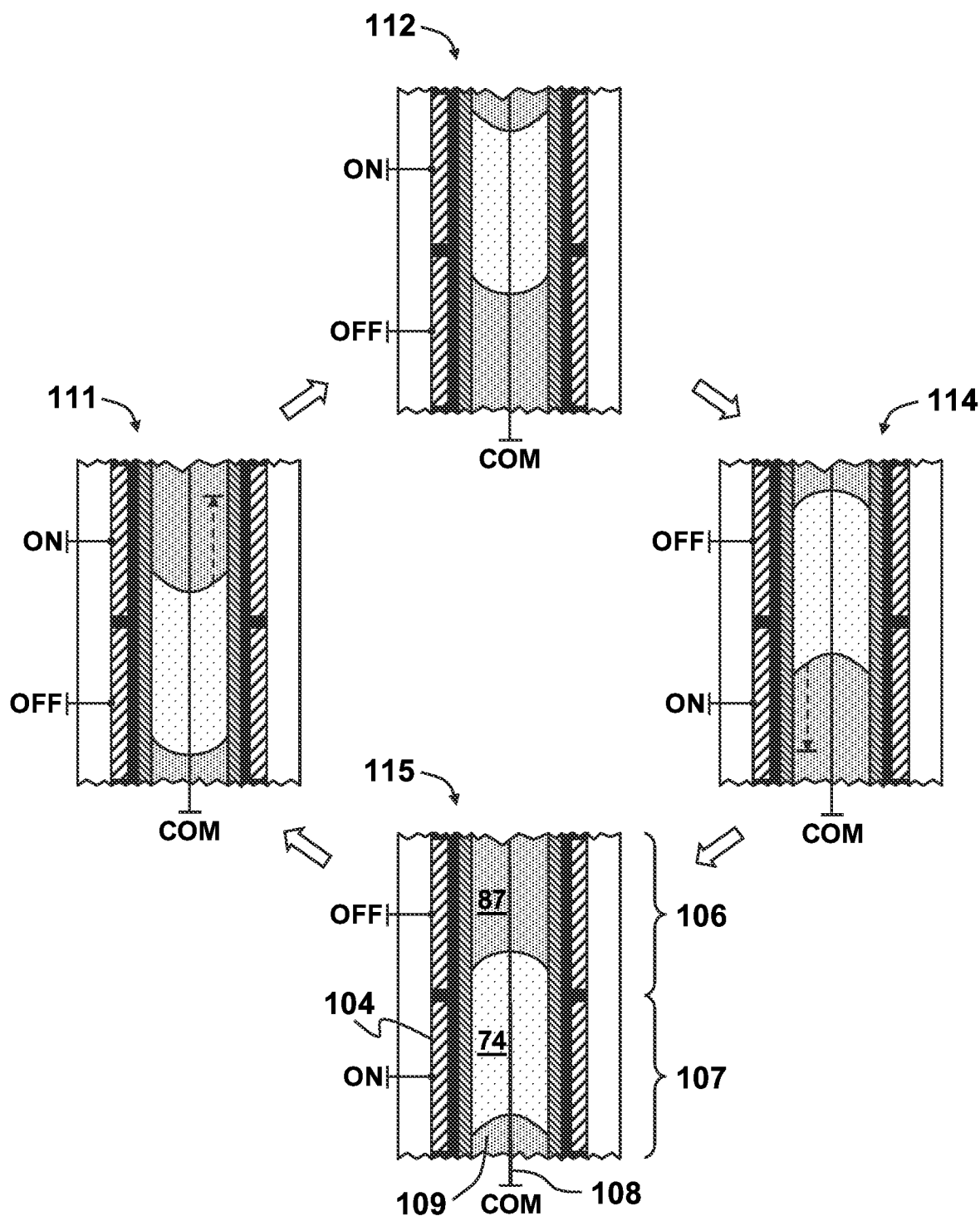
FIG. 18 is a partial side cross-sectional view of the inventive means of actuation being operated in a complete cycle.

Referring to FIG. 18 in view of FIG. 16, the droplet 74 may be viewed as a piston, which cycles between the raised and unraised states 101, 100, and the droplet channel 109 housing it may be viewed as a piston chamber. To make a comparison, in the case of an automobile a plurality of pistons are arranged in parallel to produce more power than a single piston acting alone. In contrast, according to the invention a plurality of droplet pistons is arranged in series for added power, stacked one on top of the other. For example, FIG. 16 shows two droplet pistons in series, as provided by the two droplets 74 which are actuated by their respective upstroke and downstroke electrode 106, 107 pairs. Additional upstroke and downstroke electrode 106, 107 pairs to actuate additional droplets 74 can be added to increase the hydraulic power exerted on the half-pin 5 by the droplets 74 acting in series according to the means of actuation 200.

Figure 19:
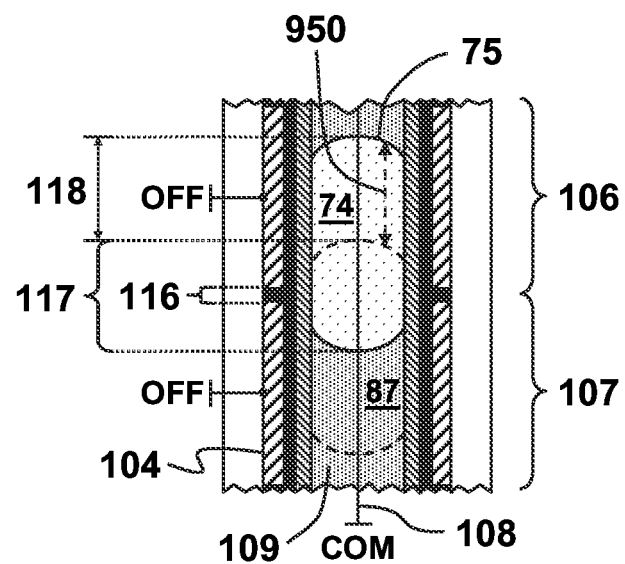
FIG. 19 is a partial side cross-sectional view of the inventive means of actuation showing a stroke distance traversed by a droplet during a stroke.

FIG. 19 shows a single pair of upstroke and downstroke electrodes 106, 107 to illustrate a range of droplet 74 movement over the course of a stroke 950, whether an upstroke or downstroke. Referring to FIG. 19 in view of FIGS. 16, 17A, and 17B, shown resting in its uncharged high position 113, the range of movement is indicated by the droplet 74 having moved from its uncharged low position 110 (shown in dashed outline) to its uncharged high position 113. Notably, there may happen to be a gap 116 between adjacent control electrodes 104, especially when they lie in adjacent substrate layers instead of next to each other in the same layer.

A known problem in the art of digital microfluidics is that a droplet can have trouble traversing a gap between adjacent control electrodes. In such cases, absent sufficient momentum, the droplet may get stuck and the device will fail. Here this is called the gap crossing problem. A prior art approach to the gap crossing problem is to employ interdigitated control electrodes to reduce the gap by creating overlap at the edges where control electrodes meet. But this approach is not easily adapted to control electrodes stacked in substrate layers one on top of the other, each in a separate layer, in which case some gap between the layers is inevitable.

Advantageously, referring to FIG. 16 in view of FIG. 19, according to the preferred embodiment the gap crossing problem is eliminated because the unwetted meniscus 75 of the droplet 74 never has to cross the gap 116 between control electrodes 104 over the course of successive strokes 950. Instead, at least a portion 117 of the droplet 74 always covers the gap 116 throughout each stroke 950.

FIG. 19 illustrates a stroke distance 118 traversed by the droplet 74 in going between low and high positions, which is the height difference traveled by the droplet 74 over the course of each stroke 950. Referring to FIG. 19 in view of FIG. 16, it will be appreciated that the stroke distance 118 times a cross-sectional area of the droplet channel 109 provides a volume of fluid movement between low and high positions, and which volume equals a volume of fluid movement in the piston chamber 14 between the raised and unraised states 101, 100.

Figure 20A:
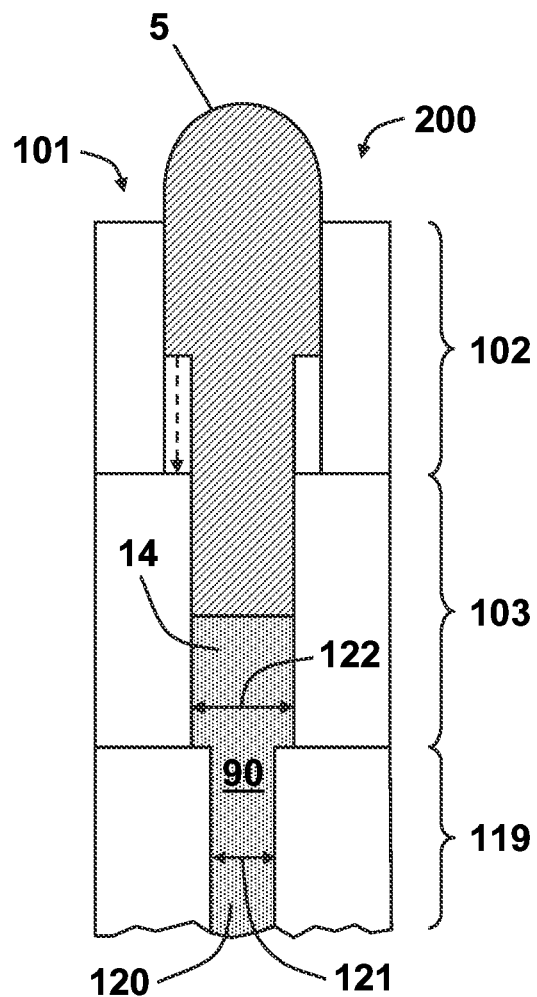
FIGS. 20A and 20B are partial side cross-sectional views of the inventive means of actuation showing hydraulic leverage ratios which are respectively greater or less than unity.
Figure 20B:
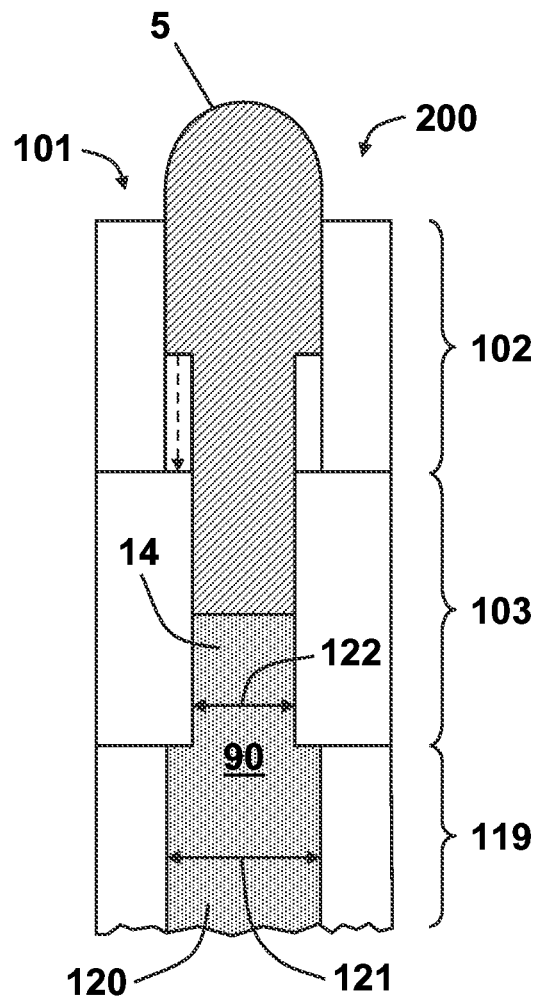

FIGS. 20A and 20B illustrate different ratios of hydraulic leverage according to the means of actuation 200. The drawing of FIGS. 20A and 20B has been generalized so that the means of actuation 200 is depicted as comprising a hydraulic actuator 119 having a hydraulic channel 120 in hydraulic communication with the piston chamber 14 of the half-pin 5, and which hydraulic communication is established by means of a hydraulic fluid 90.

In FIG. 20A, a ratio of hydraulic leverage is depicted which is greater than unity. This is evident because a cross-sectional area 121 of the hydraulic channel 120 of the hydraulic actuator 119 is less than a cross-sectional area 122 of the piston chamber 14 of the half-pin 5.

In FIG. 20B, a ratio of hydraulic leverage is depicted which is less than unity. This is evident because the cross-sectional area 121 of the hydraulic channel 120 of the hydraulic actuator 119 is greater than the cross-sectional area 122 of the piston chamber 14 of the half-pin 5.

FIG. 16 depicts a ratio of hydraulic leverage which is equal to unity.

In contrast, as depicted in FIG. 20A, when the ratio of hydraulic leverage is greater than unity, less force from the hydraulic actuator 119 is required to actuate the half-pin 5, according to the art of hydraulic machinery. However, it will take a longer amount of time to actuate the half-pin 5 because the hydraulic fluid 90 in the hydraulic actuator 119 has to move a further distance within the hydraulic channel 120 to supply a volume of fluid required to fill/empty the piston chamber 14 of the half-pin 5 to achieve the raised/unraised state 101, 100.

Conversely, as depicted in FIG. 20B, when the ratio of hydraulic leverage is less than unity, greater force from the hydraulic actuator 119 is required to actuate the half-pin 5. However, it will take a shorter amount of time to actuate the half-pin 5 because the hydraulic fluid 90 in the hydraulic actuator 119 has to move less of a distance within the hydraulic channel 120 to supply a volume of fluid required to fill/empty the piston chamber 14 of the half-pin 5 to achieve the raised/unraised state 101, 100.

A hydraulic leverage ratio of unity is generally preferred according to the invention.

In the drawing of FIG. 16, both the droplets 74 and filler medium 87 together comprise the hydraulic fluid 90 shown in FIGS. 20A and 20B.

To simplify the drawing, not shown in FIG. 16 is a reservoir for the filler medium 87 and which reservoir is configured to being equilibrated in pressure with an ambient pressure of air in the surroundings. However, such reservoirs are shown in Example 1 and Example 2 provided in the description below.

Example 1 and Example 2 teach how to make and use the display panel 26 needed to provide tactile Braille displays 10 according to the invention, as shown, for example, in FIGS. 2A, 7, 9, 10, 13, and 14.

Example 1 is considered to be the best mode of practicing the display panel 26.

The finger reader 22 shown in FIG. 7, including the best mode of practicing the display panel 26, is considered to be the best mode of practicing self-scrolling Braille.

Example 1

Figure 21:
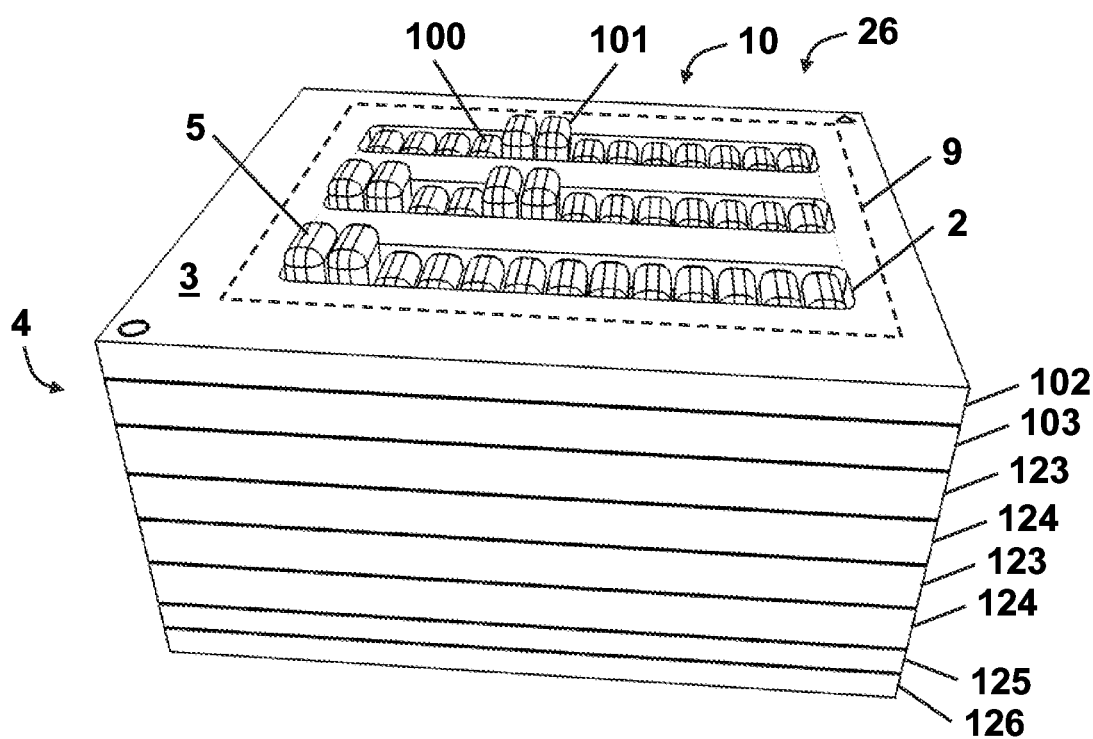
FIGS. 21 and 22 are respective top and bottom side perspective views of an inventive self-scrolling Braille display panel according to Example 1.
Figure 22:
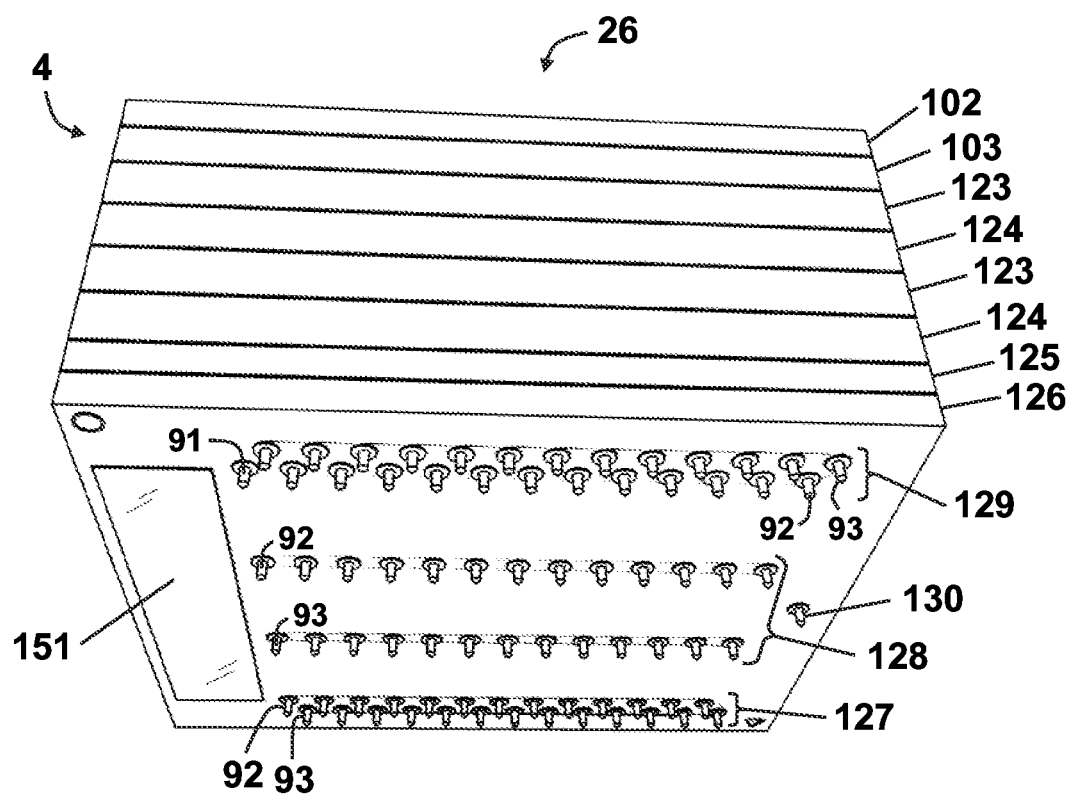
Figure 28A:
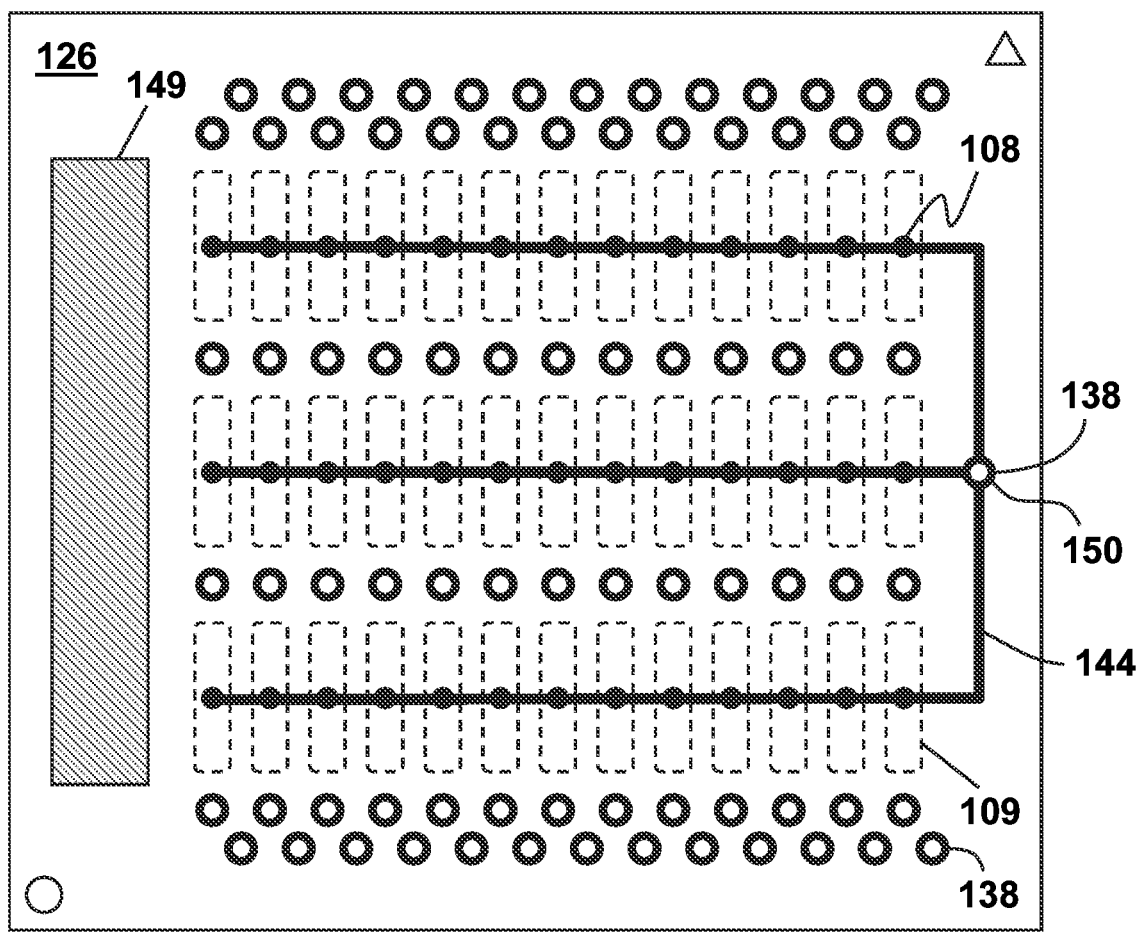
FIGS. 28A and 28B are respective top and bottom orthogonal views of a microfabricated planar substrate layer for making the inventive display panel.
Figure 28B:
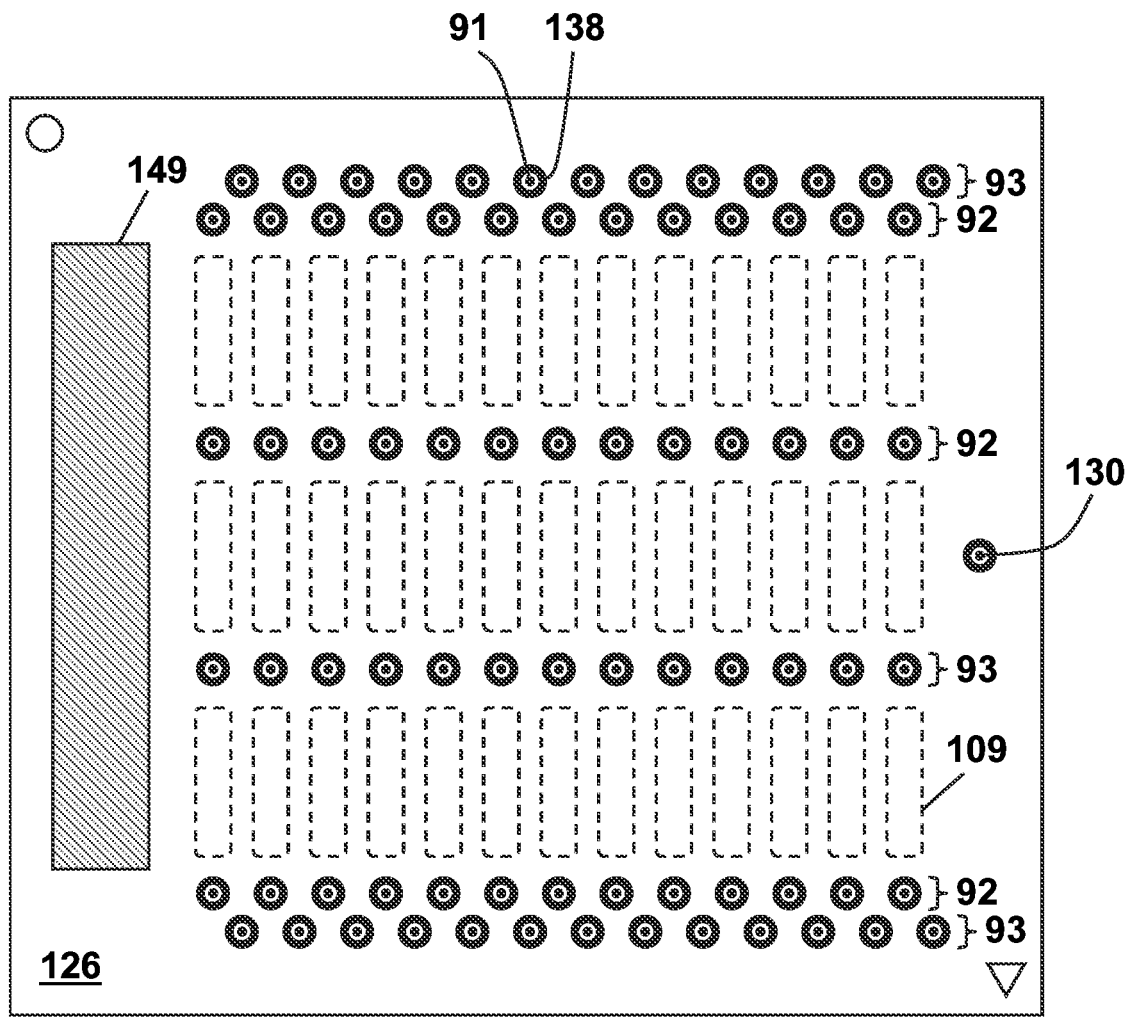
Figure 29A:
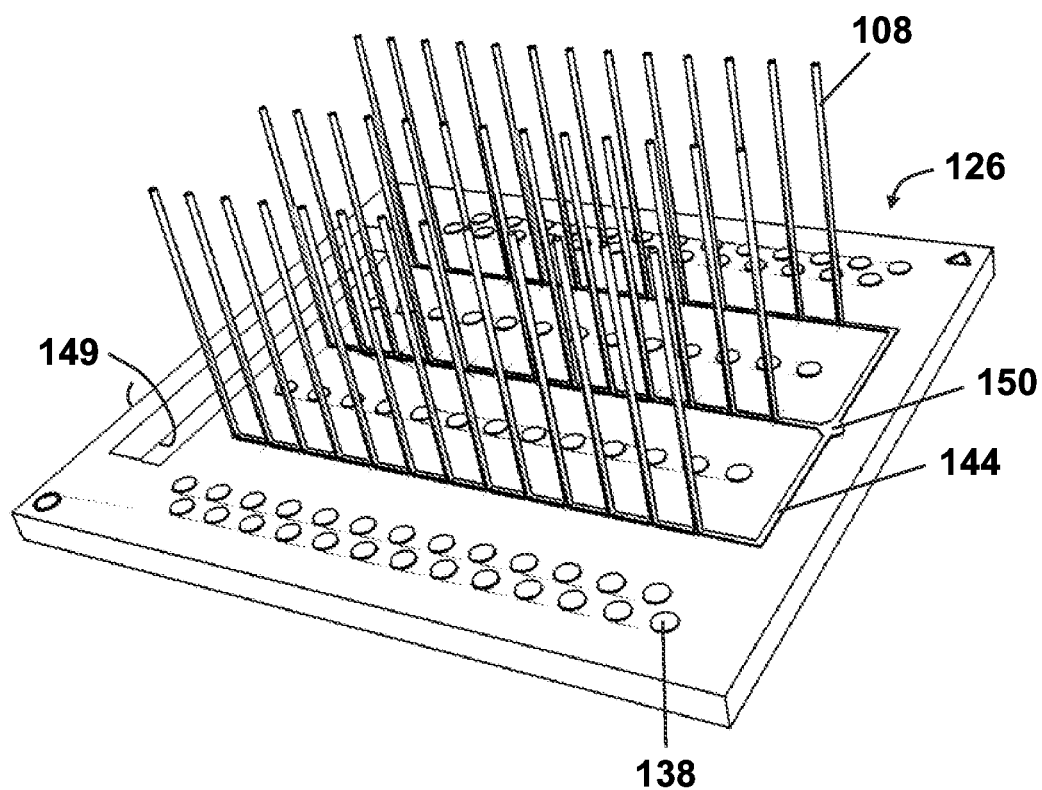
FIGS. 29A and 29B are respective top and bottom side perspective views of the layer shown in FIGS. 28A and 28B.
Figure 29B:
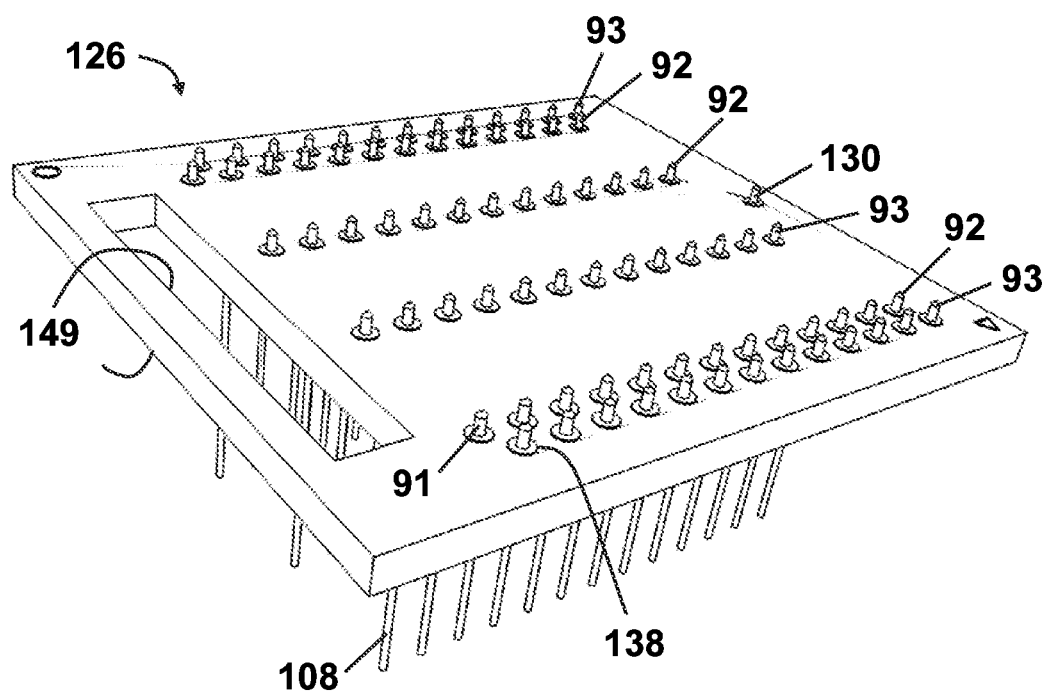
Figure 30:
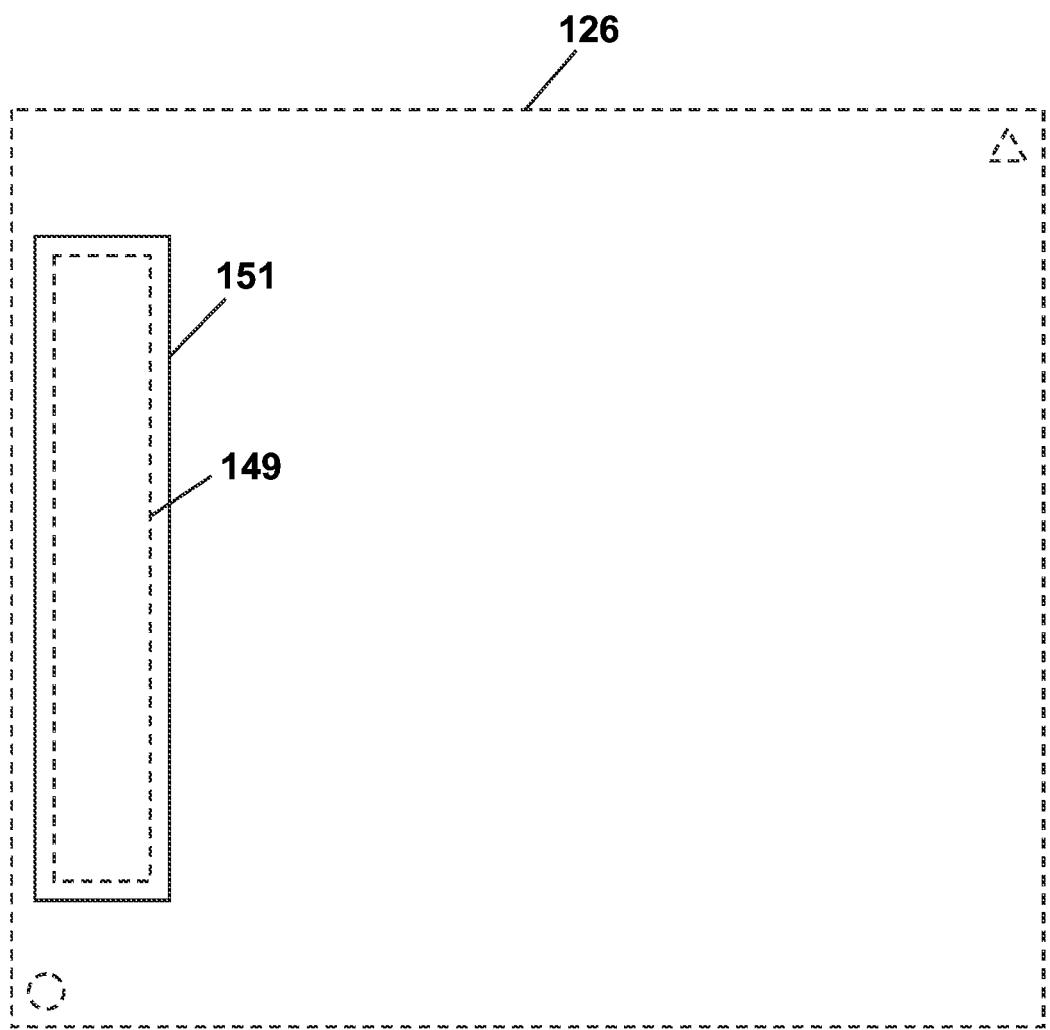
FIG. 30 is a top orthogonal view of a pressure equilibration membrane for making the inventive display panel.

FIG. 21 shows a top perspective view of the display panel 26 which according to the preferred embodiment comprises 39 half-pins 5 disposed in a substrate 4 having eight horizontally disposed planar substrate layers. FIG. 22 shows a bottom perspective view of the display panel 26. FIGS. 23, 24, 25, 26, and 27 show top orthogonal views of several of the individual substrate layers employed in assembling the display panel 26. FIGS. 28A and 28B show respective top and bottom orthogonal views of another of the individual substrate layers. FIGS. 29A and 29B show respective perspective views of FIGS. 28A and 28B. FIG. 30 shows a membrane which is applied to cover an opening on one of the substrate layers.

In FIGS. 21, 22, 23, 24, 25, 26, 27, 28A, 28B, 29A, 29B, and 30, a triangular indicium and a circular indicium appear in opposite corners to aid in an appreciation of the drawing with respect to an alignment and orientation of the substrate layers, but are not a part of the device.

Referring to FIG. 21 in view of FIGS. 2A, 2B, 2C, 3, and 16, the display panel 26 is configured to a self-scrolling Braille display 10 having disposed on its surface 3 a Braille hotspot 9 formed by three tracks 2 of half-pins 5 having 13 half-pins 5 per track 2, for a total of 39 half-pins 5 in the hotspot 9.

Referring to FIG. 21, the display panel 26 can make any combination of raised and unraised states 101, 100 of the half-pins 5 under microprocessor controls. In FIG. 21, the particular combination of raised and unraised states 101, 100 shown makes the character "t" in Braille. The combination of raised and unraised states 101, 100 shown in the middle track 2 corresponds to the 13th time interval in the timing diagram shown in FIG. 4.

Referring to FIG. 21, a preferred shape of the half-pins 5 is shown in FIG. 3. A preferred process for making the half-pins 5 is micro-injection molding. A preferred material for the half-pins 5 is plastic or other polymeric material. Another process for making the half-pins 5 is by machining compression molded Teflon® or other poly(tetrafluoroethylene) or fluoropolymer.

Referring to FIG. 21 in view of FIGS. 3 and 16, the retainment layer 102 retains the half-pins 5 and provides the surface 3 on which the finger rests in contact with the half-pins 5 to read the self-scrolling Braille. Underneath the retainment layer 102 is the piston chamber layer 103. The piston chambers 14 housing the pistons 15 and connecting shafts 16 of their respective half-pins 5 are disposed within the piston chamber layer 103. Underneath the piston chamber layer 103 is a first of two upstroke layers 123. The upstroke electrodes 106 are disposed within the upstroke layers 123. Underneath the first upstroke layer 123 is a first of two downstroke layers 124. The downstroke electrodes 107 are disposed within the downstroke layers 124. Underneath the first downstroke layer 124 is the second upstroke layer 123, followed by the second downstroke layer 124. Underneath the second downstroke layer 124 is a hydraulic reservoir layer 125, followed by a base layer 126.

Referring to FIG. 22 in view of FIGS. 9, 10, and 21, on the underside of the base layer 126 is a series of electrical contact pins 91 to provide electrical communication between the display panel 26 and the electronics assembly 42. The electronics assembly 42 is adapted to receiving the contact pins 91 in a manner of electrical contact.

Referring to FIG. 22 in view of FIGS. 16 and 21, the series of electrical contact pins 91 consists of 79 electrical contact pins 91, including 26 top track control pins 127 to control 52 control electrodes 104 associated with the 13 half-pins 5 of the top track 2, 26 middle track control pins 128 to control 52 control electrodes 104 associated with the 13 half-pins 5 of the middle track 2, and 26 bottom track control pins 129 to control 52 control electrodes 104 associated with the 13 half-pins 5 of the bottom track 2, and one common electrode contact pin 130 to power 39 common electrodes 108 associated with the 39 half-pins 5.

The three sets of control pins 127, 128, 129 each have two rows of electrical contact pins 91, consisting of one row of 13 upstroke control pins 92 to control the upstroke electrodes 106 and one row of 13 downstroke control pins 93 to control the downstroke electrodes 107 which are associated with each of the 13 half-pins 5 of the respective top, middle, and bottom tracks 2.

Referring to FIG. 22 in view of FIGS. 9, 10, and 21, the microprocessor and related control electronics are preferably housed in the electronics assembly 42 rather than in the display panel 26 itself. Accordingly, the electronics assembly 42 controls the half-pins 5 by supplying electronic signals to the electrical contact pins 91 of the display panel 26.

FIGS. 23, 24, 25, 26, 27, 28A, 28B, 29A, and 29B show the individual substrate layers employed in assembling the display panel 26 shown in FIGS. 21 and 22. The substrate layers are preferably glass layers. Voids and via holes are disposed in the glass layers using such exemplary techniques as laser micromachining, wet or dry chemical etching, and micro drilling. After fabricating the substrate layers, the individual layers are bonded together using direct bonding or indirect bonding, for example, adhesive bonding. An exemplary adhesive for bonding the glass layers is the UV curable epoxy adhesive Norland Optical Adhesive 61 (NOA 61).

FIGS. 23, 24, 25, 26, and 27 show respective top orthogonal views of the retainment layer 102, piston chamber layer 103, upstroke layer 123, downstroke layer 124, hydraulic reservoir layer 125, and base layer 126.

Figure 23:
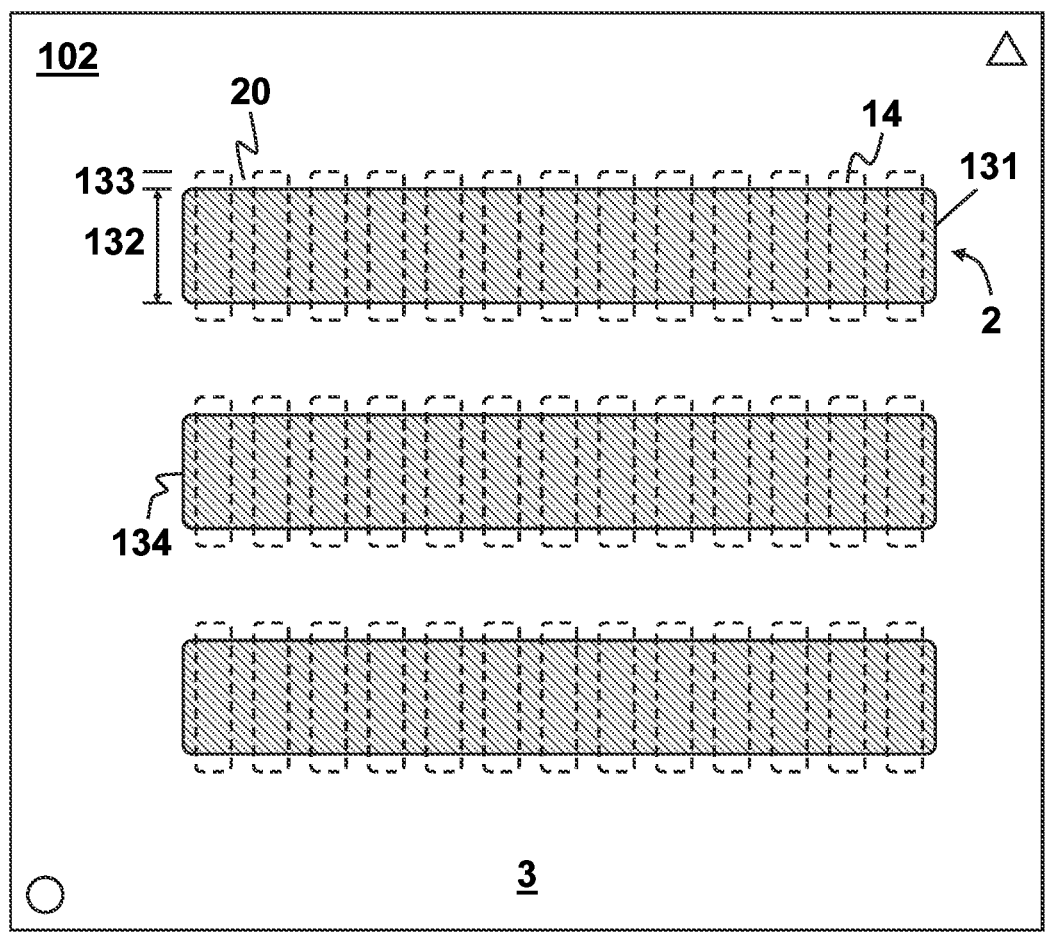
FIGS. 23, 24, 25, 26, and 27 are top orthogonal views of five different microfabricated planar substrate layers for making the inventive display panel.

Referring to FIG. 23 in view of FIGS. 2A, 2B, 2C, 3, 21, and 24, the retainment layer 102 has three voids 131 disposed therethrough, corresponding to one per track 2, which are sized to retain the half-pins 5. Shown in dashed outline are the piston chambers 14 of the piston chamber layer 103 which lies underneath the retainment layer 102. To allow free movement of the half-pins 5, a width 132 of the void 131 is sized to accommodate a width of the head 17 of the half-pin 5. To retain the half-pins 5, the width 132 of the void 131 is narrow enough so that the retainment layer 102 provides an overlapping region 133 to overlap at least a portion of a width of the upstroke ledge 18 of the half-pin 5. The overlapping region 133 forms the upstroke retainer 20 to keep the half-pin 5 from coming out of the display panel 26 and to limit the raised state 101 to a predetermined height by contact with the upstroke ledge 18, the contact being made on the bottom side of the retainment layer 102. A length of the void 131 is sized to leave enough room so the 1st and 13th half-pins 5 do not rub against its end walls 134.

Figure 24:
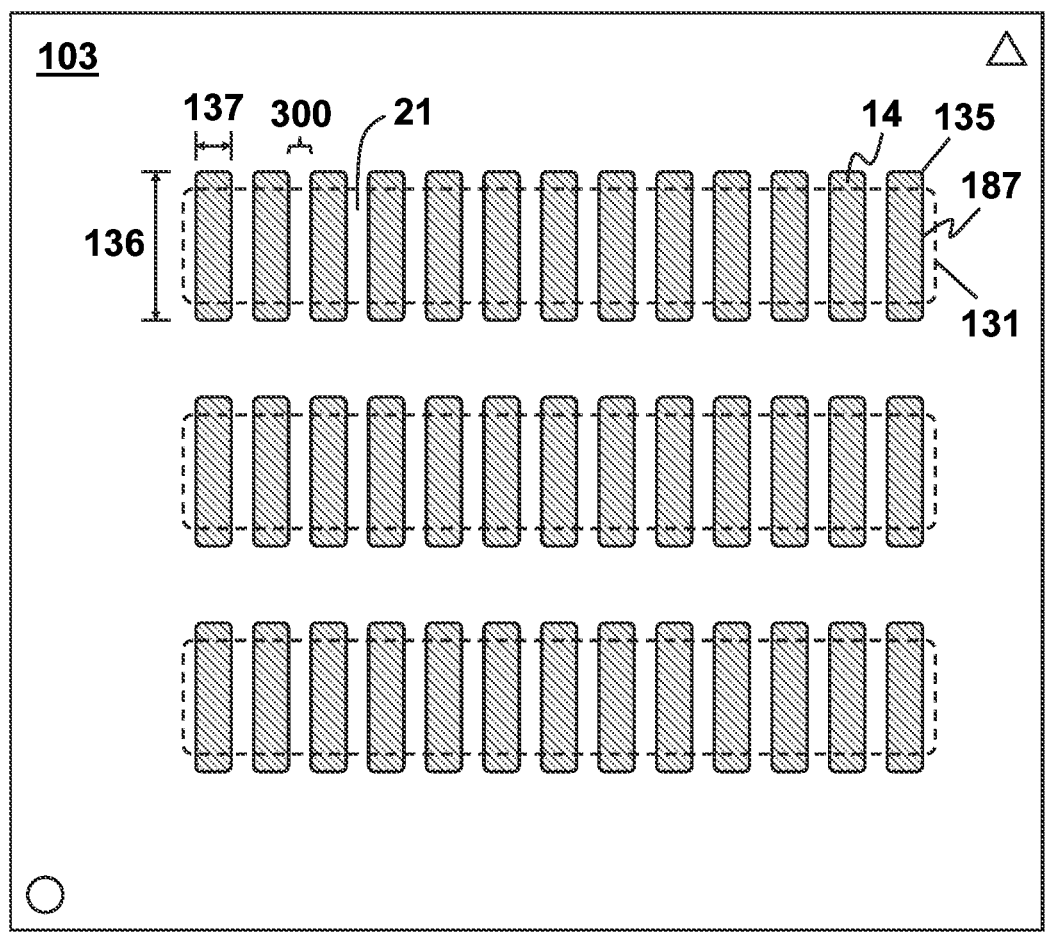

Referring to FIG. 24 in view of FIGS. 2A, 2B, 2C, 3, 21, and 23, the piston chamber layer 103 has 39 voids 135 disposed therethrough, with 13 voids 135 per track 2, to form piston chambers 14 sized to a width 136 and depth 137 of the pistons 15 of the half-pins 5. The voids 131 of the overlying retainment layer 102 are shown in dashed outline. During assembly, the half-pins 5 are inserted into the piston chambers 14 and then the retainment layer 102 is bonded on top of the piston chamber layer 103 to hold the half-pins 5 in place. A region 300 between adjacent voids 135 forming the piston chambers 14 forms the downstroke retainer 21 to limit the downstroke of the half-pin 5 to the preset lowering distance in contact with the downstroke ledge 19, the contact being made on the top side of the piston chamber layer 103.

Figure 25:
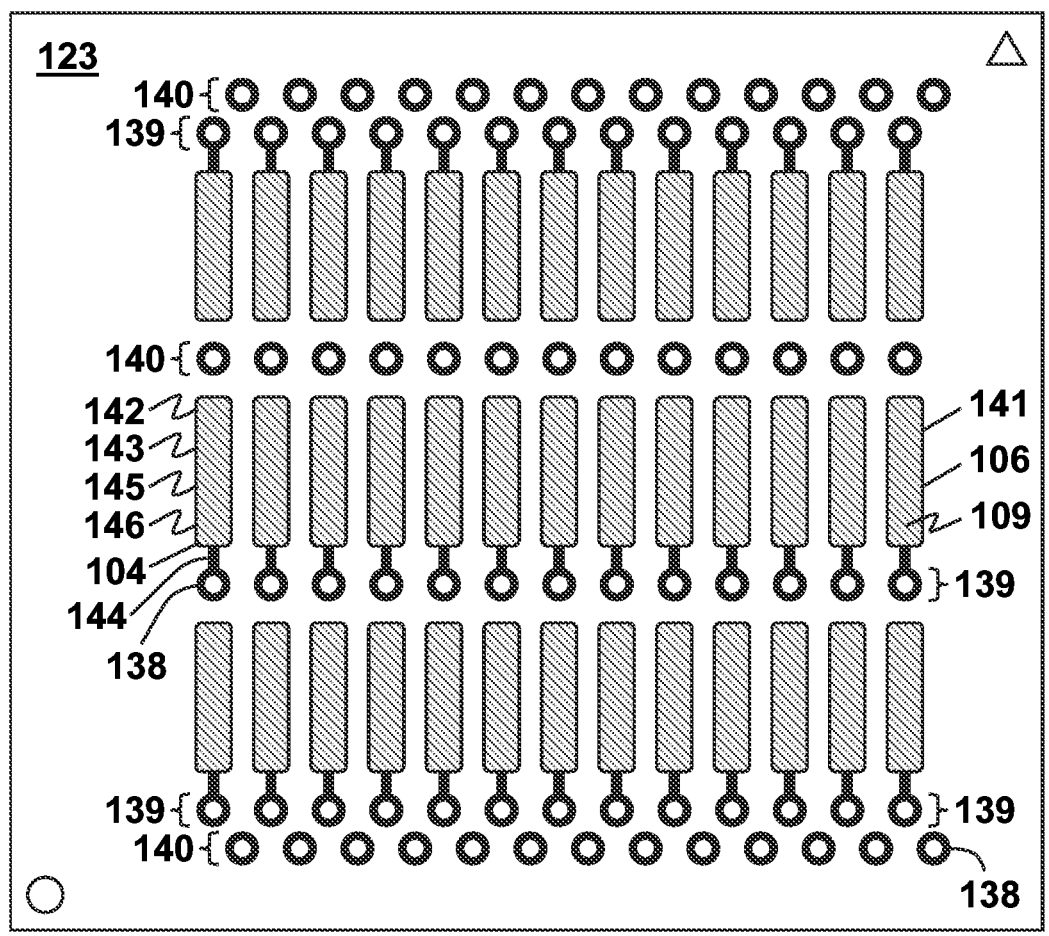
Figure 26:
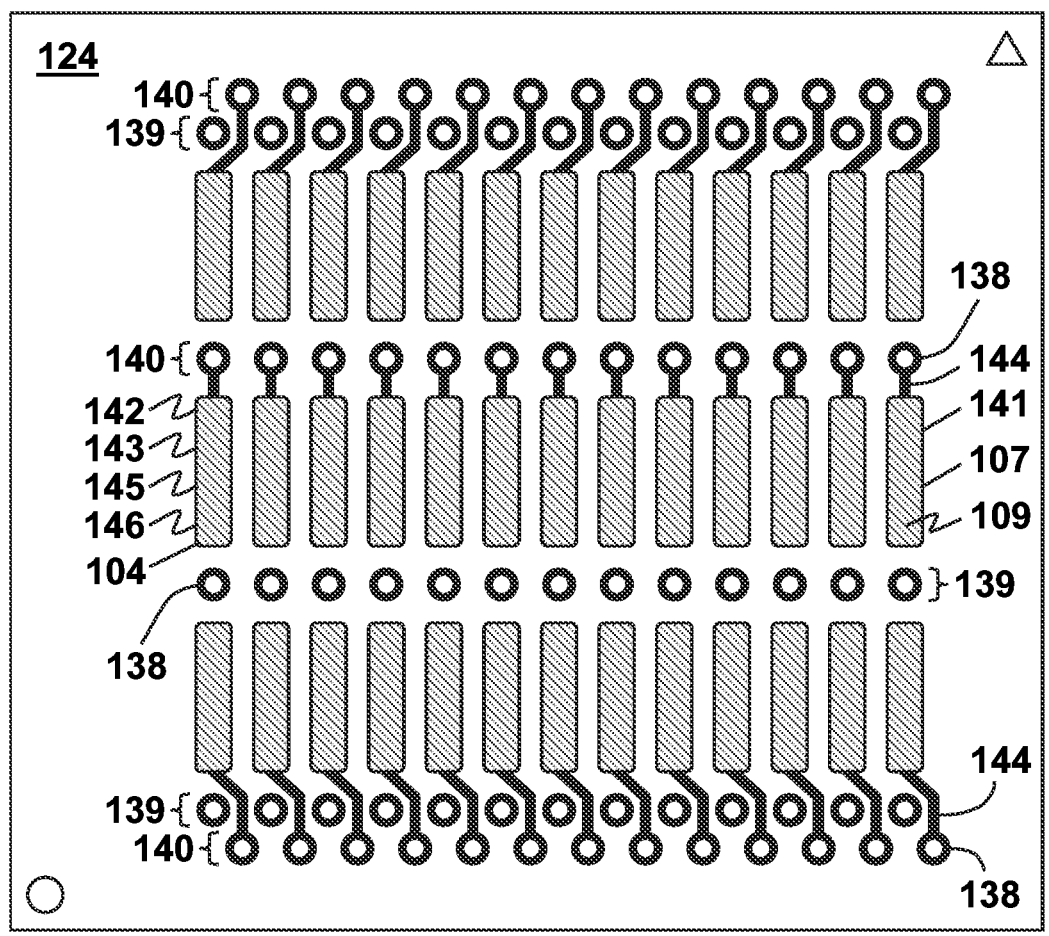

Referring to FIGS. 25 and 26 in view of FIGS. 16, 21, 22, and 24, the upstroke and downstroke layers 123, 124 are identical, except for the routing of the control electrodes 104 to their respective electronic vias 138. In the upstroke and downstroke layers 123, 124, the 78 electronic vias 138 are divided into two groups: 39 upstroke vias 139 and 39 downstroke vias 140. Upstroke and downstroke vias 139, 140 both occur in three sets of 13, corresponding to the 13 half-pins 5 in each of the three tracks 2. In the case of the upstroke layer 123, the control electrodes 104 serve as upstroke electrodes 106 and are therefore routed to the upstroke vias 139. In the case of the downstroke layer 124, the control electrodes 104 serve as downstroke electrodes 107 and are therefore routed to the downstroke vias 140.

Each of upstroke and downstroke layers 123, 124 has 39 voids 141 disposed therethrough, with 13 voids 141 per track 2, to form droplet channels 109 in hydraulic communication with the overlying piston chambers 14. The voids 141 of the upstroke and downstroke layers 123, 124 are sized to the same cross-sectional area as the overlying piston chambers 14 to provide a hydraulic leverage ratio of unity.

To form the control electrodes 104 in the upstroke and downstroke layers 123, 124, a platinum film 142 or other electrically conductive film is annularly deposited on the walls 143 of each of the voids 141. Using a photomask, the electronic vias 138 and electronic traces 144 made of copper or other electrical conductor are patterned on the upstroke and downstroke layers 123, 124 to provide electrical communication between the control electrodes 104 and their respective electronic vias 138. To complete the control electrodes 104, the platinum 142 deposited on the walls 143 is covered with a 2.5 micron film of Parylene C 145 or other electrically insulating layer and then the Parylene C 145 is covered with a 12 nanometer film of Teflon AF 1600® 146 or other hydrophobic layer. The platinum 142, Parylene C 145, and Teflon AF 1600® 146 are preferably deposited on the walls 143 of the voids 141 using conformal chemical vapor deposition.

Different thicknesses of the electrical insulator and hydrophobic layer may be applied according to the art. See Jeong et al., "Optimum thickness of hydrophobic layer for operating voltage reduction in EWOD systems," Sensors and Actuators A, Vol. 215, 2014, pp. 8-16, incorporated herein in its entirety by way of reference.

The downstroke vias 140 are not needed in the first (uppermost) upstroke layer 123. But for mass production it is less costly to make all of the upstroke layers 123 the same, and the presence of the downstroke vias 140 in the first upstroke layer 123 will not affect device operation.

Figure 27:
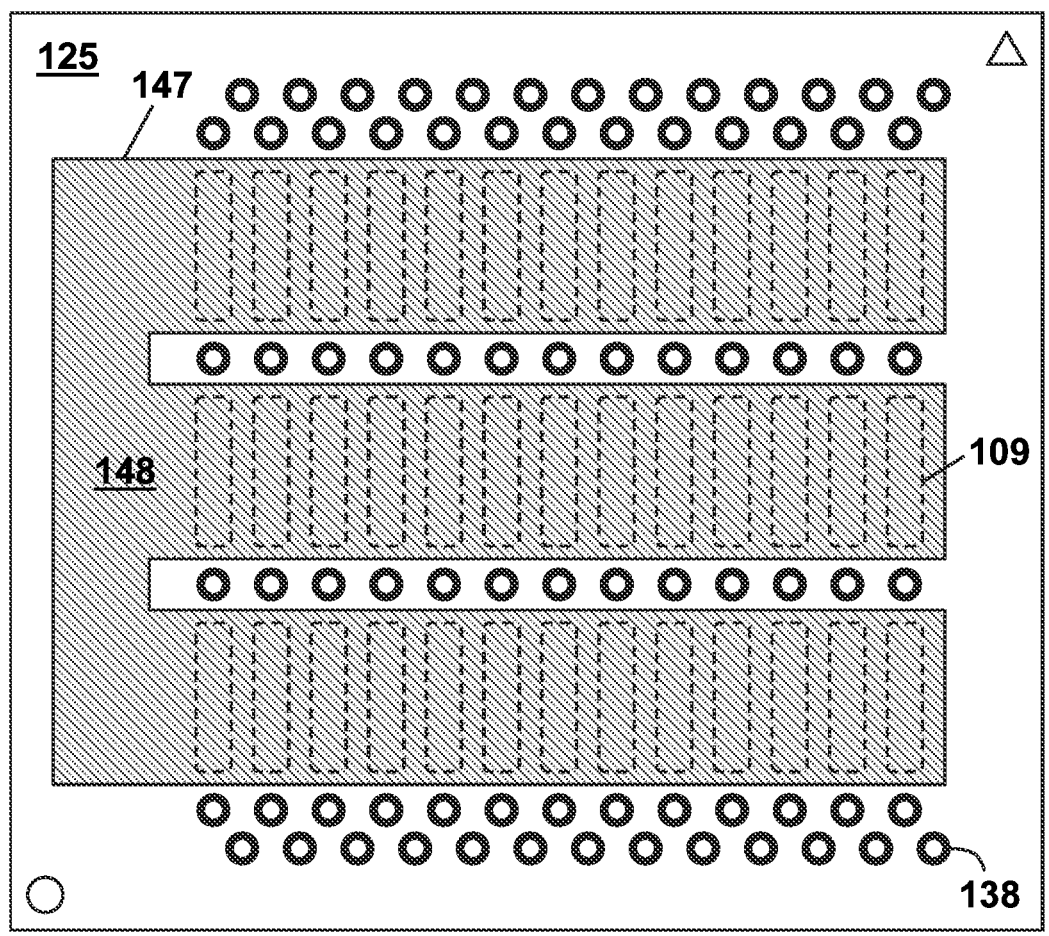

Referring to FIG. 27 in view of FIGS. 16, 25, and 26, the hydraulic reservoir layer 125 has a void 147 disposed therethrough to provide a hydraulic reservoir 148 for the filler medium 87. Shown in dashed outline are the droplet channels 109 of the second downstroke layer 124 which overlies the hydraulic reservoir layer 125. The hydraulic reservoir layer 125 is disposed with the same pattern of electronic vias 138 as the upstroke and downstroke layers 123, 124.

FIGS. 28A and 28B show respective top and bottom orthogonal views of the base layer 126. Referring to FIGS. 28A and 28B in view of FIGS. 26 and 27, shown in dashed outline are the droplet channels 109 of the second downstroke layer 124 which overlies the hydraulic reservoir layer 125, which in turn overlies the base layer 126. The base layer 126 is disposed with a void 149 therethrough to provide fluidic communication with the hydraulic reservoir 148 contained by the overlying hydraulic reservoir layer 125.

Referring to FIG. 28A in view of FIGS. 16, 25, 26, and 27, the base layer 126 is disposed with 39 common electrodes 108 on its top side to serve each of the 39 droplet channels 109 associated with the upstroke and downstroke layers 123, 124. The common electrodes 108 are coaxially configured with respect to the annular control electrodes 104 of the upstroke and downstroke layers 123, 124. The common electrodes 108 are preferably made from stainless steel wire or other electrical conductor and are preferably covered with a film of Teflon AF 1600 ® or other hydrophobic film which is not electrically insulating. The length of each common electrode 108 is made to traverse the droplet channel 109 formed by the combined upstroke and downstroke layers 123, 124 to provide electrical communication with the droplets 74 contained therein.

The base layer 126 is disposed with the same pattern of electronic vias 138 as the hydraulic reservoir layer 125 plus an additional electronic via 138 called the common electrode via 150 for supplying electrical power to the common electrodes 108. Electronic traces 144 are patterned on the top side of the base layer 126 to provide electrical communication between the common electrodes 108 and the common electrode via 150.

Referring to FIG. 28B in view of FIGS. 9, 10, 22, and FIG. 28A, electrical contact pins 91 are disposed on the bottom side of the base layer 126 in electrical contact with each of the 79 the electronic vias 138 to provide a means of electrical communication between the display panel 26 and the electronics assembly 42.

Referring to FIG. 28B in view of FIGS. 22, 25, 26, 27, and 28A, when the substrate layers containing the electronic vias 138 are bonded together, a continuous electrical connection is formed between respective vias in adjacent layers. As a consequence, the upstroke contact pins 92 are in electrical communication with the upstroke electrodes 106 via the upstroke vias 139, the downstroke contact pins 93 are in electrical communication with the downstroke electrodes 107 by way of the downstroke vias 140, and the common electrode contact pin 130 is in contact with the common electrodes 108 by way of the common electrode via 150.

FIGS. 29A and 29B show perspective views of FIGS. 28A and 28B, respectively.

Referring to FIG. 30 in view of FIGS. 22, 27, 28A, 28B, 29A, and 29B, a pressure equilibration membrane 151 is applied to the bottom of the base layer 126 to cover the void 149 disposed in the base layer 126. In FIG. 30 the void 149 covered by the pressure equilibration membrane 151 is shown in dashed outline relative to the base layer 126. The pressure equilibration membrane 151 is preferably made of a rubber film or other elastic or flexible film. The purpose of the pressure equilibration membrane 151 is to equilibrate the pressure of the fluids within the device with the ambient pressure of the surroundings via the hydraulic reservoir 148.

Referring to FIG. 21 in view of FIGS. 22, 23, 24, 25, 26, 27, 28A, 28B, 29A, 29B, and 30, to assemble the display panel 26, the piston chamber layer 103 and the upstroke and downstroke layers 123, 124 are bonded together. Working from the bottom of the second of the two downstroke layers 124, to fill the display panel 26 with hydraulic fluids a first micropipette array introduces a predetermined aliquot of the filler medium 87 into the droplet channels 109 and is then replaced by a second micropipette array which introduces a predetermined aliquot of the ionic solution forming the droplets 74 into the droplet channels 109. This process continues in alternation until the piston chambers 14 and droplet channels 109 are filled. Working from the top of the piston chamber layer 103, the half-pins 5 are inserted into their respective piston chambers 14 and the retainment layer 102 is then bonded to the piston chamber layer 103. After bonding the hydraulic reservoir layer 125 and base layer 126 together, the hydraulic reservoir layer 125 is then bonded to the second of the two downstroke layers 124. Working through the void 149 disposed in the base layer 126, the hydraulic reservoir 148 and the void 149 in the base layer 126 are filled with the filler medium 87 until flush with the bottom of the base layer 126. The pressure equilibration membrane 151 is bonded to the bottom of the base layer 126 using direct bonding or indirect bonding, for example, adhesive bonding, to cover the void 149 disposed in the base layer 126.

A preferred liquid material for the droplets 74 is an 0.1 M aqueous solution of sodium chloride (NaCl) or other electrically conductive ionic solution. A preferred liquid material for the filler medium 87 is silicone oil or other incompressible fluid which does not conduct electricity.

Referring to FIGS. 21 and 22 in view of FIGS. 9, 10, and 16, in operation, to raise a selected half-pin 5 to the raised state 101, the electronics assembly 42 addresses the upstroke and downstroke contact pins 92, 93 corresponding to the selected half-pin 5; the downstroke contact pin 93 is shorted to the common electrode contact pin 130 to discharge (turn OFF) the corresponding downstroke electrodes 107 and a predetermined voltage potential is applied between the upstroke contact pin 92 and the common electrode contact pin 130 to charge (turn ON) the corresponding upstroke electrodes 106. To lower a selected half-pin 5 to the unraised state 100, the electronics assembly 42 addresses the upstroke and downstroke contact pins 92, 93 corresponding to the selected half-pin 5; the upstroke contact pin 92 is shorted to the common electrode contact pin 130 to discharge (turn OFF) the corresponding upstroke electrodes 106 and a predetermined voltage potential is applied between the downstroke contact pin 93 and the common electrode contact pin 130 to charge (turn ON) the corresponding downstroke electrodes 107.

Example 2

Figure 31:
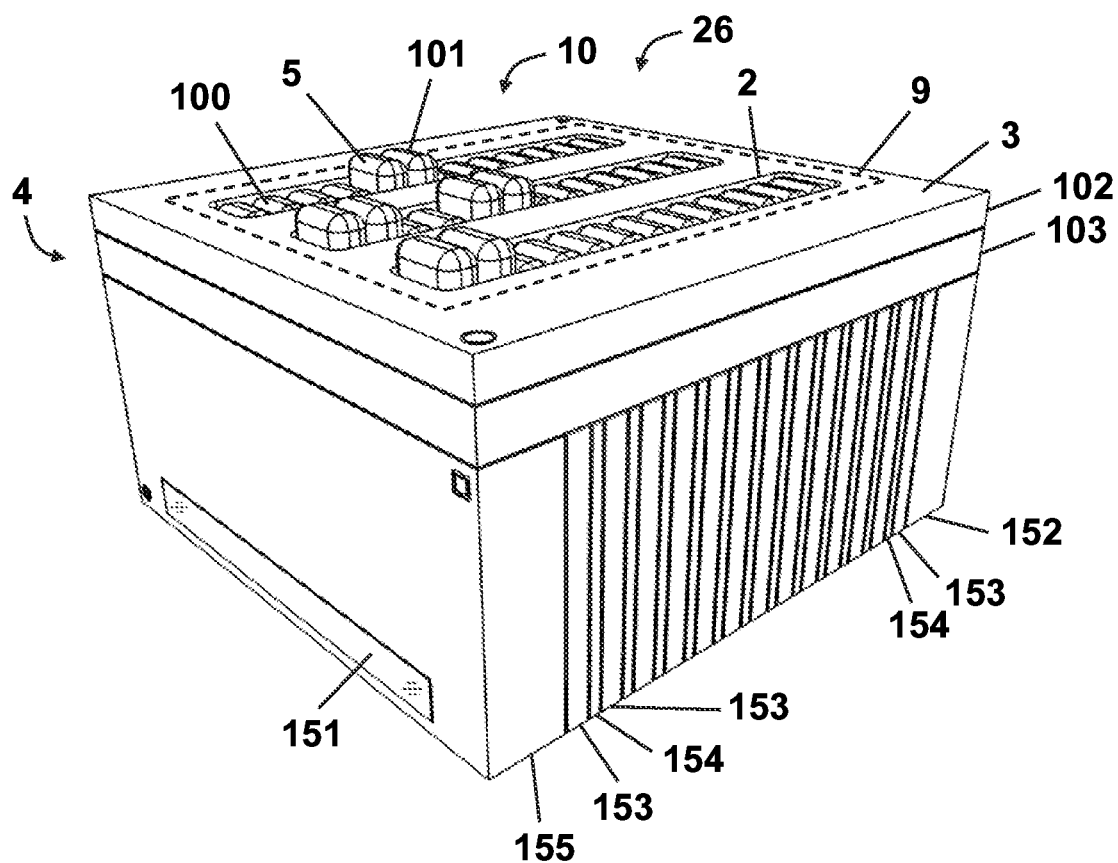
FIG. 31 is a top perspective view of an inventive self-scrolling Braille display panel according to Example 2.
Figure 34A:
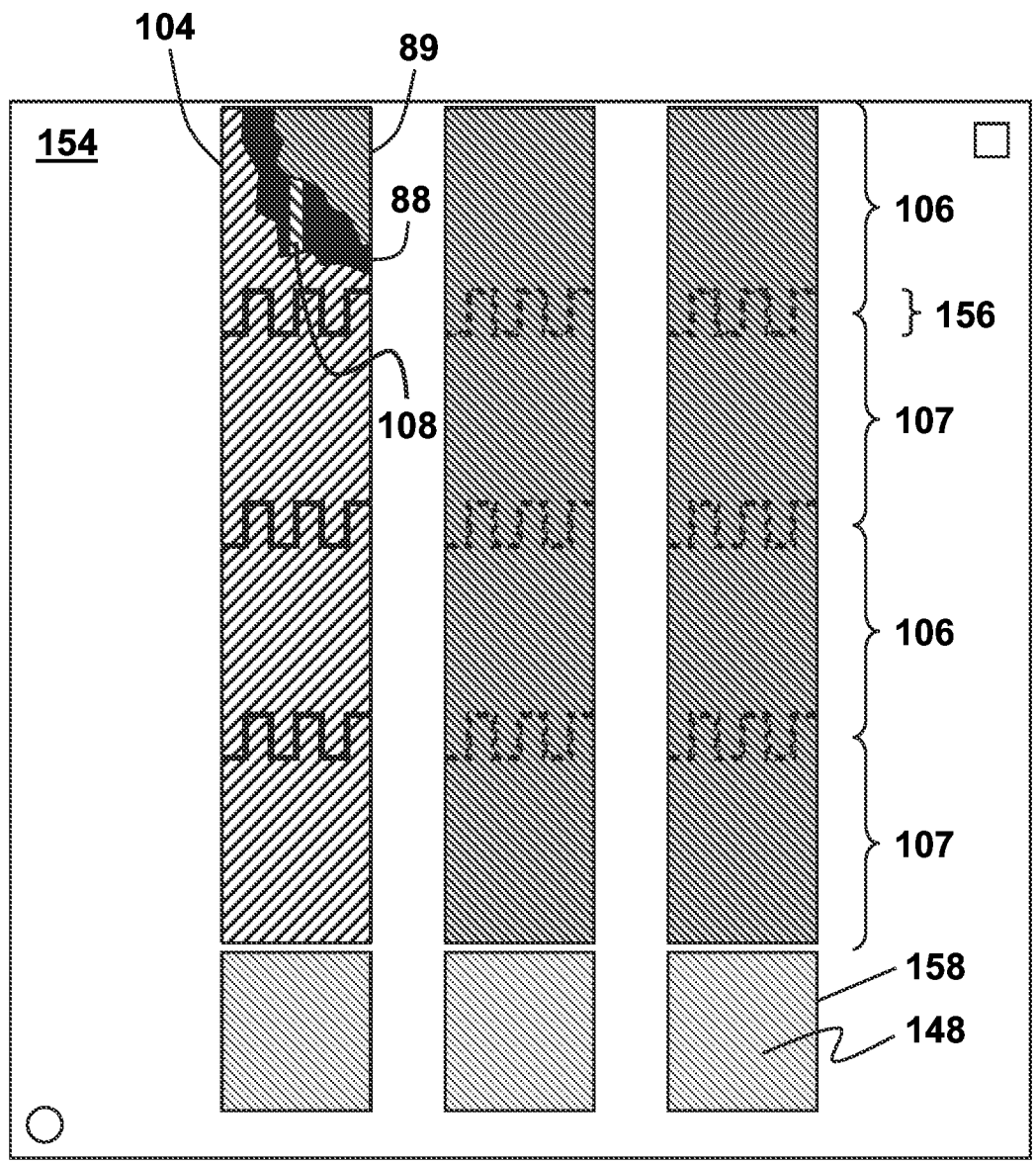
FIGS. 34A and 34B are respective top and bottom orthogonal views of a microfabricated planar substrate layer for making the inventive display panel.
Figure 34B:
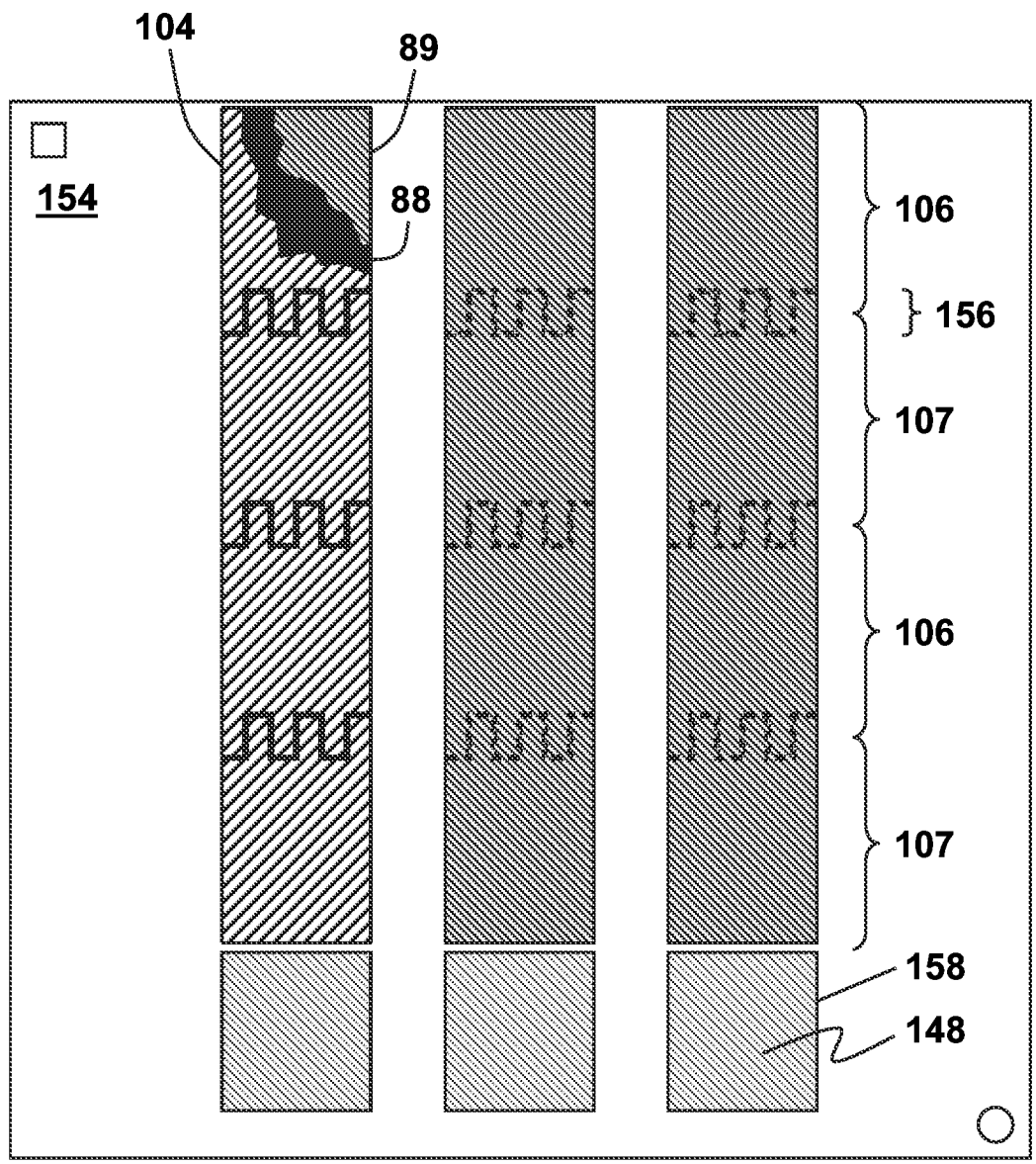
Figure 35A:
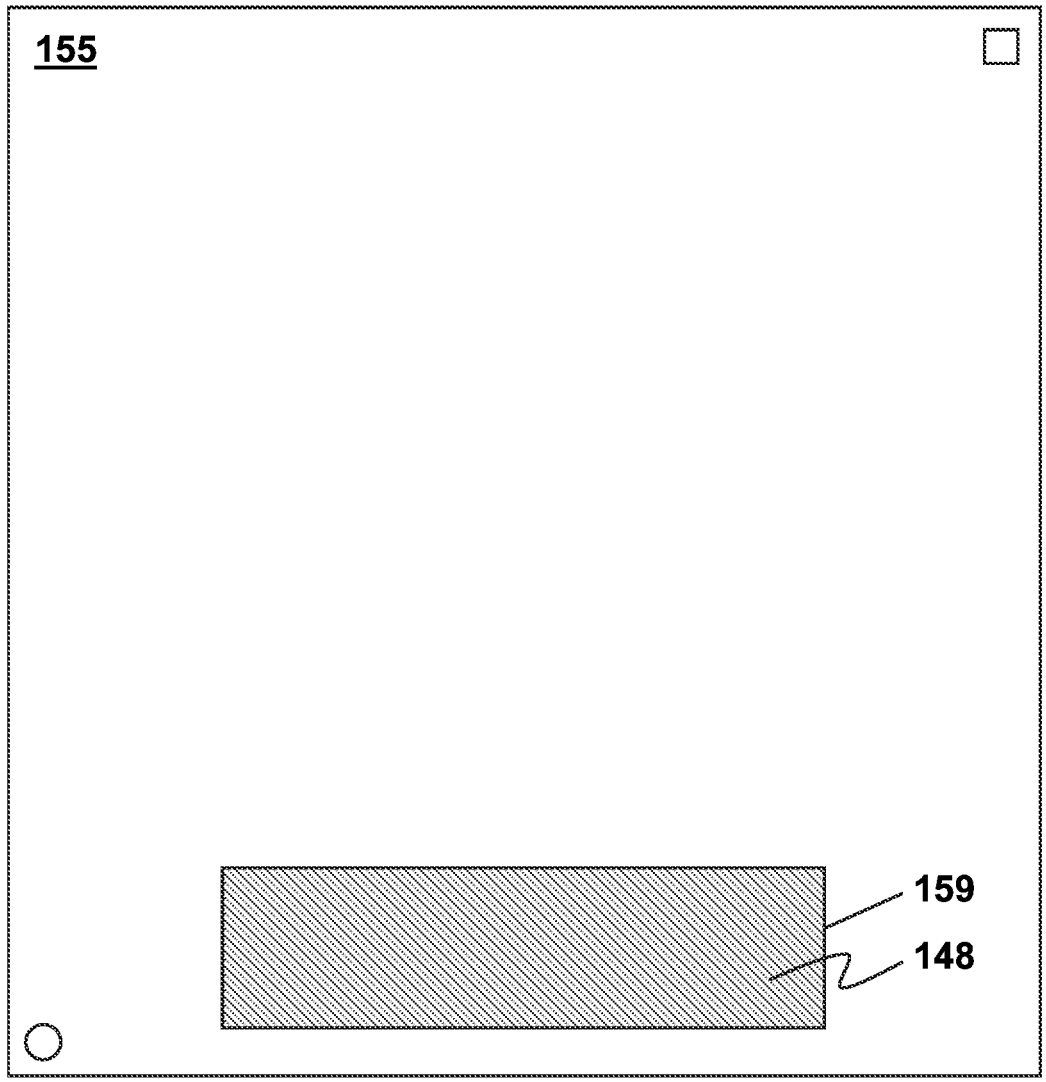
FIGS. 35A and 35B are respective top and bottom orthogonal views of a microfabricated planar substrate layer for making the inventive display panel.
Figure 35B:
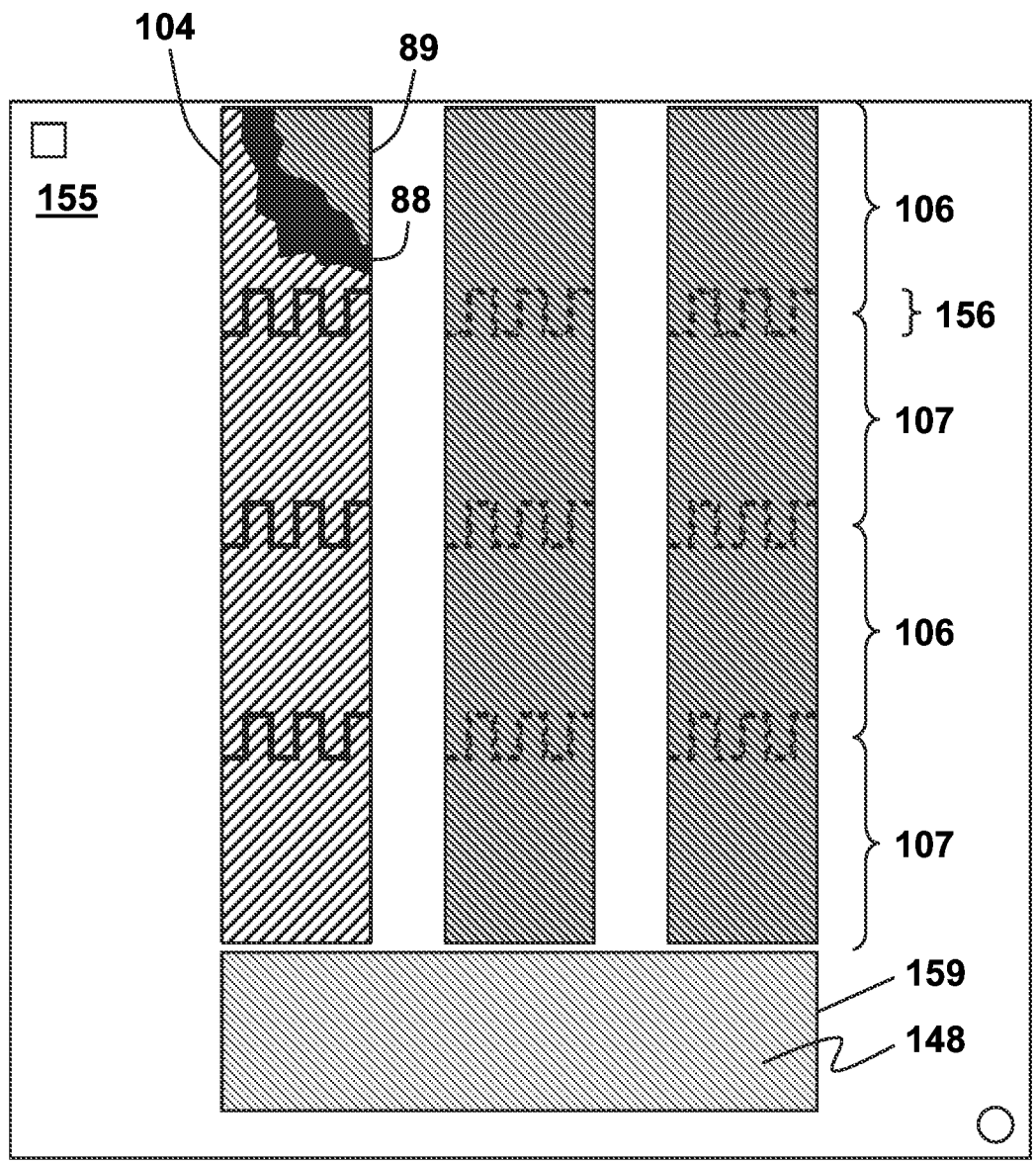
Figure 36:
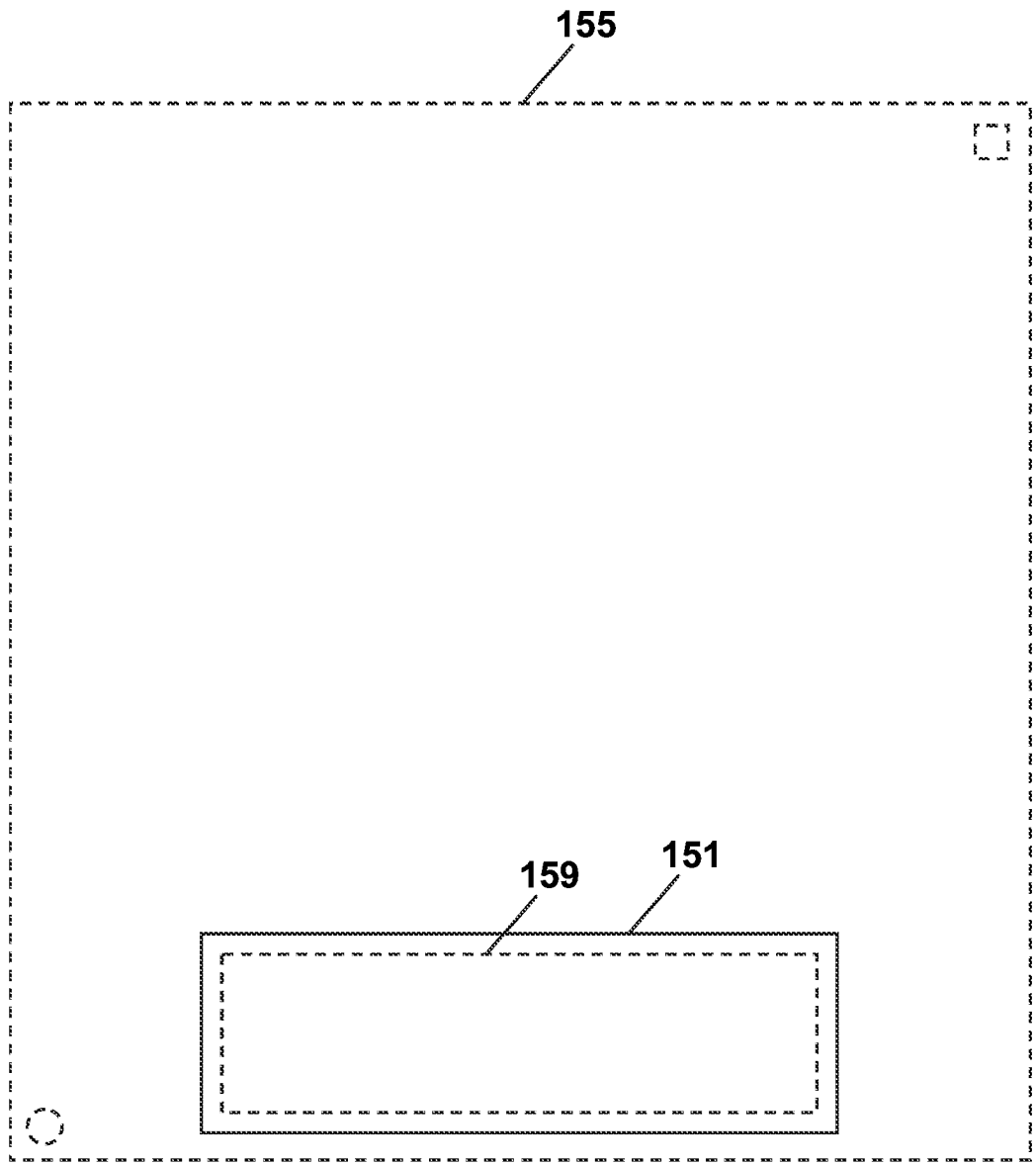
FIG. 36 is a top orthogonal view of a pressure equilibration membrane for making the inventive display panel.

FIG. 31 shows a top perspective view of an embodiment of the display panel 26 which comprises 39 half-pins 5 disposed in a substrate 4 having two horizontally disposed planar substrate layers and 27 vertically disposed planar substrate layers. FIGS. 23, 24, 32, and 33 show top orthogonal views of several of the individual substrate layers employed in assembling the display panel 26. FIGS. 34A and 34B show respective top and bottom orthogonal views of another of the individual substrate layers. FIGS. 35A and 35B show respective top and bottom orthogonal views of yet another of the individual substrate layers. FIG. 36 shows a membrane which is applied to cover an opening on one of the substrate layers.

In FIGS. 23, 24, 31, 32, 33, 34A, 34B, 35A, 35B, and 36, a triangular indicium and a circular indicium, or a square indicium and a circular indicium, appear in opposite corners to aid in an appreciation of the drawing with respect to an alignment and orientation of the substrate layers, but are not a part of the device.

Referring to FIG. 31 in view of FIGS. 21, 23, and 24, the two horizontally disposed planar substrate layers of the display panel 26 are the same as the retainment layer 102 and the piston chamber layer 103 of Example 1. But unlike in Example 1, the remaining layers of Example 2 are vertically disposed planar substrate layers, rather than being horizontally disposed.

Referring to FIG. 31 in view of FIGS. 32, 33, 34A, 34B, 35A, and 35B, the 27 vertically disposed layers consist of four types of layers: a first endcap layer 152 (FIG. 32), 13 spacer layers 153 (FIG. 33), 12 double-sided electrode layers 154 (FIGS. 34A and 34B), and a second endcap layer 155 (FIGS. 35A and 35B). The spacer layers 153 are sandwiched in alternation between the other three types of vertically disposed layers: first the first endcap layer 152, then the double-sided electrode layers 154, and finally the second endcap layer 155.

Referring to FIG. 31, the display panel 26 can make any combination of raised and unraised states 101, 100 of the half-pins 5 under microprocessor controls. In FIG. 31, the particular combination of raised and unraised states 101, 100 shown makes the character "t" in Braille. The combination of raised and unraised states 101, 100 shown in the middle track 2 corresponds to the 13th time interval in the timing diagram shown in FIG. 4.

Referring to FIG. 31, each of the half-pins 5 has the shape shown in FIG. 3.

Referring to FIG. 31 in view of FIGS. 23, 32, 35A, and 35B, the retainment layer 102 is at the superior side of the display panel 26, the first endcap layer 152 is at the right side, and the second endcap layer 155 is at the left side. For the vertically disposed layers, the top side of the layer faces left and the bottom side faces the right.

Figure 32:
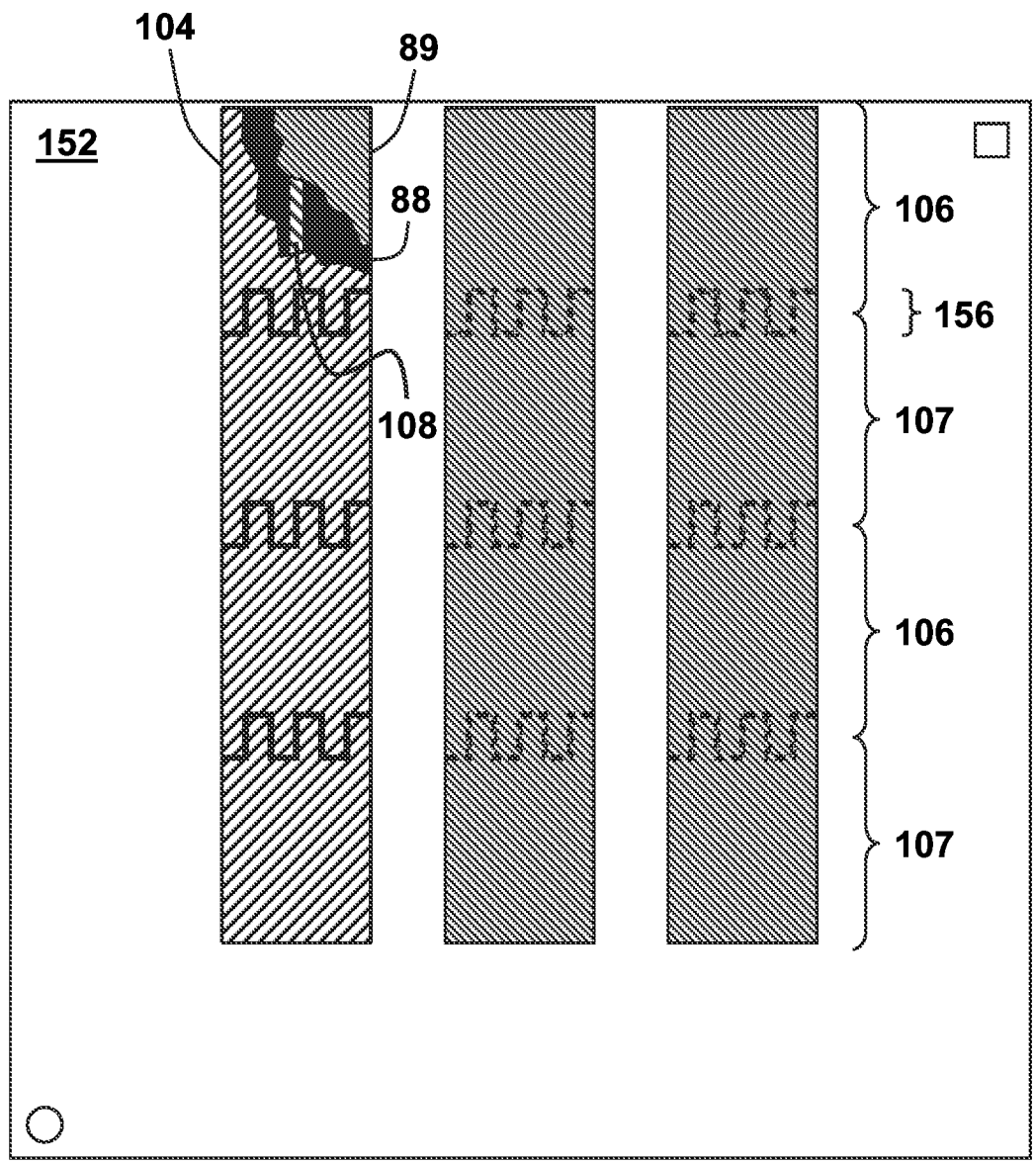
FIGS. 32 and 33 are top orthogonal views of two different microfabricated planar substrate layers for making the inventive display panel.

FIG. 32 is a top orthogonal view of the first endcap layer 152, including a cutaway view showing several of the thin film layers disposed thereon. Referring to FIG. 32 in view of FIGS. 16 and 31, the top side of the first endcap layer 152 is disposed with three columns of control electrodes 104, corresponding to respective half-pins 5 in each of the three tracks 2. The control electrodes 104 are covered with a thin film of the electrically insulating layer 88 and have interdigitations 156 where edges of the upstroke and downstroke electrodes 106, 107 meet. Rather than being coaxially disposed as in Example 1, the common electrodes 108 are patterned over the control electrodes 104 which are coated with the electrically insulating layer 88. A thin film of the hydrophobic layer 89, which in this example is not electrically insulating, is then deposited on top of the control electrodes 104 and the common electrodes 108.

Figure 33:
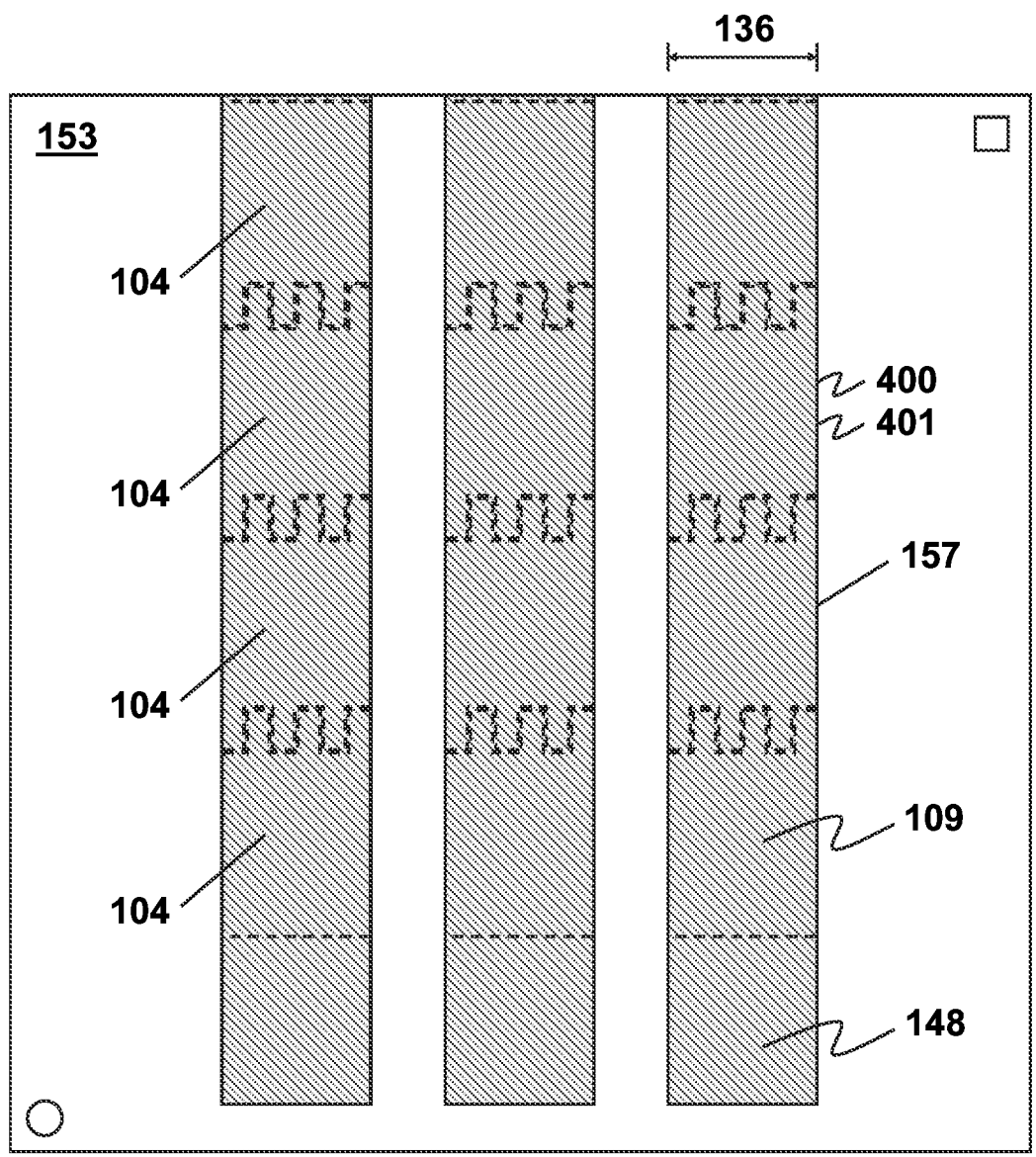

Referring to FIG. 33 in view of FIGS. 16, 31, and 32, the spacer layer 153 has three voids 157 disposed therethrough. Each void 157 serves two purposes: to provide a space forming the droplet channel 109 associated with the respective half-pin 5; and, to provide a space below the control electrodes 104 and which space forms part of the hydraulic reservoir 148 for the filler medium 87. In FIG. 33, shown in dashed outline are those control electrodes 104 which face the voids 157 forming the droplet channels 109 and which control electrodes 104 are disposed on an opposing wall formed by an adjacent substrate layer, for example, the first endcap layer 152; however, it is noted for clarity that no control electrodes 104 are shown disposed on the spacer layer 153 itself. The walls 400 of the voids 157 are coated with a hydrophobic layer 401. The hydrophobic layer 401 may also be a superhydrophobic layer according to the art.

Referring to FIG. 33 in view of FIGS. 16, 24, and 31, the width 136 of each of the voids 157 disposed in the spacer layer 153 is sized to the width 136 of the piston chambers 14, and the thickness of the spacer layer 153 is sized to the depth 137 of the piston chambers 14. Accordingly, the voids 157 of the spacer layer 153 are sized to the same cross-sectional area as their overlying piston chambers 14 to provide a hydraulic leverage ratio of unity.

FIGS. 34A and 34B show respective top and bottom orthogonal views of the double-sided electrode layer 154. Referring to FIGS. 34A and 34B in view of FIGS. 31 and 33, the double-sided electrode layer 154 is bounded on either side by the spacer layer 153 forming the droplet channels 109 in between. Referring to FIGS. 34A and 34B in view of FIGS. 24 and 31, the thickness of the double-sided electrode layer 154 is sized to a depth of the region 300 between adjacent piston chambers 14 in the same track 2.

Referring to FIGS. 34A and 34B in view of FIG. 32, the top and bottom sides of the double-sided electrode layer 154 are disposed with the same pattern of electrodes as the top side of the first endcap layer 152, except that the common electrodes 108 are not required on the bottom side. Referring to FIGS. 34A and 34B in view of FIGS. 16, 31, 32, and 33, the bottom side of the double-sided electrode layer 154 does not require the common electrodes 108 to be disposed on it because it suffices for the common electrodes 108 on the top side of the opposing substrate layer to be in electrical communication with the droplets 74 in the droplet channel 109.

Referring to FIGS. 34A and 34B in view of FIGS. 16, 24, 31, 32, and 33, the double-sided electrode layer 154 has three voids 158 disposed therethrough to provide spaces below the control electrodes 104 and which spaces form part of the hydraulic reservoir 148. When the layers are assembled, the spaces formed by the voids 158 disposed in the double-sided electrode layer 154 will be in fluidic communication with the spaces formed below the control electrodes 104 by the voids 157 disposed in the spacer layer 153 as part of the overall hydraulic reservoir 148.

FIGS. 35A and 35B show respective top and bottom orthogonal views of the second endcap layer 155. Referring to FIGS. 35A and 35B in view of FIGS. 16, 24, 31, 32, 33, 34A, and 34B, the second endcap layer 155 has a void 159 disposed therethrough to form part of the hydraulic reservoir 148 and to provide fluidic communication with the hydraulic reservoir 148 from outside the display panel 26. Referring to FIG. 35B in view of FIG. 34B, the bottom side of the second endcap layer 155 is disposed with the same pattern of electrodes as the bottom side of the double-sided electrode layer 154. The bottom side of the second endcap layer 155 does not require the common electrodes 108 to be disposed on it because it suffices for the common electrodes 108 on the top side of the opposing substrate layer to be in electrical communication with the droplets 74 in the droplet channel 109.

Referring to FIG. 36 in view of FIGS. 31, 33, 34A, 34B, 35A, and 35B, the pressure equilibration membrane 151 is applied to the top side of the second endcap layer 155 to cover the void 159 disposed in the second endcap layer 155. The void 159 covered by the pressure equilibration membrane 151 is shown in dashed outline relative to the top side of the second endcap layer 155. The purpose of the pressure equilibration membrane 151 is to equilibrate the pressure of the fluids within the device with the ambient pressure of the surroundings via the hydraulic reservoir 148.

Referring to FIG. 31 in view of FIGS. 23, 24, 32, 33, 34A, 34B, 35A, 35B, and 36, to assemble the display panel 26, the vertically disposed substrate layers are bonded together, starting with the first endcap layer 152, then the spacer and double-sided electrode layers 153, 154 in alternation, and finally the second endcap layer 155. The piston chamber layer 103 is then bonded on top of the vertically disposed substrate layers. Working from the top of the piston chamber layer 103, to fill the display panel 26 with hydraulic fluids a first micropipette array introduces a predetermined aliquot of the filler medium 87 into the piston chambers 14 and is then replaced by a second micropipette array which introduces a predetermined aliquot of the ionic solution forming the droplets 74 into the piston chambers 14. This process continues in alternation until the piston chambers 14 and droplet channels 109 are filled with hydraulic fluids. The half-pins 5 are then inserted into their respective piston chambers 14 and the retainment layer 102 is bonded to the piston chamber layer 103. Working through the void 159 disposed in the second endcap layer 155, the hydraulic reservoir 148 is filled with the filler medium 87 until flush with the top side of the second endcap layer 155 and then the pressure equilibration membrane 151 is bonded to the top side of the second endcap layer 155 using direct bonding or indirect bonding, for example, adhesive bonding, to cover the void 159.

Not shown in FIGS. 23, 24, 31, 32, 33, 34A, 34B, 35A, and 35B is a routing of electrical interconnects in the display panel 26 according to the art, including electronic traces, electronic vias, and electrical contact pins. Referring to FIGS. 23, 24, 31, 32, 33, 34A, 34B, 35A, and 35B in view of FIG. 16, for each half-pin 5, the upstroke electrodes 106 on opposing walls of the associated droplet channel 109 are all routed to one electrical contact pin for upstroke actuation, and the downstroke electrodes 107 on opposing walls of the associated droplet channel 109 are all routed to another electrical contact pin for downstroke actuation. All of the common electrodes 108 in the display panel 26 are routed to a single electrical contact pin for supplying a common or return voltage in reference to the upstroke and downstroke electrodes 106, 107. Referring to FIG. 31 in view of FIGS. 9 and 10, the electrical contact pins provide electrical communication between the display panel 26 and the electronics assembly 42. The electronics assembly 42 is adapted to receiving the contact pins 91 in a manner of electrical contact.

Preferred materials and methods for making the display panel 26 of Example 2 are analogous to those of Example 1.

Referring to FIGS. 31, 32, 34A, 34B, and 35B in view of FIGS. 9, 10, and 16, in operation, to raise a selected half-pin 5 to the raised state 101, the electronics assembly 42 addresses the upstroke and downstroke electrodes 106, 107 corresponding to the selected half-pin 5; the downstroke electrodes 107 are shorted to the common electrodes 108 to discharge (turn OFF) the downstroke electrodes 107 and a predetermined voltage potential is applied between the upstroke electrodes 106 and the common electrodes 108 to charge (turn ON) the upstroke electrodes 106. To lower a selected half-pin 5 to the unraised state 100, the electronics assembly 42 addresses the upstroke and downstroke electrodes 106, 107 corresponding to the selected half-pin 5; the upstroke electrodes 106 are shorted to the common electrodes 108 to discharge (turn OFF) the upstroke electrodes 106 and a predetermined voltage potential is applied between the downstroke electrodes 107 and the common electrodes 108 to charge (turn ON) the downstroke electrodes 107.

3. Additional Teachings

A. Haptic Feedback to Indicate Direction

Using a smartphone with a maps app for navigation is well known. But when the blind are walking on the sidewalk, listening to an app for directions can draw attention away from sounds which may indicate danger, for example, the sounds of vehicular traffic, and the deaf blind cannot hear audibly conveyed directions anyway.

Advantageously, using self-scrolling Braille in the form of the inventive finger reader, the blind and deaf blind can read directions from the app, for example, "Turn right on Franklin Street," rather than having to listen to them.

To aid in pedestrian navigation for the blind and deaf blind, accessory devices for use in conjunction with the finger reader include a pedometer to relate distances to steps, devices to indicate parameters of navigation, and devices for creating haptic effects to provide haptic feedback to indicate direction and other parameters of navigation.

Figure 37A:
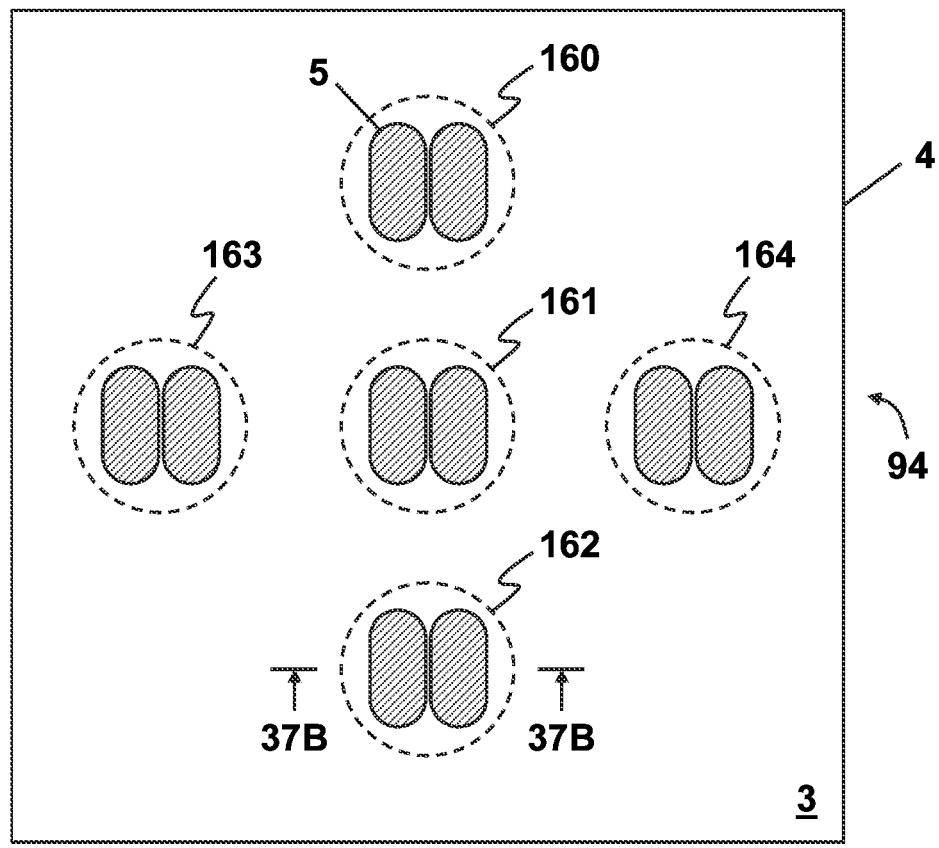
FIGS. 37A and 37B are respective top orthogonal and partial side cross-sectional views of an inventive haptic display panel.

FIG. 37A shows a top orthogonal view of a haptic display panel 94 for a haptic navigation device according to the invention. The haptic navigation device is a worn device for creating haptic effects to provide haptic feedback to indicate direction and other parameters of navigation.

Referring to FIG. 37A in view of FIGS. 7, 8, 9, and 10, the design of the haptic navigation device is analogous to that of the finger reader 22, except for having the haptic display panel 94 in place of the display panel 26 for reading Braille.

Referring to FIG. 37A in view of FIGS. 2A, 2B, 2C, 3, and 16, the haptic display panel 94 has five sets of two half-pins 5 disposed on its surface 3. An exemplary underlying means of actuation for the half-pins 5 is the same as the means of actuation 200 shown in FIG. 16. Referring to FIG. 37A, the five sets of half pins 5 are divided into top 160, middle or inner 161, bottom 162, left 163, and right 164 sets. With a finger resting on the surface 3 of the display panel 94, the half-pins 5 can produce haptic effects. The display panel 94 is sized so that the digital pulp of the finger covers all five sets of half-pins 5 with the finger at rest.

Figure 37B:
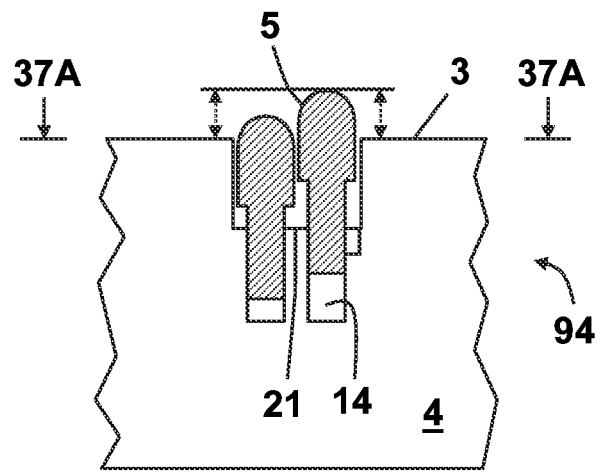

FIG. 37B shows a side cross-sectional view of one of the sets of half-pins 5 in the display panel 94. Referring to FIG. 37B in view of FIGS. 16 and 37A, in general the display panel 94 creates haptic effects by raising and lowering one or more half-pins 5 with a predetermined frequency to produce vibrations under the finger. A preferred haptic effect is created when the two half-pins 5 of a given set are individually raised and lowered in alternation with a predetermined frequency, wherein the two half-pins 5 are 180 degrees out of phase (viz. one is being raised while the other is being lowered).

The prior art has suggested that the finger is especially sensitive to vibrations at a frequency of 250 Hz. In keeping with this suggestion, a preferred frequency for the vibrations is 250 Hz. Other vibratory frequencies may also be applied, for example, ranging from 200-300 Hz.

In a full stroke mode of vibration, the half-pins 5 oscillate fully between the raised and unraised states by traversing a full stroke distance between the raised and unraised states in each cycle. In a partial stroke mode of vibration, the half-pins 5 oscillate partially between the raised and unraised states by traversing only a partial distance between the raised and unraised states in each cycle. Haptic information in the form of differing vibrations or intensities may be conveyed to the finger by using different frequencies in the full or partial modes of vibration, or by using different stroke distances according to the partial mode of vibration.

When one or more of the half-pins 5 of a set is vibrating, the set is said to be flashing. When there are brief quiescent periods between repetitive flashings, the set is said to be pulsing. The pulsing frequency is determined by the duration of time between successive flashings. The flashing or pulsing of members of the sets, including their patterns, modes, intensities, and frequencies, are conveyed to the finger as haptic information.

Referring to FIG. 37A, in contrast to the middle or inner set 161 of half-pins 5, the outer sets consist of the top set 160, right set 164, bottom set 162, and left set 163. The vertical sets consist of the top set 160, middle set 161, and bottom set 162. The horizontal sets consist of the left set 163, the middle set 161, and right set 164.

Referring to FIG. 37A, predefined significances representing haptic information can be assigned to predefined patterns of actuation for the half-pins 5 according to the haptic display panel 94. As an example of such an assignment, where the half-pins 5 of unspecified sets are unraised and at rest, basic haptic information that can be conveyed to the finger resting on the display panel 94 of the haptic navigation device may include: top set 160 flashing (go forward); middle set 161 flashing (stop); bottom set 162 flashing (go backward); left set 163 flashing (go left); right set 164 flashing (go right); top set 160 and middle set 161 flashing (go up); middle set 161 and bottom set 162 flashing (go down); middle set 161 flashing with outer sets flashing in clockwise sequence (turn or rotate clockwise); middle set 161 flashing with outer sets flashing in counterclockwise sequence (turn or rotate counterclockwise); and, all sets flashing (warning/hazard/stop).

Complex haptic information can also be conveyed, particularly in a preselected mode. For example, in an exemplary corridor/portal entry/exit mode, the user is signaled to rotate left or right and then the horizontal sets flash when the user is positioned for entry/exit through the corridor/portal. For example, the corridor may be a crosswalk, and in an exemplary crosswalk mode, once the user is positioned for entry and the "walk" signal has been wirelessly communicated from the street signal to the user's device, the top set 163 and the horizontal sets flash to signal begin crossing.

The haptic navigation device can be used in tandem with an auxiliary display device such as a finger reader displaying self-scrolling Braille according to the invention. For example, using a wireless protocol, for example, Bluetooth, which enables the haptic navigation device and the finger reader to communicate, a haptic signal presented on the haptic display panel 94 of the haptic navigation device to begin crossing the street can be confirmed by conveying the text message "begin crossing" via the finger reader at the same time.

To give another example, a smartdevice can wirelessly acquire a building directory via a personal area network and communicate a listing to the finger reader to enable the user to select a destination within the building, after which the user navigates to the selected destination using haptic feedback from the haptic navigation device.

To give yet another example, the smartdevice can wirelessly acquire a restaurant menu which is read via the finger reader, and after making menu selections and payments which are wirelessly communicated to restaurant staff via the smartdevice, the user can navigate to a pickup area via the haptic navigation device when signaled that the selection is ready.

To give yet another example, the user can preplan a bus route wirelessly with the aid of the smartdevice and the finger reader and then, with the aid of the haptic navigation device, navigate to a selected bus stop, assume a predetermined position within a bus stop area when signaled that the bus is arriving, and enter the bus with a payment method provided via near-field communication.

In general, a haptic device other than to read Braille may be worn on a different finger than a finger reader, on the same finger, or the two may be integrated on the same device.

The haptic navigation device is best practiced in wireless communication with an auxiliary navigation device which is worn on the user's body at a predetermined location to maintain fixed references with respect to the body. For example, the predetermined location may be the belt buckle area or the front the chest. References taken with respect to the body, for example, left versus right, are thus figured relative to the position and orientation of the auxiliary navigation device rather than relative to the finger wearing the haptic navigation device. This way the finger wearing the haptic navigation device does not have to maintain a fixed posture as would be the case if such references were taken relative to the position and orientation of the finger. A user who may prefer otherwise may rely on either mode of reference.

One skilled in the art of navigation will appreciate the wide variety of devices which are capable of acquiring position and orientation with respect to a predefined system of user coordinates, including such exemplary devices as a compass, an accelerometer, a gyroscope, an inertial reference system, a rangefinder, and a global positioning system (GPS) receiver.

Referring to FIG. 16, in general the means of actuation 200 can be applied to any system of pins and which pins can be arranged on a tactile display in a variety of patterns, for example, a linear pattern as shown in FIG. 2A, a cross-hair pattern as shown in FIG. 37A, a grid pattern, or a circular pattern. Such patterns can be used to convey a wide variety of haptic information. For example, the pins of a linear pattern can sweep back and forth to indicate a direction to or fro. To give another example, the pins of a linear pattern can indicate progress in the manner of a progress bar, for example, to indicate the percentage of a distance remaining. To give yet another example, the pins of a circular pattern can rotate to indicate a degree of rotation.

B. Filling the Display Panels with Hydraulic Fluids

Figure 38:
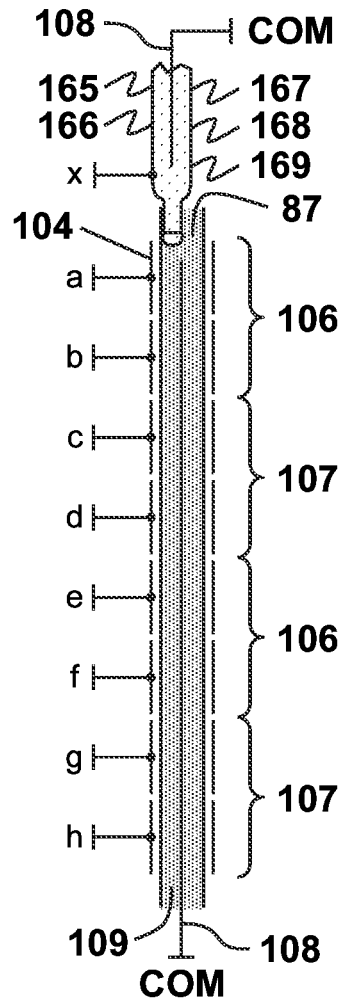
FIG. 38 is a side cross-sectional view of an inventive means of actuation for refreshable Braille in a state of partial assembly receiving a hydraulic fluid from a micropipette.
Figure 39:
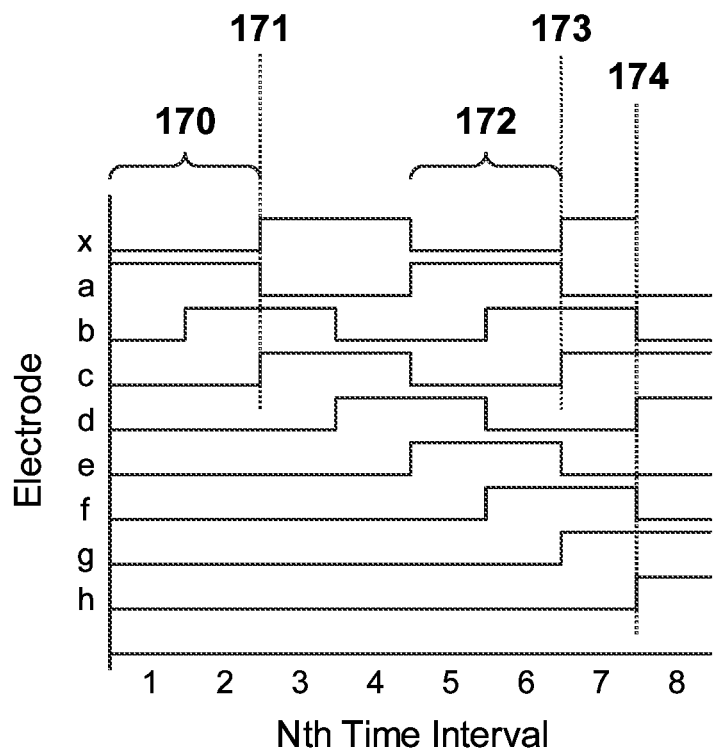
FIG. 39 is an inventive timing diagram for filling the inventive means of actuation with hydraulic fluids under electrowetting controls.
Figure 40:
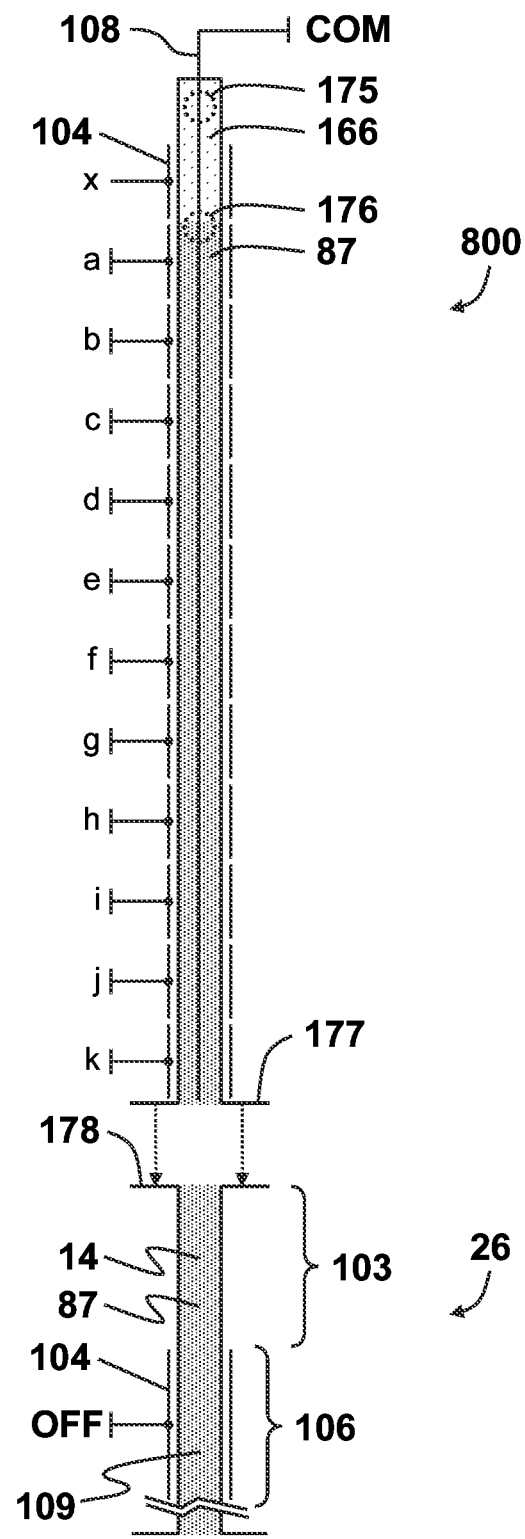
FIG. 40 is a partial side cross-sectional view of the inventive self-scrolling Braille display in a state of partial assembly receiving hydraulic fluids from an inventive microfluidic injection system.

Referring to FIGS. 21 and 31, although Example 1 and Example 2 rely on a micropipetting of hydraulic fluids to fill the display panels 26, it is also possible to perform the filling with the aid of electrowetting forces as shown in FIGS. 38, 39, and 40.

In FIG. 38, the control electrodes 104 of the display panel 26 have been modified from what is shown in FIG. 16 to assist in the filling of the droplet channel 109 with hydraulic fluids. Referring to FIG. 38 in view of FIG. 16, the control electrodes 104 of the exemplary means of actuation 200 have been modified by partitioning each of them into two separate electrodes so they can be controlled separately, the first two of which are labeled "a" and "b" and so forth. A first micropipette 165 contains an electrically conductive ionic solution 166 for dispensing the droplets 74 into the droplet channel 109. Not shown in FIG. 38 is a second micropipette to periodically dispense predetermined aliquots of the filler medium 87 into the droplet channel 109.

In the example of FIG. 38, the first micropipette 165 is disposed for electrowetting its contents by way of a micropipetting control electrode labeled "x" in the drawing. The micropipetting control electrode is in electrical communication with an externally disposed electrical contact to control the electrode in reference to the common electrode 108 which is coaxially disposed within the micropipette 165 in contact with the ionic solution 166. The control electrode is formed by coating the inside of the micropipette 165 with a metallic film 167 or other electrically conductive film followed by an electrically insulating layer 168 and then a hydrophobic layer 169. The outside of the micropipette is also coated with the hydrophobic layer 169 around the tip. The hydrophobic layer may also be a superhydrophobic layer according to the art.

FIG. 39 is a timing diagram for filling the droplet channel 109 of FIG. 38 by controlling the ON and OFF states of the electrodes as labeled. The high state (logic value one) represents a charged state of the electrode (ON) and the low state (logic value zero) represents an uncharged or discharged state of the electrode (OFF).

Referring to FIG. 38 in view of Example 1, Example 2, and FIG. 16, FIG. 38 shows the means of actuation 200 in a state of assembly after substrate layers forming the droplet channels 109 have been joined together but before they are joined to the piston chamber layer 103.

Referring to FIG. 39 in view of FIGS. 16 and 38, with the first micropipette 165 presenting at its tip at least some of its ionic solution 166 in electrowetting proximity to the electrode labeled "a," the electrode labeled "x" associated with the micropipette 165 is turned OFF and the electrodes labeled "a" and "b" associated with the display panel 26 are turned ON to dispense 170 a first droplet 74 of the ionic solution 166 from the micropipette 165 into the droplet channel 109; to split 171 the first droplet 74 from the micropipette 165, the electrode labeled "x" is turned ON in competition with the electrodes labeled "b" and "c," which are also turned ON, while the intervening electrode labeled "a" is turned OFF; a second droplet 74 is dispensed 172; after the second droplet 74 is split 173: the first micropipette 165 is removed 174, the piston chamber layer 103 is joined to the substrate layers forming the droplet channels 109 and the piston chambers 14 are filled with the filler medium 87 by means of the second micropipette, the half-pins 5 are placed over their respective piston chambers 14 on top of the filler medium 87, and the downstroke electrodes 107 are turned ON (viz. the electrodes labeled "c," "d," "g," and "h"). The retainment layer 102 is then joined to the piston chamber layer 103, at which point the appearance of the half-pins 5 in the display panel 26 is that of the unraised state 100 as shown in FIG. 16.

Because the assembly of the display panel 26 is not yet complete at the time when the filling of the droplet channels 109 occurs, electrical probes are employed to actuate the electrodes of the display panel 26 by making electrical contact with electrical interconnects disposed in the display panel 26 so as to supply electrical power to the electrodes from an external power supply.

Before dispensing the droplets 74 from the first micropipette 165, the second micropipette fills the droplet channel 109 with a predetermined aliquot of the filler medium 87, and more is added periodically each time the droplets 74 are being split and taken lower into the droplet channel 109.

The filling of the droplet channels 109 and piston chambers 14 can both take place after the piston chamber layer 103 is joined to the substrate layers forming the droplet channels 109, provided that the tip of the first micropipette traverses the piston chamber 14 and reaches down to a level of electrowetting proximity with the electrode labeled "a." Electrowetting proximity means close enough that the ionic solution 166 presented at the tip of the micropipette will assume a wetted meniscus against the electrode labeled "a" by means of electrowetting forces when the electrode is turned ON.

The first micropipette can be replaced by an ordinary micropipette which does have a micropipetting control electrode, but then it has to be lifted periodically. In such a case, with electrodes "a" and "b" turned ON, the droplet 74 is split away from the micropipette by lifting the micropipette away from the droplet 74 which is being held by the electrodes.

FIG. 40 shows the display panel 26 of Example 1 or Example 2 in a state of assembly after the piston chamber layer 103 has been joined to the underlying substrate layers containing the droplet channels 109. Referring to FIG. 40 in view of FIG. 16, unlike the example of FIG. 38, in FIG. 40 the control electrodes 104 of the display panel 26 have not been modified from what is shown in FIG. 16. To simplify the drawing, not shown in FIG. 40 is the common electrode 108 of the display panel 26.

FIG. 40 shows a microfluidic injection system 800 for filling the droplet channels 109 of the display panel 26 with hydraulic fluids. The injection system 800 functions analogously to the display panel 26 having modified control electrodes 104 as shown in FIGS. 38 and 39. Referring to FIG. 40, the ionic solution 166 is dispensed from a first reservoir having a fluid port 175 disposed at the top of the injection system 800, and the filler medium 87 is dispensed from a second reservoir having a fluid port 176 disposed between the control electrodes 104 labeled "x" and "a." The control electrode 104 labeled "x" in FIG. 40 functions analogously to the micropipetting control electrode labeled "x" in FIGS. 38 and 39.

Referring to FIG. 40 in view of FIG. 16, Example 1, and Example 2, to begin dispensing a predetermined sequence of hydraulic fluids, an injection manifold 177 at the bottom of the injection system 800 is attached to the top surface 178 of the piston chamber layer 103 to establish fluidic communication with the piston chambers 14. The timing diagram shown in FIG. 39 can be analogously relied on to dispense the sequence of droplets 74 and filler medium 87 via the FIG. 40 injection system 800, except that a predetermined aliquot of the filler medium 87 is dispensed at the end to finish filling droplet channels 109 and the piston chambers 14. The injection system 800 is then removed and the half-pins 5 are placed over their respective piston chambers 14 on top of the filler medium 87, and the downstroke electrodes 107 are turned ON. The retainment layer 102 is then joined to the piston chamber layer 103, at which point the appearance of the half-pins 5 in the display panel 26 is that of the unraised state 100 as shown in FIG. 16.

Referring to FIG. 40, finer control over the filling of hydraulic fluids into the display panel 26 will be obtained by employing in the injection system 800 a greater number of control electrodes 104 which individually have a shorter vertical length.

Figure 41:
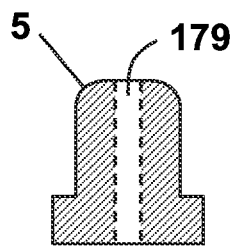
FIG. 41 is a side cross-sectional view of an inventive half-pin.

Referring to FIG. 41 in view of FIGS. 3 and 16, as an aid to filling the display panel 26 with hydraulic fluids and seating the half-pins 5 in their piston chambers 14, the half-pins 5 may be disposed with one or more channels 179 proceeding therethrough from the head 17 to the piston 15 to admit hydraulic fluids and air to pass through the half-pin 5. Accordingly, fluids may be filled or relieved through the half-pins 5, after which the channels 179 are plugged at the head 17.

C. Modification of the Display Panels

Referring to FIG. 21 in view of FIGS. 16, 25, and 26, although the display panel 26 of Example 1 is configured to two pairs of upstroke and downstroke electrodes 106, 107 per half-pin 5 by having two pairs of upstroke and downstroke layers 123, 124, in general the display panel 26 can be configured to one or more pairs of upstroke and downstroke electrodes 106, 107 by having the corresponding number of pairs of upstroke and downstroke layers 123, 124.

Referring to FIG. 31 in view of FIGS. 23, 24, 32, 33, 34A, 34B, 35A, 35B, and 36, although the display panel 26 of Example 2 is configured to two pairs of upstroke and downstroke electrodes 106, 107 per half-pin 5, in general the display panel 26 can be configured to one or more pairs by employing the corresponding number of control electrodes 104 and sizing each of the vertically disposed planar substrate layers accordingly.

Referring to FIG. 38, when control electrodes 104 are partitioned into half-electrodes or other fractions of electrodes, vibrational modes can be employed which operate the half-electrodes or the other fractions in a cycle, as opposed to cycling whole electrodes.

Figure 42:
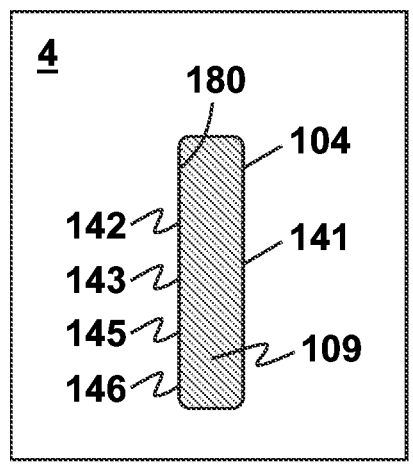
FIG. 42 is a top orthogonal view of an isolated section of a microfabricated planar substrate layer for making the inventive display panel of Example 1.
Figure 43:
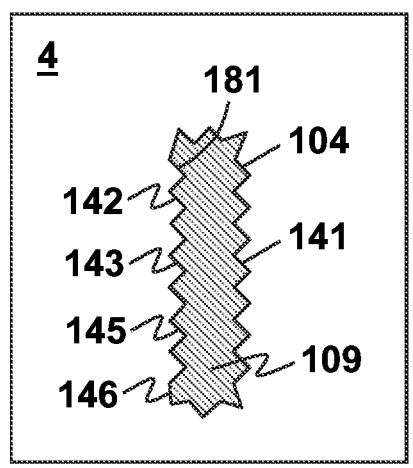
FIG. 43 is a top orthogonal view of an isolated section of a microfabricated planar substrate layer for making the inventive display panel of Example 1.

FIG. 42 shows an isolated (close-up) top orthogonal view of the annular control electrode 104 shown in FIGS. 25 and 26. Referring to FIG. 42 in view of FIGS. 25 and 26, the void 141 disposed in a layer of the substrate 4 has walls 143 which are smooth 180. In contrast, FIG. 43 shows a variation of the FIG. 42 control electrode 104, in which the walls 143 of the void 141 are corrugated 181 instead of smooth 180. When the walls 143 forming a surface for the control electrode 104 are corrugated 181, the surface area is increased compared when the walls 143 are smooth 180. When the surface area is increased, more charge can be stored by the control electrode 104 in the ON state based on the principle of electrolytic capacitance.

Advantageously, all else being equal, when the surface area is increased relative to the cross-sectional area of the droplet channel 109 or, put another way, when the cross-sectional circumference is increased relative to the cross-sectional area, a greater actuation force will be applied to the droplets 74 by the control electrodes 104 in accord with increased charge storage; alternatively, by increasing the surface area, the voltage potential applied between the control and common electrodes 104, 108 can be reduced while retaining the same actuation force.

Corrugated walls can be made from such exemplary layer materials as glass using such exemplary processes as laser micromachining or chemical etching, after which the control electrodes 104 are deposited. Corrugated walls can also be made by molding such exemplary layer materials as poly (dimethylsiloxane) (PDMS).

Figure 44:
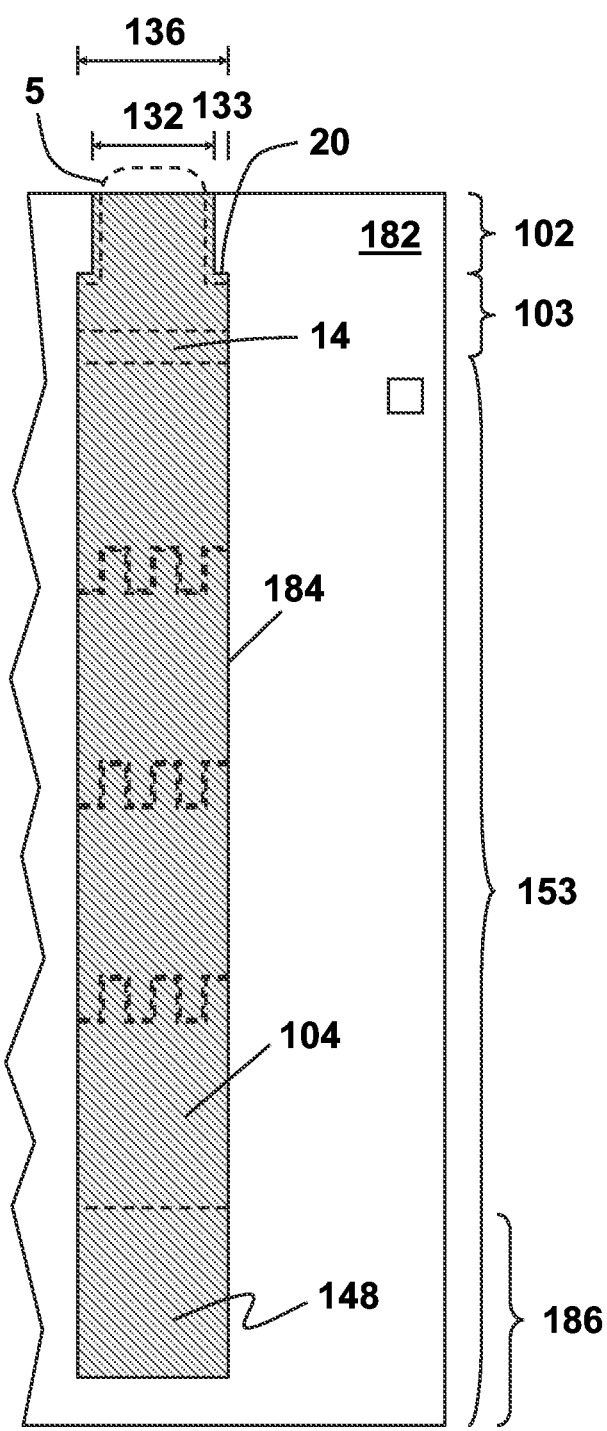
FIGS. 44 and 45 are top orthogonal views of two different microfabricated planar substrate layers for modifying the inventive display panel of Example 2.
Figure 45:
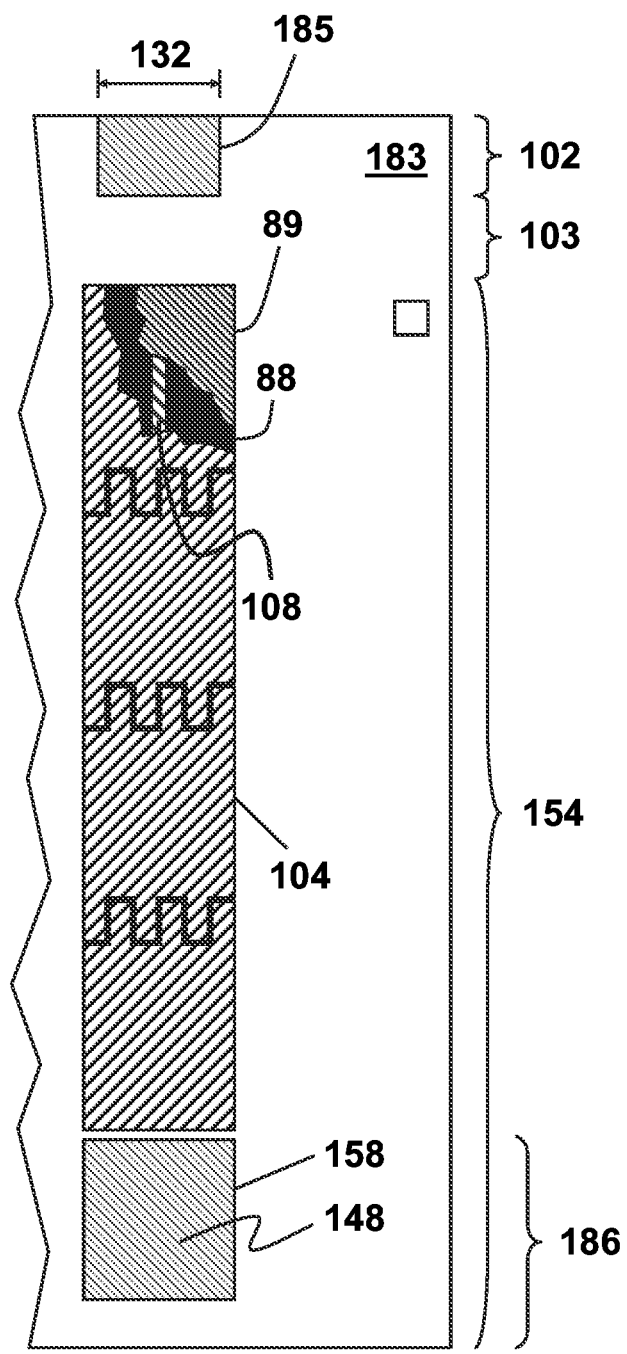

FIGS. 44 and 45 show respective modifications of the FIG. 33 spacer layer 153 and the double-sided electrode layer 154 of FIGS. 34A and 34B and which modifications enable all substrate layers to be vertically disposed by eliminating the need for the two horizontally disposed layers in the assembly of the FIG. 31 embodiment, namely, the piston chamber layer 103 and the retainment layer 102.

Referring to FIGS. 44 and 45 in view of FIGS. 33, 34A, and 34B, the spacer layer 153 and the double-sided electrode layer 154 are respectively modified as a vertically extended spacer layer 182 and a vertically extended double-sided electrode layer 183. Referring to FIGS. 44 and 45 in view of FIGS. 32, 35A, and 35B, though not shown in the drawing, when employing the extended layers 182, 183, then the first and second endcap layers 152, 155 are likewise extended vertically to have the same height and width as the extended layers 182, 183.

Corresponding to the same indicium appearing in FIGS. 33, 34A, and 34B, in FIGS. 44 and 45 a square indicium appears near the upper right hand corner of the top side of the extended layers 182, 183 to aid in an appreciation of the drawing with respect to an alignment and orientation of the substrate layers, but is not a part of the device.

Referring to FIG. 44 in view of FIGS. 23, 24, 31, and 33, the extended spacer layer 182 has voids 184 disposed therethrough which serve the function of the voids 157 in the spacer layer 153 forming the droplet channels 109 and part of the hydraulic reservoir 148, the function of the voids 135 in the piston chamber layer 103 forming the piston chambers 14, and the function of the voids 131 in the retainment layer 102 which are sized so that the retainment layer 102 retains the half-pins 5. Referring to FIG. 44 in view of FIGS. 2C, 23, 31, and 33, the voids 184 disposed in the extended spacer layer 182 provide upstroke retainers 20 to retain the half-pins 5 in the same manner as the upstroke retainers 20 provided by the retainment layer 102.

Referring to FIG. 45 in view of FIGS. 23, 31, 34A, and 34B, the extended double-sided electrode layer 183 has voids 185 disposed therethrough which serve the function of the voids 131 in the retainment layer 102 which are sized so that the retainment layer 102 retains the half-pins 5.

Referring to FIG. 44 in view of FIG. 31, when joining the substrate layers together during assembly of the display panel 26, then for each of the extended spacer layers 182, each half-pin 5, as shown in dashed outline, is placed in the extended spacer layer 182 in its respective void 184 before joining the extended spacer layer 182 to a subsequent substrate layer. Referring to FIG. 44 in view of FIG. 41, in this case the half-pins 5 should have one or more channels 179 disposed in them to admit fluids to pass therethrough when filling the display panel 26 with hydraulic fluids.

Referring to FIGS. 44 and 45 in view of FIGS. 23, 24, 31, 33, 34A, and 34B, the extended layers 182, 183 can be modified so that only the piston chamber layer 103 is eliminated, in which case the horizontally disposed retainment layer 102 is still required.

Referring to FIGS. 44 and 45 in view of FIGS. 21, 27, 28A, 28B, 29A, 29B, 31, 33, 34A, and 34B, the spacer layer 153 and the double-sided electrode layer 154 can be modified so that a lower portion 186 associated with the hydraulic reservoir 148 is removed. In such a case, the remaining vertically disposed substrate layers are sized accordingly, and horizontally disposed substrate layers are added underneath along the lines of the hydraulic reservoir layer 125 and the base layer 126 of the FIG. 21 embodiment.

Referring to FIG. 3, in general the head 17 of the half-pins 5 can be disposed with any shape or texture to produce a variety of haptic effects. For example, the head 17 may be made rough, bumpy, pointy, wavy, or beveled.

In FIGS. 21 and 31, all of the substrate layers are flush with each other in the display panels 26 of Example 1 and Example 2. Alternatively, in view of FIG. 10 the panel surface 47 of the display panel 26 may extend beyond the underlying actuator housing 48 which contains the actuators needed to actuate the half-pins 5. The panel surface 47 may be made of glass or toughened glass, for example, Gorilla Glass® (Corning, Inc., Corning, NY), or a glass alternative, for example, synthetic sapphire. The panel surface 47 may be formed of one or more substrate layers, for example, the retainment layer 102, or it may be formed by a fraction of a substrate layer.

In FIGS. 21 and 31, the retainment layer 102 is depicted as a single substrate layer as are the other substrate layers. But, in general, substrate layers may be individually composed of multiple sub-layers.

For example, referring to FIGS. 21 and 31 in view of FIG. 10, to provide a touch sensitive panel surface 47 for the display panel 26, the retainment layer 102 can be composed of a plurality of sub-layers as needed for a capacitive touchpad or touchscreen according to the art.

When a substrate layer is composed of a plurality of sub-layers and a void must be disposed through the layer entirely, it is preferable to join all of the sub-layers together before making the void. Referring to FIG. 24 in view of FIG. 3, this is especially true of the piston chamber layer 103 so that the walls 187 of the piston chambers 14 will be smooth as is desirable to promote smooth operation of the pistons 15, rather than presenting discontinuities at the walls 187 due to poorly aligned sub-layers.

Referring to FIG. 16, to save space by reducing the height of the display panel 26, the thickness of the piston chamber layer 103 can be reduced by having at least a portion of the half-pin 5 descend into the droplet channel 109 on the downstroke.

Referring to FIGS. 21 and 31 in view of FIGS. 9 and 10, to save space by reducing the height of the self-scrolling Braille display 10, one or more substrate layers of the display panel 26 may contain one or more semiconductor layers having electronics disposed therein to replace at least a portion of the electronics assembly 42.

Referring to FIG. 13 in view of FIGS. 21 and 31, though the exemplary display panels 26 of Example 1 and Example 2 each provide only a single hotspot 9, an array of hotspots 9 as shown in FIG. 13 may be disposed on the substrate 4 of a single display panel 26 or separate display panels 26 may be grouped together to form the array.

Referring to FIGS. 21 and 31 in view of FIGS. 16, 22, 27, 28A, 28B, 29A, 29B, 30, 31, 33, 34A, 34B, 35A, 35B, and 36, although Example 1 and Example 2 employ formal hydraulic reservoirs 148 to equilibrate pressure inside the droplet channels 109 with the ambient pressure of the surroundings, it may suffice to provide a short channel containing a non-volatile liquid beneath each droplet channel 109. The filler medium 87 can serve this function if it is a non-volatile liquid. Each short channel, which is sized to hold enough of the non-volatile liquid to provide a vapor barrier, is in fluidic communication with the respective droplet channel 109 on one end and open to the surrounding air on the other end.

Referring to FIG. 33 in view of FIGS. 31, 32, 34A, 34B, and 35B, to provide an annular rather than parallel arrangement of control electrodes 104 in the FIG. 31 embodiment, the walls 400 of the void 157 disposed in the spacer layer 153 may also be disposed with control electrodes 104 in the same manner as on the double-sided control electrode layer 154 and the first and second endcap layers 152, 155, except without the common electrodes 108. Respective control electrodes 104 are then connected together to form the effectively annular arrangement.

Referring to FIG. 24 in view of FIGS. 21 and 31, the piston chambers 14 are disposed in the piston chamber layer 103 perpendicular to the surface 3 of the display panel 26 which provides a flat reading surface. Alternatively, though not shown in the drawing, the piston chambers 14 may be tilted at an angle in combination with a curved retainment layer to provide a concave or convex reading surface for the display panel 26 which is curved proximal to distal and/or left to right.

Referring to FIGS. 44 and 45 in view of FIGS. 31, 32, 35A, 35B, and 36, though not shown in the drawing, features disposed in the substrate layers such as the control electrodes 104 and voids 159, 184, 185 can be titled at an angle or curved and the tops of each of the vertically disposed substrate layers can be cut along a curve rather than a straight line to provide a concave or convex reading surface for the display panel 26 which is curved proximal to distal.

D. Other Types of Actuation

Referring to FIG. 31 in view of FIGS. 32, 33, 34A, 34B, and 35B, to actuate the electrically conductive droplets 74 housed within the droplet channels 109 between parallel walls, the selected control electrodes 104 which face each other on both walls are charged with like polarity in reference to the common electrode 109 which is superimposed on one of the walls. But other types of actuation can be adapted to the embodiments of invention as well.

For example, the prior art describes a digital microfluidic system in which one wall (viz. plate) is disposed with a common electrode and coated with a hydrophobic layer which is not electrically insulating, while an opposing parallel plate is disposed with a series of control electrodes in an electrowetting arrangement for manipulating droplets of an electrically conductive ionic solution.

To give another example, Pamula et al. teach a digital microfluidic system in which one plate has no electrodes but is covered with a hydrophobic layer while an opposing parallel plate carries both the control electrodes and the common electrode in an electrowetting arrangement for manipulating droplets of an electrically conductive ionic solution. See U.S. Pat. No. 6,911,132 (Pamula et al.) for an apparatus for manipulating droplets by electrowetting-based techniques, incorporated herein in its entirety by way of reference.

In contrast to these two prior art examples, U.S. Pat. No. 8,292,798 teaches that the more powerful electrowetting arrangement for manipulating droplets of an electrically conductive ionic solution is obtained by employing a common electrode in reference to parallel plates of control electrodes charged with like polarity, as in the FIG. 31 embodiment of the present invention, or in reference to annular control electrodes, as in the FIG. 21 embodiment of the present invention. See U.S. Pat. No. 8,292,798, col. 61, line 53 ff.

In yet another example, the prior art also describes an electrowetting arrangement for manipulating droplets of an electrically conductive ionic solution between two opposing parallel plate electrodes charged with opposite polarity and which droplets are electrically insulated from both of the plates. But a weakness of this type of actuation is that its principle of energy storage is based on the parallel plate capacitor, which at usable dimensions holds less charge for a given voltage than energy storage based on the electrolytic capacitor, as is the case of the preferred embodiments of the invention. Thus, for a given voltage potential, this type of actuation will produce less force on the droplets than the preferred means of actuation according to the invention. See U.S. Pat. No. 8,292,798, col. 60, line 56 ff., for further comparison of these two different principles of electrowetting droplets of an electrically conductive ionic solution.

Also noted is U.S. Pat. No. 6,369,954 (Berge et al.) for a lens with variable focus, incorporated herein in its entirety by way of reference. Also noted is U.S. Pat. No. 7,126,903 (Feenstra et al.) for a variable focus lens, incorporated herein in its entirety by way of reference.

Instead of employing droplets of an ionic solution or other electrically conductive liquid, another genre of electrowetting employs droplets of a dielectric liquid (viz. an electrically non-conducting liquid). To give an example, Le Pesant et al. teach an electrowetting arrangement for manipulating droplets of a dielectric liquid between two opposing plates charged with opposite polarity and which droplets are in electrical communication with both of the plates. See U.S. Pat. No. 4,569,575 (Le Pesant et al.) for electrodes for a device operating by electrically controlled fluid displacement, incorporated herein in its entirety by way of reference.

Also noted is Pellat's experiment for measuring electrocapillary forces exerted by dielectric liquids under the action of an electric field when held between electrically uninsulated parallel plate electrodes. See Pellat, H., "Mesure de la force agissant sur les diélectriques liquides non électrisés placés dans un champ életrique (Measurement of the force acting on non-electrified dielectric liquids placed in an electric field)," Comptes Rendus de l'Académie des Sciences (Proceedings of the Academy of Sciences), Paris, Vol. 119, 1895, pp. 691-694, incorporated herein in its entirety by way of reference. Also noted is U.S. Pat. No. 2,062,468 (Matz) for an optical device, incorporated herein in its entirety by way of reference. Also noted is U.S. Pat. No. 2,802,918 (Boyle) for an electrostatic relay, incorporated herein in its entirety by way of reference. Boyle teaches (col. 1, lines 32-39 and lines 46-60) that the embodiments of the electrostatic relay can be adapted to an electrically conductive liquid (mercury) or a dielectric liquid.

In an electrowetting context, a liquid droplet subject to electrowetting forces may be variously called a liquid globule, a liquid slug, or a liquid embolus. In U.S. Pat. No. 4,569,575, Le Pesant et al. teach (col. 3) two fluids, wherein one fluid is a liquid globule having a high permittivity (viz. dielectric constant) and a low electrical conductivity, for example, cyclohexanone, and the other is a gas or vapor having a lower permittivity which serves as a surrounding filler medium, for example, air. They further teach (col. 3) application of a non-wetting layer on top of parallel plate electrodes to reduce the wettability of the globules. They further teach (col. 4, lines 8-17) that the power of their electrowetting arrangement to move droplets within their device increases with the difference in permittivity between the two fluids.

Referring to FIG. 16, a gas or vapor fluid would not be a suitable filler medium 87 for the means of actuation 200 because the fluids employed in the device must be hydraulic fluids, meaning, they must be incompressible fluids (viz. liquids) rather than gas or vapor. But the teaching of Le Pesant et al. may be adapted to the embodiments of the invention by imposing the added requirement that both fluids be incompressible (viz. liquid).

To adapt the teaching of Le Pesant et al. to the embodiments of the invention, two mutually immiscible liquid materials having low electrical conductivities (viz. mutually immiscible dielectric liquids) are required which are chemically compatible and have different dielectric constants, wherein the liquid forming the droplets has a high dielectric constant and the liquid forming the filler medium has a low dielectric constant (or vice versa). Two such liquids are provided, for example, by glycerol as the droplet material, which has a high dielectric constant, and a silicone oil as the filler medium material, and which silicone oil is immiscible with glycerol has a low dielectric constant relative to glycerol.

As an alternative, a mineral oil or a fluorinated electronic liquid may be employed as the filler medium material relative to glycerol. As another alternative, deionized water may be employed as the droplet material relative to silicone oil, mineral oil, or a fluorinated electronic liquid.

To adapt the teaching of Le Pesant et al. to the embodiments of the invention, one skilled in the art will know to select from the literature two mutually immiscible dielectric liquids having wide differences in permittivity, one with high permittivity and the other with low permittivity. See Maryott et al., "Table of dielectric constants of pure liquids," National Bureau of Standards Circular 514, Washington, D.C., 1951, incorporated herein in its entirety by way of reference.

For example, the silicone oil (viz. silicone fluid) employed to adapt the teaching of Le Pesant et al. to the embodiments of the invention is preferably a super low viscosity silicone fluid having a viscosity ranging from 0.65 to 2.0 centistokes at 25° C., for example, hexamethyldisiloxane (HDMS), octamethyltrisiloxane, decamethyltetrasiloxane, and dodecamethylpentasiloxane. Other alternatives include a poly(dimethylsiloxane) (PDMS) silicone fluid which has a low viscosity ranging from 5 to 20 centistokes at 25° C. or a standard viscosity ranging from 50 to 100 centistokes at 25° C.

To give another example, the fluorinated electronic liquid employed to adapt the teaching of Le Pesant et al. to the embodiments of the invention is preferably a 3M™ Fluorinert® electronic liquid FC-70, a 3M™ Fluorinert® electronic liquid FC-84, or another 3M™ Fluorinert® electronic liquid supplied by the 3M Company (Maplewood, MN) which has a low dielectric constant and is immiscible with glycerol, deionized water, or other droplet material.

Advantageously, silicone fluids of low or super low viscosity and glycerol have been regarded as environmentally friendly materials.

Figure 46:
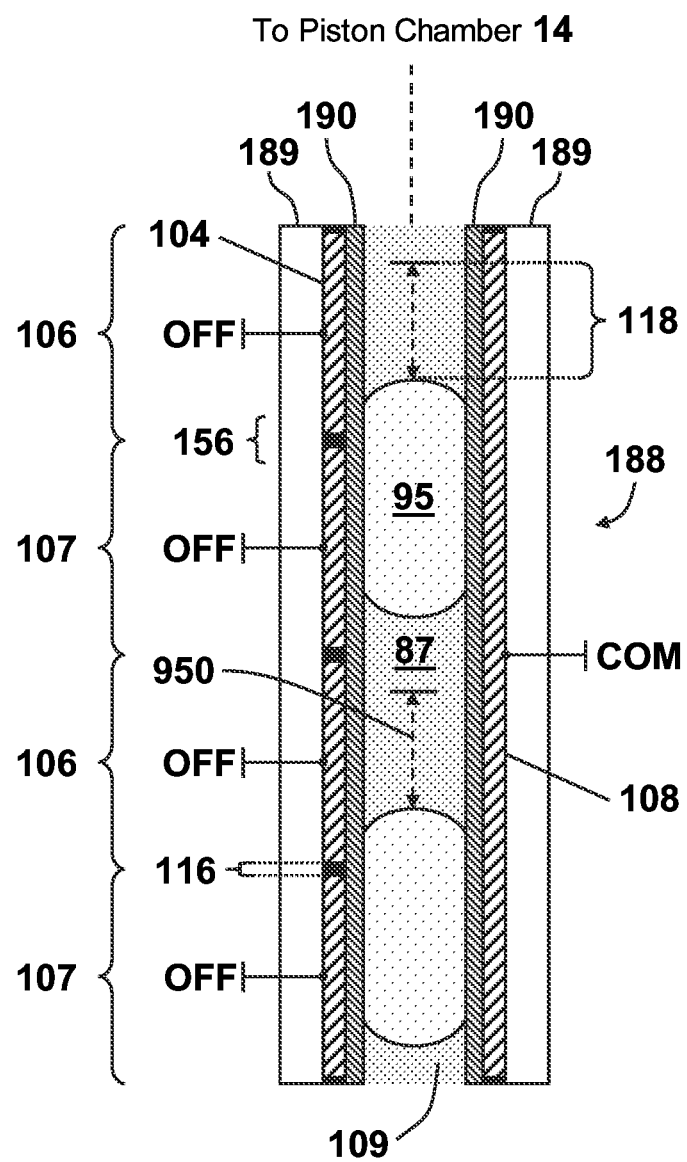
FIG. 46 is a side cross-sectional view of an inventive dielectric liquid hydraulic actuator.

FIG. 46 shows how the teaching of Le Pesant et al. can be adapted to a dielectric liquid hydraulic actuator 188 in keeping with the embodiments of the invention. Referring to FIG. 46 in view of FIG. 16, the dielectric liquid hydraulic actuator 188 employs two dielectric liquids as its hydraulic fluids in contrast to the means of actuation 200 shown in FIG. 16 which relies on droplets 74 composed of an electrically conductive ionic solution.

Referring to FIG. 46 in view of FIG. 16, the dielectric liquid hydraulic actuator 188 comprises opposing parallel plate electrodes having the control electrodes 104 disposed on one plate 189 and common electrode 108 disposed on the opposing plate 189, wherein the droplet channel 109 between the two plates 189 contains the hydraulic fluids, wherein one of the hydraulic fluids consists of dielectric liquid droplets 95 composed of glycerol or other dielectric liquid having a high permittivity, and wherein the other hydraulic fluid consists of the filler medium 87 composed of silicone oil or other dielectric liquid having a low permittivity which is immiscible with the droplets 95.

Referring to FIG. 46 in view of FIGS. 31, 32, 33, 34A, 34B, 35A, 35B, and 36, in a manner analogous to the assembly of the Example 2 embodiment, the dielectric liquid hydraulic actuator 188 is preferably assembled from vertically disposed substrate layers, including the spacer layer 153 which is sandwiched between the plates 189 to form the droplet channel 109. Exemplary materials for making the plates 189 include glass or poly(dimethylsiloxane) (PDMS) layers.

In keeping with the teaching of Le Pesant et al., on the sides facing the droplet channel 109 the opposing plates 189 are coated on top of the control and common electrodes 104, 108 with a non-wetting layer 190 which is not electrically insulating and which is non-wetting with respect to the droplets 95. Because glycerol is hydrophilic, then when employing glycerol as the material forming the droplet 95, the non-wetting layer 190 is a hydrophobic layer. An exemplary material for the non-wetting layer 190 which is hydrophobic is a fluoropolymer, for example, Teflon AF1600 ® and Cytop®. According to the art, the non-wetting layer 190 which is hydrophobic may also be a superhydrophobic layer.

Referring to FIG. 46 in view of FIGS. 16, 19, and 32, in keeping with the teaching of Le Pesant et al. the control electrodes 104 may be disposed with interdigitations 156 where they meet. But this is not necessary unless the outline of the droplet 95 will be made to traverse the gap 116 between successive control electrodes 104 during the stroke 950.

FIG. 46 shows all control electrodes 104 in the OFF state. Referring to FIG. 46 in view of FIG. 16, the control electrodes 104 of the dielectric liquid hydraulic actuator 188 are divided into the upstroke and downstroke electrodes 106, 107. To actuate the half-pins 5, the dielectric liquid hydraulic actuator 188 is disposed in fluidic communication with the piston chamber 14 of the half-pin 5 and the droplets 95 contained within the droplet channel 109 are actuated electronically. As is the case in the example of FIG. 16, in the example of FIG. 46 each pair of upstroke and downstroke electrodes 106, 107 actuates its own droplet 95.

Though two pairs of upstroke and downstroke electrodes 106, 107 are provided in the example of FIG. 46, in practice one or more pairs may be provided. For a given hydraulic leverage ratio between the droplet channel 109 and the piston chamber 14, greater hydraulic pressures will obtained by increasing the number of droplets 95 being actuated in series.

In a manner analogous to the operation of the FIG. 16 embodiment, to actuate the droplets 95 of the FIG. 46 embodiment, a predetermined voltage potential is applied between selected control electrodes 104 and the common electrode 108. The upstroke electrodes 106 are selected for upstroke actuation and the downstroke electrodes 107 are selected for downstroke actuation. A direct current (DC) or alternating current (AC) voltage potential may be applied. An exemplary AC voltage takes the form of a square wave having a predetermined frequency and waveform. Droplet actuation rates may be enhanced using an overdrive voltage as disclosed by Jeong et al. See Jeong et al., ibid.

Referring to Example 2 in view of FIGS. 2A, 24, and 33, with the half-pins 5 spaced apart at an exemplary distance of 0.0285 inches (0.724 millimeters) on center, then an exemplary depth 137 of the piston chambers 14 will be on the order of 0.020 inches (0.500 millimeters). According to Example 2 and in keeping with a hydraulic leverage ratio of unity, the depth 137 of the piston chambers 14 also corresponds to a spacing distance between walls formed by opposing substrate layers on either side of the droplet channel 109 and which spacing distance is provided by the thickness of the spacer layer 153. But because the principle of energy storage in the device of Example 2 is based on the electrolytic capacitor, an amount of spacing distance between electrodes of opposite polarity is for the most part irrelevant to the force of actuation.

In contrast, the principle of energy storage in the dielectric liquid hydraulic actuator 188 shown in FIG. 46 is based on the parallel plate capacitor, such that the force of actuation is directly proportional to the strength of the electric field set up between opposite plates. For a given voltage potential, the electric field strength between opposing electrode plates is inversely proportional to the distance between the plates. As a consequence, referring to FIG. 46 in view of FIG. 20A, it is preferable to operate the dielectric liquid hydraulic actuator 188 with a hydraulic leverage ratio greater than unity in order to reduce a spacing distance between the opposing control and common electrodes 104, 108.

Figure 47:
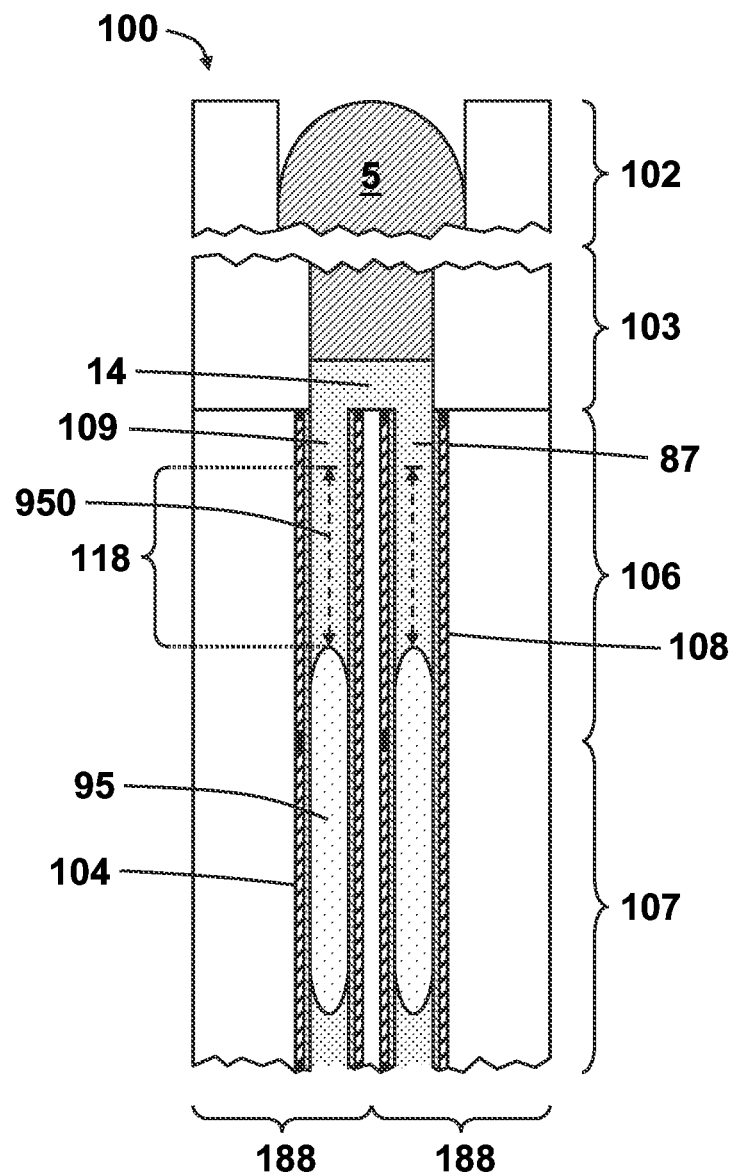
FIG. 47 is a side cross-sectional view of an inventive means of actuation for refreshable Braille.

FIG. 47 shows an embodiment of the invention in which the dielectric liquid hydraulic actuator 188 shown in FIG. 46 is employed as a substitute for the exemplary means of actuation 200 for refreshable Braille shown in FIG. 16. Referring to FIG. 47 in view of FIGS. 16, 24, and 46, the spacing distance between the opposing plates 189 disposed with the control and common electrodes 104, 108 is less than the depth 137 of the piston chambers 14 to provide a closer spacing of the plates 189. In the example of FIG. 47, the closer spacing distance between the plates 189 allows for a plurality of the dielectric liquid hydraulic actuators 188 units to be disposed in parallel in hydraulic communication with the piston chamber 14, in this example two units, to provide a greater hydraulic force on the half-pin 5 than a single unit acting alone.

Referring to FIG. 47 in view of FIGS. 19 and 20A, in this example the combined cross-sectional area of the droplet channels 109 of the two units of the dielectric liquid hydraulic actuators 188 is less than the cross-sectional area 122 of the piston chamber 14, in which case the ratio of hydraulic leverage is greater than unity for both the individual and combined units. But because the overall ratio of hydraulic leverage is greater than unity, the stroke distance 118 traveled by the droplets 95 must be elongated, compared to the case of an overall hydraulic ratio of unity, in order to match the filling/unfilling of the piston chamber 14 with the filler medium 87 on each stroke 950. Accordingly, in the FIG. 47 embodiment the control electrodes 104 and droplets 95 are sized to the elongated stroke distance 118.

Figure 48:
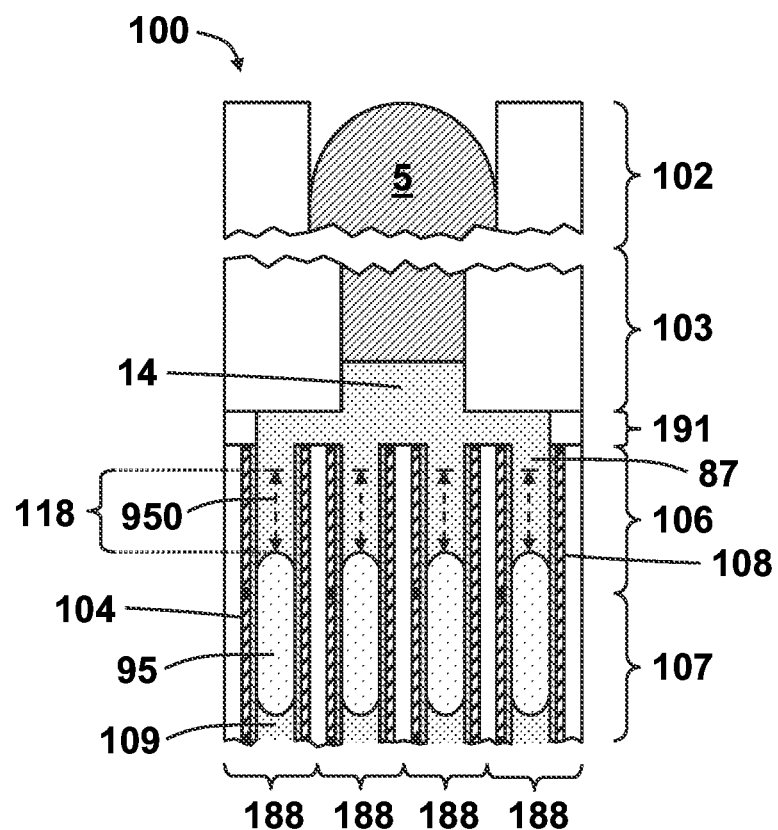
FIG. 48 is a side cross-sectional view of an inventive means of actuation for refreshable Braille.

FIG. 48 shows another embodiment of the invention in which the dielectric liquid hydraulic actuator 188 shown in FIG. 46 is employed as a substitute for the exemplary means of actuation 200 for refreshable Braille shown in FIG. 16. Referring to FIG. 48 in view of FIGS. 19, 20B, and 46, in this embodiment four units of the dielectric liquid hydraulic actuator 188 are employed to actuate the half-pin 5. Since the cross-sectional area of the four units combined is greater than the cross-sectional area 122 of the piston chamber 14, an actuator-to-piston-chamber reducer coupling 191 is included between the droplet channels 109 and the piston chamber 14.

As in FIG. 47, in FIG. 48 the hydraulic leverage ratio between the individual dielectric liquid hydraulic actuators 188 and the piston chamber 14 is greater than unity. But because the cross-sectional area of the four units combined is greater than the cross-sectional area 122 of the piston chamber 14, the overall hydraulic leverage ratio of the combined dielectric liquid hydraulic actuators 188 is less than unity. Because the overall ratio of hydraulic leverage is less than unity, the stroke distance 118 traveled by the droplets 95 must be shortened compared to an overall hydraulic ratio of unity in order to match the filling/unfilling of the piston chamber 14 with the filler medium 87 on each stroke 950. Accordingly, the control electrodes 104 and droplets 95 are sized to the shortened stroke distance 118.

Although the device of FIG. 46 will generally require a greater voltage potential to produce the same force of actuation as the device of FIG. 16, the device of FIG. 46 will generally accept much greater voltages without breaking down. A reason for this difference is that the FIG. 16 device relies on the thin electrically insulating layer 88 which in general can breakdown at much lower voltages than the dielectric liquids of the FIG. 46 device.

Referring to FIGS. 2A, 2B, and 2C in view of FIGS. 16, 21, and 31, although the devices of Example 1 and Example 2 rely on the means of actuation 200 which is disposed vertically underneath and in close proximity to the half-pins 5, it is also possible to establish fluidic communication between the piston chambers 14 and the means of actuation 200 via a network of microfluidic channels/vias (viz. microchannels) disposed in the substrate layers of the display panels 26. For example, the means of actuation 200 may accordingly be disposed horizontally in substrate layers located at some distance from the piston chambers 14 being served.

Referring to FIGS. 2A, 2B, and 2C, although a hydraulic means of actuation employing electrowetting forces is preferred to actuate the half-pins 5 of the inventive self-scrolling Braille display 10, it will be appreciated that any other suitable means of hydraulic actuation, should it be devised, may likewise be configured for actuating the half-pins 5 having close spacing in keeping with the liberal spirit of the invention. Although a hydraulic means of actuation is preferred to actuate the half-pins 5 of inventive self-scrolling Braille display 10, it will be appreciated that any other suitable means of actuation, should it be devised, may likewise be configured for actuating the half-pins 5 having close spacing in keeping with the liberal spirit of the invention.

Figure 49:
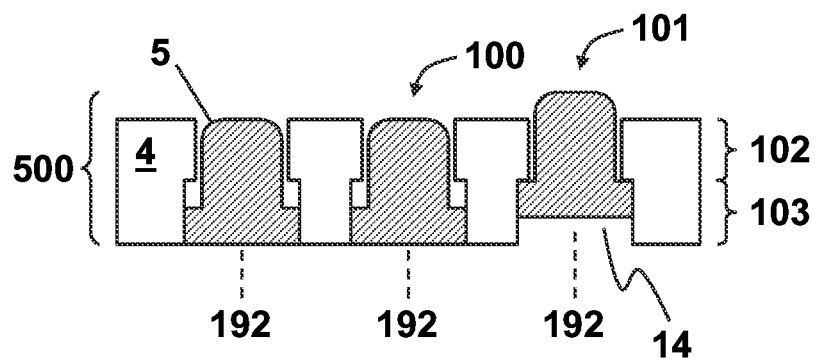
FIG. 49 is a side cross-sectional view of an inventive half-pin piston assembly.

Referring to FIG. 49 in view of FIGS. 2A, 2B, 2C, 3, 21, 23, 24, and 31, an inventive half-pin piston assembly 500 comprises the retainment layer 102, the piston chamber layer 103, and the half-pins 5.

Advantageously, the half-pin piston assembly 500 can be configured for receiving power to actuate the half-pins 5 from a hydraulic or pneumatic pressure source 192 which is disposed in fluidic communication with the piston chambers 14 from below and which fluidic communication is established using microfluidic or microfabrication technologies according to the art.

To display Braille on the half-pin piston assembly 500, the hydraulic or pneumatic pressure source 192 is controlled electronically via a microprocessor to actuate the half-pins 5 in a predetermined sequence. Pressurization and depressurization of the piston chambers 14 by the hydraulic or pneumatic pressure source 192 actuates the half-pins 5 to their raised and unraised states 101, 100 respectively.

Advantageously, half-pin piston assembly 500 is disposed with the upstroke retainer 20 to limit the upstroke of the half-pin 5 to the preset rising distance in contact with the upstroke ledge 18, and further disposed with the downstroke retainer 21 to limit the downstroke of the half-pin 5 to the preset lowering distance in contact with the downstroke ledge 19, whereby the rising and falling of the half-pin 5 is limited to a preset distance between the raised and unraised states 101, 100.

Advantageously, the half-pin piston assembly 500 does not require a latching mechanism to maintain the half-pins 5 in the raised state 101 because the raised state 101 is maintained by a predetermined pressure between the upstroke ledge 18 of the half-pin 5 and the upstroke retainer 20 provided by the retainment layer 102, and which pressure is provided via the hydraulic or pneumatic pressure source 192.

Advantageously, the half-pin piston assembly 500 can be made from two microfabricated horizontally disposed planar layers which are bonded together after placing the half-pins 5 in their piston chambers 14 and which half-pins 5 can be made by such exemplary processes as plastic micro-injection molding or by machining compression molded Teflon® or other poly(tetrafluoroethylene) or fluoropolymer.

Advantageously, the half-pin piston assembly 500 provides for an array of half-pins 5 having close spacing.

Advantageously, the half-pin piston assembly 500 is configurable for displaying self-scrolling Braille according to the invention.

In general, the half-pins 5 can be coated in whole or in part with a non-stick coating or a non-stick lubricant, for example, one containing Teflon® or other fluoropolymer, to prevent them from sticking to each other or from sticking to the walls of the piston chamber 14. When employing liquid within the piston chamber 14 for hydraulic actuation, the piston 15 and connecting shaft 16 of the half-pin 5 may be coated a with a layer of silicone oil, grease, or other material to promote lubrication and a tight seal according to the art. Similarly, when employing air or other gas or vapor within the piston chamber 14 for pneumatic actuation, the piston 15 and connecting shaft 16 of the half-pin 5 may be coated with a layer of silicone oil, grease, or other material to promote lubrication and an airtight seal according to the art.

Figure 50:
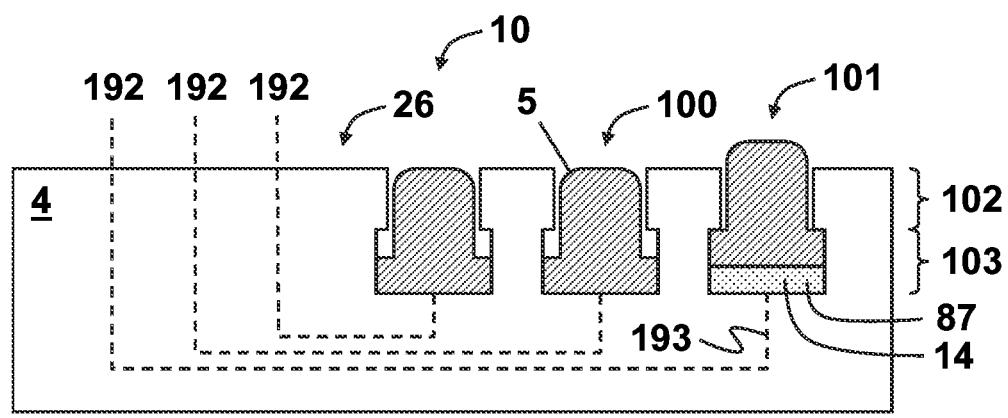
FIG. 50 is a side cross-sectional view of an inventive self-scrolling Braille display.

FIG. 50 provides an additional example of the versatility of the half-pin piston assembly 500 in making self-scrolling Braille displays 10 according to the invention.

Referring to FIG. 50 in view of FIGS. 2A, 2B, 2C, 3, 21, 23, 24, 31, and 49, an exemplary self-scrolling Braille display 10 comprises the half-pin piston assembly 500, wherein the substrate 4 is disposed with hydraulic or pneumatic microchannels 193 providing fluidic communication between the piston chambers 14 of the half-pins 5 and the hydraulic or pneumatic pressure source 192. In this example, the piston chambers 14 and their associated microchannels 193 are filled with silicone oil 87 or other hydraulic fluid for hydraulic actuation of the half-pins 5. Alternatively, the piston chambers 14 and their associated microchannels 193 may be filled with air or vapor as a pneumatic fluid for pneumatic actuation of the half-pins 5.

In one example, the hydraulic or pneumatic pressure source 192 comprises a positive pressure air line (viz. compressed air line), a negative pressure air line (viz. vacuum line), and a series of electronically controlled microvalves to switch between the positive pressure air line and the negative pressure air line in fluidic communication with respective microchannels 193 and which microchannels 193 contain the hydraulic or pneumatic fluids.

In operation, a selected microvalve or microvalve combination is actuated under electronic controls to allow pressure from the positive pressure air line to pressurize the corresponding piston chamber 14 and raise the half-pin 5 to the raised state 101; conversely, a selected microvalve or microvalve combination is actuated to allow pressure from the piston chamber 14 to be released into the negative pressure air line to depressurize the piston chamber 14 and lower the corresponding half-pin 5 to the unraised state 100.

For example, microvalves can be mounted on top of the substrate 4 and connected to a house supply of positive and negative air pressure provided by respective air and vacuum lines connected respectively to an air compressor and a vacuum pump. House supplies of this sort are common in school laboratories and are thus well suited to the school setting, for example, a school for the blind. Exemplary air compressors and vacuum pumps include computer-controlled compact microfluidic pressure and vacuum generator pumps. Exemplary electronically controlled microvalves which are mountable on the substrate 4 include miniature solenoid valves, piezoelectric valves, Braille pin valves, and prefabricated Quake valves. See Gu et al., "Computerized microfluidic cell culture using elastomeric channels and Braille displays," Proceedings of the National Academy of Sciences USA, Vol. 101, No. 45, 2004, pp. 15861-6, incorporated herein in its entirety by way of reference. See also Hulme et al., "Incorporation of prefabricated screw, pneumatic, and solenoid valves into microfluidic devices," Lab on a Chip, Vol. 9, No. 1, 2009, pp. 79-86, incorporated herein in its entirety by way of reference.

Hydraulic lines can be substituted for the air and vacuum lines to provide positive and negative pressure lines. For example, positive pressure can be provided by a gravity drip and negative pressure can be provided by a siphon.

Pressure lines and pressurized systems can be provided with pressure regulators and pressure sensors to maintain predetermined pressures according to the art.

As an alternative to surface-mounted microvalves, electronically controlled microvalves can be provided which are disposed within the substrate 4 in the form of microfluidic valves. Positive and negative pressure microchannel lines can be disposed within the substrate 4 in fluidic communication with external positive and negative pressure lines to serve the microfluidic valves. Exemplary microfluidic valves disposed within the substrate include Quake, doormat, curtain, and plunger microvalves. See Au et al., "Microvalves and micropumps for BioMEMS," Micromachines, Vol. 2, No. 2, 2011, pp. 179-220, incorporated herein in its entirety by way of reference.

As an alternative to microvalves combined with positive and negative pressure lines, the hydraulic or pneumatic pressure source 192 can be provided by electronically controlled bidirectional micropumps, or opposing unidirectional micropumps, which are mounted on top of the substrate 4 or disposed within the substrate 4, including associated fluid reservoirs or microchannels which are preferably pressure-equilibrated with the surrounding air. In operation, when employing bidirectional micropumps (viz. micropumps able to urge flow in forward or reverse directions), a selected micropump is signaled to urge fluid toward the associated piston chamber 14 via the associated microchannel 193 to pressurize the piston chamber 14 and raise the half-pin 5 to the raised state 101; conversely, the selected micropump is signaled to urge fluid away from the associated piston chamber 14 via the associated microchannel 193 to depressurize the piston chamber 14 and lower the half-pin 5 to the unraised state 100. When employing unidirectional micropumps, a member of an opposing pair is selected to raise/lower the half-pins 5. Exemplary micropumps include peristaltic micropumps, piezoelectric micropumps, diaphragm micropumps, Braille pin micropumps, and electroosmotic pumps. See Au et al., ibid.

Referring to FIG. 49, sources of negative fluid pressure acting on the piston chambers 14 can be eliminated in cases where an alternate means of retracting the half-pins 5 is provided to lower them to the unraised state 100. For example, the digital pulp of the finger has an elasticity which when resting on top of the half-pins 5 will inherently cause them to be pushed down into their piston chambers 14 unless an opposing pressurization of the piston chambers 14 is maintained.

Figure 51A:
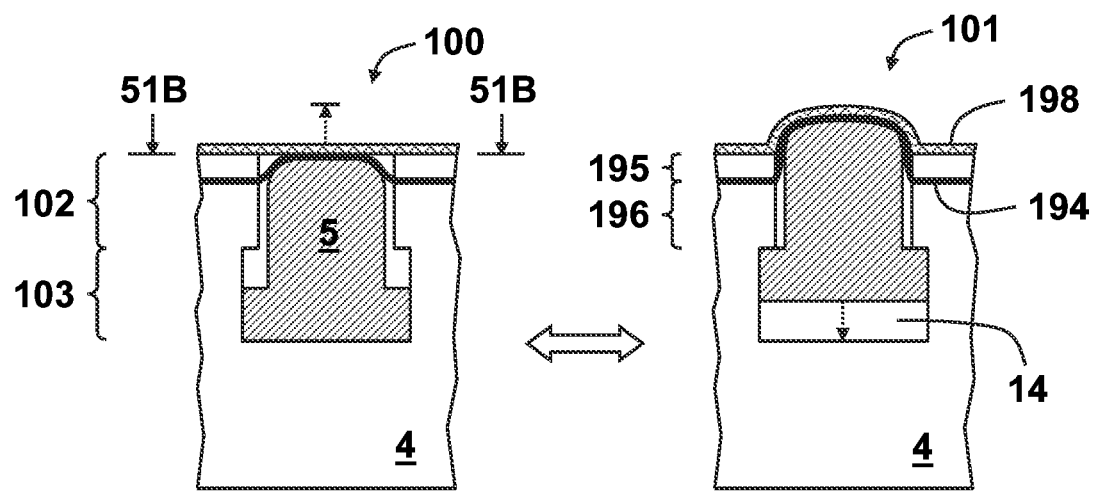
FIGS. 51A and 51B are respective partial side cross-sectional and top orthogonal views of an inventive self-scrolling Braille display in a partial state of assembly.
Figure 51B:
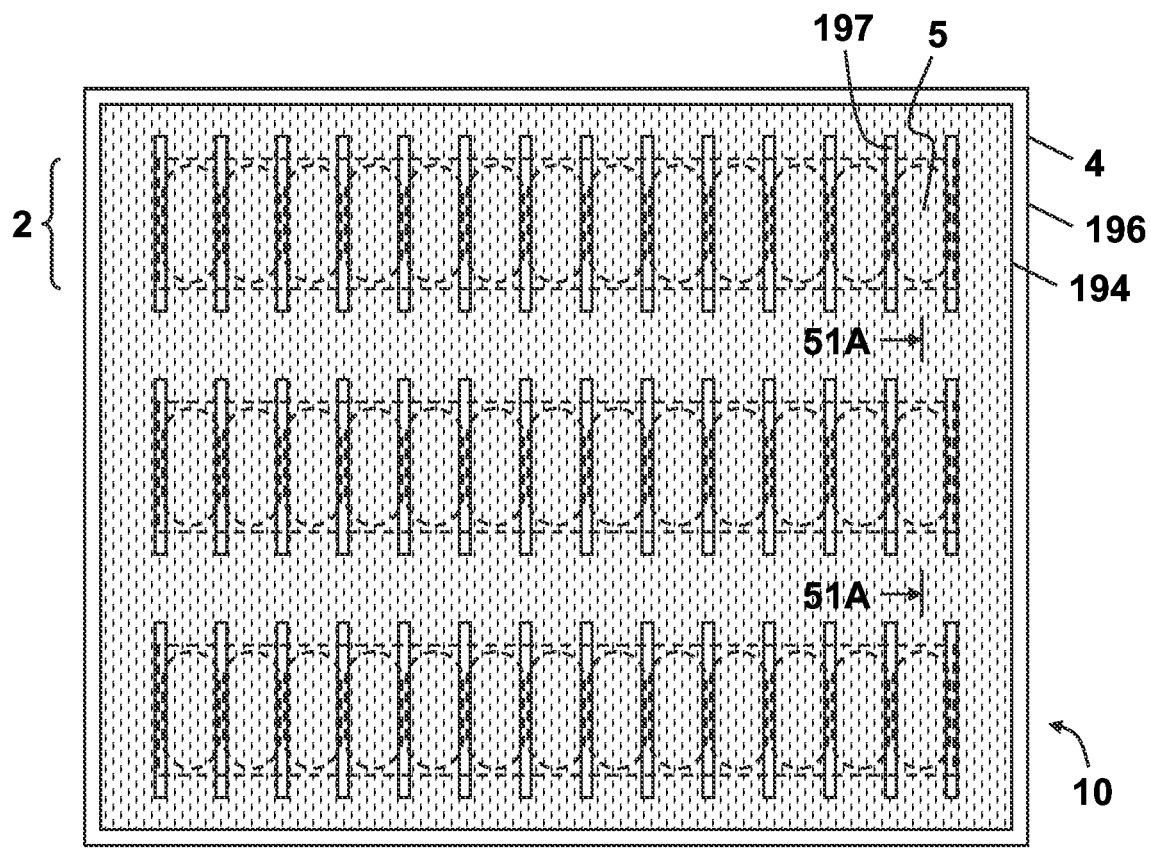

Referring to FIGS. 51A and 51B in view of FIGS. 2A, 2B, 2C, 3, 21, 23, 24, 31, 49, and 50, an exemplary means of retracting the half-pins 5 to the unraised state 100 in absence of a depressurization source is provided by an elastic member 194 which is stretched over the heads 17 of the half-pins 5 and anchored to the substrate 4. In this example, the retainment layer 102 is formed of two sub-layers, namely, an upper layer 195 and a lower layer 196. During assembly, the elastic member 194 is bonded to the top surface of the lower layer 196 using direct bonding or indirect bonding, for example, adhesive bonding, and then the upper layer 195 is bonded to the top of the lower layer 196.

Referring to FIG. 51B, a series of slits 197 is disposed through the elastic member 194 on the left and right sides of each of the individual half-pins 5 so that elastic forces provided by the elastic member 194 will operate on each half-pin 5 independently.

Referring to FIG. 51A, in operation, after the piston chamber 14 is pressurized to raise the half-pin 5 to the raised state 101, then when it is time to lower the half-pin 5 to the unraised state 100 the source of pressurization on the piston chamber 14 is removed and as a consequence the elastic forces of the elastic member 194 cause the half-pin 5 to retract into the piston chamber 14.

For example, referring to FIG. 51A in view of FIG. 16, starting at the raised state 101, by turning the upstroke electrodes 106 OFF and leaving the downstroke electrodes 107 OFF as well, the source of pressurization on the piston chamber 14 is removed without in turn exerting any depressurization force on the piston chamber 14. In this case, the need for the downstroke electrodes 107 can be eliminated by means of the elastic member 194.

Referring to FIGS. 51A and 51B in view of FIGS. 2A, 2B, 2C, and 3, when employing the elastic member 194 on top of the heads 17 of the half-pins 5, then to preclude direct contact between the elastic member 194 and the finger, a flexible or elastomeric cover film 198 is bonded to the surface 3 of the substrate 4 using direct bonding or indirect bonding, for example, adhesive bonding, to cover at least the tracks 2. Otherwise the finger in contact with the elastic member 194 may displace portions of the elastic member 194 covering the heads 17 of the half-pins 5. Noted for clarity is that FIG. 51B shows the elastic member 194 but not the cover film 198.

Though not shown in the drawing, to promote a free movement of the half-pins 5 without the elastic member 194 sticking to the cover film 198, a non-volatile silicone oil or other lubricant is preferably placed between the cover film 198 and the elastic member 194 in places where the elastic member overlies the heads 17 of the half-pins 5. Though not shown in the drawing, non-stick sheets, films, backings, or coatings may also be disposed on or between the elastic member 194 and the cover film 198 to promote the free movement of the half-pins 5. Likewise, lubricants and other non-stick members may be placed between the heads 17 of the half-pins 5 and the elastic member 194 to promote the free movement of the half-pins 5.

Figure 52A:
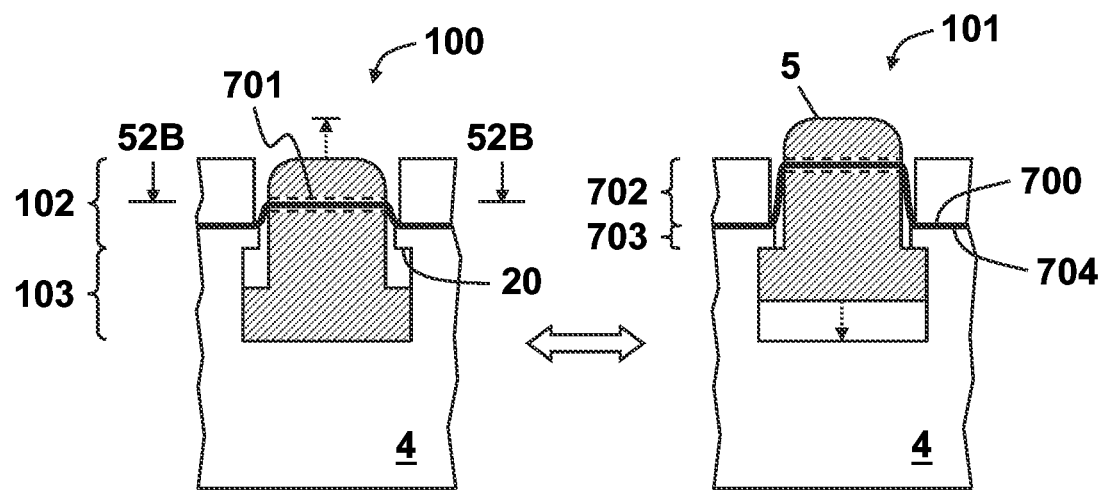
FIGS. 52A and 52B are respective partial side cross-sectional and top orthogonal views of an inventive self-scrolling Braille display.
Figure 52B:
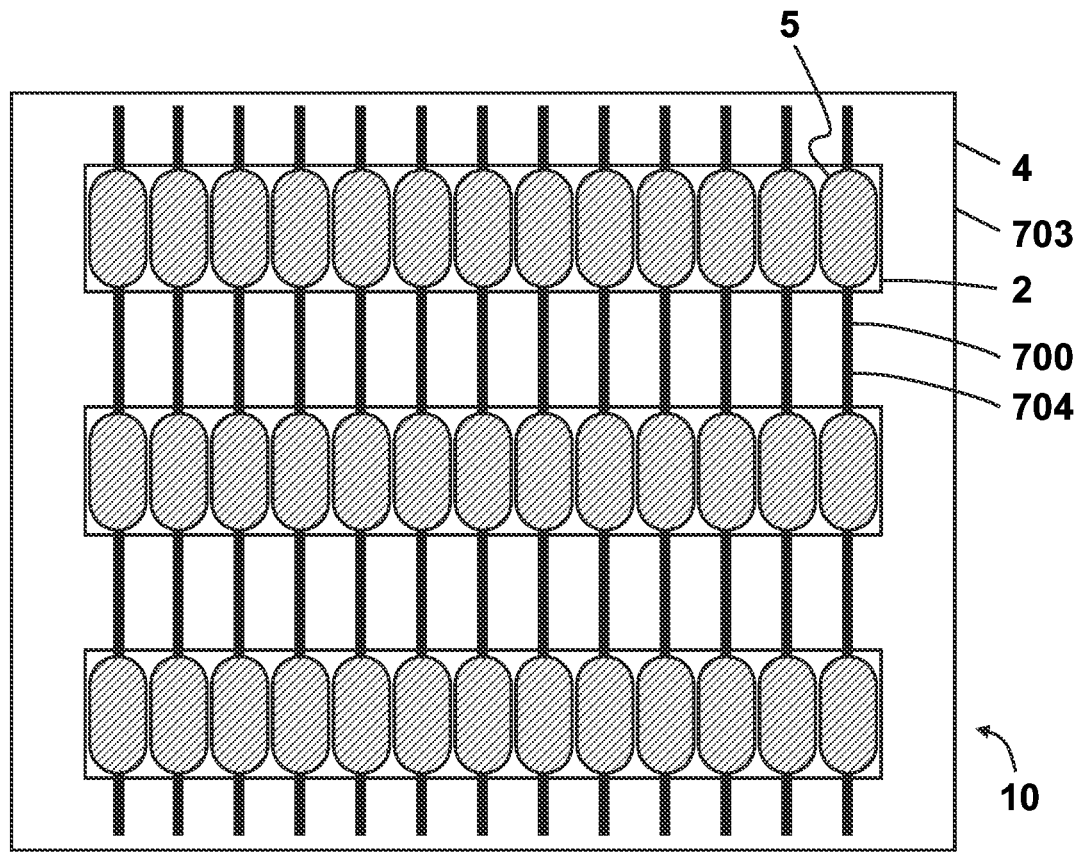

Referring to FIGS. 52A and 52B in view of FIGS. 2A, 2B, 2C, 3, 21, 23, 24, 31, 49, 50, 51A, and 51B, another exemplary means of retracting the half-pins 5 to the unraised state 100 in absence of a depressurization source is provided by an elastic band 700 which is stretched through a hole 701 disposed in the heads 17 of the half-pins 5 and anchored to the substrate 4. In this example, the retainment layer 102 is formed of two sub-layers, namely, an upper layer 702 and a lower layer 703. During assembly, the elastic bands 700 are bonded to the top surface of the lower layer 703 using direct bonding or indirect bonding, for example, adhesive bonding, and then the upper layer 702 is bonded to the top of the lower layer 703.

The hole 701 disposed through the head 17 of each half-pin 5 preferably has a diameter which is large enough to allow the elastic band 700 to slip freely therethrough. Accordingly, any imbalance in proximal-distal lateral forces produced on the half-pin 5 by the elastic band 700 will be equilibrated by slippage of the elastic band 700 within the hole 701. In this manner, the elastic band 700 exerts a net downward vertical force on the half-pin 5 without exerting a proximal-distal lateral force.

Prior to assembly, the top surface of the lower layer 703 may optionally be disposed with a series of open microchannels 704 to accommodate the elastic bands 700 which are then pressed into the open microchannels 704 and fixed using direct bonding or indirect bonding, for example, adhesive bonding, so that the upper and lower layers 702, 703 will lie more closely against each other during assembly.

Referring to FIG. 52A in view of FIGS. 2C and 23, the width 132 of the void 131 disposed in the retainment layer 102 must be wide enough to provide the upstroke retainer 20 in the lower layer 703. In contrast, the width of the void 131 disposed in the upper layer 702 may be widened so the elastic bands 700 will not get pinched between the half-pins 5 and the sidewalls of the tracks 2.

Figure 53A:
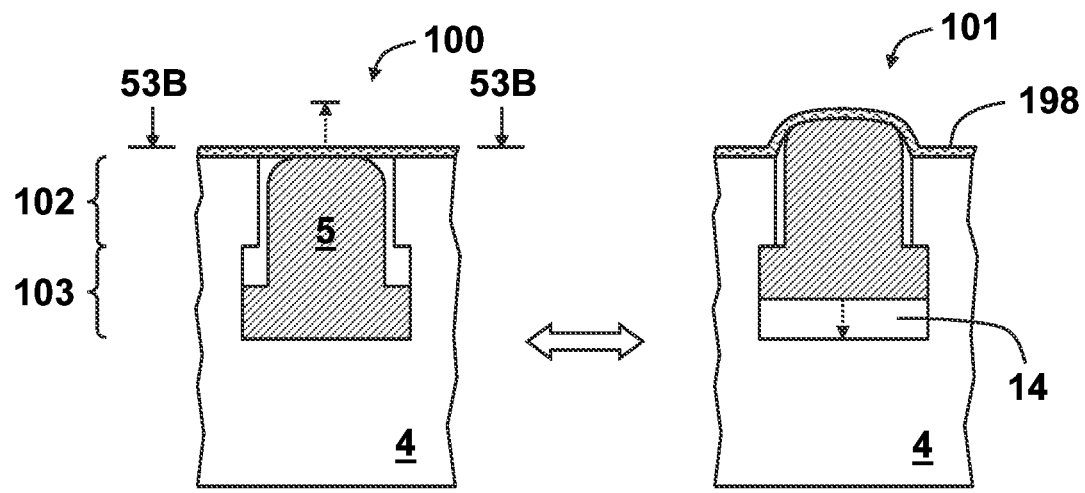
FIGS. 53A and 53B are respective partial side cross-sectional and top orthogonal views of an inventive self-scrolling Braille display.
Figure 53B:
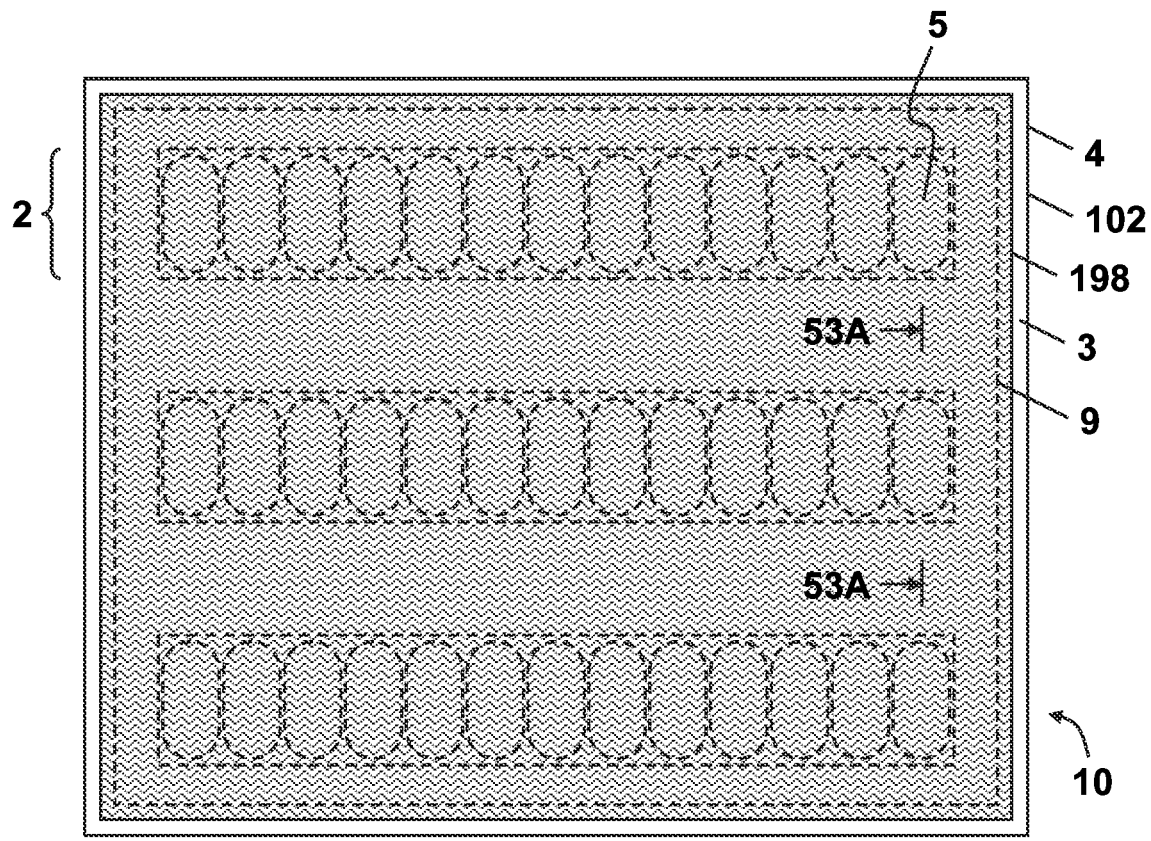

FIGS. 53A and 53B show the self-scrolling Braille display 10 having the hotspot 9 covered with the flexible or elastomeric cover film 198 bonded to the surface 3 of the substrate 4. Referring to FIGS. 53A and 53B in view of FIGS. 2A, 2B, 2C, and 3, the cover film 198 is bonded to the surface 3 of the substrate 4 over the hotspot 9 using direct bonding or indirect bonding, for example, adhesive bonding.

Advantageously, by smoothing out discontinuities between adjacent half-pins 5, the cover film 198 promotes a smoother feel of the Braille dots 6 formed by the half-pins 5 underneath.

Advantageously, by covering the tracks 2, the cover film 198 keeps the tracks 2 clean and waterproof.

Though not shown in the drawing, to promote a free movement of the half-pins 5 without sticking to the cover film 198, a non-volatile silicone oil or other lubricant is preferably placed between the cover film 198 and the heads 17 of the half-pins 5. Though not shown in the drawing, non-stick sheets, films, backings, or coatings may also be disposed on or between the half-pins 5 and the cover film 198 to promote the free movement of the half-pins 5.

Referring to FIGS. 51A, 51B, 53A, and 53B in view of FIGS. 2A, 16, Example 1, and Example 2, when needed to equilibrate the air pressure beneath the cover layer 198 which overlies the tracks 2 with the ambient pressure of the surroundings, microchannels may be disposed in the display panel 26 for pressure relief by connecting the tracks 2 either with the surrounding air or with the hydraulic reservoir 148 or with the bottoms of the droplet channels 109. Alternatively, one or more holes may be disposed in the cover layer 198 over the tracks 2.

Though the exemplary cover film 198 shown in FIG. 53B is limited to covering a single hotspot 9, in general cover films 198 may be employed to cover an area of any size on the surfaces 3 of self-scrolling Braille displays 10, including multiple areas.

Although Example 1 and Example 2 do not specify one, in general the cover layer 198 can be bonded to the surface 3 of the exemplary display panels 26.

As an alternative to bonding, the cover layer 198 can be stretched over the display panel 26 and clamped. An exemplary clamping means is provided by a bracket which fits over the cover layer 198 and interlocks with the top of the display panel 26. Alternatively, the cover layer 198 can be prestreched over the bracket before it is attached to the display panel 26.

Advantageously, the interlocking clamping means enables the cover layer 198 to be easily replaced after it is worn out.

Although Example 1 and Example 2 do not specify one, in general the display panels 26 can be provided with the interlocking clamping means including the cover layer 198.

Referring to FIGS. 53A and 53B in view of FIGS. 51A and 51B, when disposed with a predetermined elasticity, the cover film 198 can contribute to retracting the half-pins 5 in a manner analogous to the elastic member 194 of FIGS. 51A and 51B.

Referring to FIGS. 53A and 53B in view of FIGS. 3, 51A, 51B, 52A, and 52B, all else being equal, a stronger force of retraction will be obtained by anchoring an elastic means to a sub-layer of the retainment layer 102 below the surface 3 of the substrate 4, for example, as in FIG. 51A by anchoring the elastic member 194 to the top of the lower layer 196 of the retainment layer 102, or for example, as in FIG. 52A by anchoring the elastic bands 700 to the top of the lower layer 703 of the retainment layer 102. The added force of retraction will be especially evident when the head 17 of the half-pin 5 is nearly flush with the surface 3 of the substrate 4, for the reason that anchoring the elastic means below the surface 3 enables it to provide a pull-down force even when the head 17 of the half-pin 5 is flush with the surface 3.

Figure 54:
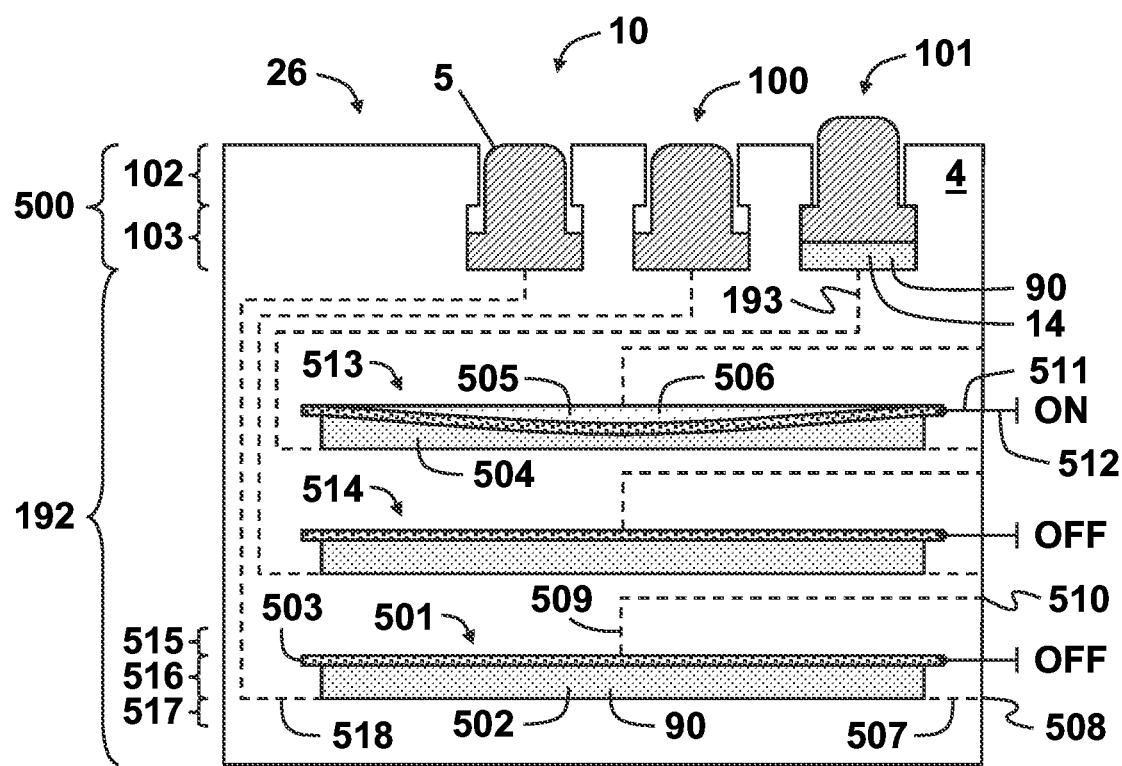
FIG. 54 is a side cross-sectional view of an inventive self-scrolling Braille display.

FIG. 54 provides yet another example of the versatility of the half-pin piston assembly 500 in making self-scrolling Braille displays 10 according to the invention. In FIG. 54, dashed lines show paths taken by microchannels disposed and routed in the substrate 4 according to the art of microfluidics.

Referring to FIG. 54 in view of FIGS. 2A, 2B, 2C, 3, 9, 10, 21, 22, 23, 24, 31, 49, and 50, an exemplary display panel 26 comprises horizontally disposed planar substrate layers bonded together, and which layers include the retainment and piston chamber layers 102, 103 forming the half-pin piston assembly 500 and additional layers forming the hydraulic or pneumatic pressure source 192 underneath, which in this example is a hydraulic pressure source. In this example, the hydraulic pressure source 192 comprises diaphragm micropumps 501 in hydraulic communication with the respective piston chambers 14 via the respective hydraulic microchannels 193.

Each micropump 501 comprises a micropump volume 502, a micropump diaphragm 503 partitioning the micropump volume 502 into a lower hydraulic chamber 504 filled with the hydraulic fluid 90 and an upper pneumatic chamber 505 filled with air 506 from the surroundings, the respective hydraulic microchannel 193 providing fluidic communication between the hydraulic chamber 504 and the respective piston chamber 14, a respective fill-release microchannel 507 providing fluidic communication between the hydraulic chamber 504 and a respective fluid fill-release port 508 for external access to filling the hydraulic chamber 504 with the hydraulic fluid 90, a pneumatic microchannel 509 providing fluidic communication between the pneumatic chamber 505 and an external air opening 510 which is open to the surrounding air, and at least two electrical interconnects 511 providing electrical communication between the diaphragm 503 and respective external electrical connectors 512.

To simplify the drawing, in FIG. 54 only a single electrical interconnect 511 and electrical connector 512 carrying a control signal (ON or OFF) for the respective diaphragm 503 are shown for each micropump 501; not shown is the other of the at least two electrical interconnects 511 and electrical connectors 512 which carry a common or return voltage for the diaphragm 503.

In operation, to raise the half-pin 5 to the raised state 101, an ON signal is sent from the electronics assembly 42 to the diaphragm 503 of the respective micropump 501, which causes the diaphragm 503 to deflect downward to assume a deflected state 513 which pressurizes the hydraulic fluid 90 in the associated hydraulic and piston chambers 504, 14 to raise the half-pin 5; to lower the half-pin 5 to the unraised state 100, an OFF signal is sent from the electronics assembly 42 to the diaphragm 503, which cause the diaphragm 503 to revert to a flat state 514 which depressurizes the hydraulic fluid 90 to lower the half-pin 5.

The pneumatic microchannel 509 serves two purposes: in a manner analogous to the pressure equilibration membrane 151 shown in FIGS. 22 and 31, it adjusts the pressure of the hydraulic fluid 90 in a way that compensates for atmospheric changes in the ambient pressure exerted on the half-pin 5 by the surroundings; and, it prevents a pressure lock from forming in opposition to the movement of the diaphragm 503.

To fill the display panel 26 with the hydraulic fluid 90, all substrate layers are assembled except the retainment layer 102, and the diaphragms 503 of the micropumps 501 are placed in the flat state 514 (OFF). Before the pistons 15 of the half-pins 5 are inserted into their piston chambers 14, hydraulic fluid 90 is injected into the display panel 26 via each of the fill-release ports 508 using a syringe or an injection manifold until the piston chambers 14 are filled. The half-pins 5 are then pressed into their piston chambers 14 to seat them in the unraised state 100 by applying external pressure to their heads 17 until their downstroke ledges 19 contact the downstroke retainers 21, during which process some amount of the hydraulic fluid 90 exudes from the fill-release ports 508 and is discarded. In one example of filling, the fill-release ports 508 are then plugged and the filling is complete. In an alternate example of filling, before plugging the fill-release ports 508, the diaphragms 503 are partially actuated (turned partially ON) so that they deviate from the flat state 514 by a predetermined amount which is less than that of the deflected state 513; the half-pins 5 are then pressed to again seat them in the unraised state 100 and the fill-release ports 508 are plugged after the excess hydraulic fluid has exuded therefrom. Finally, the retainment layer 102 is bonded to the piston chamber layer 103 to complete the assembly of the display panel 26.

An advantage of the alternate example of filling is that then whenever the diaphragm 503 is turned OFF an elastic force of the diaphragm seeking to return to the perfectly flat state 514 will create a negative pressure on the hydraulic fluid 90 and seat the half-pin 5 more firmly in the unraised state 100.

As a variation on the alternate example of filling, instead of partially actuating the micropumps 501, pressurized air can be supplied to partially inflate the pneumatic chambers 505 of the micropumps 501 via the external air openings 510.

Exemplary materials for the micropump diaphragm 503 include electroactive polymers (EAP) and piezoceramics. Exemplary electroactive polymers include piezoelectric polymers, dielectric elastomers, ionic polymer metal composites (IPMC), and conducting polymers. Exemplary piezoelectric polymers, which generally include polymers of the ferroelectric type, include in particular poly(vinylene fluoride) (PVDF) (viz. polyvinylidene fluoride, polyvinylidene difluoride, or poly(1,1-difluoroethylene)) and its copolymers. Exemplary dielectric elastomers include acrylic adhesives, polyurethanes, silicone elastomers, and selectively solvated triblock copolymers derived from poly[styrene-b-(ethylene-co-butylene)-b-styrene] (SEBS). An exemplary silicone elastomer is Silastic® Q7-4750 enhanced-tear-resistant silicone elastomer (Dow Corning Corporation, Midland, MI) consisting of a mixture of dimethyl and methylvinyl siloxane with reinforcing silica which is thermally cured via platinum-cure addition reaction chemistry.

In the prior art, such materials have been explored as actuators, including for use in refreshable Braille displays. See the following references, which are incorporated herein in their entirety by way of reference: Bar-Cohen, "Electroactive polymers for refreshable Braille displays," SPIE Newsroom, 2009, http://dx.doi.org/10.1117/2.1200909.1738; Chakraborti et al., "A compact dielectric elastomer tubular actuator for refreshable Braille displays," Sensors and Actuators A, Vol. 179, 2012, pp. 151-157; Spigna et al., "The integration of novel EAP-based Braille cells for use in a refreshable tactile display," SPIE Proceedings, Vol. 7642, Electroactive Polymer Actuators and Devices (EAPAD) 2010, 76420A; Wu, "A reconfigurable tactile display based on polymer MEMS technology," Georgia Institute of Technology, Dissertation, 2008, http://hdl.handle.net/1853/22623; and, Arora, "Development of dielectric elastomer based prototype fiber actuators," North Carolina State University, Thesis, 2005, http://www.lib.ncsu.edu/resolver/1840.16/1413.

In general, electroactive polymers (EAP) may be classified as ionic or electronic. Ionic electroactive polymers include: "polyelectrolyte gels, such as modified poly(acrylonitrile); ionic polymer metal composites (IPMC), such as Nafion/Pt; conducting polymers, such as polypyrrole (PPy) and polyaniline (PANi); carbon nanotubes, currently classified as EAP even though they are non-polymeric macromolecular materials." Electronic electroactive polymers include: "piezoelectric polymers, such as PVDF; electrostrictive polymers, such as copolymers based on PVDF; dielectric elastomers, such as silicone; flexoelectric polymers, such as liquid crystal elastomers." Exemplary piezoelectric polymers include poly(vinylidene fluoride) (PVDF) and its copolymers. An exemplary copolymer of poly(vinylidene fluoride) (PVDF) is poly(vinylidene fluoride-trifluoroethylene) (P(VDF-TrFE)). See Mazzoldi et al., "Electroactive polymer actuators," In: H. Janocha (ed.), Adaptronics and smart structures: basics, materials, design, and applications, $2^{nd}$ ed., New York: Springer, 2007, pp. 204-224 (quoting pp. 204-205), incorporated herein in its entirety by way of reference. See also Mani, "Surface characterization of polyvinylidene fluoride (PVDF) in its application as an actuator," Texas A&M University, Thesis, 2007, http://hdl.handle.net/1969.1/ETD-TAMU-1349, incorporated herein in its entirety by way of reference.

Electroactive polymer materials are actuated by applying a predetermined voltage potential between two electrodes in contact with the polymer material.

Ionic electroactive polymer materials generally require the presence of electrolytes in order to function. Ionic electroactive polymer materials generally have to be wet for the electrolytes to have the required mobility within the material. To satisfy these requirements, one of the two electrodes in contact with the material is typically an electrically conductive aqueous solution. The polymer material can be encapsulated to keep it wet.

Electronic electroactive polymer materials are typically actuated using dry electrodes, but they will generally function with wet or dry electrodes provided that the two electrodes are electrically insulated from each other. The polymer material typically provides the required electrical insulation. Stretchy electroactive polymer materials, more specifically, those which when actuated exhibit a great change of surface area in contact with an electrode, require compliant electrodes. Compliant means the electrodes easily stretch or flow along with the change in shape of the polymer material, rather than resisting the change or fracturing. Based on their stretchiness, dielectric elastomers typically require compliant electrodes or a compliant electrode-elastomer design. Exemplary compliant electrodes include electrically conductive aqueous solutions, room temperature ionic liquids, electrically conductive greases or rubbers, and conductive polymers. Exemplary electrode-elastomer designs include metal electrodes deposited in a serpentine, coiled, accordion, or other spring-like pattern or on corrugated or buckled elastomer surfaces so the electrodes will stretch along with the elastomer. See Rosset et al., "Flexible and stretchable electrodes for dielectric elastomer actuators," Applied Physics A, Vol. 110, No. 2, 2013, pp. 281-307, incorporated herein in its entirety by way of reference. See also Akbay, "Performance of compliant electrodes in electro active polymer (EAP) actuators," North Carolina State University, Thesis, 2004, http://www.lib.ncsu.edu/resolver/1840.16/1877, incorporated herein in its entirety by way of reference. See also Khodaparast et al., "Electrode structures in high strain actuator technology," Journal of Optoelectronics and Advanced Materials, Vol. 9, No. 11, 2007, pp. 3585-3591, incorporated herein in its entirety by way of reference.

In order to function as a piezoelectric material which serves as an actuator by deforming under an applied electric field, piezoelectric polymers must be suitably prepared. With respect to poly(vinylidene fluoride) (PVDF) and its copolymers, suitable preparations include obtaining the polar 0-phase of the molecule (all-trans conformation) and inducing polarization. Due to the polarization process (viz. poling), piezoelectric films have an upside-right versus upside-down faced piezoelectric polarity. To actuate a film of piezoelectric material, an electric field is applied by applying a predetermined voltage potential between opposing electrodes disposed on opposite sides of the film in the manner of a parallel plate capacitor. With this type of actuation, the principle of energy storage is based on the parallel plate capacitor. An amount of deformation increases with the strength of the electric field. The strength of the electric field increases with the applied voltage, the dielectric constant of the material between the opposing electrodes, and the degree of polarization of the material, and decreases with the separation distance between the electrodes. The separation distance is related to the thickness of the film. Exemplary films of poly(vinylidene fluoride) (PVDF) and its copolymers range in thickness from 2 to 110 microns. Exemplary conducting electrodes are deposited on opposite sides of the film by evaporation or sputtering. Alternatively, the electrodes can be painted or pressed on the film surfaces. See Dargaville et al., "Characterization, performance and optimization of PVDF as a piezoelectric film for advanced space mirror concepts," Sandia National Laboratories, Sandia Report No. SAND2005-6846, U.S. Department of Commerce, Springfield, VA: National Technical Information Service, 2005, incorporated herein in its entirety by way of reference.

Exemplary prior art actuators based on piezoelectric materials include unimorph bilayer benders, serial and parallel bimorph benders, and multimorph benders according to the art. Typical bender geometries include strips, squares, or disks. The disk (viz. circular) and square geometries are suitable for use as a diaphragm.

According to the unimorph bender, a piezoelectric film (called the active layer) is sandwiched between opposing electrode films, and the outer surface of one of the electrodes is covered with an elastic film (called the passive layer) which is non-piezoelectric or not configured for a piezoelectric response. In operation, a predetermined voltage potential is applied between opposing electrodes to flex the unimorph bender, and shorted to relax the bender back to its resting position.

To achieve maximum bending in a unimorph bilayer bender under an applied voltage potential of 100 volts, Tiwari et al. disclose an optimal active layer thickness of 2.5 microns for a poly(vinylidene fluoride) (PVDF) piezoelectric film, and an optimal passive layer thickness of 9 microns for a silicon nitride ($Si_3N_4$) elastic film. They further disclose that the active layer is preferably less than 5 microns thick for optimized bending. They further disclose the same optimal active and passive layer thicknesses when substituting polysilicon or stainless steel elastic films for the silicon nitride ($Si_3N_4$) elastic film, but with slightly decreased bending, in order of decreasing bending. See Tiwari et al., "Optimizing the design of polymer based unimorph actuator using COMSOL Multiphysics," Proceedings of the 2012 COMSOL Conference in Bangladore, 2012, https://www.comsol.com/offers/conference2012papers/papers/file/id/13954/file/15821_tiwari_paper.pdf, incorporated herein in its entirety by way of reference.

Kim discloses complex poling and/or electrode arrangements for piezoelectric actuators configured to a diaphragm to produce increased displacement, including interdigitated and regrouped embodiments. See Kim, "Low power energy harvesting with piezoelectric generators," University of Pittsburgh, Thesis, 2002, http://d-scholarship.pitt.edu/id/eprint/10228, incorporated herein in its entirety by way of reference. See also Mo et al., "Finite element analysis of unimorph rectangular piezoelectric diaphragm actuators with experimental verification," Smart Materials and Structures, Vol. 21, No. 8, 2012, 085025, incorporated herein in its entirety by way of reference.

Referring to FIG. 54 in view of FIGS. 2C, 3, and 24, an exemplary diaphragm micropump 501 comprises three planar substrate layers bonded together: a ceiling layer 515, a micropump reservoir layer 516, and a flooring layer 517, and which layers include or encompass the micropump volume 502, the micropump diaphragm 503, microfluidic interconnects, and electrical interconnects.

The microfluidic volume 502 is formed by a void disposed in the reservoir layer 516. The diaphragm 503, being centered over the microfluidic volume 502, is sandwiched between the ceiling layer 515 and the reservoir layer 516 and partitions the microfluidic volume 502 into the lower hydraulic chamber 504 filled with the hydraulic fluid 90 and the upper pneumatic chamber 505 filled with air 506 from the surroundings.

The microfluidic interconnects include: disposed in the ceiling layer 515, the pneumatic microchannel 509, which provides fluidic communication between the pneumatic chamber 505 and the external air opening 510 which is open to the surrounding air; disposed in the reservoir layer 516 or flooring layer 517, a section 518 of the hydraulic microchannel 193 which connects the hydraulic chamber 504 with the associated piston chamber 14; further disposed in the reservoir layer 516 or flooring layer 517, one or more connecting vias, which route microfluidic interconnects between adjacent substrate layers; and, further disposed in the reservoir layer 516 or flooring layer 517, the fill-release microchannel 507, which provides fluidic communication between the hydraulic chamber 504 and the fill-release fluid port 508 for external access to filling the hydraulic chamber 504 with the hydraulic fluid 90.

The electrical interconnects include: the at least two electrical interconnects 511, which provide electrical communication between the diaphragm 503 and their respective external electrical connectors 512.

Although not shown in FIG. 54, the electrical interconnects 511 carrying the common or return voltage for their respective micropumps 501 in the display panel 26 can all be routed to a single electrical connector 512.

Although shown differently in FIG. 54, the pneumatic microchannels 509 providing fluidic communication between the pneumatic chamber 505 and the surrounding air can all be routed to a single external air opening 510.

Although shown in FIG. 54 one on top of the other, in general a plurality of micropumps 501 can be disposed in the same layer, for example, in a linear, cubic, or hexagonal array.

Although shown in FIG. 54 at a lower height than the piston chambers 14, alternatively the micropumps 501 can be disposed at the same height or higher for the sake of gravitational advantage over the piston chambers 14 they serve.

Although shown in FIG. 54 in a one-to-one correspondence, in general a plurality of micropumps 501 can serve a single piston chamber 14 in parallel.

Advantageously, employing micropumps 501 in parallel increases an applied hydraulic force and lessens a response time of the associated half-pin 5.

Referring to FIG. 54 in view of FIGS. 2C, 3, and 24, an exemplary diaphragm 503 is configured to a unimorph bilayer bender.

In one example, the unimorph bilayer bender forming the diaphragm 503 consists of an active layer and a passive layer, wherein the active layer consists of a suitably prepared 2.5 micron thick poly(vinylidene fluoride) (PVDF) piezoelectric film having a circular geometry 18 millimeters (0.709 inches) in diameter or a square geometry 18 millimeters (0.709 inches) wide, wherein metal film electrodes are deposited on the top and bottom sides of the piezoelectric film, and wherein the passive layer consists of a 9 micron thick silicon nitride ($Si_3N_4$) elastic film deposited on top of the top side electrode except over an electrical pad contact region near an edge of the diaphragm 503.

The foregoing dimensions of the exemplary unimorph bilayer bender assume the following exemplary dimensions: the microfluidic volume 502 formed by the void disposed in the reservoir layer 516 is sized to a circular geometry 12 millimeters (0.472 inches) in diameter; the piston chamber 14 associated with the micropump 501 has a width 136 of 2.2 millimeters (0.087 inches) and a depth 137 of 0.5 millimeters (0.020 inches) and the piston 15 rises 0.5 millimeters (0.020 inches) between the unraised and raised states 100, 101 for a stroke volume of 0.55 cubic millimeters ($3.36 \times 10^{-5}$ cubic inches); and, when a voltage potential of 100 volts or less is applied between the top and bottom electrodes to turn the micropump 501 ON, the diaphragm 503 is at least capable of making at least a 10 micron parabolic deflection in the deflected state 513, as suffices to displace the stroke volume. One skilled in the art will appreciate that these dimensions can be modified in keeping with the liberal spirit of the invention.

Advantageously, employing half-pins 5 according to the invention means that an associated hydraulic actuator only has to provide half the stroke volume and half the force compared to whole-pin actuation.

To prevent the diaphragm 503 formed by the exemplary unimorph bilayer bender from sticking to the bottom of the ceiling layer 515, a circular region on the bottom of the ceiling layer 515, which matches the circular void forming the micropump volume 502, is disposed with a non-stick coating or a non-stick lubricant, for example, one containing Teflon® or other fluoropolymer.

In keeping with the exemplary unimorph bilayer bender, the bottom side of the ceiling layer 515 is disposed with one of the two electrical interconnects 511 for powering the micropump 501 in the form of an electronic trace having at its distal terminus an electrical pad for making contact with the top electrode of the unimorph bilayer bender. At its proximal terminus, the trace makes electrical contact with its respective external electrical connector 512. Similarly, the top side of the reservoir layer 516 is disposed with the other of the two electrical interconnects 511 for powering the micropump 501 in the form of an electronic trace having at its distal terminus an electrical pad for making contact with the bottom electrode of the unimorph bilayer bender. At its proximal terminus, the trace makes electrical contact with its respective external connector 512.

To assemble the micropump 501 in keeping with the exemplary unimorph bilayer bender forming the diaphragm 503, the top side of the diaphragm 503 is bonded at its edges to the bottom side of the ceiling layer 515, having been centered over the circular region corresponding to micropump volume 502, and having aligned the electrical pad contact region to make electrical contact between the top electrode of the diaphragm 503 and the electrical pad disposed on the bottom side of the ceiling layer 515. The bottom side of the ceiling layer 515 is then bonded to the top side of the reservoir layer 516 with the diaphragm 503 sandwiched between, such that the bottom side electrode of the diaphragm 503 makes electrical contact with the electrical pad disposed on the top side of the reservoir layer 516. Finally, the bottom side of the reservoir layer 516 is bonded to the top side of the flooring layer 517.

In keeping with the exemplary unimorph bilayer bender, an exemplary hydraulic fluid 90 for filling the hydraulic chamber 504 of the micropump 501 is a low or super low viscosity silicone oil.

Though shown differently in the drawing of FIG. 54, in practice the flooring layer 517 of one micropump 501 can double as the ceiling layer 515 of the micropump 501 beneath it.

Referring to FIG. 54, another exemplary diaphragm 503 is configured to a serial bimorph bender, parallel bimorph bender, or multimorph bender according to the art.

Referring to FIG. 54, yet another exemplary diaphragm 503 is configured to a piezoelectric material disposed with complex poling and/or electrode arrangements according to the art.

Referring to FIG. 54 in view of FIGS. 2C, 3, and 24, yet another exemplary diaphragm 503 is configured to an active member comprising a dielectric elastomer.

In one example, the active member forming the diaphragm 503 consists a 3M® VHB® 4905 acrylic adhesive tape (3M Company, Maplewood, MN) having an unstrained thickness of 0.5 millimeters (0.02 inch) and an unstrained square geometry which is 12.7 millimeters (0.5 inches) wide and which is stretched 200%×200% to a prestrained square geometry which is 25.4 millimeters (1 inches) on each side and then coated on top with a film of RTV 60-CON electrically conductive silicone rubber elastomer (Stockwell Elastomerics, Inc., Stockwell, PA) which is applied by airbrush suspended in n-heptane (½ w/w) and allowed to cure to provide a top side electrode which is 40 microns thick.

In keeping with the exemplary active member, the reservoir layer 516 has a circular void 21 millimeters (0.827 inches) in diameter disposed therethrough to form the micropump volume 502. The active member is centered on the void disposed in the reservoir layer 516 and bonded to the top of the reservoir layer 516 along its edges to provide the diaphragm 503 having an effective diameter of 21 millimeters (0.827 inches).

In keeping with the exemplary active member, an exemplary bottom side electrode is provided by the hydraulic fluid 90, which in this example is an electrically conductive ionic solution consisting of an aqueous 0.1 M sodium chloride (NaCl) solution.

The foregoing dimensions of the exemplary active member assume the following exemplary dimensions: the piston chamber 14 associated with the micropump 501 has a width 136 of 2.2 millimeters (0.087 inches) and a depth 137 of 0.5 millimeters (0.020 inches) and the piston 15 rises 0.5 millimeters (0.020 inches) between the unraised and raised states 100, 101 for a stroke volume of 0.55 cubic millimeters ($3.36 \times 10^{-5}$ cubic inches); and, when a voltage potential of 6000 volts or less is applied between the top and bottom electrodes to turn the micropump 501 ON, the diaphragm 503 is at least capable of making at least a 5 micron parabolic deflection in the deflected state 513, as suffices to displace the stroke volume. One skilled in the art will appreciate that these dimensions can be modified in keeping with the liberal spirit of the invention.

In keeping with the exemplary active member, electrical communication between the top side electrode and one of the two external electrical connectors 512 providing electrical power to the micropump 501 is provided via an electrical trace disposed on the bottom side of the spacer layer and which trace terminates in an electrical pad in contact with the electrically conductive rubber covering a top edge of the layer forming the diaphragm 503. Electrical communication between the bottom side electrode and the other of the two external electrical connectors 512 supplying electrical power to the micropump 501 is provided via an electrical trace disposed on the top side of the flooring layer 517 and which trace terminates in an electrical pad in contact with the ionic solution forming the hydraulic fluid 90 within the hydraulic chamber 504.

In general, a response of an actuator employing a dielectric elastomer may be improved by prestraining the elastomer according to the art. See Chakraborti et al., ibid.

In keeping with the exemplary active member, an additional prestraining of the diaphragm 503 can be performed after assembly of the display panel 26 by repetitively turning the micropumps 501 ON and OFF for a predetermined number of cycles. To place a resistive load on the prestraining, an elastic member having a predetermined elastic modulus may be pressed against the heads 17 of the half-pins 5 to resist their upward motion. During prestraining, the display panel 26 may be turned over so that the micropumps 501 are not lower than the piston chambers 14 with respect to the field of gravity. Prestraining may also be performed by inflating and deflating the active member forming the diaphragm 503 for a predetermined number of cycles via the external air openings 510 providing fluidic communication with the pneumatic chamber 505, whether before or after filling the display panel 26 with the hydraulic fluid 90.

In general, the diaphragm 503 can be prestreched over the micropump volume 502 before bonding or clamping it between substrate layers during assembly of the micropump 501. But when employing a diaphragm material which expands in plane when actuated, for example, a dielectric elastomer, then the prestreching must be less than the capacity of the material for expansion when actuated; otherwise the material will expand in plane when actuated, instead of expanding out of plane and forming a bubble by deflecting downward as needed to form the deflected state 513 of the micropump 501.

To encourage the diaphragm 503 to deflect downward when actuated, then rather than being perfectly flat as shown in FIG. 54, the bottom of the ceiling layer 515 can be provided with a convex surface disposed over the micropump volume 502 and which surface is in contact with the diaphragm 503 in the OFF state. The convex surface is disposed with one or more openings to maintain fluidic communication between the pneumatic microchannel 509 and the pneumatic chamber 505. Alternatively, the bottom of the ceiling layer 515 may be disposed with one or more posts or other protrusions to provide an offset distance between the diaphragm 503 in the OFF state and the ceiling layer 515.

To reduce the potential of the diaphragm 503 for sticking to a surface, the surface can be disposed with a non-stick coating or a non-stick lubricant, for example, one containing Teflon® or other fluoropolymer. The potential of the diaphragm 503 for sticking is also reduced by having only a limited surface area in contact with the diaphragm 503 in the OFF state, for example, by providing the contact area with posts or other protrusions or with furrows or other indentations.

Though not shown in the drawing of FIG. 54, one or more spacer layers between the ceiling and reservoir layers 515, 516, or recesses etched into the ceiling or reservoir layers 515, 516, can be provided to accommodate the thickness of the diaphragm 503 or to provide an offset to prevent the diaphragm 503 from contacting the ceiling layer 503 in the flat state 514.

Though not shown in the drawing of FIG. 54, as an alternative to active deflection the diaphragm 503 can be passively deflected by placing an actuator having an expanding member between the ceiling layer 515 and the top side of the diaphragm 503. Exemplary actuators for this purpose include tube- or roll-type dielectric elastomer actuators or piezoelectric stack actuators according to the art. The diaphragm 503 can also be passively deflected by placing an actuator having a contracting member between the diaphragm 503 and the flooring layer 517 and which member is attached at its top end to the diaphragm 503 and at its bottom end to the flooring layer 517. Exemplary actuators for this purpose include stack-type dielectric elastomer actuators according to the art. Active and passive actuation may be combined or employed separately.

In general, to avoid damaging an electroactive polymer actuator with an abrupt increase in the voltage potential applied to opposing electrodes, the voltage can be gradually increased from zero to its target value via an electronics assembly using a predetermined voltage waveform, for example, a sawtooth wave waveform.

In general, the hydraulic fluids 90 having low viscosity and high incompressibility are preferred to promote faster transmission rates of hydraulic forces and, hence, faster response times of the half-pins 5.

In keeping with devices which are actuated by an electric field applied between electrodes in the form of a direct current (DC) or alternating current (AC) voltage potential, one skilled in the art will know to try voltages ranging from less than one volt to as great as several tens of kilovolts to produce a measurable actuation, along with frequencies ranging from 0 Hz to tens of gigahertz. To measure actuation, one skilled in the art will know to employ a sensor or camera to detect a deflection produced by the device as a function of applied voltage and frequency. To pick out optimal voltages and frequencies, one skilled in the art will know to graphically plot the measured actuation and to determine optimal values as a function of deflection.

Although the self-scrolling Braille displays of the invention are configured to a transverse movement of Braille dots on a stationary substrate, it is contemplated that self-scrolling Braille devices in keeping with the liberal spirit of the invention may be configured to a lateral movement of Braille dots on a stationary substrate or to a combination of such movements.

E. Additional Advantages of the Invention

According to the second example of the prior art, refreshable Braille devices employ a series of Braille cells, typically in a single row. After reaching the last member of a given row, this requires the user to lift the finger and return to the first member of the row each time, or to the first member of the next row if multiple rows are provided. The device must also be signaled to refresh the line(s) of cells with the next sequence of characters after being read. A standard line of text in Braille has up to 38 Braille cells, which represents roughly half the characters of a line of plain text. With six dots per cell and a one-to-one correspondence of actuators, this requires 228 actuators per line of text in Braille to control the pins which produce the raised dots. If fewer cells are provided, the required number of actuators is reduced but the tedium of having to move the finger across the cells and back again is increased since the lines are shorter.

Advantageously, the self-scrolling Braille displays 10 of Examples 1 and 2 require only 39 actuators based on a one-to-one correspondence of the half-pins 5 and their means of actuation 200, and unlimited text can be presented without the tedium of moving the finger across a line of cells and back again. Moreover, the user does not need to signal the device to refresh the text since new characters are presented by the microprocessor continuously from a text file.

According to the second example of the prior art, refreshable Braille devices require sensors, for example, a sensor placed under each cell, in order to sense the user's position in the text as it is being read.

Advantageously, the self-scrolling Braille displays 10 of Examples 1 and 2 do not require a sensor to determine the user's position in the text, as it can be inferred that the user can only read whatever text is being presented to the finger at a given moment in time. Unlike the devices according to the second example of the prior art, this means devices according to the invention can be synchronized with other processes without having to employ sensors to sense the user's position in the text.

According to the fourth example of the prior art, a number of Braille cells are disposed on a substrate which revolves on a disc, wheel, or other revolving substrate. But limits on the minimum curvature of the substrate in turn limits how small such devices can be made, which in turn limits their portability and makes them generally unsuitable for use as a worn device.

Advantageously, the self-scrolling Braille displays 10 of Examples 1 and 2 are readily adapted to portability and can be worn on the reading finger.

According to the prior art, pins forming refreshable Braille dots typically need some sort of latching mechanism so they can be locked and unlocked or set and reset in order to hold them in the raised position. This adds to the mechanistic complexity of the associated device. It can also limit the maximum rate at which text can be refreshed and, hence, the maximum reading speed.

Advantageously, the self-scrolling Braille displays 10 of Examples 1 and 2 do not require a latching mechanism because the transverse wave of dots being propagated only requires individual half-pins to be in the high state (raised) for a brief, transient period of time. This is analogous to the stadium display, in which the spectators stand for only a brief period of time and then sit back down again.

F. Miscellaneous

In this disclosure, when opposing electrodes are said to be shorted together to discharge them, it includes the possibility of direct or indirect shorting. In the case of direct shorting, the electrodes are discharged via a direct electrical connection and the stored charge is lost. In the case of indirect shorting, which offers the advantage of being more conservative of energy, the electrodes are discharged by routing them via a circuit that recovers some of the stored charge according to the art. For example, the circuit may route some of the charge to other electrodes which need to be charged by connecting the discharging electrodes in parallel with the ones being charged. To give another example, the circuit may recover some of the charge via an inductive coupling connected to a rechargeable battery.

In general, self-scrolling Braille displays according to the invention can be synchronized with other processes, including text, audio, music, spoken word, light, smell, flavor, heat or cold, water, vibrations, and so forth. For example, a book in Braille about flowers can be synchronized with an aromatherapy device which produces smells corresponding to the same flowers as they are being described in the text.

A plurality of the inventive devices or their accessories can also be synchronized with each other, including wirelessly. For example, separate devices worn on the left and right hands can be synchronized with each other for reading the same text simultaneously or with a timed delay. To give another example, devices worn by different users can also synchronized to scroll the same text at the same time and in synch with or responsive to another process or event, for example, to deliver content from a news service or internet provider or to conduct a daily prayer service with the aid of written materials in Braille.

Referring to FIG. 6A, the surface 3 of the display panel 26 can be adapted to preselected modes of vibration according to the art by disposing a vibrating element, for example, an electric motor vibrator, a solenoid vibrator, or a piezoelectric vibrator, in mechanical contact with the display panel 26.

In general, self-scrolling Braille displays according to the invention can be configured according to the art for translating plain text to Braille, translating Braille into plain text, speech recognition, speech to text translation, text to speech translation, translating text from one language to another, translating speech between languages, word completion (viz. autocompletion), text replacement (viz. autocorrection), predictive text, incremental searching (viz. text suggestions), data validation, spell checking, grammar checking, electronic dictionary lookup, and electronic search engine lookup.

According to the art of integrating electronic components, in general self-scrolling Braille displays according to the invention can include accessory devices and sensors, including: an input device, an output device, a computing device, an additional tactile display, an audio device, a microphone, a speaker, a vibrator, a light, a webcam, a media player, a visual display, a plain text display, a pointing device, a game console, a printer, a scanner, a camera, an event recorder, an audio recorder, a video recorder, a computer keyboard, a teletypewriter, a telephonic connection, a TTY (viz. teletypewriter) connection, a cell phone, a telephone, a computer storage device, a memory card reader, an optical device, an electron or ion device, a global positioning system (GPS) device, a geographic information system (GIP) device, a navigation system device, a rangefinder, an accelerometer, a gyroscope, a compass, an inertial reference system device, a position sensor, a collision avoidance system, telerobotics, a personal digital assistant, an intelligent personal assistant, software, a software agent, encryption software, a computer operating system, a device for creating haptic effects, a device configured for haptic feedback, a mobile phone, a mobile device, a device configured for computer networking, a battery charger, a battery indicator, an auxiliary power supply, a digital thermometer, a blood pressure monitor, a pulse oximeter, a heart rate monitor, a pedometer, a biosensor, an activity tracker, a fingerprint sensor, a device configured for fingerprint recognition, a device configured for sending or receiving radio or other electromagnetic signals, a metronome, a clock, a timer, an alarm, and so forth.

According to the art of integrating electronic components, in general self-scrolling Braille displays according to the invention can be integrated with other electronic devices as an accessory device or as a substitute input/output device. For example, one or more Braille hotspots according to the invention can be integrated with the input/output electronics associated with a touchscreen, a touchpad, a keypad, a keyboard, an input key, a switch, a control button, a slide switch, a rotary input, a digital crown, and so forth. For example, a hotspot can be disposed on each input key of a cell phone keypad: for example, consider the key for the character set {2, A, B, C}; when a sensor associated with the hotspot or key detects that the finger has been placed lightly over the key, the hotspot starts scrolling through the members of the character set in sequence over and over again; then once the desired character appears, the user can press the key more firmly to indicate a selected member of the set, for example, when composing a text message.

In general, a touchpad or touchscreen associated with self-scrolling Braille displays according to the invention can be configured for receiving simple or multi-touch gestures made by touching the touchpad or touchscreen with a stylus and/or one or more fingers. The touchpad or touchscreen can also be configured for receiving different levels of pressure being applied to the touchpad or touchscreen by the stylus and/or one or more fingers.

In general, self-scrolling Braille displays according to the invention can be configured according to user preferences. For example, one half-pin instead of two can be kept in the low state between adjacent Braille dots in the same Braille cell. For example, six half-pins instead of seven can be kept in the low state between successive cells. The specified dimensions of the preferred embodiments of the invention are not limiting.

In place of half-pins, self-scrolling Braille displays according to the invention can be adapted to whole pins, one-third pins, quarter pins, or any whole fraction of a whole pin less than or equal to one. For example, three half-pins instead of two can be used to make a single Braille dot, in which case the half-pins may be called one-third pins.

The self-scrolling Braille effect of the invention can be adapted to purposes other than simple reading, for example, to read other indicia of information, for example, direction, elevation, heading, alignment, magnitude, pattern, beat, signal, timing, matching, coincidence, degree, rotation, position, and so forth. The self-scrolling Braille effect of the invention can also be adapted to tactile stimulation on sensitive regions of the body for purposes other than reading, including massage or other stimulation. An array of tracks and pins can be specifically adapted to such purposes in view of the invention. Such can also be synchronized with other processes according to the art.

In general, Braille finger readers according to the invention can be configured according to the art for wireless pairing with a desktop computer or a mobile smartdevice, for example, a smartphone. Analogous to the relation between an iPhone® and an Apple Watch®, the finger reader can be configured to work by connecting via Bluetooth to the smartdevice and accessing any finger reader compatible apps stored on the smartdevice. For example, the smartdevice running a mobile app can be used to set user preferences on the finger reader, for example, to set the finger reader for left- or right-handed usage. Via an intelligent personal assistant, the smartdevice can be used to find books and other materials of interest to the user, who can then download them onto the finger reader. Analogous to the relationship between a smartwatch and a smartphone, the finger reader configured for wireless pairing only needs to be within wireless range of the smartdevice to communicate with it. The finger reader can be provided with a microphone and speaker to enable the user to verbally communicate with the smartdevice even when the smartdevice is located in a desk or somewhere else outside audible range.

In general, self-scrolling Braille displays according to the invention can also be provided with any combination of a memory card reader to enable text and text messages to be transferred using a memory card; a USB port or other receptacle to enable power and/or data to be transferred using a cable connection to a computer or auxiliary power supply; a headphone socket; a microphone socket; and, an audio headset socket.

Referring to FIG. 7 in view of FIGS. 9 and 10, in an exemplary mode of operation, the distal button 28 of the finger reader 22 is pressed once to access a library of text and text messages stored in a finger reader file system associated with the electronics assembly 42 and its operating system software. The rotary input 29 is then turned to scroll through a first level of file folders: Favorites, Homework, Leisure, Messages, and so forth. As the rotary input 29 is turned, the finger reader 22 repetitively scrolls (presents) on the display panel 26 the text corresponding to the name of the folder or text file which the rotary input 29 points to until the rotary input 29 is turned a notch forward or backward to the next selection. The rotary input 29 is then clicked to make a selection, which takes the user to the selected text file or to the next level in the file system.

In another exemplary mode of operation, the proximal button 28 is pressed twice to access bookmarks. The rotary input 29 is then turned to scroll through a recent list of bookmarks. With the rotary input 29 pointing to a given bookmark, the finger reader 22 repetitively scrolls a segment of text as a reminder of the identity of the bookmark, which according to user preferences can provide such information as the name, chapter, or page of a book; an excerpt from text appearing immediately before and/or after the bookmark; a list of senders from whom recent text messages have been received; a list of dates corresponding to the date when text messages were received; and so forth. The rotary input 29 is then clicked to make a selection to begin reading, which takes the user to a preset position in the text being pointed to by the bookmark.

G. Other Applications of the Invention

The prior art discloses an adaptation of prior art refreshable Braille displays to computer-controlled microfluidics. See Gu et al., ibid.

Advantageously, the inventive self-scrolling Braille displays can be employed to perform work and related actions by coupling their half-pins to additional mechanisms according to the art of engineering. For example, the half-pins may be employed to actuate a valve, a mixer, or a pump in a microfluidic device.

Advantageously, the inventive actuators can be employed to actuate a system of one or more pistons or pins which are coupled to additional mechanisms to perform work and related actions according to the art of engineering. For example, the pistons may be employed to actuate a valve, a mixer, or a pump in a microfluidic device.

H. Additional Prior Art

In this disclosure, finger readers according to the invention, which are distinguished by displaying the inventive self-scrolling Braille to the finger, are not to be confused with prior art finger-worn devices, including devices of the same or similar name, which do not display Braille on the device in the form of a transverse or lateral propagation of a coded sequence of raised/unraised protuberances for reading by the finger.

Thus, when compared to the prior art, the inventive finger readers are distinguished as self-scrolling Braille finger readers.

For example, the prior art teaches a device having a finger-mounted camera for optical character recognition (OCR) and means of haptic feedback, but which does not display Braille. See U.S. Pat. No. 9,024,874 (Stetten et al.) for a fingertip haptic sensor controller, incorporated herein in its entirety by way of reference.

To give another example, the prior art discloses an assisted reading device having a finger-mounted camera for optical character recognition (OCR) of printed text, means of text-to-speech translation of the recognized text, and means of means of haptic feedback, but which does not display Braille. See Shilkrot et al., "FingerReader: A wearable device to explore printed text on the go," Proceedings of the Association for Computing Machinery 33$^{rd}$ Annual Conference on Human Factors in Computing Systems, ACM CHI 2015, Extended Abstracts, pp. 2363-2372, incorporated herein in its entirety by way of reference.

To give yet another example, the prior art discloses an assisted reading device comprising an electrotactile display mounted on the finger to display Braille, but not in the form of a coded sequence of raised/unraised protuberances. See Saadeh, "A refreshable and portable e-Braille system for the blind and visually impaired," University of North Las Vegas, Dissertations, Paper No. 1619, 2012, http://digitalscholarship.unlv.edu/thesesdissertations/1619/, incorporated herein in its entirety by way of reference.

Electrotactile displays operate on the basis of an electrocutaneous mechanism, whereby a pattern of electrical stimulation is provided to the finger in contact with an array of electrodes to evoke a perception of Braille dots, in contrast to traditional Braille displays which present Braille dots in the form of raised/unraised protuberances. But though electrotactile displays have had some success in enabling users to identify dot patterns representing shapes, for example, open squares, triangles, and circles, user recognition of standard Braille code using prior art electrotactile displays has been limited due to the poor resolution associated with electrotactile perceptions. See Kaczmarek et al., "Pattern identification as a function of stimulation current on a fingertip-scanned electrotactile display," Institute of Electronics and Electrical Engineers Transactions on Neural Systems and Rehabilitation Engineering, Vol. 11, No. 3, 2003, pp. 265-275, incorporated herein in its entirety by way of reference.

4. Additional Definitions

In this disclosure, when the finger used in reading Braille is referred to as stationary, it means substantially stationary. Substantially stationary includes the possibility of a back and forth finger movement that may be associated with personal reading habits even when reading, for example, from a moving substrate.

In this disclosure, reference to a finger used in reading Braille generally includes the option of a plurality of fingers. According to personal reading habits, Braille is often read using two or four fingers to sense Braille dots, for example, the index fingers of both hands, the index and middle fingers of both hands, or the index and middle fingers of one hand. If only one finger is used, it has often been the index finger of the dominant hand.

In this disclosure, reference to a finger used in reading Braille means more specifically the digital pulp of the finger, also called the finger pad.

In this disclosure, Braille dots are palpable protuberances forming dots in their raised state and which are configured to standard or non-standard Braille codes.

In this disclosure, the raised (protruding) state of a Braille dot is called the "high" state and is symbolized by a binary logic value of one or a filled circle; the unraised (lying flush) state of a Braille dot is called the "low" state and is symbolized by a binary logic value of zero or an unfilled circle.

In this disclosure, self-scrolling Braille means a transverse or lateral movement of Braille dot protuberances on a stationary substrate, to apparatus in the form of tactile displays to produce such a movement, and to methods of reading, writing, and character display employing such apparatus.

In this disclosure, according to the inventive self-scrolling Braille devices, Braille dots are said to be scrolling along their tracks in the direction of the finger by way of their transverse or lateral propagation. They are also said to be scrolling the finger. Since the motion is relative, the dots are said to be scrolling the finger and the finger is said to be scrolling the dots, even though the finger remains stationary on a stationary substrate. In producing the transverse or lateral propagation, the self-scrolling Braille device is said to be scrolling the dots to (or toward) the finger, which means the device is presenting them to the finger for reading in Braille, including the characters, text, and other coded significances which the dots represent.

In this disclosure, the term microprocessor includes a microprocessor as well as an associated power supply, memory device, software, and input/output electronics; it can also be interpreted to mean a computer, microcomputer, minicomputer, or microcontroller, including associated software and peripheral devices.

5. Additional Disclosure

A. Exemplary Control of the Display

Figure 55:
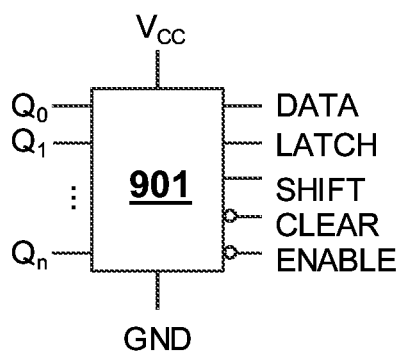
FIG. 55 is a schematic view of a prior art shift register assembly.

Referring to FIG. 55, an assembly of prior art shift registers 901 controlled by a microcontroller can be used to control individual pins, viz. half-pins, of the inventive Braille displays in the inventive manner of self-scrolling Braille. An exemplary shift register for this purpose is an integrated circuit 74HC595 shift register (Texas Instruments, Dallas, TX). An exemplary microcontroller is an Arduino Uno Rev3 microcontroller (arduino.cc). The microcontroller can be preprogrammed and powered by a battery or other power supply or it can be connected to a PC or Mac computer via a USB cable for electrical power, software upload, and serial data exchange. The shift register assembly 901 consists of a series of serially linked individual shift registers which together provide n+1 control signals Q ranging from 0 to n, where the ith control signal $Q_i$ controls the actuation of ith pin in the display. The shift register assembly 901 is powered by a power supply ($V_{cc}$, GND) and the binary state of the control signals Q is determined by a combination of binary signals supplied by the microcontroller (DATA, LATCH, SHIFT, CLEAR, ENABLE).

Figure 56:
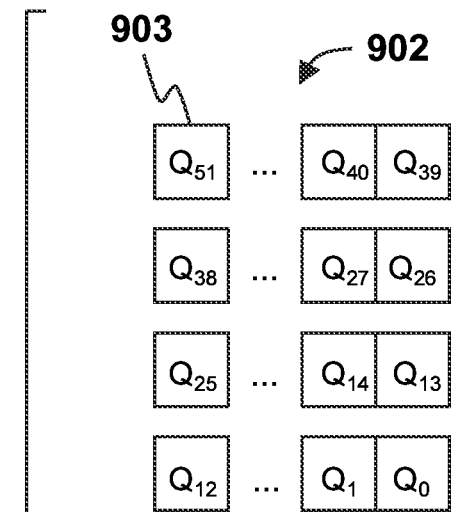
FIG. 56 is a schematic view of an inventive self-scrolling Braille display.

FIG. 56 shows an exemplary self-scrolling Braille display 902 according to the invention, comprising 52 half-pins 903 arranged in four rows of 13, wherein the up-and-down state of the ith half-pin 903 is determined by the binary state of the ith control signal $Q_i$. Such a display 902 is suitable for displaying 8-bit Braille, wherein individual Braille cells are configured to a 2-by-4 matrix of columns and rows.

In general, the control signals Q supplied to the display 902 by the shift register assembly 901 will not drive individual half-pins 903 directly; instead, the ith control signal $Q_i$ will control an electronic drive circuit to operate an actuator for raising and lowering the ith half-pin 903. For example, where the actuator is a solenoid for raising and lowering the half-pin 903 via a connecting member for mechanical actuation, for example, via a control wire or rod, or via a diaphragm to produce hydraulic pressure for hydraulic actuation, a prior art electronic drive circuit for controlling solenoids may be employed, such as the electronic drive circuit shown in FIG. 57. Though other actuator types will require different types of electronic drive circuits for actuation according to the art, in any case the electronic drive circuits, and in turn the corresponding actuators, will be controlled by control signals Q supplied to the display 902.

Figure 57:
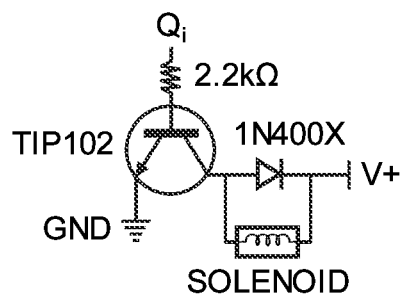
FIG. 57 is a schematic view of a prior art electronic drive circuit.

Referring to FIG. 57, a control signal $Q_i$ is supplied to the base of an NPN Darlington power transistor TIP102 via a 2.2 kΩ resistor. The emitter of the transistor is connected to ground and the collector is connected to one lead wire of the solenoid and the other lead wire of the solenoid is connected to a power supply V+. Opposite lead wires of the solenoid are connected to a flyback diode 1N400X, such as a 1N4001 general purpose rectifier diode.

An exemplary electronic drive circuit to drive the electrowetting-based actuators of Examples 1 and 2 takes the form of a low voltage serial to high voltage parallel converter (LV-to-HV SIPO converter) having at least as many high voltage push-pull outputs as there are actuators, combined with a DC-to-DC converter to supply a predetermined high voltage. The LV-to-HV SIPO converter will typically include its own internal shift register assembly which serves the function of the shift registers 901 of FIG. 55. An exemplary LV-to-HV SIPO converter for this purpose is the HV507PG-G low voltage serial to high voltage parallel converter with 64 high voltage push-pull outputs (Microchip Technology Inc., Chandler, AZ).

Figure 58:
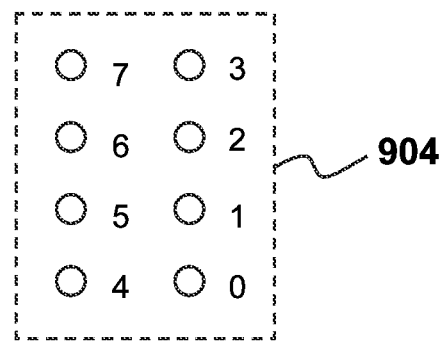
FIGS. 58 and 59 are top orthogonal views of two different 2-by-4 Braille cells having dot position assigned according to an inventive system.
Figure 59:
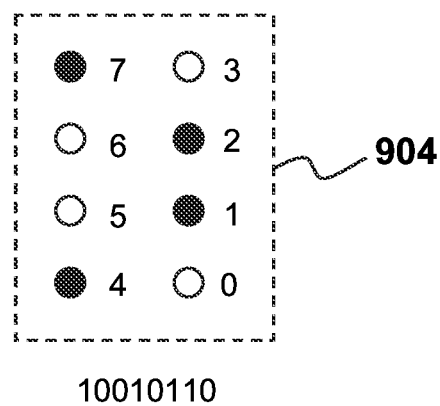

To facilitate programmable control of the display 902, a systematic method of representing Braille dot patterns has been devised for use with the invention, called the two-nibble encoding system or TNES. TNES systematically encodes an 8-bit sequence of Braille dots in the format MSB 76543210 LSB, where MSB is the most significant bit, LSB is the least significant bit, and the eight bit positions are numbered 0 through 7. FIG. 58 shows an 8-bit Braille cell 904 configured to a 2-by-4 matrix of two columns and two rows, wherein the eight Braille dots have been assigned bit positions 0 through 7 according to the TNES system. For example, FIG. 59 shows a dot pattern for the Braille cell 904 corresponding to the binary code point 10010110 in TNES. TNES is so called because in the FIG. 58 configuration the bits forming the left and right nibbles (4-bit portions) of the 8-bit byte are assigned to respective left and right columns.

Figure 60:
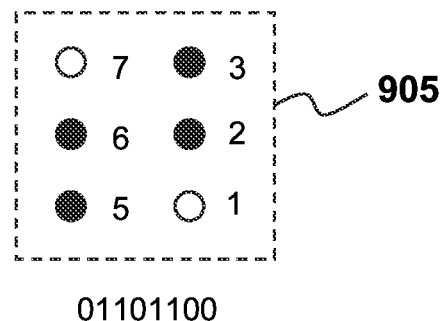
FIG. 60 is a top orthogonal view of a 2-by-3 Braille cell having dot position assigned according to an inventive system.

FIG. 60 shows a 6-bit Braille cell 905 configured to a 2-by-3 matrix of two columns and three rows and having a dot pattern corresponding to binary 01101100 according to the TNES system. Note that unused bit positions 0 and 4 (the bottom row) are ignored. Although it would be more systematic to use the bottom three rows of the FIG. 58 8-bit Braille cell 904 for the corresponding 6-bit Braille cell, the top three rows are being used here instead for an historical reason, namely, that 8-bit Braille codes tend to add a fourth row at the bottom of the standard 6-bit cell rather than at the top.

Figures 61, 62, 63, 64:
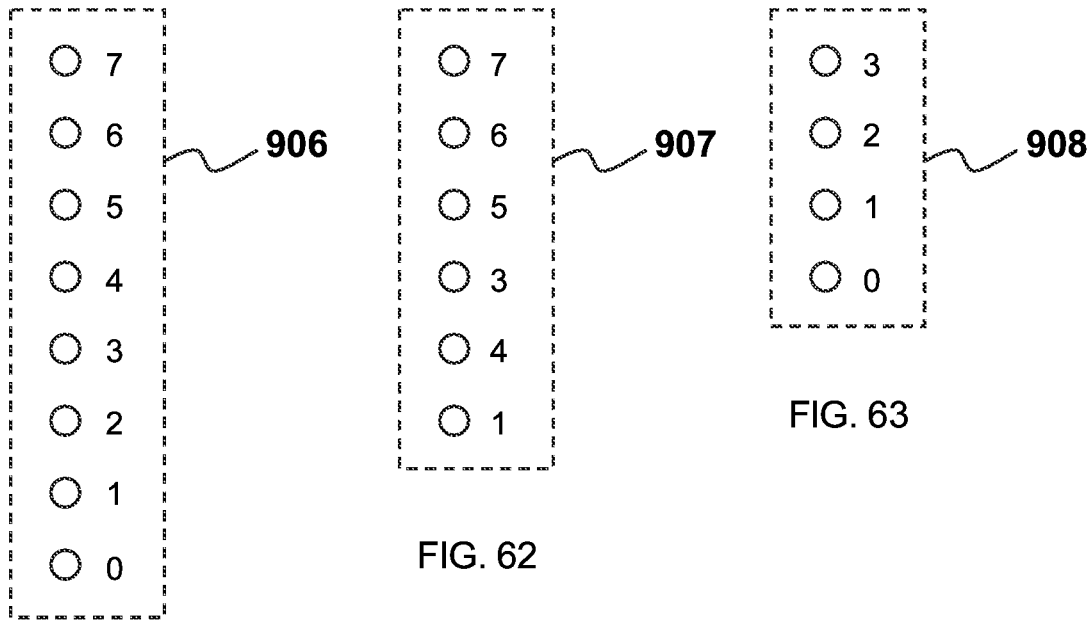

FIG. 61 shows a 1-by-8 8-bit Braille cell 906 which forms a matrix of one column and eight rows, with bit positions assigned using the TNES system. FIG. 62 shows a 1-by-6 6-bit Braille cell 907 which forms a matrix of one column and six rows, with bit positions assigned using the TNES system. It is easy to transfer pre-existing Braille codes for 2-by-4 and 2-by-3 matrices onto their respective 1-by-8 and 1-by-6 matrices, simply by transposing the bit positions of the FIG. 58 cell 904 as shown in FIGS. 61 and 62.

In general, predefined numbers of bit positions may be assigned in predefined arrangements. For example, FIG. 63 shows a 1-by-4 4-bit Braille cell 907 which forms a matrix of one column and four rows, with bit positions assigned using the TNES system. A short code such as a 4-bit Braille code can be used for such exemplary purposes as to haptically communicate instrument readings to an operator.

FIG. 64 shows a 256-element array ASCII2NEMETH [256] written in the C++ programming language which indexes the 6-bit Nemeth Braille Code in TNES by its corresponding ASCII code point (American Standard Code for Information Interchange). For example, the letter "t" is ASCII character 116 in decimal, and ASCII2NEMETH[116] =108, which is binary 01101100, which as shown in FIG. 60 equates to the Braille dot pattern in TNES corresponding to the letter "t" in the Nemeth Braille Code. Hence, the array ASCII2NEMETH[256] enables the dot patterns of the Nemeth Braille Code to be accessed by their corresponding ASCII codes via TNES. This array is useful for displaying Nemeth Braille on the inventive displays. Note that the Nemeth Code is 6-bit and that a zero has been used to represent cases where there is no counterpart in the Nemeth Code for the 8-bit code; however, the same principles may be extended to an arbitrary 8-bit Braille code.

FIG. 65 shows the reverse, namely, a 256-element array NEMETH2ASCII[256] written in the C++ programming language which indexes the ASCII code according to its 6-bit Nemeth Braille Code correspondent in TNES. This array is useful for displaying ASCII characters which are typed out by their Nemeth Code dot pattern on a chordic keyboard. For example, the chordic combination 01101100 corresponds to 108 in decimal and the TNES dot pattern for the letter "t" in Nemeth Braille; in turn, NEMETH2ASCII [108]=116, which corresponds to the letter "t" in ASCII code. The algorithm for converting the chordic combination to decimal is the sum of the TNES bit values raised to the power of their respective TNES bit positions. Note that the Nemeth Code is 6-bit and that a zero has been used to represent cases where there is no counterpart in the Nemeth Code for the 8-bit code; however, the same principles may be extended to an arbitrary 8-bit Braille code. The 8-bit array can also include code points for formatting and commands.

The Unicode Standard 9.0 (Unicode, Inc., Mountain View, CA) for displaying Braille dot patterns is provided over the hexadecimal range U+2800 to U+28FF. The Unicode standard is not as systematic as TNES. The reason for the less systematic Unicode approach is historical, namely, the standard 6-bit cell is historically numbered 123456 and a fourth row is added at the bottom for 8-bit Braille as U.S. Pat. No. 12,374,568. To convert between Unicode and TNES code points, Braille patterns in Unicode are numbered in terms of bit position according to MSB 01263457 LSB in contrast to corresponding Braille patterns in TNES which are numbered according to MSB 76543210 LSB, with hexadecimal 2800 being added to arrive at the Unicode value.

FIG. 66 shows a 256-element array UTF2TNES[256] written in the C++ programming language which decodes the Unicode standard in terms of the TNES standard. Since the array ranges from 0 to 255 then hexadecimal 2800 has to be subtracted from the Unicode Transformation Format (UTF) code point. For example, UTF 2801−2800=1 and UTF2TNES[1]=128; in other words, UTF 2801 is decimal 128 in TNES.

FIG. 67 shows a 256-element array TNES2UTF[256] written in the C++ programming language which decodes the TNES standard in terms of the Unicode standard. For example, the TNES dot pattern 00000001 is decimal 1 and TNES2UTF[1]=2880, which references the same dot pattern in Unicode. FIG. 68 shows a 256-element array TNES2UTFDEC[256] written in the C++ programming language which also decodes the TNES standard in terms of the Unicode standard, except in this case the array yields the decimal version of the UTF code points minus hexadecimal 2800.

FIG. 69 shows an exemplary software program for the Arduino microcontroller written using Arduino Version 1.6.13 (arduino.cc), which is based on the C++ programming language, to control the FIG. 56 Braille display 902 via the FIG. 55 shift register assembly. The program is written in a parameter format, so that it can be configured to a variety of user preferences. For example, at line 17, ColWidth[4]={2, 2, 2, 6} provides a Braille cell configured to dots composed of two half-pins each, with two half-pin spacing between left and right column dots, and six half-pin spacing after the right column dots. Changing the parameters, for example, to ColWidth[4]={3, 2, 3, 6} provides a Braille cell configured to dots composed of 3 half-pins each (viz. pins) or, more precisely, 3 one-third pins. Noted is that "pins" is the generic description for pins, whether employed as single pins, half-pins, one-third pins, and so forth.

The exemplary program shown in FIG. 69 is non-limiting. As will be appreciated by one skilled in the art of computer software and electrical engineering, the individual pins associated with Braille displays according to the invention can be operated in any pattern or frequency of raised and unraised states under software controls, for example, by programmatically manipulating the control signals Q of the FIG. 55 shift register array 901 to control the actuation of the pins, for example, the half-pins 903 of the FIG. 56 display 902.

Standard Braille codes for 2-by-3 6-bit Braille cells have been established for languages throughout the world. See "World Braille Usage," 3rd. ed., Washington, D.C.: National Library Service for the Blind and Physically Handicapped, Library of Congress, 2013. These codes can be programmatically accessed using the TNES system, by forming an array to assign ASCII characters to the corresponding dot patterns which are numbered using TNES code points. This has been done for the Nemeth Braille Code in FIG. 64. More generally, where UTF code points are used instead of the 0 to 255 code points of ASCII, the array can either be dimensioned according to the range of the UTF code points or a constant value can be subtracted from the UTF code points so that the array can be indexed using the 0 to 255 range. For example, the latter has been done in FIG. 66 in the case of the array UTF2TNES[256], which converts UTF code points ranging from hexademical 2800 to 28FF to their corresponding TNES code points.

Rather than being limited to traditional Braille cell configurations, the inventive Braille displays can also display what are here called "inflected" Braille characters. By inflected is meant that one or more pins are raised in forming the character than are provided within the ordinary left and right columns for displaying dots in traditional Braille cells.

Figure 70:
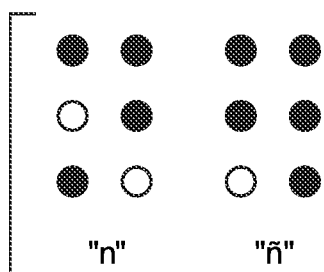
FIG. 70 is a top orthogonal view of prior art representations of the letters "n" and "ñ" (enye) in Braille.

For example, consider the Spanish letters "n" (ene) and "ñ" (enye) and their corresponding Braille cells in traditional Spanish Braille, as shown in FIG. 70. Even though the sighted "n" (ene) looks similar to the sighted "ñ" (enye), the traditional Braille versions are dissimilar. Additionally, the TNES code point 206 (binary 11001110) is used for the "ñ" (enye) in traditional Spanish Braille but in Nemeth Braille it would be used for the "]" (closed bracket) instead. Unfortunately, differences such as this make it harder for bilingual readers of Spanish and English Braille to switch back and forth.

Figure 71:
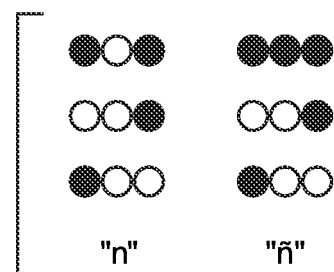
FIG. 71 is a top orthogonal view of an inventive representation of the letters "n" and "ñ" (enye) in Braille.

An alternate approach, as shown in FIG. 71, is to employ an inflected version of the Braille letter "n" (ene) for the Braille "ñ" (enye). In this example, rather than being left blank (unraised), the interdot spaces between the left and right columns of dots in the topmost row are raised to yield an inflected "n" (ene), that is to say, the "ñ" (enye). Programmatically, addressing ASCII code point 164, which corresponds to the "ñ" (enye), can be used invoke a subroutine to inflect the "n" (ene) according to a predetermined format. Not only does this produce a Braille "ñ" (enye) which looks similar to the "n" (ene), but it also allows the TNES code point 206 (binary 11001110) to be used for the "]" (closed bracket) in both languages.

Figure 72:
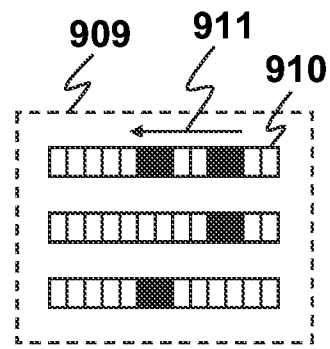
FIG. 72 is a top orthogonal view of the letter "n" being scrolled on an inventive self-scrolling Braille display.
Figure 73:
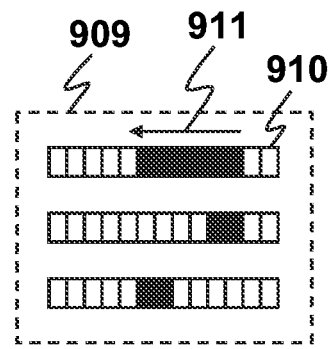
FIG. 73 is a top orthogonal view of the letter "ñ" (enye) being scrolled as an inventive inflected character on an inventive self-scrolling Braille display.

FIGS. 72 and 73 show how the regular and inflected forms corresponding to the "n" (ene) and "ñ" (enye) could appear on an exemplary inventive Braille display 909 having three rows of 13 columns of individual half-pins 910. An arrow indicates the direction of transverse wave 911 produced by a sequential raising and lowering of the half-pins 910. The raised and unraised states of the half-pins 910 are indicated by filled and unfilled boxes, respectively. Referring to FIG. 73, rather than being blank (unraised), the interdot spaces (spaces between left and right Braille cell columns) of the topmost row are raised to form the "ñ" (enye), which referring to FIG. 72, is otherwise based on the same dot pattern as used for the "n" (ene). For some users, using inflected Braille characters in this or similar fashion may prove to be a more natural way for displaying inflected characters. Though the example of FIG. 73 uses the interdot spaces of the topmost row, other columns and rows may be used to provide inflections for various characters.

A problem encountered in reading traditional 2-by-3 Braille, which is the standard version of 6-bit Braille, is that (here using the Nemeth Braille Code as an example) seven characters {"a", "b", "k", "l", "1", "2", """} only have dots in the left column and seven characters {",", "@", """, "_", """, ".", ";"} only have dots in the right column. The problem with this is that it can be hard to tell which column is which when reading Braille and, hence, which character is which. The seven pairs of characters which have the same dot patterns but in opposite columns and thus lend themselves to confusion are: {"a", "@"}, {"b", """}, {"k", "."}, {"l", "_", "1", """, "2", ";"}, and {""", ";"}.

Figure 74:
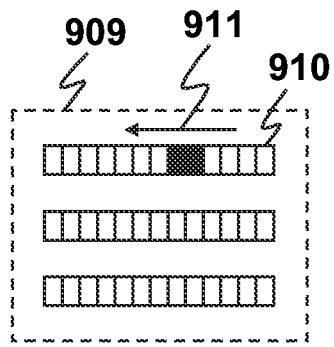
FIG. 74 is a top orthogonal view of the letter "a" being scrolled on an inventive self-scrolling Braille display.
Figure 75:
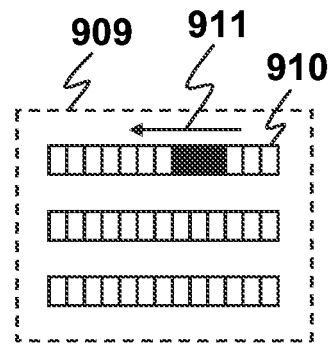
FIG. 75 is a top orthogonal view of the character "@" being scrolled on an inventive self-scrolling Braille display.

An exemplary solution to this problem is to employ different numbers of pins (viz. half-pins) in composing the dots of the left versus right columns of the Braille cell in cases where dots are present in only one of the columns. This practice can be extended similarly to 2-by-4 Braille, which is the standard form of 8-bit Braille. For example, referring to FIGS. 74 and 75, the letter "a" can be distinguished from the character "@" by using two pins (viz. two half-pins) for the "a" as shown in FIG. 74 and three or more half-pins (viz. pins) for the "@" as shown in FIG. 75. In other words, a greater number of pins are used to make dots in the right column of the Braille cell when only the right column has dots. Accordingly, the dots having a greater width will signify right column dots to the user in cases where only one column has any dots. But in the other cases, where only the left column has dots or when both the left and right columns have dots, all dots can have the same width in pins regardless of column.

When left and right columns are distinguishable, some blank spaces can be truncated to help speed the flow of reading. For example, when only one column has dots, the spaces allocated to the opposite column and the interdot space can be truncated.

Some Braille characters are relatively simple, for example, the letter "a" in the Nemeth Braille Code. But some Braille characters are more complex, for example, the letter "n" in Nemeth Braille. In theory, it will take users longer to recognize the more complex Braille characters, that is to say, the more complex dot patterns associated with the characters. Put another way, character complexity can be defined and determined by studying the length of time it takes the user to recognize the given character. With this information in hand, the inventive Braille display can be made to scroll the simpler characters at a faster rate than the more complex characters. For example, under programmatic controls, once the dots of a given character which is traveling at its own predefined scrolling rate has passed, the passage of the next character on the display can be accelerated or decelerated, as the case may be, to its own predefined scrolling rate. Accordingly, different characters can be assigned variable scrolling rates.

To develop a Braille code for a given language, dot patterns of less complexity, as measured by the length of time it takes the user to recognize the given pattern, can be assigned to characters having a higher letter frequency in the language.

In general, the inventive displays can be made to programmatically scroll Braille characters from right to left, as is accorded to reading text from left to right in languages such as English; from left to right, as is accorded to reading text from right to left in languages such Arabic, Farsi, and Hebrew; from bottom to top, as is accorded to reading text from top to bottom in languages such as traditional Chinese; or from top to bottom. They can also be made to flip the orientation of text, in the same way that a tablet computer switches the orientation of its display depending on which way the user is holding it. For example, the orientation of Braille text can be flipped on the inventive display when the user switches a finger-worn Braille display from left to right index fingers, so that the relative orientation of the text remains the same with respect to the user in either case.

B. Layout of the Display

Noh et al. note that "[i]t is well known that reading Braille enhances tactile sensory ability according to the principle that using Braille enhances the plasticity of the somatosensory area of the brain. (Citations omitted)" Their study found that "using Braille may develop the sensitivity of the median nerve in the blind, especially in terms of electrical sensitivity." They state that "[t]he thumb, index finger, middle finger, and palm are areas innervated by the median nerve. (Citation omitted)" Noh et al., "Differences in two-point discrimination and sensory threshold in the blind between braille and text reading: a pilot study," Journal of Physical Therapy Science, Vol. 27, No. 6, pp. 1919-1922, 2015; p. 1921, col. 2.

The two-point test determines what is the closest that two points can be in contact with the user's skin before the user will perceive the two points as one point rather than as two. Two-point discrimination is important for reading Braille because the finger must distinguish dots which are very close together. As Noh et al. describe, this ability improves with practice reading Braille. But it can be hard to learn Braille at first because the closeness of traditionally spaced Braille dots tends to be near or below the initial two-point threshold of many prospective Braille users. This can impede a beginner's progress in learning to read Braille.

For example, according to Wikipedia (Two-point discrimination) the two-point threshold of the finger ranges from 3 millimeters (0.118 inches) to 8 mm (0.315 inches). But the traditional standard of Braille on embossed on paper is for dots to be spaced apart a mere 0.092 inches on center (2.34 millimeters) (horizontally or vertically, but not diagonally). See National Library Service for the Blind and Physically Handicapped, ibid., p. 3. Though spacing as close as this is needed to conserve space when using embossed paper to print Braille, this is not an issue for the inventive Braille displays, which can present unlimited text on a finger-sized hotspot region.

Figure 76:
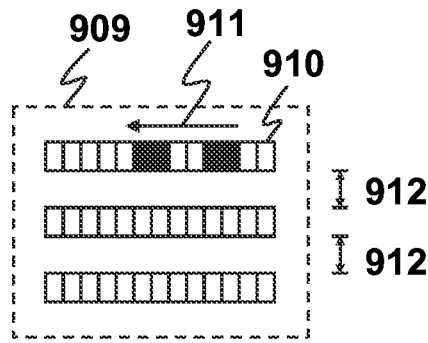
FIGS. 76 and 77 are top orthogonal view of two different versions of the character "c" being scrolled on an inventive self-scrolling Braille display.
Figure 77:
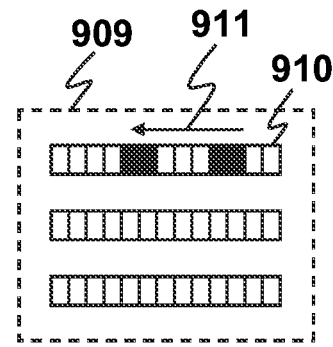

Referring to FIG. 76, the inventive Braille displays can be produced with a spacing distance 912 between rows as is suited to user preferences. For example, for reading with the finger, the spacing distance 912 between rows can range from 2 millimeters (0.079 inches) up to 8 millimeters (0.315 inches) or even more depending on the length of the user's finger. Similarly, referring to FIG. 77 in view of FIG. 76, the interdot spacing (spacing between the left and right columns of dots in a Braille cell) can be widened or narrowed according to user preferences. For example, as shown in FIG. 76, the interdot spacing is two half-pins 910; in contrast, as shown in FIG. 77, the interdot spacing has been increased to three half-pins 910 to provide a wider spacing between the left and right columns of dots.

As Braille reading skill improves, the user may prefer to switch over to an embodiment of the inventive Braille displays which has been produced with rows having a closer spacing as well as with an interdot spacing which has been decreased to produce columns of dots which are spaced closer together. Also noted is that spacing distances can also be widened for reading with other parts of the body which have a wider two-point threshold distance in contrast to reading with the finger or other more sensitive area.

C. Visual Monitor Screen

Figure 78:
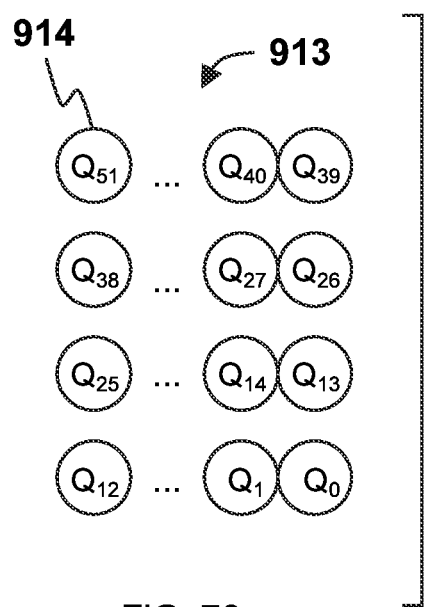
FIG. 78 is a schematic view of an inventive monitor screen for an inventive self-scrolling Braille display.
Figure 79:
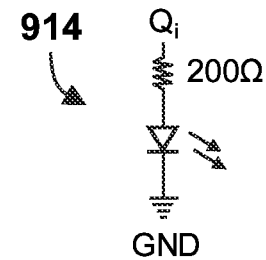
FIG. 79 is a schematic view of a prior art electronic drive circuit.

For sighted users as well as sighted parents and teachers, it will be helpful to have visual feedback regarding the text being scrolled by the inventive Braille display. Referring to FIG. 78 in view of FIGS. 55 and 56, for this purpose an LED light monitor screen 913 is provided, wherein the ith LED light 914 is controlled by the ith control signal $Q_i$. Being controlled by the same control signals Q, the LED monitor screen 913 follows the same pattern as pins 903 on the Braille display 902, whereby a lighted LED light 914 corresponds to a raised pin 903 and an unlit LED light 914 corresponds to an unraised pin 903. In general, the control signals Q supplied to the Braille display 902 via the shift register assembly 901 will suffice to drive individual LED's 914 directly using the exemplary prior art LED circuitry shown in FIG. 79.

The inventive Braille displays may be combined with a visual alphanumeric display which visually displays alphanumeric text corresponding to what is being displayed on the Braille display. For example, referring to FIG. 13, the alphanumeric visual display 57 of the children's Braille tablet 55 can provide indicia of what the child is reading. The alphanumeric visual display 57 will typically decode ASCII code points. The ASCII code points can be programmatically supplied to the alphanumeric visual display 57 in synch with displaying the corresponding Braille characters on the Inventive Braille Displays.

D. Constant Contact Versus Tapping Modes of Self-Scrolling Braille

To practice the inventive Braille displays using weak actuators for raising the pins of the display (viz. half-pins) up and down, a tapping mode of self-scrolling Braille is provided. In contrast, the invention also provides a constant contact mode of self-scrolling Braille which generally requires stronger actuators to implement.

Figure 80:
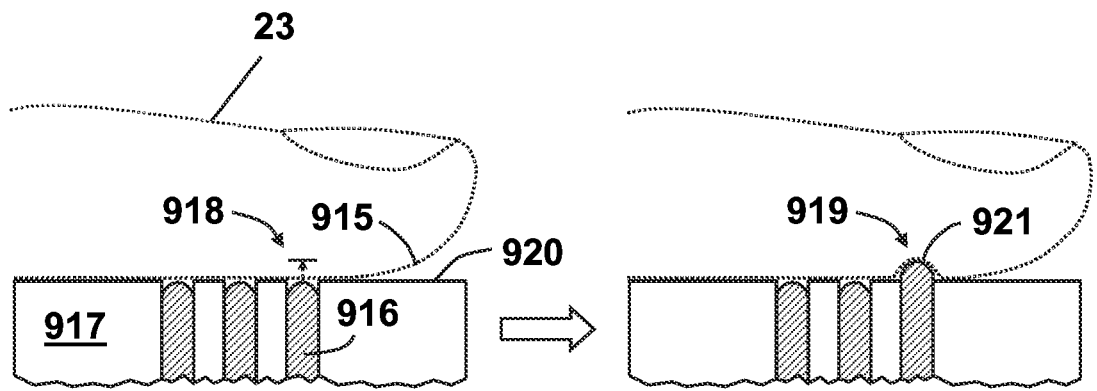
FIG. 80 is a partial side cross-sectional view of an inventive constant contact mode for displaying an inventive self-scrolling Braille.

FIG. 80 shows the constant contact mode and illustrates the nature of the problem. According to the constant contact mode, the user's skin, which in this example is the skin 915 of the finger pad of the left index finger 23, is in constant contact with the Braille pins 916 of the inventive Braille display 917 in both the unraised 918 and raised states 919 while resting on a top surface 920 of the Braille display 917. In constant contact mode, then order to depress the skin to produce an indentation 921 so as to provide a palpable sensation, the force supplied by an underlying actuator to raise the pin 916 must be no less than an opposing force provided by the elasticity of the skin 915. Unfortunately, some actuators are not able to supply the requisite force needed to achieve constant contact mode actuation.

Figure 81:
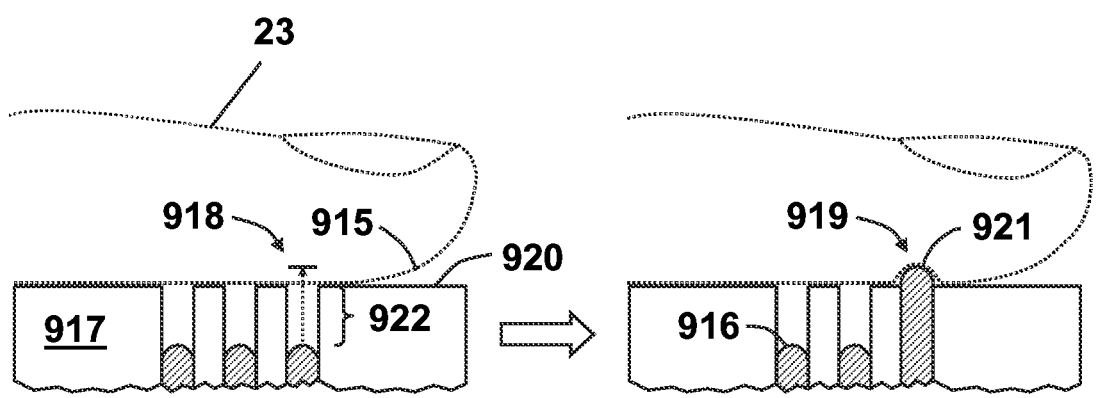
FIG. 81 is a partial side cross-sectional view of an inventive tapping mode for displaying an inventive self-scrolling Braille.

Advantageously, a tapping mode is provided to overcome this limitation. Referring to FIG. 81, according to the tapping mode of self-scrolling Braille, the pins 916 are not in contact with the user in the unraised state 918, but when actuated are allowed to accelerate freely within a void region 922 until they tap against the user to signify the raised state 919. According to Newton's second law, F=ma, where F is the force which will produce an acceleration a on an object of mass m. Hence, providing the void region 922 will allow the pin 916 to be accelerated under the force of its actuator over a predetermined distance in traversing the void region 922, in which case the pin 916 will acquire a momentum so as to impinge upon the skin 915 of the finger 23 with a force greater than the force of actuation provided by the underlying actuator. By impacting against the skin 915 with enough force to cause a palpable indentation 921 in the skin, the user will perceive the impingement as a tap. The self-scrolling Braille effect is produced by producing these taps in preprogrammed succession along respective rows of pins 916 disposed in the Braille display 917.

E. Integration with Various Devices

In general, referring to an exemplary FIG. 2A, the base, viz. substrate 4, in which the pins, viz. half-pins 5, of the inventive self-scrolling Braille displays 10 are disposed, can form part of an apparatus selected from the set consisting of a worn device, a finger-worn device, a desktop device, a portable device, a mobile device, a tablet computer, a laptop computer, a desktop computer, a smartphone, a smartwatch, a smartdevice, a handheld device, a directory, a kiosk, an instrument panel, a control mechanism, a button, a knob, a handle, a sign, a label, and a container. Accordingly, the user will be able to read Braille via a portion of the user's body in contact with a surface of the apparatus containing the substrate 4.

F. Interactive Reading

The invention provides a method of interactive reading, in the form of temporally pairing a self-scrolling Braille display with another process or event, whereby the other process or event is performed or recorded in computer-controlled synchronization with a presenting of dots, words, or characters on the self-scrolling Braille display. For example, the other process or event can perform a text-to-speech function in synchronization with the self-scrolling Braille display, whereby an audio device plays a spoken version of a text or characters being presented to a learner of Braille. To give another example, the other process or event can monitor and record a user heart rate, brain waves, breathing rate, perspiration rate, or other physiological variable relating to an interaction of mind and body and which record is made in correspondence to a record of text as said text was presented to the user in Braille. To give yet another example, the other process or event can present a user with an aroma, vibration, sound, or other stimulus in synchronization with a passage in Braille, whereby the user is presented with said stimulus in synchronization with a reading of the passage.

Figure 106:
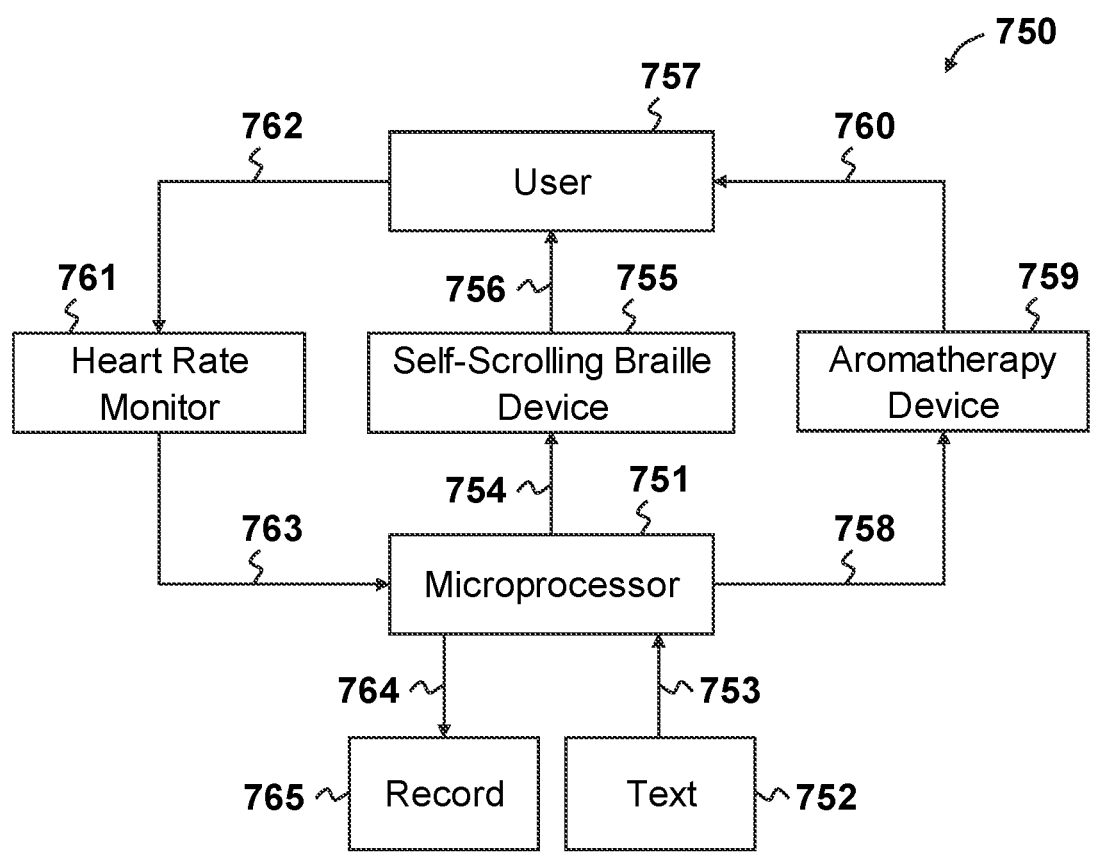
FIG. 106 is a block diagram of an exemplary method of interactive reading according to the invention.

FIG. 106 shows an exemplary method of interactive reading 750 according to the invention. Referring to FIG. 106, the method includes such exemplary steps as: a microprocessor 751, receiving text 752 as text input 753; the microprocessor 751, sending programmatic instructions 754 to a self-scrolling Braille device 755 to cause the text 752 to be displayed on the self-scrolling Braille device 755 as self-scrolling Braille 756 for reading by a user 757; the microprocessor 751, sending programmatic instructions 758 to an aromatherapy device 759 to release an aroma 760 for smelling by the user 757 in sync with the displaying of the text 752 as self-scrolling Braille 756; a heart monitor 761, monitoring a heart rate 762 of the user 757 and sending a heart rate data 763 to the microprocessor 751; the microprocessor 751, writing 764 heart rate data 763 to a record 765 in correspondence to a record of the text input 753 received and displayed as self-scrolling Braille 756.

G. Transducer-Based Self-Scrolling Braille

Electrotactile Braille displays are well known in the prior art. These employ electrical transducers to apply electrical shock to the finger using an array of electrodes configured to a Braille cell. Unfortunately, users experience discomfort and fatigue due to an effect of the electrical stimulus on the finger or other body part. However, it is contemplated that if a suitable transducer is devised, then an array of such transducers elements could be employed in place of the physical pins 903 of the FIG. 56 Braille display 902 to produce the self-scrolling Braille effect. It is further contemplated that a smoother sensation of Braille characters moving across the display will be produced by employing a train of at least two activated adjacent transducer elements, with individual leading and trailing transducer elements being activated and deactivated in succession to move the train along a given row, whereby the activated and deactivated transducer elements serve in analogy to raised and lowered half-pins.

H. Modification of Examples 1 and 2

Figure 82:
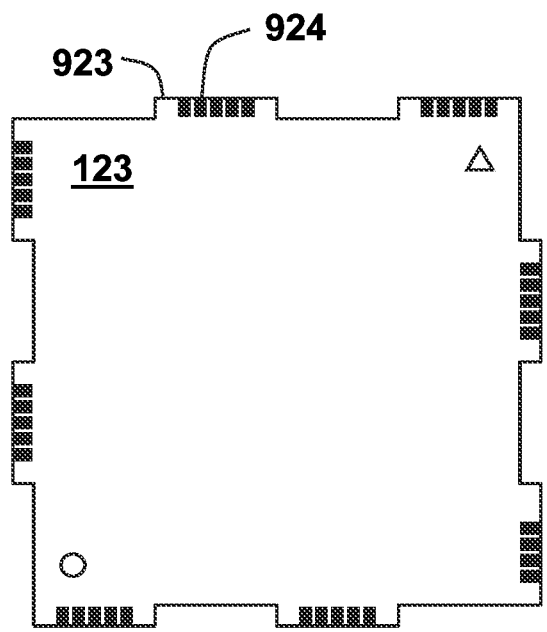
FIGS. 82 and 83 are top orthogonal simplified views of two different microfabricated planar substrate layers for making the inventive display panel of Example 1.
Figure 83:
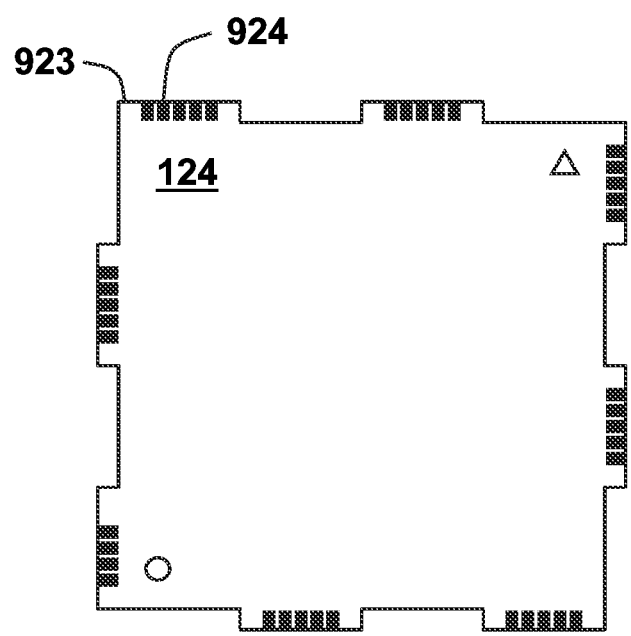

FIGS. 82 and 83 show simplified views of the upstroke and downstroke layers 123, 124 of Example 1, as shown in FIGS. 25 and 26, and which layers have been modified by adding electrical contact tabs 923 on the outer edge of the substrate to eliminate the need for electrical vias 138. Referring to FIGS. 82 and 83 in view of Example 1, though not shown in the simplified views of FIGS. 82 and 83, according to this modification electronic traces 144 proceeding from respective upstroke and downstroke electrodes 106, 107 are routed to electrical contacts 924 disposed on the tabs 923 to form edge connectors. The tabs 923 of alternating upstroke and downstroke layers 123, 124 are staggered so that external electrical connections can be made with their respective electrical contacts 924. A similar approach can be taken with the Example 2 embodiment.

Figure 85:
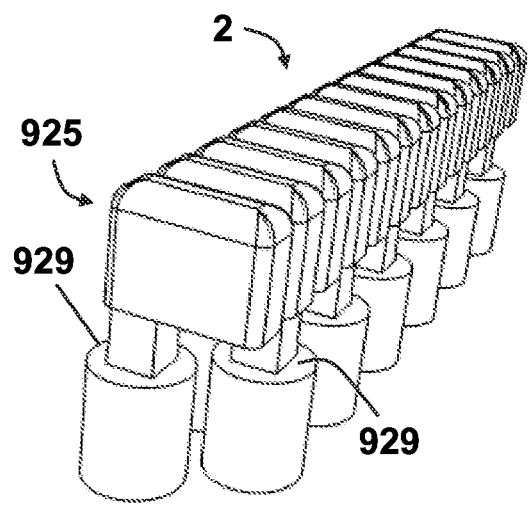
FIGS. 85 and 86 are side perspective views of a track of inventive Braille pins.
Figure 86:
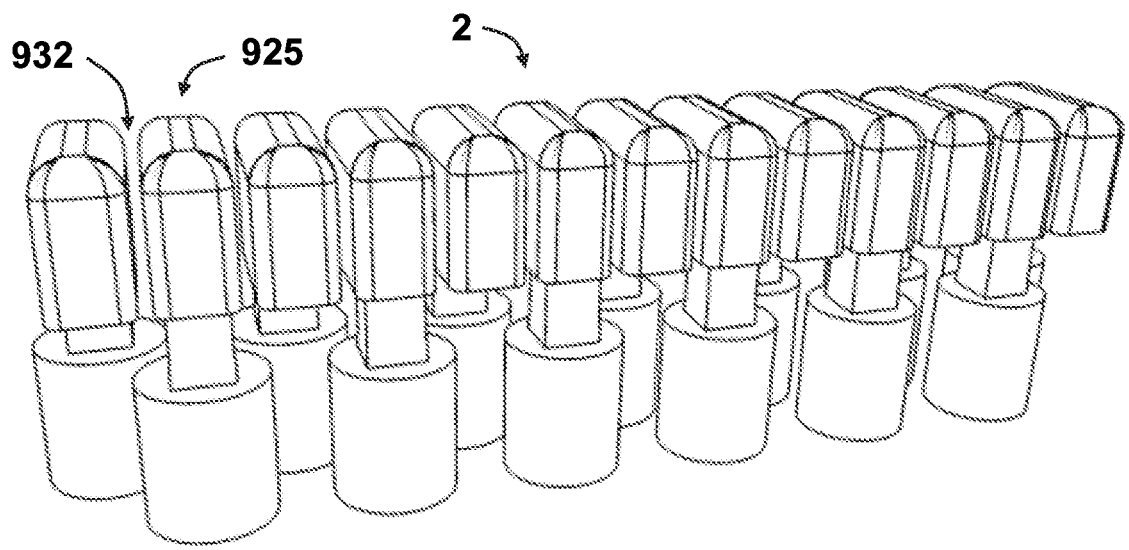

Referring to FIG. 3 in view of FIGS. 21, 24, and 31, Examples 1 and 2 employ half-pins 5 having with oblong pistons 15 which fit into voids 135 of a corresponding shape disposed in the piston chamber layer 103 (FIG. 24). However, circular pistons may promote a better hydraulic seal than the oblong-shaped pistons 15. Examples 1 and 2 can be modified to accommodate half-pins having circular pistons by replacing the piston chamber layer 103 (FIG. 24) and retainment layer 102 (FIG. 23) with new layers configured for receiving circular-piston half-pins. Exemplary half-pins and layers for this modification are shown in FIGS. 84, 85, and 86 (showing the half-pins) and FIGS. 87, 88, and 89 (showing the layers, in order from bottommost to topmost).

Figure 84:
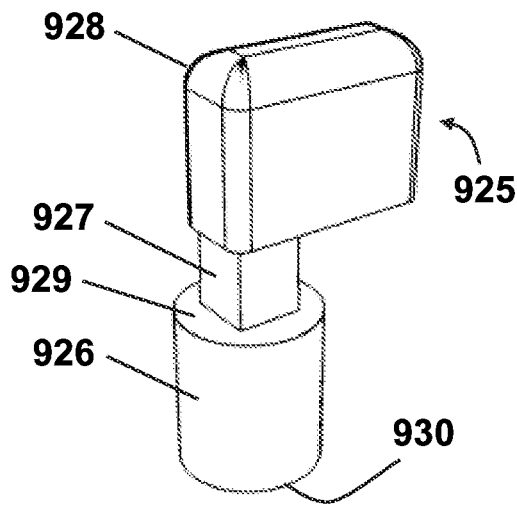
FIG. 84 is a side orthogonal view of an inventive Braille pin.

FIG. 84 shows a circular-piston half-pin 925 having a circular piston 926, a connecting shaft 927, a rounded head 928, an upstroke ledge 929, and a downstroke ledge 930. FIG. 85 shows a track 2 formed by a series of 13 of the circular-piston half-pins 925. Referring to FIG. 85, the circular-piston half-pins 925 are staggered and their heads 928 alternate in direction so that their upstroke ledges 929 always face an outer perimeter. FIG. 86 shows a void 932 left between adjacent circular-piston half-pins 925 to reduce friction for smooth up-and-down movement.

Figure 87:
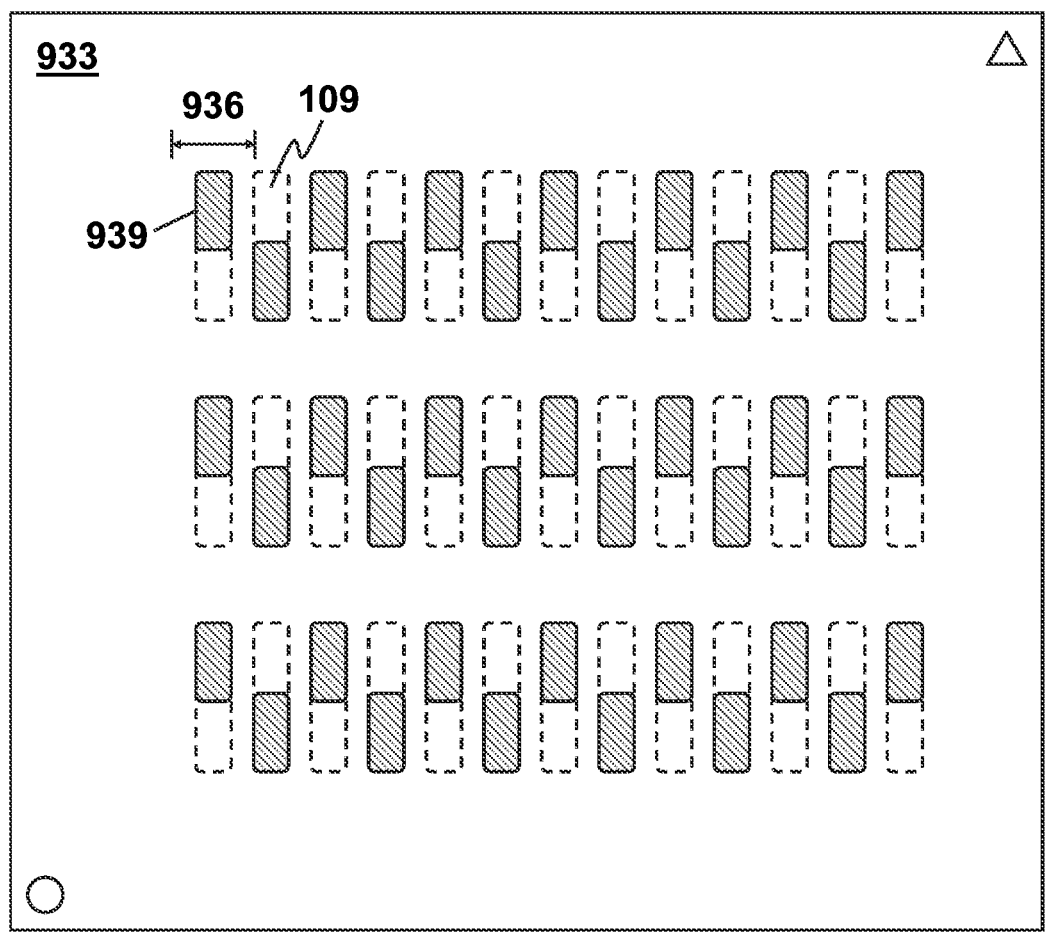
FIGS. 87, 88, and 89 are top orthogonal views of three different microfabricated planar substrate layers for making the inventive display panels of Examples 1 and 2.
Figure 88:
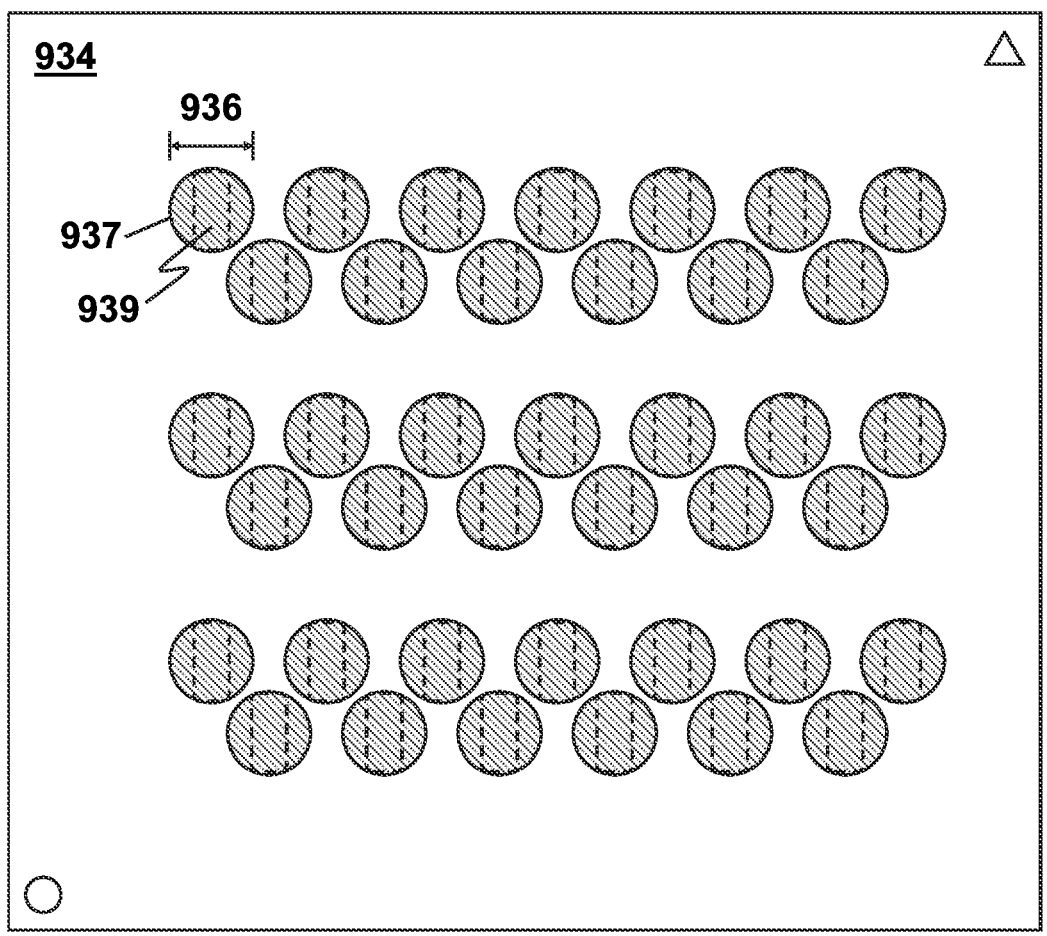

FIG. 87 shows a droplet channel isolation layer 933. FIG. 88 shows a circular-piston piston chamber layer 934 having voids 937 disposed therethrough to form circular piston chambers which are sized to a diameter 936 of the circular pistons 926. Referring to FIG. 87 in view of FIG. 88, the reason for staggering the circular-piston half-pins 925 is to allow for the diameter 936 of the pistons 926 to be greater than would be possible without staggering; and, the reason for the isolation layer 933 is that it has voids 939 disposed therethrough to limit fluidic communication with a given piston chamber to the droplet channel 109 immediately underneath. The voids 939 provided by the isolation layer 933 are required when the diameter 936 of the void 937 forming a given circular piston chamber is so great that it might also communicate fluidically with neighboring droplet channels 109 rather than only with the droplet channel 109 immediately underneath.

Figure 89:
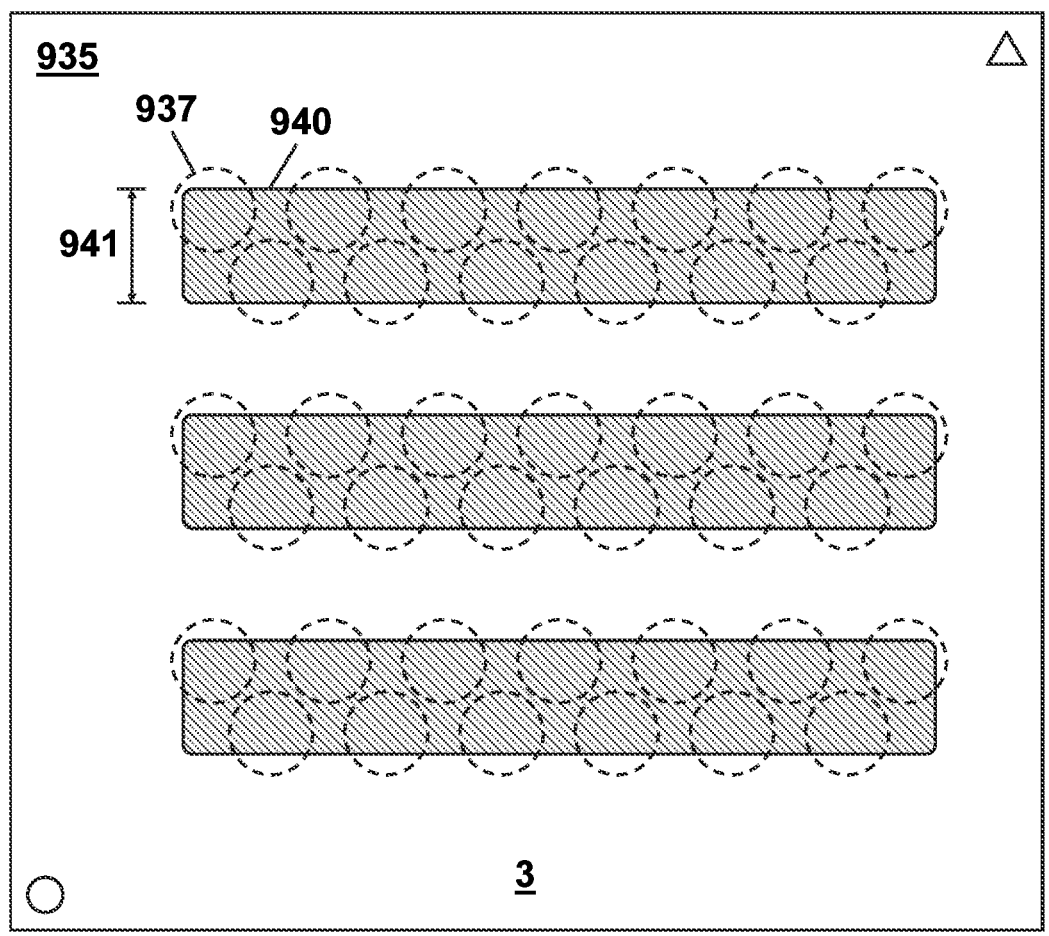

FIG. 89 shows a retainment layer 935 for the circular-piston half-pins 925 which keeps them from falling out of the circular-piston piston chamber layer 934 underneath. Referring to FIG. 89 in view of FIGS. 21 and 31, the retainment layer 935 also provides the surface 3 on which the finger rests in contact with the circular-piston half-pins 925 to read the self-scrolling Braille. Referring to FIG. 89 in view of FIGS. 2A, 2B, 21, 31, 84, 85, 86, 87, and 88, the retainment layer 935 has three voids 940 disposed therethrough, corresponding to one per track 2, which are sized to retain the half-pins 925. A width 941 of the voids 940 is sized so that the upstroke ledges 929 of the half-pins 925 will contact the bottom of the retainment layer 935 to limit the stroke distance and to retain the half-pins 925.

In general, the thickness of the isolation layer 933 is nominal; the thickness of the circular-piston piston chamber layer 934 is equal, for example, to the height of the circular piston 926 plus the height of the connecting shaft 927; the height of the connecting shaft 927 is equal to not less than the stroke distance of the half-pins 925 in going between the raised and unraised states; and, the thickness of the retainment layer 935 is not so great that the top of the half-pin head 928 would be below the surface 3 of the retainment layer in the raised state.

Noted is that additional exemplary techniques for forming or patterning substrate layers include die cutting and computer numerical control (CNC) machining.

I. Other Half-Pin Embodiments

As a variation on the FIG. 84 embodiment, a circular-piston half-pin can be provided having more than one circular piston in line with an underlying droplet channel via respective piston chambers. Alternatively, a peg can be added in place of the additional piston which does not communicate with the underlying droplet channel, but merely serves as a guide to prevent the half-pin from swiveling.

Figure 90:
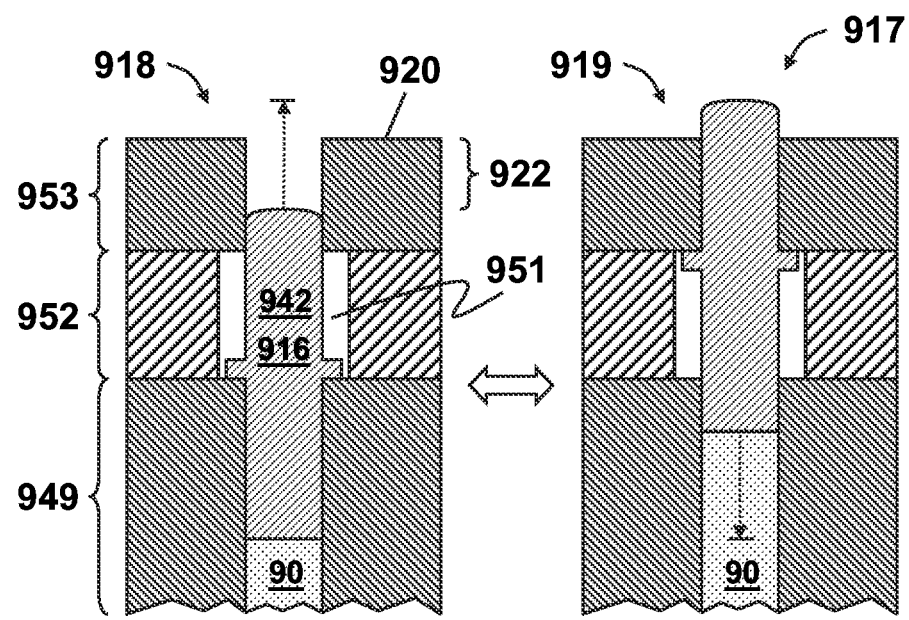
FIG. 90 is a partial side cross-sectional view of an inventive Braille pin configured within substrate layers to an inventive tapping mode of hydraulic actuation.

FIG. 90 shows a pin embodiment suitable for the tapping mode of self-scrolling Braille. Referring to FIG. 90 in view of FIG. 81, the Braille pin 916, which in FIG. 90 is more specifically an elongated tapping mode Braille pin 942, traverses the void region 922 which allows it to accelerate before impacting the user's skin in going from the unraised state 918 to the raised state 919.

Figures 91, 92, 93:
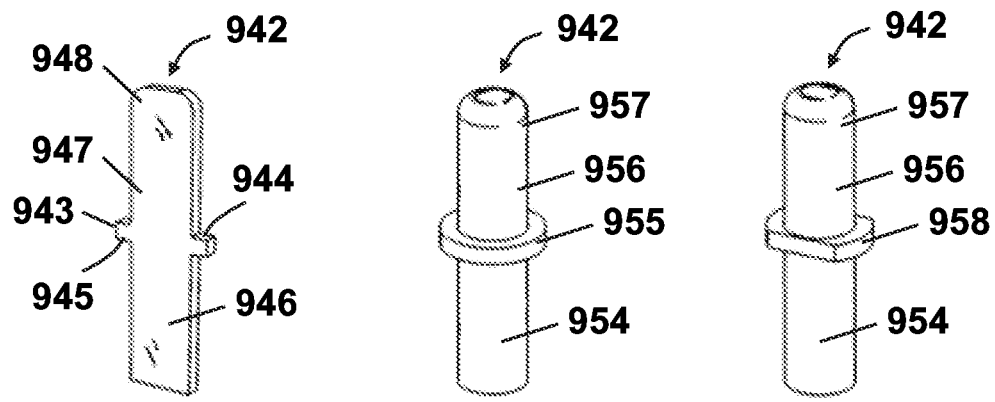
FIGS. 91, 92, and 93 are side perspective views of three different inventive Braille pins.

FIGS. 91, 92, and 93 show an exemplary variety of the elongated tapping mode Braille pin 942.

Referring to FIG. 91 in view of FIG. 90, the Braille pin 942 can have a flat, cruciform shape; a pair of cleats 943 at opposite sides to provide both an upstroke ledge 944 and a downstroke ledge 945; a flat piston 946; a connecting shaft 947; and, a head 948. Referring to FIG. 90, as an example of operation, the pin 942 is actuated under hydraulic forces via a pressurized hydraulic fluid 90 within a piston chamber layer 949. In any case, the cleats 943 traverse a void region 951 within a spacer layer 952, the upstroke ledge 944 stops an upward motion of the pin 942 in contact with a bottom surface of a retainment layer 953, and the downstroke ledge 945 stops a downward motion of the pin 942 in contact with a top surface of the piston chamber layer 949.

Referring to FIG. 92 in view of FIGS. 90 and 91, alternatively the pin 942 may have a round shape including a round piston 954, a ring cleat 955, a round connecting shaft 956, and a round head 957. Referring to FIG. 93 in view of FIGS. 90, 91, and 92, the ring cleat 955 can be modified by squaring it off, as shown, or by giving it a notch; by adapting the spacer layer 952 to receive the ring cleat 955 which has been notched or squared off, the pin 942 will not swivel.

Referring to FIGS. 91, 92, and 93, in general the parts of these exemplary elongated tapping mode Braille pins 942 can be interchanged or modified. For example, a round head can be combined with a flat piston. To give another example, a flat head can be broadened in either direction relative to a connecting shaft. To give yet another example, in cases where mechanical actuation is employed as opposed to hydraulic actuation, the piston may be omitted by providing guidance for the pin within a retainment layer.

FIGS. 94, 95, 96, 97, 98, and 99 show an additional variety of Braille pins for use with the invention, including an associated arrangement of substrate layers.

Figure 94:
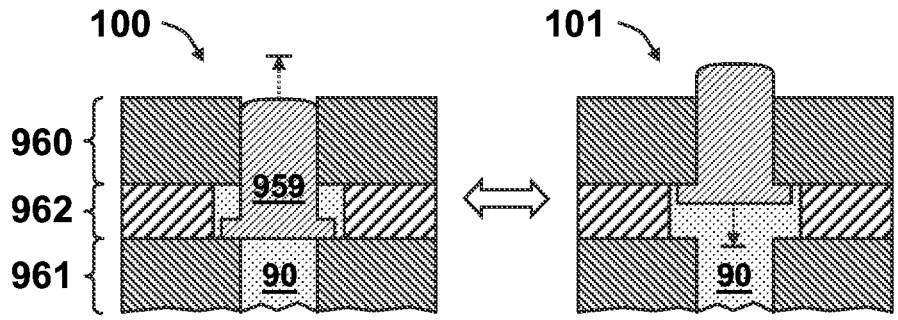
FIGS. 94, 95, 96, and 97 are partial side cross-sectional views of four different inventive Braille pins configured within substrate layers to hydraulic actuation.

Referring to FIG. 94, a Braille pin 959 is shown moving between unraised and raised states 100, 101 under the action of hydraulic fluid 90. With a piston chamber layer 960 above and base layer 961 below a spacer layer 962, the pin 959 has cleats at the bottom of its piston to constrain the movement of the cleats to a space within the spacer layer 962.

Figure 95:
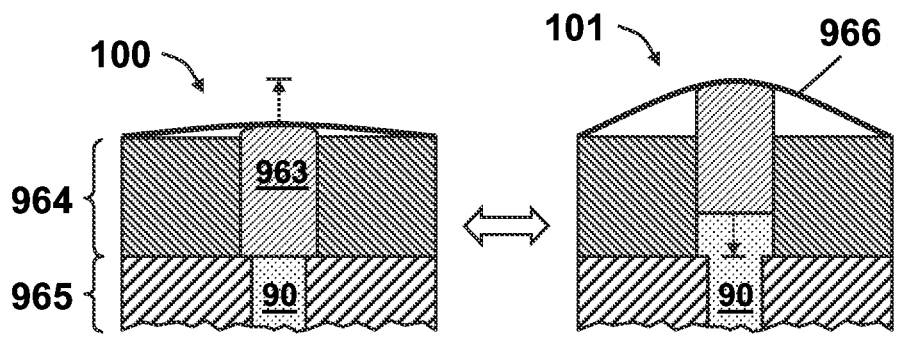

Referring to FIG. 95, a Braille pin 963 is shown moving within a piston chamber layer 964 between unraised and raised states 100, 101 under the action of hydraulic fluid 90. A downward movement of the pin 963 is constrained by contact of the bottom of its piston with the top of a base layer 965 and an upward movement of the pin 963 is constrained by an elastic member 966 disposed on top of the piston chamber layer 964.

Figure 96:
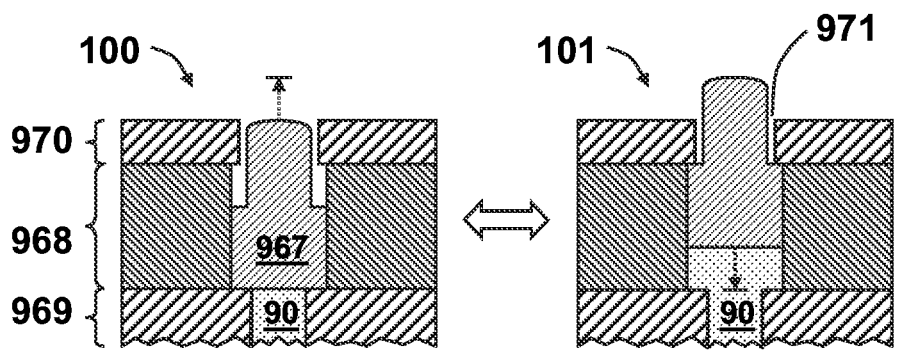

Referring to FIG. 96, a Braille pin 967 is shown moving within a piston chamber layer 968 between unraised and raised states 100, 101 under the action of hydraulic fluid 90. A downward movement of the pin 967 is constrained by contact of the bottom of its piston with the top of a base layer 969 and an upward movement of the pin 967 is constrained by contact of the top of its piston with the bottom of a retainment layer 970. A pressure relief 971 is included in the retainment layer 970 to prevent a pressure lock. Alternatively, a pressure relief can be disposed within the pin 967 in the form of channels or holes.

Figure 97:
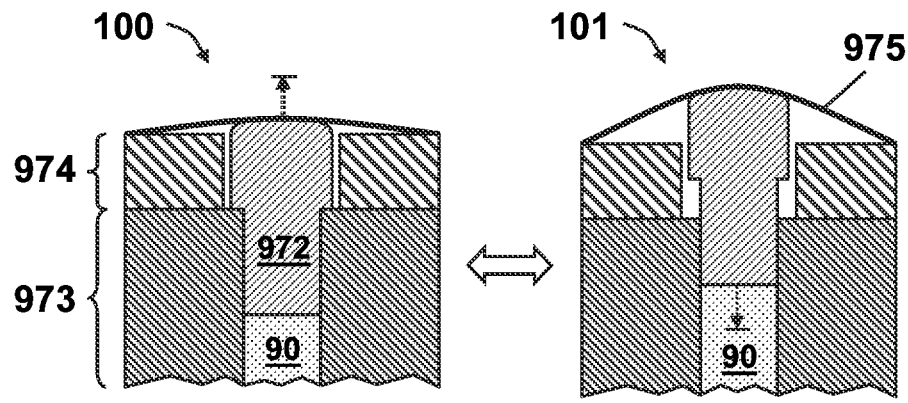

Referring to FIG. 97, a Braille pin 972 is shown moving within a piston chamber layer 973 between unraised and raised states 100, 101 under the action of hydraulic fluid 90. A downward movement of the pin 972 is constrained by contact of the bottom of its connecting shaft with the top of the piston chamber layer 973 and an upward movement of the pin 972 is constrained by an elastic member 975 disposed on top of an overlying retainment layer 974.

Figure 98:
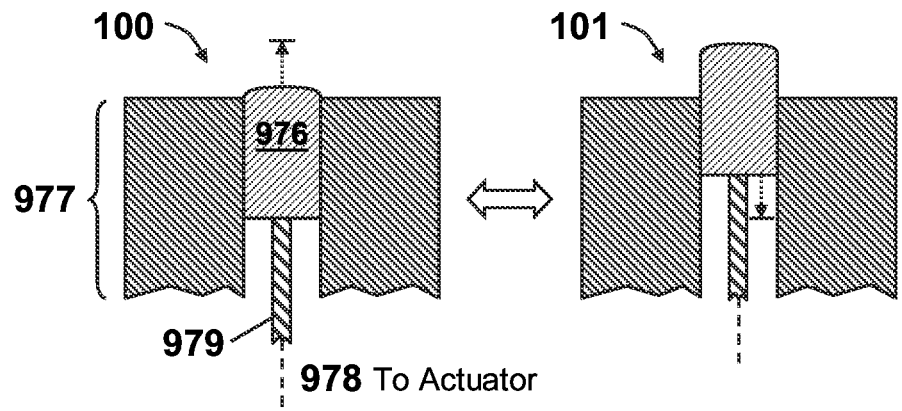
FIGS. 98 and 99 are partial side cross-sectional views of two different examples of an inventive Braille pin configured to mechanical actuation.

Referring to FIG. 98, a Braille pin 976 is shown moving within a piston chamber layer 977 between unraised and raised states 100, 101 under the action of a mechanical actuator 978 which is in mechanical communication with the pin via a connecting member 979. Exemplary connecting members 979 include connecting wires and connecting rods. Exemplary wires include wires made of spring steel. Exemplary actuators include push-pull type mini solenoids and bimorph piezoelectric reeds. The upward and downward movement of the pin 976 is constrained by the mechanical movements of its actuator 978.

Figure 99:
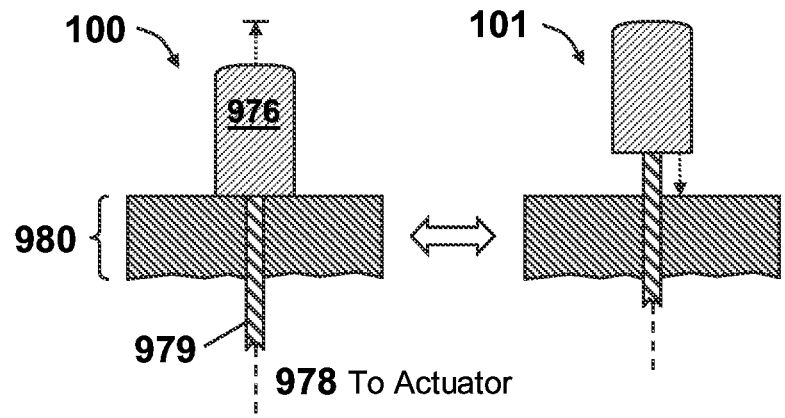

Alternatively, referring to FIG. 99 in view of FIG. 98, the piston chamber layer 977 can be omitted in favor of a connecting member guide layer 980, which serves as a guide for the connecting member 979. Though not shown in the drawing, in the case of FIG. 99 a retainment layer can be added on top of the connecting member guide layer 980 to limit lateral movement of the pin 976 under pressure from the finger. In the case of FIG. 99, as opposed to having an elaborated head of the pin 976 attached to the connecting member 979 as shown, the head of the pin 976 can be provided simply by the tip of the connecting member 979 itself, which in turn may be covered with an elastomeric layer or an impenetrable flexible layer for finger comfort.

Referring to FIG. 98 in view of FIG. 99, the piston chamber layer 977 can have the connecting member guide layer 980 disposed underneath it so as to route or guide the connecting member 979 to the pin 976 disposed within the piston chamber layer 977.

In general, where hydraulic actuation of a Braille pin is shown in the drawing, it can be replaced by mechanical or pneumatic actuation, and vice versa.

For example, referring to FIG. 98, the connecting member 979 can be replaced by hydraulic fluid. In such a case, however, since the pin 976 lacks any features to constrain its movement, the pressurization and depressurization of the hydraulic fluid will have to be controlled finely enough to limit movement of the pin 976 to a predetermined stroke distance.

To give another example, referring to FIG. 94 in view of FIG. 98, the hydraulic fluid 90 can be replaced by the connecting the mechanical actuator 978 to the pin 959 via the connecting member 979. But when using mechanical actuators 978, it is generally preferable to constrain movement of the pin 976 on the actuator side of the system rather than on the pin side. Also noted is that hydraulic actuation is generally preferred over pneumatic actuation. Accordingly, FIGS. 2B, 2C, 84, 85, 86, 87, 88, 89, 90, 91, 92, 93, 94, 95, 96, and 97 show Braille pin configurations which are best practiced using hydraulic actuation in contrast to FIGS. 98 and 99 which show Braille pin configurations which are best practiced using mechanical actuation.

J. Additional Timing Diagrams

In view of FIGS. 2A, 2B, 4, 56, and 74, FIGS. 100, 102, and 104 show inventive timing diagrams for propagating a top row of pins (viz. half-pins) to form the letter "a" in Braille on the inventive self-scrolling Braille display. In contrast to the timing diagram of FIG. 4, in which pins have been numbered from 1 to 13 as in the pins 5 of the self-scrolling Braille display 10 of FIG. 2B, in FIGS. 100, 101, and 104 the pins have been numbered as are the pins 903 (viz. half-pins) in the Braille display 902 of FIG. 56, such that the ith control signal $Q_i$ controls the ith pin.

As shown in FIG. 2A, two half-pins 5 which are adjacent are raised form the Braille dot 6. But a more general term than "half-pin" is "pin" since even one pin or more than two pins can also be used to produce the self-scrolling Braille effect according to the invention. Hence, the terms pin and half-pin can be used somewhat interchangeably; for, though using two pins to form one Braille dot is the preferred methodology and for this reason the pins are typically referred to as half-pins, the pins of the display can also be used in other configurations as well.

Figure 100:
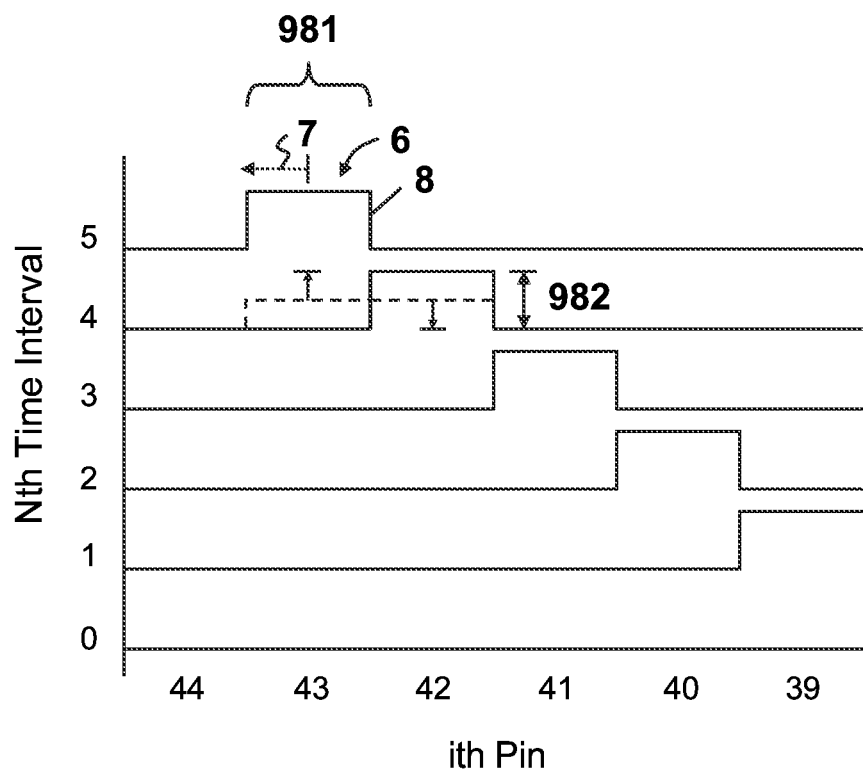
FIG. 100 is an inventive timing diagram for propagating a top row of pins to form the character "a" in Braille on the inventive display.
Figure 102:
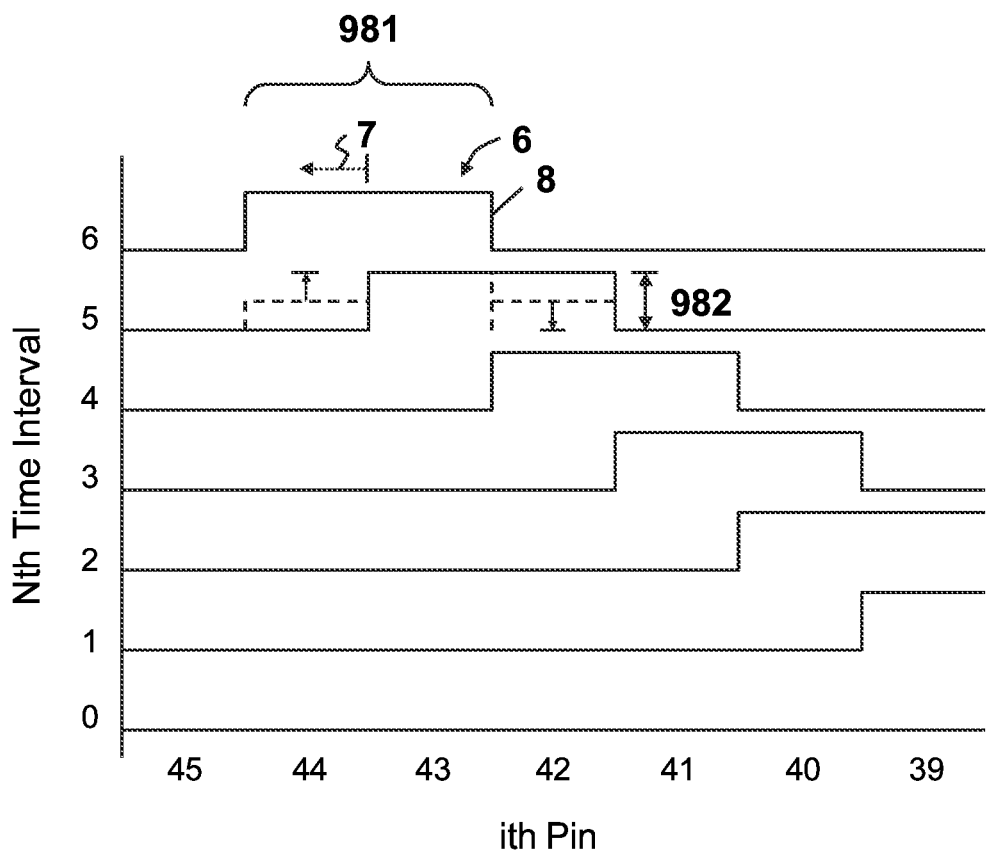
FIG. 102 is an inventive timing diagram for propagating a top row of pins to form the character "a" in Braille on the inventive display.
Figure 104:
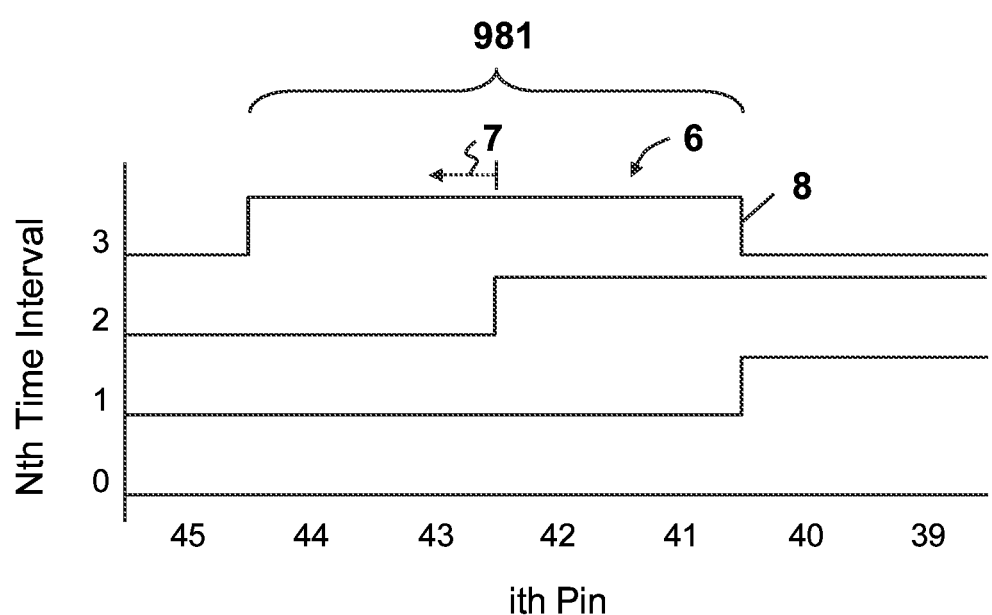
FIG. 104 is an inventive timing diagram for propagating a top row of pins to form the character "a" in Braille on the inventive display.

In the timing diagrams of FIGS. 100, 102, and 104, the high state (logic value one) represents a raised pin and the low state (logic value zero) represents an unraised pin. The rate at which pin states are propagated is controlled by the microcontroller by setting the duration of the time interval according to user preferences. Referring to FIGS. 100, 102, and 104, according to the self-scrolling Braille effect a sequential raising and lowering of the pins in series causes the Braille dot 6 formed by the raised state of the pins to laterally propagate 7 as a transverse wave 8 which scrolls past a stationary finger resting on a stationary substrate in which the pins are disposed.

FIG. 100 shows a timing diagram where self-scrolling Braille is propagated in the form of a train 981 which is only one pin long. Referring to FIG. 100, consider the time in between the 4th and 5th time intervals. At this point in time, the 42nd pin has been lowered half-way and the 43rd pin has been raised half-way, as shown in dashed lines. At this half-way point, the amplitude 982 of the transverse wave 8 has been reduced to one-half its maximum.

Figure 101:
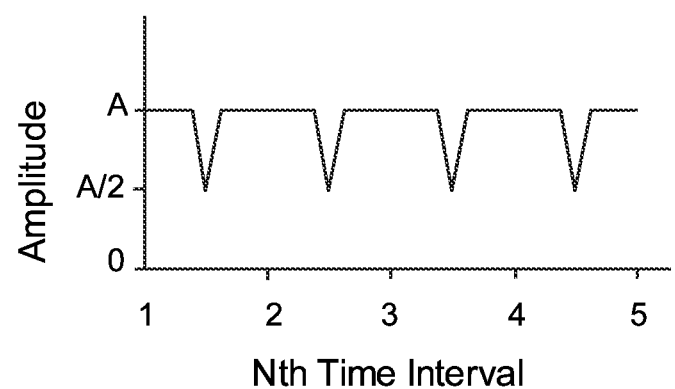
FIG. 101 is graph of amplitude versus time for a transverse wave shown in the timing diagram of FIG. 100.

FIG. 101 graphs the amplitude of the transverse wave 8 shown in FIG. 100 as a function of time. Referring to FIG. 101 in view of FIG. 100, the amplitude 982 of the transverse wave 8 vacillates between its full value A and half that value A/2. This vacillation can appear as a jittery or wobbly sensation under the finger.

In contrast, FIG. 102 shows a timing diagram where self-scrolling Braille is propagated in the form of a train 981 which is two pins long. Referring to FIG. 102, consider the time in between the 5th and 6th time intervals. At this point in time, the 42nd pin has been lowered half-way and the 44th pin has been raised half-way, as shown in dashed lines. But because the 43rd pin remains fully raised, the amplitude 982 of the transverse wave 8 retains its full value.

Figure 103:
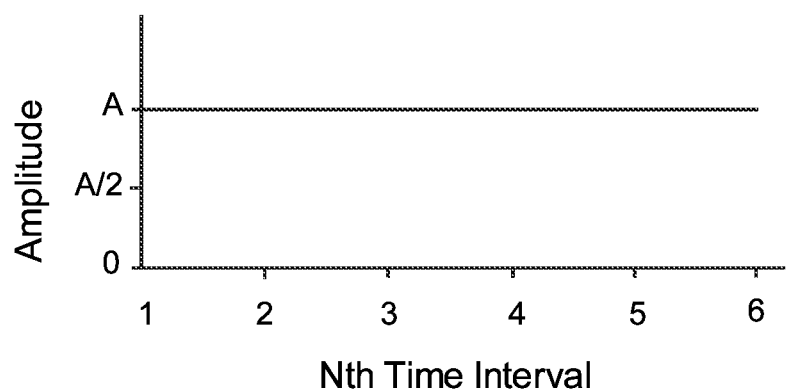
FIG. 103 is graph of amplitude versus time for a transverse wave shown in the timing diagram of FIG. 102.

FIG. 103 graphs the amplitude of the transverse wave 8 shown in FIG. 102 as a function of time. Referring to FIG. 103 in view of FIG. 102, the amplitude 982 constantly retains its full value A over time because at least one pin remains in the raised state at all times. Consequently, there is no jittery or wobbly effect, unlike what is shown in FIG. 101.

FIG. 104 shows a timing diagram where self-scrolling Braille is propagated in the form of a train 981 which is two pin sets long and where each pin set is composed of two pins. In this case, two adjacent pins forming a pin set are raised and lowered in unison as if one pin. Pin sets can be used to emulate wider pins on a track which has narrower pins.

Referring to FIG. 100, at the 3rd time interval, the rearmost pin of the train 981 is pin 41 and the pin immediately in front of the train 981 is pin 42. Referring to FIG. 102, at the 3rd time interval, the rearmost pin of the train 981 is pin 40 and the pin immediately in front of the train 981 is pin 42. Referring to FIG. 104, at the 2nd time interval, the rearmost pin set of the train 981 is formed by pins 39 and 40 and the pin set immediately in front of the train 981 is formed by pins 43 and 44.

Referring to FIGS. 100 and 102, the inventive self-scrolling Braille dot 6 is laterally propagated 7 along a given track of pins in the manner of a transverse wave 8 by lowering the rearmost pin of the train 981 while raising the pin immediately in front of the train 981. In general, referring to FIGS. 100, 102, and 104, the inventive self-scrolling Braille dot 6 is laterally propagated 7 along a given track of pins in the manner of a transverse wave 8 by lowering the rearmost pin or pin set of the train 981 while raising the pin or pin set immediately in front of the train 981. The rearmost of the train 981 can also be called the trailing pin or pin set and that immediately in front of the train 981 can also be called the leading pin or pin set. Regarding the ends of the track 981, the propagation of the train 981 is treated as if there were imaginary pins extending beyond either end, so that the train 981 gradually emerges at one end of the track 981 and then gradually disappears at the other end. See also FIGS. 2B and 4.

As shown in FIGS. 102 and 103, employing at least two pins or pin sets in forming the train 981 will preserve the amplitude of the transverse wave 8. See also FIG. 104. In contrast, as shown in FIGS. 100 and 101, employing only one pin or pin set in forming the train 981 will make the amplitude of the transverse wave 8 jitter or wobble over time.

Accordingly, referring to FIGS. 100, 101, 102, 103, and 104, to provide a smoother self-scrolling Braille effect it is advantageous to employ trains 981 which are at least two or more pins or pin sets in length.

K. Typographical Emphasis and Inline Linking

Typographical emphasis, such as boldface and italic type, and inline linking, also known as hotlinks, are often used to highlight or enhance sighted text. Emphasis, hotlinks, and other such attributes or significances can be added to self-scrolling Braille by method of a markup language which the user can read along with other text. Alternatively, they can be added by method of haptic effects. For example, the haptic effects can take the form of a set of distinguishable vibratory or pulsatile modes, wherein certain members of the set signify, for example, a hotlink or a particular kind of emphasis, for example, boldface type.

To produce a distinguishable set of haptic effects, the pins, viz. half-pins, of the self-scrolling Braille display can be made to vibrate or pulse at predetermined frequencies or intensities in addition to being raised and lowered. In such a case, the vibrations or pulses will occur as overtones which are superimposed upon the frequency associated with the raising and lowering of the pins which signifies the raised and unraised states.

Alternatively, the Braille display itself, whether in whole or in part, or other device in contact with the user's body, can be made to vibrate or pulse in sync with the scrolling of text when the text is to be given emphasis or to indicate a hotlink or other such attributes or significances. Alternatively, an additional row, viz. track, of pins can be added to the display to code for such attributes or significances as emphasis, inline linking, and so forth. Alternatively, Braille characters can be inflected to signify emphasis, inline linking, or other such attributes or significances.

L. Modification of the Children's Braille Tablet

Figure 105:
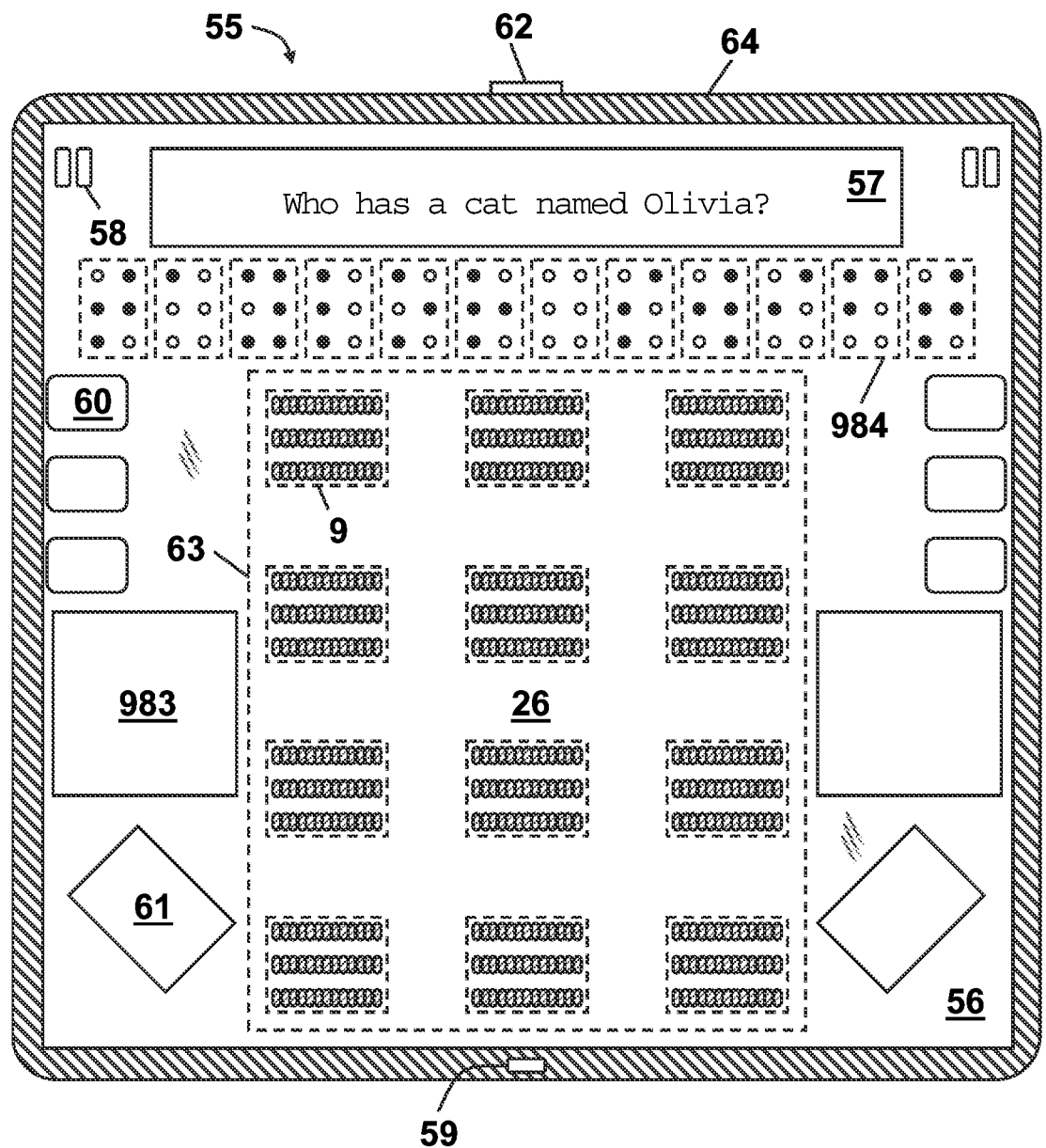
FIG. 105 is a top orthogonal view of a modified embodiment of the children's Braille tablet shown in FIG. 13.

FIG. 105 shows a modified version of the children's Braille tablet 55 shown in FIG. 13, meaning computer tablet. The tablet 55 includes computer electronics and preferably a rechargeable battery with an inductive coupling for wireless charging via an external charging station, along with electronics to monitor and regulate power supply.

Referring to FIG. 105 in view of FIG. 13, the modified children's Braille tablet 55 further includes left and right side tactile graphics displays 983 and a row of electronically refreshable Braille cells 984 to display Braille characters which are generally static as opposed to self-scrolling. The static cells are useful in teaching children to read Braille signage.

What is claimed is:

1. A method of interactive reading, comprising: temporally pairing a self-scrolling Braille display with another process or event, whereby the other process or event is performed or recorded in computer-controlled synchronization with a presenting of dots, words, or characters on the self-scrolling Braille display.

2. The method of claim 1, wherein the other process or event performs a text-to-speech function in synchronization with the self-scrolling Braille display, whereby an audio device plays a spoken version of a text or characters being presented to a learner of Braille.

3. The method of claim 1, wherein the other process or event monitors and records a user heart rate, brain waves, breathing rate, perspiration rate, or other physiological variable relating to an interaction of mind and body and which record is made in correspondence to a record of text as said text was presented to the user in Braille.

4. The method of claim 1, wherein the other process or event presents a user with an aroma, vibration, sound, or other stimulus in synchronization with a passage in Braille, whereby the user is presented with said stimulus in synchronization with a reading of the passage.

5. A method of interactive reading, comprising:
upon two processes or events,
at least one of the two processes or events presenting a transverse wave of haptic indicia configured to communicate a simulated lateral motion of a train of haptic information for reading by a user in contact with a surface of the user's body,
temporally pairing the two processes or events together, whereby one of the two processes or events is performed or recorded in computer-controlled synchronization with the other process or event.

6. The method of claim 5, wherein the haptic indicia are configured to communicate information in Braille.

7. The method of claim 6, wherein the haptic indicia comprise palpable protuberances.

8. The method of claim 7, wherein one of the two processes or events performs a text-to-speech conversion in sync with the information communicated in Braille by the other process or event, whereby an audio device plays a spoken version of the information communicated in Braille by the other process or event.

9. The method of claim 7, wherein one of the two processes or events monitors and records a heart rate, brain waves, breathing rate, perspiration rate, or other physiological variable relating to an interaction of the user's mind and body, wherein the physiological variable is recorded in correspondence to a record of the information communicated in Braille by the other process or event.

10. The method of claim 7, wherein one of the two processes or events presents the user with an aroma, vibration, sound, or other stimulus in sync with the information communicated in Braille by the other process or event.

11. The method of claim 5, wherein a worn, handheld, or desktop device is adapted to providing said contact between the haptic indicia and the surface of the user's body.

12. The method of claim 11, wherein said surface of the user's body is a finger, toe, or underside of a wrist.

13. The method of claim 12, wherein the haptic indicia are configured to communicate information in Braille.

14. The method of claim 13, wherein the haptic indicia comprise palpable protuberances.

15. The method of claim 14, wherein one of the two processes or events performs a text-to-speech conversion in sync with the information communicated in Braille by the other process or event, whereby an audio device plays a spoken version of the information communicated in Braille by the other process or event.

16. The method of claim 14, wherein one of the two processes or events monitors and records a heart rate, brain waves, breathing rate, perspiration rate, or other physiological variable relating to an interaction of the user's mind and body, wherein the physiological variable is recorded in correspondence to a record of the information communicated in Braille by the other process or event.

17. The method of claim 14, wherein one of the two processes or events presents the user with an aroma, vibration, sound, or other stimulus in sync with the information communicated in Braille by the other process or event.

18. The method of claim 5, wherein one of the two processes or events performs a text-to-speech conversion in sync with the haptic information communicated by the other process or event, whereby an audio device plays a spoken version of the haptic information communicated by the other process or event.

19. The method of claim 5, wherein one of the two processes or events monitors and records a heart rate, brain waves, breathing rate, perspiration rate, or other physiological variable relating to an interaction of the user's mind and body, wherein the physiological variable is recorded in correspondence to a record of the haptic information communicated by the other process or event.

20. The method of claim 5, wherein one of the two processes or events presents the user with an aroma, vibration, sound, or other stimulus in sync with the haptic information communicated by the other process or event.

21. A method of interactive sensory experience, comprising:
upon two processes or events,
at least one of the two processes or events presenting a transverse wave of haptic indicia configured to communicate a simulated lateral motion of a train of tactile stimulation for sensing by a user in contact with a surface of the user's body,
temporally pairing the two processes or events together, whereby one of the two processes or events is performed or recorded in computer-controlled synchronization with the other process or event.

22. The method of claim 21, wherein the tactile stimulation is configured to communicate haptic information selected from the group consisting of direction, elevation, heading, alignment, magnitude, pattern, beat, signal, timing, matching, coincidence, degree, rotation, and position.

23. The method of claim 21, wherein the tactile stimulation is presented on a sensitive region of the user's body for reading.

24. The method of claim 21, wherein the tactile stimulation is presented on a sensitive region of the user's body for a purpose other than reading.

25. The method of claim 24, wherein the purpose other than reading is massage.

26. The method of claim 21, wherein the transverse wave of haptic indicia is provided by a user-worn haptic device.

27. The method of claim 26, wherein the transverse wave of haptic indicia provided by the user-worn haptic device is configured to simulate a sensation of a virtual textured surface moving in contact with said surface of the user's body.

28. The method of claim 26, wherein the user-worn haptic device is a finger-worn haptic device.

29. The method of claim 28, wherein the transverse wave of haptic indicia provided by the finger-worn haptic device is configured to simulate a sensation of a virtual textured surface moving under the user's fingertip.

* * * * *